United States Patent [19]
Sinor et al.

[11] Patent Number: 5,583,506
[45] Date of Patent: Dec. 10, 1996

[54] SIGNAL PROCESSING SYSTEM AND METHOD

[75] Inventors: Susan S. Sinor, Ellicott City; Vincent S. Zagardo, Cockeysville; David B. Fry, Columbia; Michael D. Vanous, Ellicott City; David L. Mowery, Highland; Gary M. Kiselewich, Baltimore; Michael J. Gardner, Laurel; Alfred B. Fitzgerald, III; William D. Horner, both of Severna Park; Lynn D. Ferguson, Ellicott City, all of Md.

[73] Assignee: Northrop Grumman Corporation, Los Angeles, Calif.

[21] Appl. No.: 223,091

[22] Filed: Jul. 22, 1988

[51] Int. Cl.[6] ................................................ G01S 13/00
[52] U.S. Cl. ..................................... 342/25; 364/132
[58] Field of Search ........................... 364/200, 900, 364/131–133; 342/25

[56] References Cited

U.S. PATENT DOCUMENTS

| | | | |
|---|---|---|---|
| 3,905,031 | 9/1975 | McCord | 342/25 |
| 4,339,752 | 7/1982 | Williams et al. | 342/25 |
| 4,709,327 | 11/1987 | Hillis et al. | 364/200 |
| 4,773,038 | 9/1988 | Hillis et al. | 364/900 |
| 4,811,210 | 3/1989 | MacAulay | 364/200 |
| 4,814,973 | 3/1989 | Hillis et al. | 364/200 |

*Primary Examiner*—Salvatore Cangialosi
*Attorney, Agent, or Firm*—Walter G. Sutcliff

[57] ABSTRACT

An avionic digital signal processing system for a plurality of different types of input sensors such as radar, electro-optical, and electronic warfare that comprises a PI bus operating at 12.5 MHz and a data network subbus operating at 20 MHz. A plurality of array processor groups each having a plurality of 1750 CPU's are controlled over the PI-bus and receive their sensor inputs over the subbus data network. A plurality of general purpose 1750A computers are connected to the PI-bus for communicating control and narrow band information. A distributed operating system resides in the 1750A central processing units and includes provision for re-routing the signal paths in the event of failure of modules.

30 Claims, 19 Drawing Sheets

FIG. 4
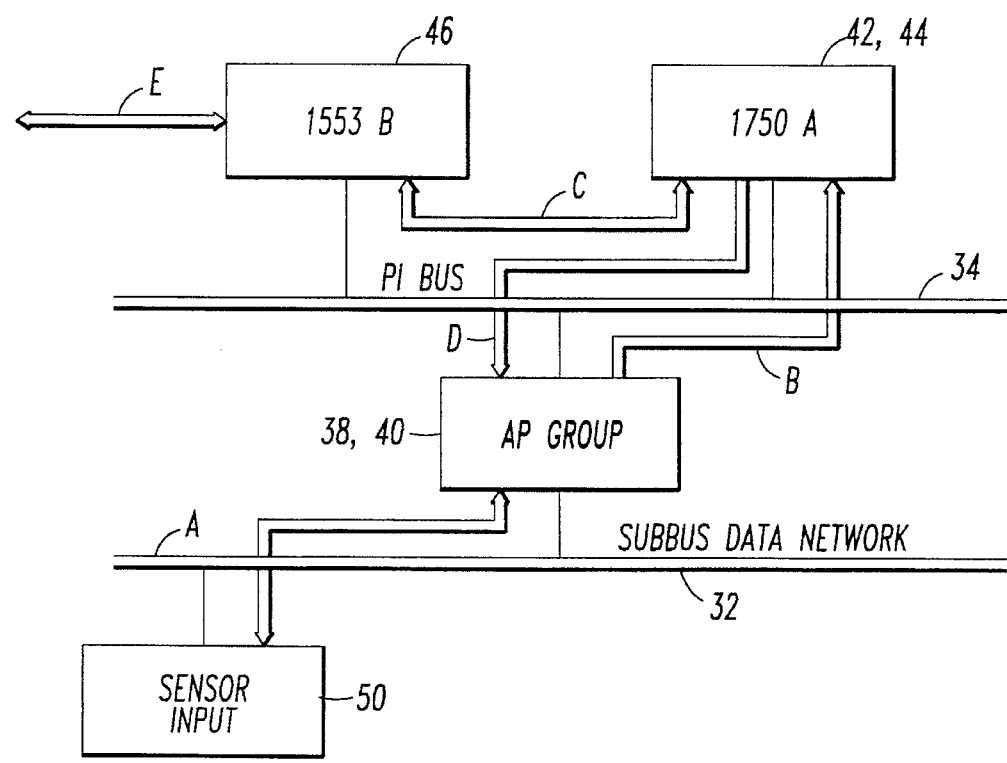
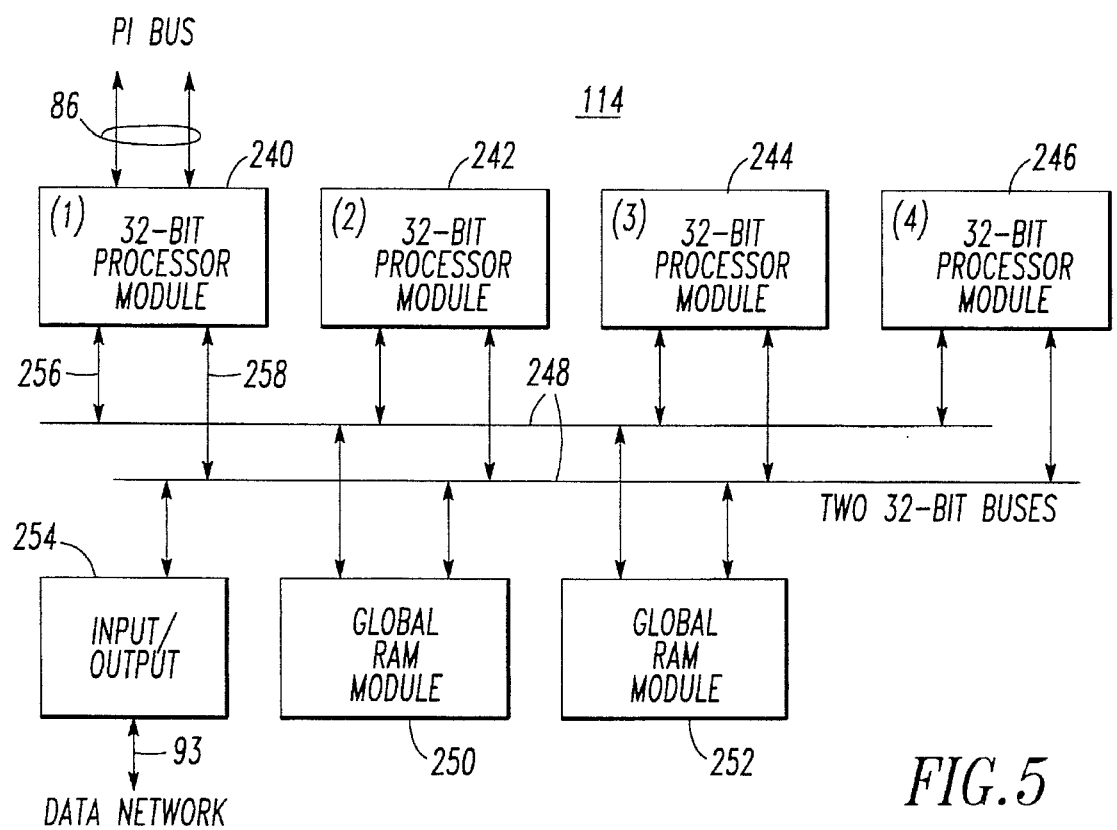
FIG. 5

FIG.10

SIGNAL PROCESSING SYSTEM AND METHOD

BACKGROUND OF THE INVENTION

The present invention relates to digital signal processing, and more particularly to a system and related method for processing digital signals in avionic systems.

With the onset of digital processing in avionics systems, such as airborne radar systems, the mission capabilities of the fighter and surveillance aircraft was radically altered, making it possible to engage and defeat enemy targets at unheard of distances and at unheard of speeds. In the years that followed, the realm of digital processing expanded as new sensors were brought on board the aircraft bringing valuable new information to the pilot. However, as threat technology grew more sophisticated, systems became more complex and more numerous, and pilots found it difficult to make sense of the volume of incoming data. In fact, the pilot became the point of integration for dozens of partially programmable computers attached to a whole array of discrete sensors.

Prior to the present invention, the failure of a component of a system associated with one of the sensors, caused the entire system associated with that sensor to become disabled, resulting in a loss in combat capability. Heretofore, the software for such individual systems was difficult to modify in order to handle the emergence of new or different types of threats. Each addition of a different type of sensor to the aircraft, required an additional dedicated signal processing system. Thus, such prior systems were not only inflexible and difficult to maintain, but also, were rapidly becoming impractical, in that the pilots task was becoming more unmanageable.

SUMMARY OF INVENTION

One of the advantages of the present invention is the provision a digital signal processing system and related method utilizing a common processor for fusing data from multiple sensors.

Another advantage of the present invention is to provide a digital signal processing system and related method for supporting a plurality of different type sensors that is fault tolerant in the face of failure of components of the system.

A further advantage of the present invention is the provision of a digital signal processing system and related method that is easily programmable to permit changes in the software as new threats emerge or hostile forces develop new tactics.

A still further advantage of the present invention is the provision of a modular signal processing system and related method operable with multiple surface and airborne sensors of different types that permits easy flight line replacement of defective modules, and for easy expansion as new sensor systems are brought on line.

Another advantage of the present invention is the provision of a signal processing system and related method for multiple sensors that minimizes hardware requirements. Objects and other inventions are set forth in part in the description which follows, and, in part will be obvious from the description or may be learned by the practice of the invention. The objects and advantages of the present invention may be realized and attained by means of the instrumentalities and combinations particularly pointed out in the appended claims.

To achieve the objects and in accordance with the purpose of the invention, as embodied and broadly described herein, a digital signal processing system for controlling avionic displays and devices in accordance with processed signals from a plurality of sensors, comprises a plurality of array processor groups. Each group includes bulk memory means for storing sensor received data, signal processing means for processing the stored data, and controller means for handling the storage and processing of the data. Subbus data network means interconnect the bulk memory means, the signal processing means, and control means of each respective array processor group, and also interconnect the plurality of groups in parallel relationship, for storing sensed data in a bulk memory means of a selected group and for processing and transferring the stored and processed data to a selected group in accordance with the control means of a selected one of the array groups. The system further comprises a plurality of individual general purpose digital computers, an input/output module means for receiving and generating instructions to operate the avionic displays and devices; and parallel interface bus means interconnecting each of the genral purpose computers, the input/output module means, and the control means of each array processor group in parallel relationship to one another for generating the signals to operate the display and avionic devices in accordance with the processed signals.

BRIEF DESCRIPTION OF THE DRAWINGS

FIG. 4 is schematic diagram illustrating the flow of information between an array processor group and a general purpose computer in the system and method of the invention;

FIG. 5 is a schematic block diagram of a DP processing module that may be used in the system of FIG. 2;

FIGS. 10 through 19 are diagrams of different addressing styles for the processor bulk memory of FIG. 3;

DETAILED DESCRIPTION OF THE PREFERRED EMBODIMENT

General Organization

Figure 1:
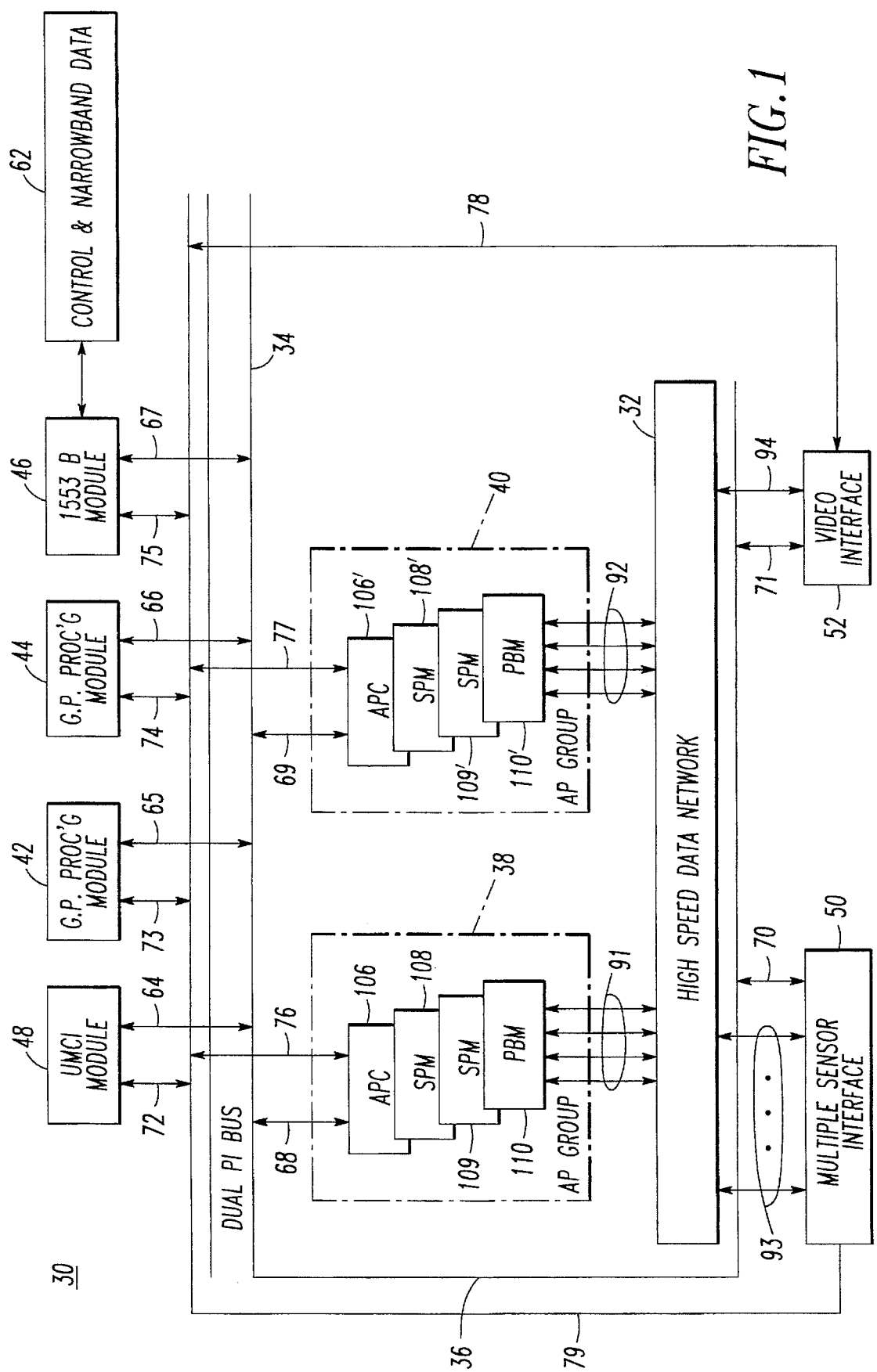
FIG. 1 is a broad schematic block diagram of a signal processing system in accordance with one embodiment of the present invention.

Referring to the drawings where like reference characters refer to like parts, there is illustrated and described a digital signal processing system for controlling avionic displays and devices in accordance with processed signals from a plurality of sensors. As embodied herein and referring to FIG. 1, a digital signal processing system generally referred to as 30, comprises a high speed setup bus data network 32, which is referred to herein as a subbus or a data network, or at times a subbus data network and a dual parallel interface (PI) bus 34. System 30 includes array processor group modules 38 and 40, VHSIC 1750A general purpose computer modules 42 and 44, a 153B input/output module 46, a user maintenance console interface (UMCI) module 48, a sensors interface module 50, and a video interface module 52.

All of the system modules are connected in parallel to TM bus 36 by respective input/outouts 64 through 71 inclusive for booting and maintenance of the system. Each of modules 42, 44, 46, and 48 has a control input/output 72 through 75 inclusive connected in parallel relationship to dual PI bus 34. Modules 38, 40, 50 and 52, each have a control input/output 76 through 79, inclusive, connected in parallel-relationship to PI bus 34; and also a signal input/output 91 through 94 connected in parallel relationship to high speed subbus data network 32.

In accordance with the invention the system includes parallel interface bus means interconnecting each of the genral purpose computers, the input/output module means, and the control means of each array processor group in parallel relationship to one another for generating the signals to operate the display and avionic devices in accordance with the processed signals. As embodied herein PI bus 34 provides an intermodule, redundant communication path for the transfer of control information and other high level data messages over the above mentioned control input/outputs of the connected modules.

The invention includes subbus data network means interconnecting the bulk memory means, the signal processing means, and control means of each respective array processor group, and interconnecting the plurality of groups in parallel relationship for storing sensed data in a bulk memory means of a selected array group and for processing and transferring the stored and processed data to a selected array group in accordance with the control means of a selected one of the array groups. Preferably, and as herein embodied data network 32 is a high bandwidth, quickly reconfigurable data network for intermodule exchange of signal processing data over the signal input/outputs of the connected modules. This arrangement of the various modules with PI bus 34 and data network 32 implements the needs of radar electro optics, electronic warfare, and segment signal processing wherein the input data rates through sensors interface module 50 are high and the output data comprises both a video display through video interface 52; and narrow band target messages and control commands through input/output module 46. Up to 31 module groups are able to be supported by PI bus protocol so that signal processing systems of up to 10 billion operations per second (BOPS) and up to 80 million instructions per second (MIPS) can be transferred. Data network 32 may take either one of two modular forms depending on the size of the system. For smaller systems, typical of present radar requirements, data network 32 may comprise four 40 Megabyte per second buses. For larger systems the buses are interconnected by an active crossbar network, referred to herein as a WEB, which also transfers data at 40 Megabytes per second per connection. Data network 32 transfers data for coherent vector processing prior to primary thresholding, and PI bus 34 transfers data used in target-space, scalar processing after target detection.

In accordance with the invention, the system has a plurality of array processor groups, each group including bulk memory means for storing sensor received data, signal processing means for processing the stored data, and controller means for handling the storage and processing of the data. As herein embodied, and referring to FIG. 1, array group 38,40 respectively include controller 106, 106', signal processing modules 108, 108' and 109, 109', and processor bulk memory module 110, 110'. It is intended that vector oriented signal processing tasks be carried out on array processor groups 38 and 40, which are each capable of 640 million operations per second (MOPS).

The system of the present invention includes a plurality of individual general purpose digital computers. As herein embodied general purpose processing modules 42 and 44, are well known computers known as 1750A, one of which is provided for redundant backup, are utilized by the system for high level scheduling of the array processor groups 38 and 40, and the tracking of a modest number of targets.

The invention further includes an input/output module means for receiving and generating instructions to operate the avionic displays and devices; and user maintenance console interface module for use during field diagnosis and software development. As herein embodied, a well known input/output device 46, known as a 1553B device, and module 48 is coupled to PI bus 34. Module 48 includes a master clock that operates at 40 MHz which frequency is conventionally divided and inverted for obtaining a clock rate of 20 MHz on subbus 32 and 12.5MHz on P1 bus 34.

Figure 2:
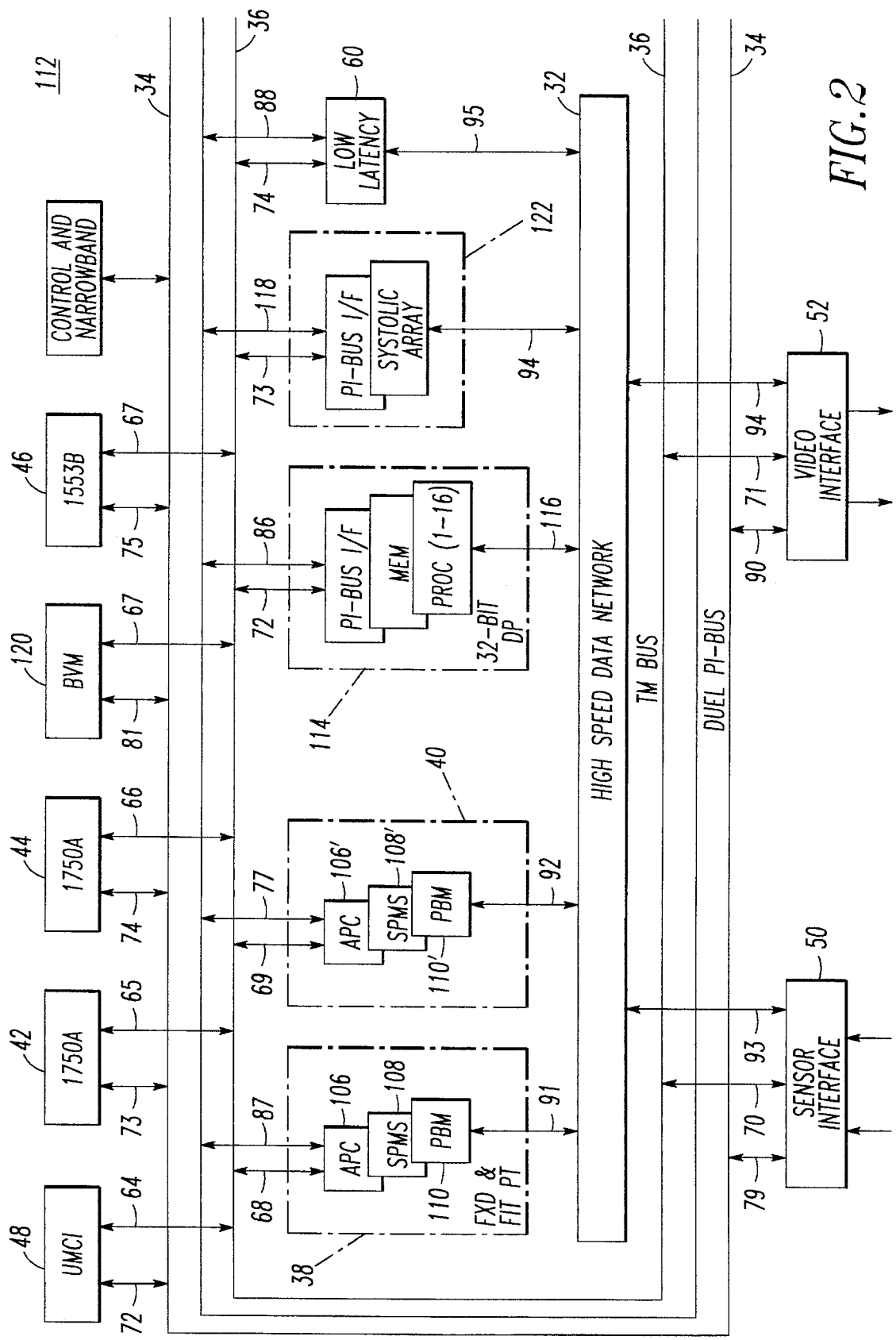
FIG. 2 is a broad schematic block diagram of a signal processing system and method of the present invention illustrating exemplary types of modules that may be used therewith.

Referring to FIG. 2, a digital signaling processing system generally referred to as 112, is shown with additional modules that may be used for systems with special requirements. For example, where surveillance radar is one of the types of sensor inputs, data processing group 114, which may comprise up to sixteen individual 32 bit data processors for handling targets held in track, because, there is the need to track or otherwise process many more targets passing the primary thresholds. A thousand targets held in track is not unusual, with false alarms generating an additional few thousand tracks that are held for only a few scans. Networking further adds to the load by expanding the field of view beyond that of the local sensor. In this application, raw thresholded data is brought from interface 50, over output 93, and data network 32 directly into group 114 over output 116; and off- loading PI bus 34 of primary data crossings over input/output 46 through connection 118. A non-volatile memory module 120, which is used for the storage of executable images and fault logging also may be included.

For applications where unique requirements must be met, system 112 may utilize in addition, a systolic type vector processor 122. Module 122 is a high performance two BOPS programmable module that is most efficient on structured signal processing problems typically found at the front-end of the signal processing chain. The bandwidth of data network 34 permits a module, such as 122 to be incorporated into the system of the present invention.

Array Processor Group Modules

Referring again to FIG. 1, each one of the similar array processor group modules 38,40 comprises an array processor controller (APC) line replaceable module 106, 106' a signal processing module (SPM) pair 108 and 109, 108' and 109' respectively, and a processor bulk memory module (PBM) 110, 110'. Because module groups 38 and 40 are similar, group 38 will be described in detail in FIG. 3 wherein the controller is in block 106, signal processing module in block 108, processor block memory in block 110, and dta network associated with group 38 in block 32, all as defined by a continuous solid line boundary.

Figure 3:
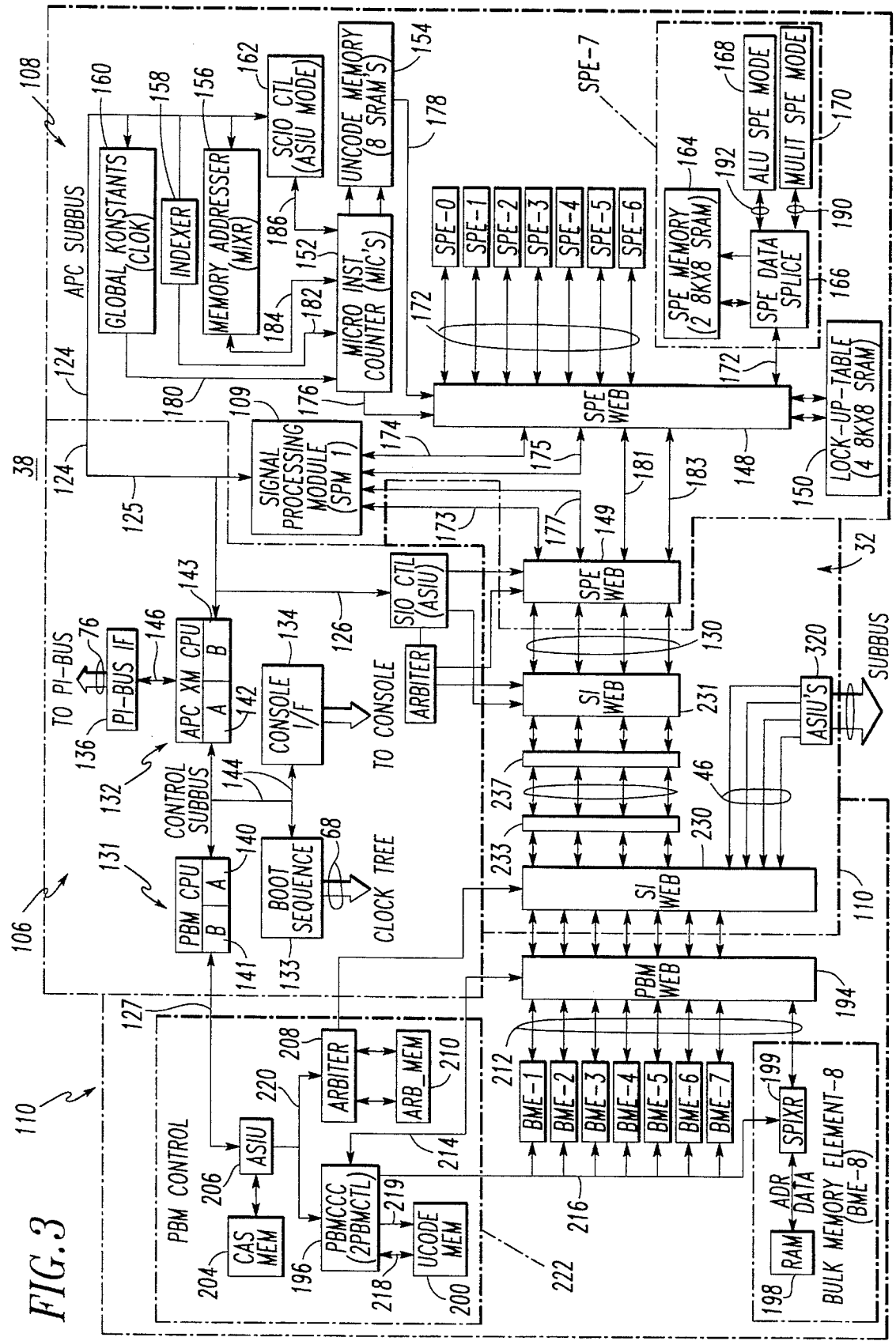
FIG. 3 is a schematic block diagram of an array processor group of modules utilized in the system of the present invention.

Referring to FIG. 3, APC module 106 is connected to SPM modules 108 and 109 over lines 124, 125, and 126. SPM modules 108 and 109 are connected to PBM module 110, through data network 32 by lines 130. In turn, PBM module 110 is coupled to APC module 108 at connection 127. As embodied herein, array processor controller module 106, which provides embedded control to AP group 38, contains 256K of memory for a distributed operating system, hereinafter described, and local storage. APC module 106 governs the communication between modules 108, 109, 110, and the outside world. Signal Processing modules 108 and 109 provide the high speed processing functions for AP group 38. SPM modules 108 and 109 receive sensor data from data network 32 via PBM module 110 at input/output 91 of the data network, and perform signal processing instructions under the control of APC module 106 on lines 124, 125, and 126. Intermediate results of signal processing from SPM modules 108, and 109 are returned to PBM module 110 for transfer to another functional element of group 38 or to data network 32 at connection 130.

As herein embodied, processor bulk memory module 110 contains 256K of static RAM for storage of input data, partially processed data, or fully processed data ready for output to video interface 52, for example.

APC Module

Referring again to FIG. 3, APC control module 106 contains two pair of embedded control VHSIC 1750A central processing units 131 and 132, a boot sequencer 133, a console interface 134, and a PI bus interface 136. One CPU 140 of the pair 131, and one CPU 142 of pair 132 are connected by control subbus 144, at times referred to hereinafter C to C bus, in common with boot sequencer 132 and console interface 134. PI bus interface 136 is connected to CPU 132 at line 146. Another of the pair of CPU's 131, referred to as 141 is connected functionally to PBM module 110 by line 127. Another of the pair of CPU's 132, referred to as 143 is connected functionally, and in the present embodiment physically to SPM module 108 and 109 over lines 124 and 125, respectively.

CPU 140 of pair 131, and PCU 142 of pair 132 handle all traffic on PI bus 34 and overall system topology, as well as interpreting messages received, and initiating the appropriate response. CPU 141 of pair 131 controls PBM module 110, and CPU 143 of pair 132 runs an application program that calls signal processing procedures to perform the signal processing tasks. The signal processing procedures themselves execute on the SPE array and operate on data vectors initially supplied from the PBM.

SPM Module

Each of SPM modules 108 and 109 contain eight signal processing elements SPE-0 through SPE-7 for a total of sixteen SPE elements, and a local I/O switch (SPEWEB) 148. Switch 148 also includes a look up table 150 for use by the SPE array. Modules 108 and 109 also each contain a micro-code sequencer 152, a resident memory 154, a memory addresser 156, an indexer 158, a global constant store (GLOK) 160, and a signal instruction controller 162. Each of the SPE portions represented by element SPE-7 contains an 8K by 16 local memory, a 32 word multi-register file 166 (SPE DATA SLICE), an arithmetic logic unit 168, and a multiplier 170 to implement 16 bit integer arithmetic operations at 20MHz. I/O switch 148 is connected to each of SPE's 0–7 by lines 172 of module 108, and connected to module 109 by input/output lines 174 and 175. An I/O switch 149, similar to switch 148, is connected to module 109 by lines 173 and 177. Switches 148 and 149 are connected to each other by lines 181 and 183. Micro-code sequencer 152 is connected to switch 148 at line 176, and local memory 154 is connected via line 178 to switch 148. Addresser 156, indexer 158, store 160, and controller 162 are connected to micro-code sequencer 152, referred to also as a micro instruction counter (MIC) through lines 180,182, 184, and 186, respectively.

The SPE's of SPM 108 all operate in parallel under the control of a 64 bit micro-code word resident in the SPM module. The SPE array represents a single instruction, multiple data architecture. Each SPE receives a portion of a large data set and processes it under the direction of common APC controller 106. Local memory addresses in addresser 156 and global constants in module 160 are received from APC 132 over line 124. Local memory in each SPE, represented by block 164 is a single port high speed memory which can execute a read or write operation on every clock cycle. Memory addressing is provided by (MIXR) 156 or may be provided by using a data addressing capability resident in every SPE. Data addressing permits each SPE to calculate a distinct address, with ALU 168 or multiplier 170 generating the address. Also, SPE memory 164 is able to perform conditional memory writes, which are based on the state of a flip-flop (not shown) in the conditional logic associated with ALU 168. The state of the flip-flop may also be complemented to permit the use of an "if" condition; or writing to memory may also be executed under the control of a loop sensitive suppression feature. SPE register file 166 contains thirty-two distinct registers, twenty-eight of which are general purpose. The remaining four registers are dedicated to a unique purpose, such as input/output, global constants memory access, and memory access. Register file 166 has five output ports, namely output ports X and Y reresented by line 190 which are input to multiplier 170, A and B ports 192 input to ALU 168, and autostuff port 172. Register file 166 also has three input ports, also referred to by reference numerals 190, 192, and 172 output from multiplier 170, ALU 168, and SPEWEB 148, respectively. Any register 166 may be accessed by one or all of the five output ports, but only one register may be written for each of the three input ports. The autostuff port is used to manipulate data in the register file without utilizing ALU 168 or multiplier 170 during a macro instruction.

ALU 168 contains the necessary logic to implement many different signal processing algorithms. The major elements (not shown) include a core arithmentic logic unit, a barrel shifter, a Q circuit, and the conditional logic circuit, the function of which was previouly mentioned.

The core arithmetic logic unit provides all the standard functions, namely, add, subtract, and, or, etc. Output of ALU 168 may also be scaled by a factor of two for some arithmetic operations without having to use the barrel shifter. The barrel shifter implements one clock N bit logical, algebraic, or circular shifts for single precision data. Double precision shifts are performed in two clock cycles. The Q register contains the number of positions to shift the operand, where zero is interpreted as no shifting, a positive number implies a left shift, and a negative number implies a right shift. Multiplier array 170 supports a pipelined sixteen bit by sixteen bit integer multiplication in a single clock time. Double precision multiplications are supported at a lower clock rate without the need for any external summation of the partial products. The throughput rates for multiplier precision are as follows: (a) sixteen by sixteen -one clock- (b) sixteen by thirty-two -two clocks- (c)thirty-two by thirty-two—four clocks—(d) sixteen N by sixteen -N clocks-(e) sixteen N by sixteen M —(N+1)M clocks. Examples (a) and (b) above assume that only sixteen and thirty-two bits of the product are required. If the entire product is required, then an additional clock time should be added per sixteen bit word. Example (d) can be performed entirely within the multiplier. However (e) requires partial product summation support from the ALU for (N+1)M clock cycles. The output of the multipier is passed through a barrel shifter which is used for scaling the products. Products may be scaled by a factor of 2 to the nth power where N is any whole integer from zero to forty-eight. Additional functions supported by multiplier 170 include single precision addition, single precision subtraction, single precision absolute value, and pass data mode.

As will be described in more detail in connection with the description of high speed data network 32, I/O switch (SPEWEB) 148 provides four different I/O operations, namely, (1) SPE to SPE transfers, (2) SPE to PBM/PBM to SPE transfers, (3) SPE to APC/APC to SPE transfers, and (4) SPE table lookups. Three different kinds of operation of (1) above include broadcast transfers where one SPE is selected to provide data to all other SPE,s; adjacent SPE transfers wherein data is exchanged between adjacent SPEs in either a clockwise and counterclockwise direction; amd order table transfers wherein a table stored in 148 are used to implement any type of SPE to SPE transfer, including both broadcast and adjacent types. Broadcast and adjacent transfers are carried out at a 10MHz rate, while order table transfers are performed at a 5MHz rate, i.e., each SPE can source and sink a data word every four clocks. SPE to PBM/PBM to SPE transfers are routed through switch 148. Any SPE can either send or receive data from any PBM bulk memory element, hereinafter described. The SPM to PBM interconnection logic supports a 5MHz data rate per SPE. SPE to APC/APC to SPE transfers provide flexibility in the general SPE I/O area. They are useful for sending small amounts of processed data back to the controller 106 for further processing, or for sending the results back to the next higher level controller, or for making program flow decisions in APC module 106 based upon processed data. APC to SPE transfers are useful for downloading a unique data value into each SPE as opposed to the capabilities provided by global constants memory indexer 158. However, indexer 158 has double buffering. Lookup table transfers from 150 are used to generate complex transcendental functions, division algorithms, or any other functions not readily implemented by ALU168 or multiplier 170. In the lookup transfer type, each SPE calculates and sends a unique value to table 150 and receives back the additional value. Two physically separate tables 150 are provided in each SPM 108 to speed up the lookup process, which may be performed at a 5MHz rate per SPE.

PBM Module

PBM module 110 contains eight bulk memory elements BME-1 through BME-8 and a local I/O switch (PBMWEB) 194. Each of the BME elements represented by BME-8 contains a random access (RAM) memory 198 and an indexer (SPIXR) 199. Module 110 also comprises a microcode sequencer, a memory addresser, and an indexer, similar to module 108, all referred to at block 196. A resident memory is referred to at block 200. PBM module further comprises a memory (CASMEM) 204, a controller interface unit (ASIU) 206, an arbiter 208, and an arbiter memory 210. Functionally, PBM module has associated therewith controller 131, which in the present embodiment is physically located on APC module 106.

BME's 1–8 are connected in parallel to I/O switch (PBM-WEB) 194 by lines 212. Switch 194 is connected to microcode controller 196 by line 214. In turn BME's 1–8 are connected in parallel to controller 196 by lines 216. Local memory 200 is connected to controller 196 by lines 218 and 219; amd ASIU 206 is connected to micro-code controller 196 and arbiter 208 by line 220.

Functionally, PBM comprises one pair of fully compliant MIL-STD- 1750A CPU's 131 with 32K×16 of shared memory, and a dedicated hardware unit within dashed lines 222 that allows the CPU's to direct the array of eight bulk memory elements BME-1 thru BME-8. I/O channels 212 of PBMWEB switch 194 permits access of the BME's to the outside world. In the present embodiment, the CPU,s 131 and hardware unit 222 are physically located on APC module 106. CPU 140 of pair 131 is used primarily to accept requests for PBM 110 services from PI bus 34. CPU 141 of pair 131 services each data request by setting up the resources of lower level hardware. An alternate form of an I/O data request is provided primarily for inter-processor communications wherein control words are sent to CPU 140 over subbus 144, instead of PI bus 34. PBM microcode controller 196 consists of a controller and a 4×4 microcode memory. The microcode memory holds a fixed set of PBM input/output instructions that are parameterized and called from controller 141 of pair 131.

RAM 198 of each BME 1–8 may be a 32K×16K static memory with a cycle rate of 20MHz, or a 128K×16K dynamic RAM (with error detection and correction) with a clock rate of 5MHz. Indexer (SPIXR) 199, which generates addresses and provides input/output data for RAM 198, can provide linear, interval, PST addressing, and provide for 16 bit and 32 bit data addressing. Indexer 199 also provides all the necessary input/output capability for RAM 198, including error detection in the dynamic RAM version.

Input/output switch 194 is a full crosspoint switch that couples the eight elements BME 1–8 to any subset of eight external input/output ports in order that ay user on any set of input/output ports has access to the entire address space of processor bulk memory 110. Switch 194 also performs the data formatting required by the PBM. Switch 194 connects to a standard interface device 230 to talk to data network 32 over input/outputs 91. Data network 32 provides the necessary handshaking and buffering to coordinate individual data transfers. The configuration of high speed interconnect switches 149, 194, 230, and 231 is system dependent, but always consists of a set of switching elements referred to as SIWEBSs. The creation of a path through the data network may be described as a set of standard SIWEB controls. Once SIWEB controls are established, data network 32 protocols are used to transfer the data.

SPE array SPE 0–7 works in conjunction with PBM 110 which serves to buffer data that SPE's are to process. PBM 110 may consist either of 256K word of static random access memory assuming 8K×8 SRAMs or of 1 Mword (assuming 32×8 SRAMs) for buffering data including data from other processors. It communicates with SPE arrays over high speed data network 32, and with its own CPU controller 128, can simultaneously service several users; that is, an SPE array, sensor, or other processor, up to a 160 MHz 16-bit word rate capacity.

Array processor 38 is fully programmable at all levels. A main user application program executes on APC 132. The user program sends controls to PBM 110 so that it can collect a data set from a sensor or other processor for processing. The application program then executes a series of procedure calls to SPE array processing procedures, or to PBM input/output procedures to accomplish signal processing tasks.

Reference is made to Appendix G, pages 1 and 2 which lists algorithms that may reside in the signal processing instruction library of the array processor group which are common to and exemplifies a plurality of sensors, such as radar and electronic warfare.

SPE processing procedures may be drawn from a standard library, or custom coded by the user; PBM input/output procedures are standard for all users and are provided in a standard library of signal processing instructions. In addition to supplying data vectors for the SPE array, PBM 110 can also be used to store intermediate results from the SPE array, or to transfer data to another functional element in the group or to data network 32.

For a more detailed understanding of the distributed operating system DOS for PBM 110 reference is made to Appendix A pages A1 through A22 wherein PBMC-A refers to CPU 140 and PBMC-B refers to CPU 141 of FIG. 3.

This Appendix A outlines the commands that invoke the use of the PBM and devices on the C to C subbus 144.

FIGS. 10 through 19, which are self explanatory, illustrate the different addressing styles available to access a PBM file. The PBM's file dimensions are twelve rows by eight columns of data elements. Each data element may contain from one to sixteen words. Single real data take up one word and quad floating point data take up to sixteen words per matrix element. Although FIGS. 10 through 19 illustrate a four SPE system, such a configuration is selected merely for illustrative purposes.

The user interface makes use of the PBM similar to disk usage in a mainframe system. At the lowest level of data specification is the (data) file, which is comprised of X rows and Y columns. An example of a PBM file is presented in FIG. 10. Files are grouped into volumes. A volume of files defined as those files that will always be on the same PBM. Therefore, each PBM will contain at least one volume but not more than N volumes, where N is the number of PBM files. Due to the bookkeeping PBM DOS must perform, the fewer volumes in a system, the more efficient PBM DOS will be.

Files stored in the PBM in one of a variety of formats, referred to as "File Storage Styles." The styles can be grouped into two categories: Formatted and Unformatted. Unformatted files are those files whose internal data structure is dictated by the user. PBM DOS only sees these files as occupying a certain number of rows and columns in the PBM. Formatted files, on the other hand, have their content structure dictated by PBM DOS. These files are distributed throughout the PBM to provide special addressing capabilities initiated by PBM DOS through a macro call. The storage styles define how a file may be accessed and by whom. When single external elements are referred to as the accessing elements, the reference is to either the PBM Controller 131 (PBMC) or system elements on the Data Subbus such as the Input Buffer and Output Buffer. When multiple elements are described as the accessing elements, the reference is to a multi-element PBM or a multi-element SPE Array. With this information in mind, the file storage styles are:

*Unformatted

Global—The file is stored in one BME of the PBM. The file may be accessed by any of the SPEs.

Local—The file is stored as an extension of each SPE's local memory. Each BME's portion may be accessed only by that BME;s associated SPE.

*Formatted

Row Conversion—The file is stored throughout the PBM such that single external elements may access this file by rows only.

Column Conversion—The file is stored throughout the such that single external elements and multiple elements may access this by columns only.

Row or Column Access—The file is stored throughout the PBM such that multiple elements may access it by either row or column.

Several different methods of transferring data to and from files exist. The different methods of transferring data are referred to as "Addressing Styles." A description of each type of addressing style follows.

Linear addressing may only be used on files of LOCAL or GLOBAL storage style. The 'Row Or Column' parameter defines the transfer to be either a row transfer or a column transfer. Linear addressing begins accessing at the point defined by the 'Initial Row Or Column' and 'Initial Row Or Column Element' parameters, accessing data elementts "Increment' elements apart. The transfer is complete when either the "Number Of Rows Or Columns' or 'Number Of Matrix Elements' are transferred (only one of which may be specified). Examples of how to access a file with Linear addressing are shown in FIGS. 11, 12 13, and 14 herein.

Interval addressing may only be used on files of LOCAL or GLOBAL storage style. The 'Row Or Column' parameter defines the transfer to be either a row transfer or a column transfer. Interval addressing begins accessing at the point defined by the 'Initial Row Or Column' and 'Initial Row Or Column Element' parameters, accessing data elements 'Increment' apart for 'Interval' data elements, at which time the addressing increments by 'Alternate Increment.' The transfer is complete when either the 'Number Of Rows Or Columns' or 'Number Of Matrix Elements' are transferred (only one of which may be specified). Examples of how to access a file with Interval addressing are shown in FIGS. 11, 12, 13, 14, and 15 herein.

Figure 16:
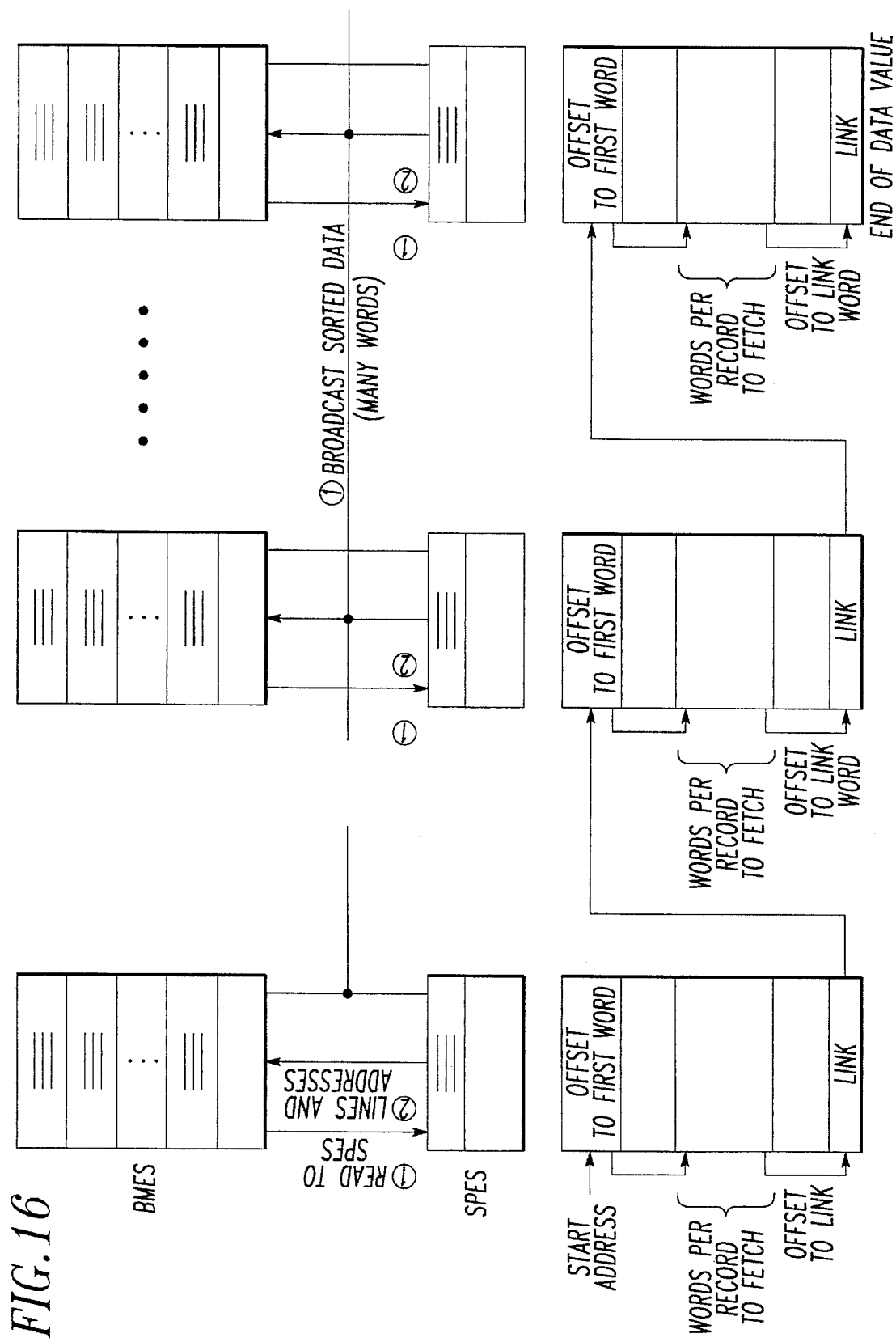
Figure 17:
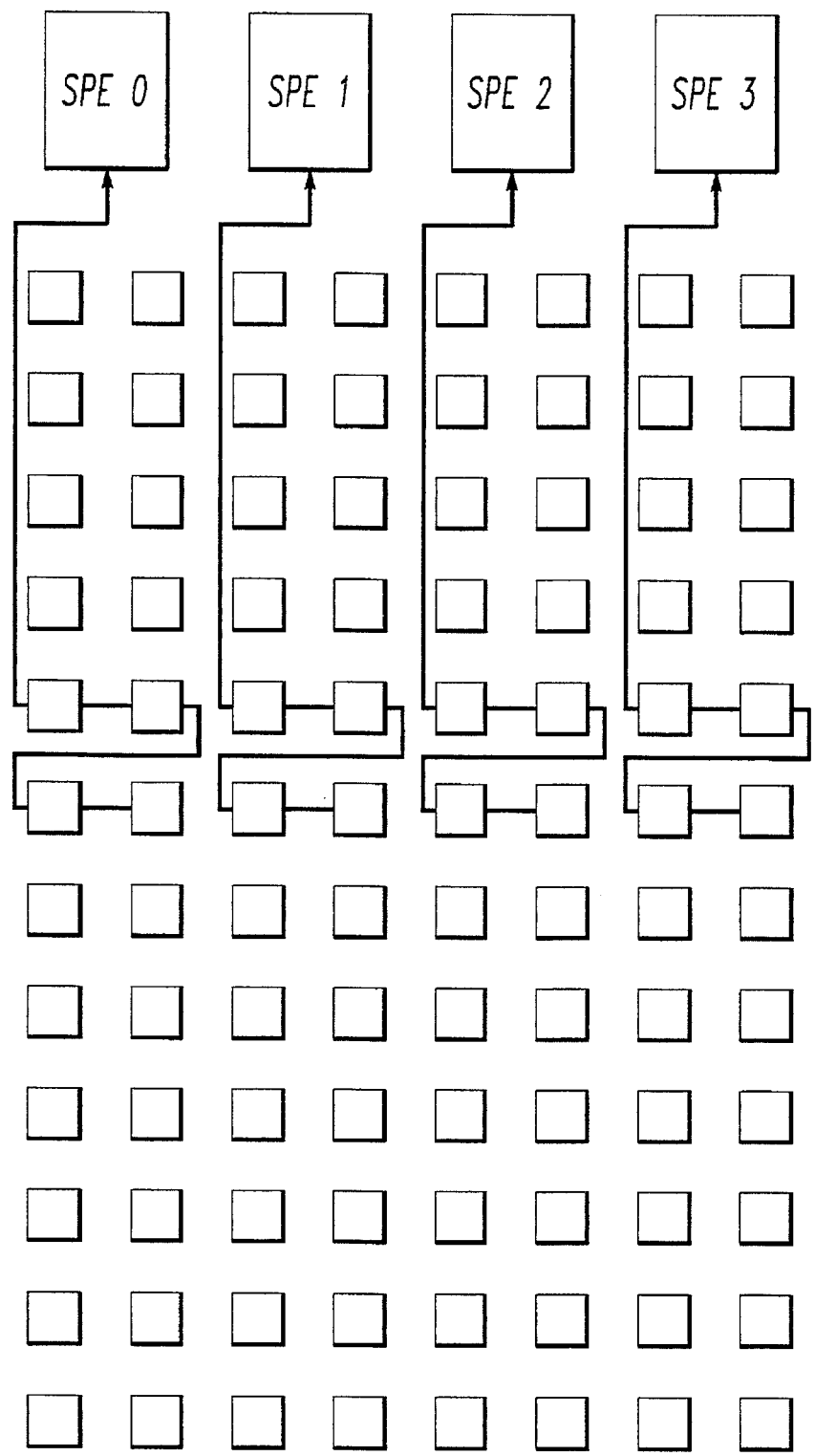

PST addressing may only be used on files of LOCAL or GLOBAL storage style. PST addressing is comprised of two set-up transfers and then the data transfer. The first set-up transfer is a PBM to SPE Array transfer that gives the SPE Array portions of pulse vectors. This transfer will probably be accomplished via Interval addressing. After executing a sort algorithm on these pulse vector portions, the SPE Array writes information back to the PBM that links the pulse vectors together as a linked list as the second set-up transfer, again probably through Interval addressing. Finally, the actual PST data transfer may occur upon request from the SPE Array. The PBM will broadcast to all SPEs data words beginning at 'Start Address'+'Offset To First Word.' 'Words Per Record To Fetch' are transmitted before the 'Offset To Link' is implemented to determine the next record's location. When the Link field is equal to the 'End Of Data Value,' the transfer is complete. An example of how to access a file with PST addressing is shown in FIG. 16.

Figure 11:
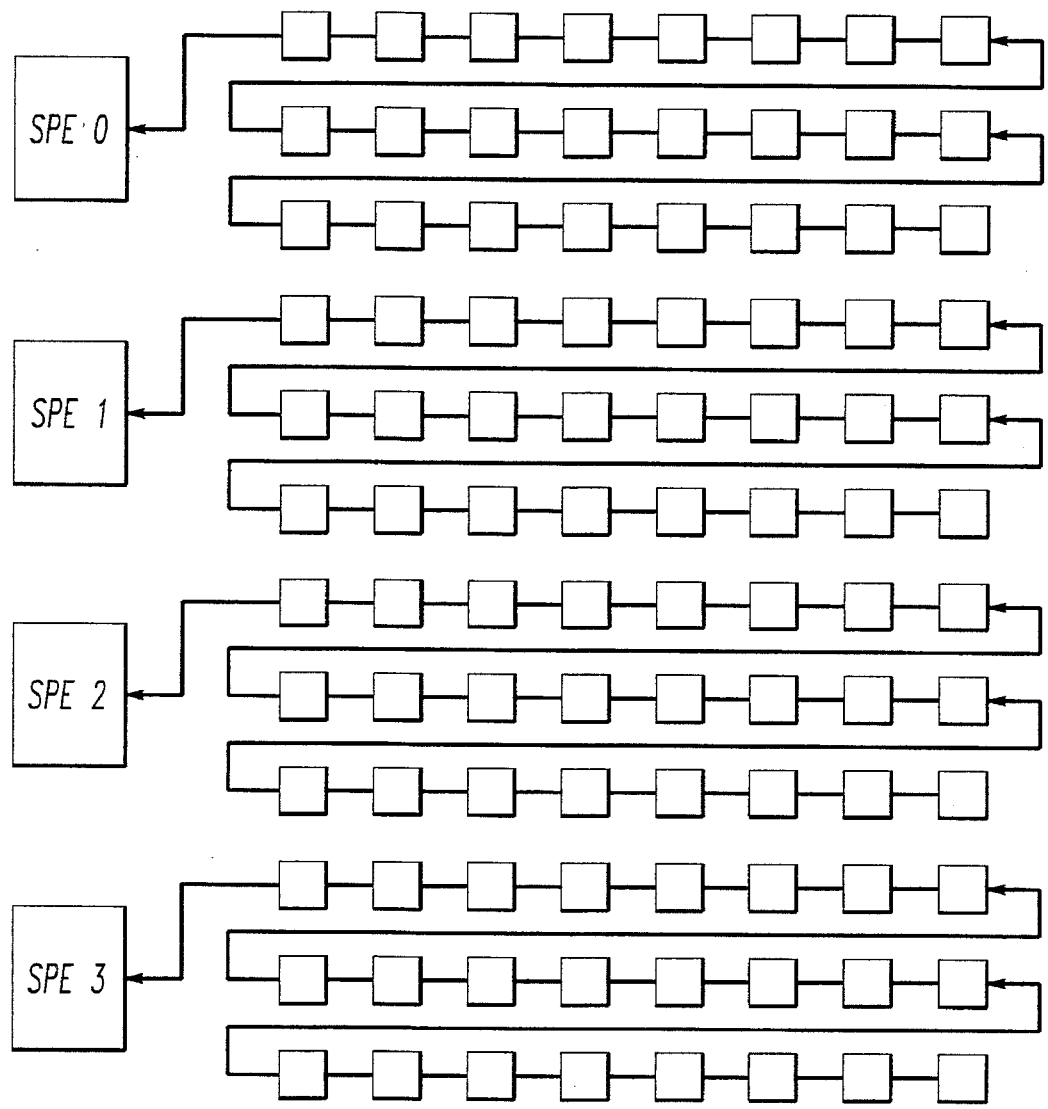
Figure 12:
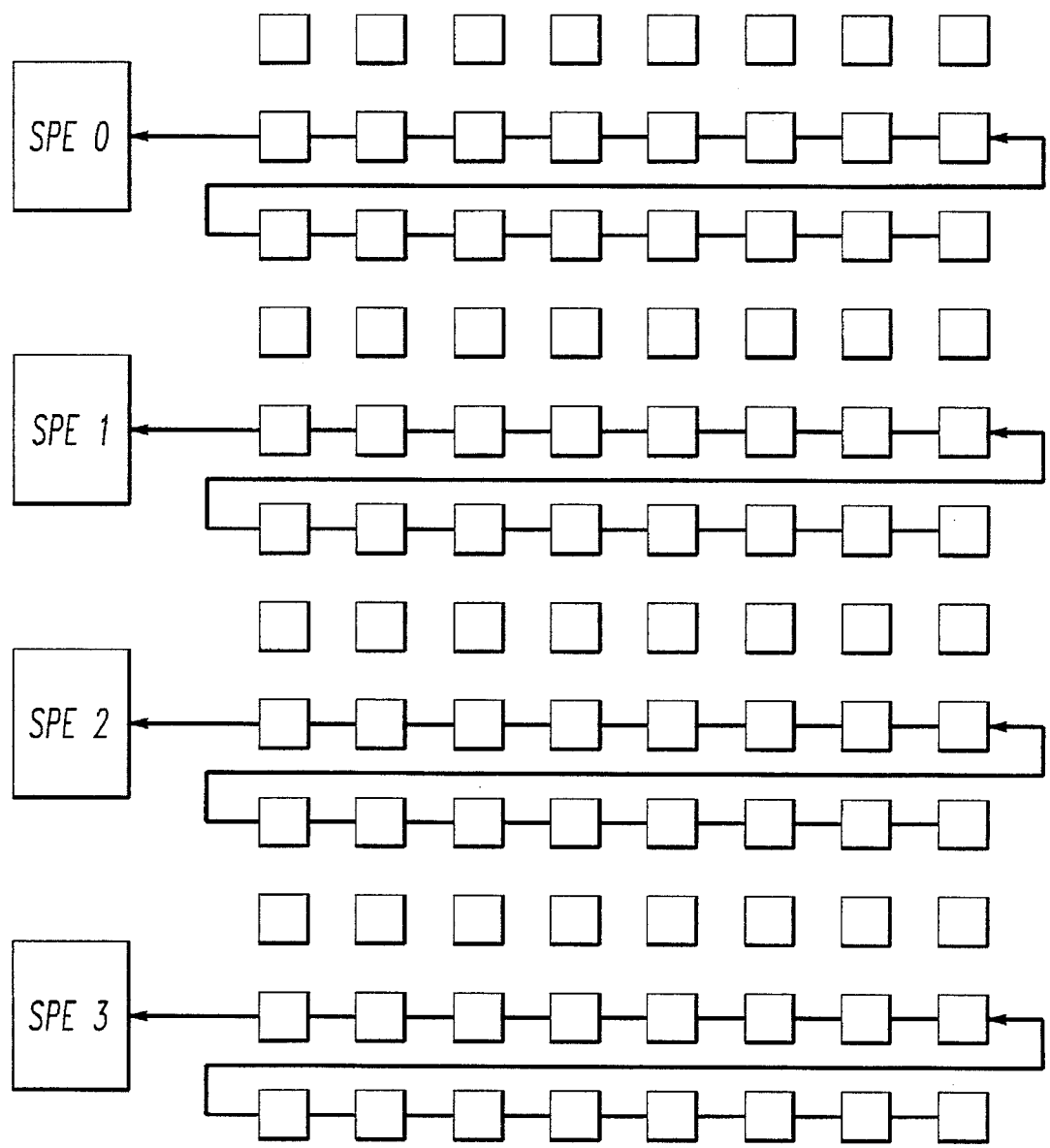
Figure 13:
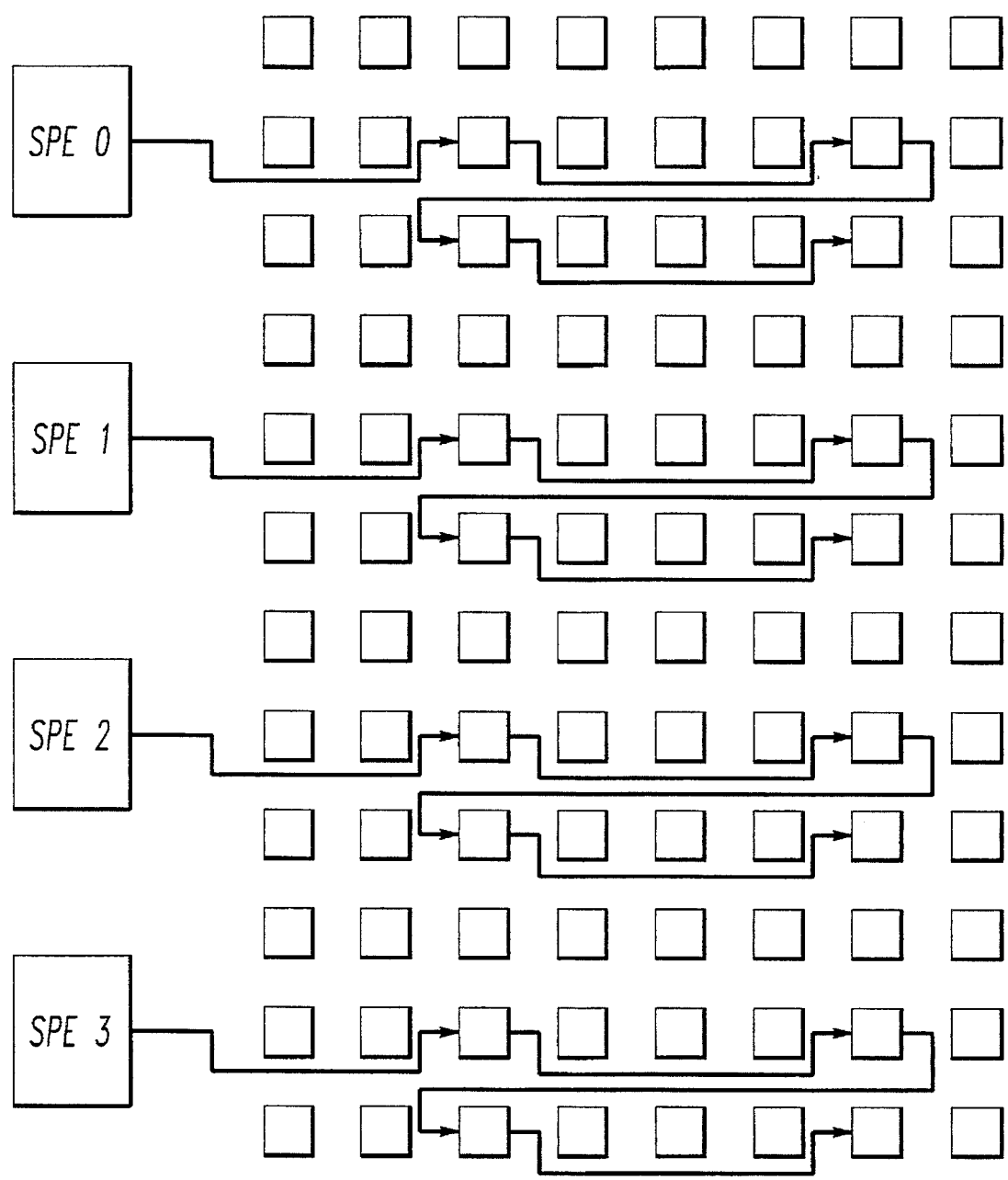

By Row addressing may only be used on files of ROW_CONVERSION or ROW_COL_ACCESS storage style. This addressing style provides few options. By Row addressing begins accessing at the point defined by the 'Initial Row Or Column' and 'Initial Row Or Column Element' parameters, accessing either 'Number Of Rows Or Columns' or a contiguous 'Number Of Matrix Elements' (only one of which may be specified). Examples of how to access a file with By Row addressing are shown in FIGS. 11 and 12.

Figure 14:
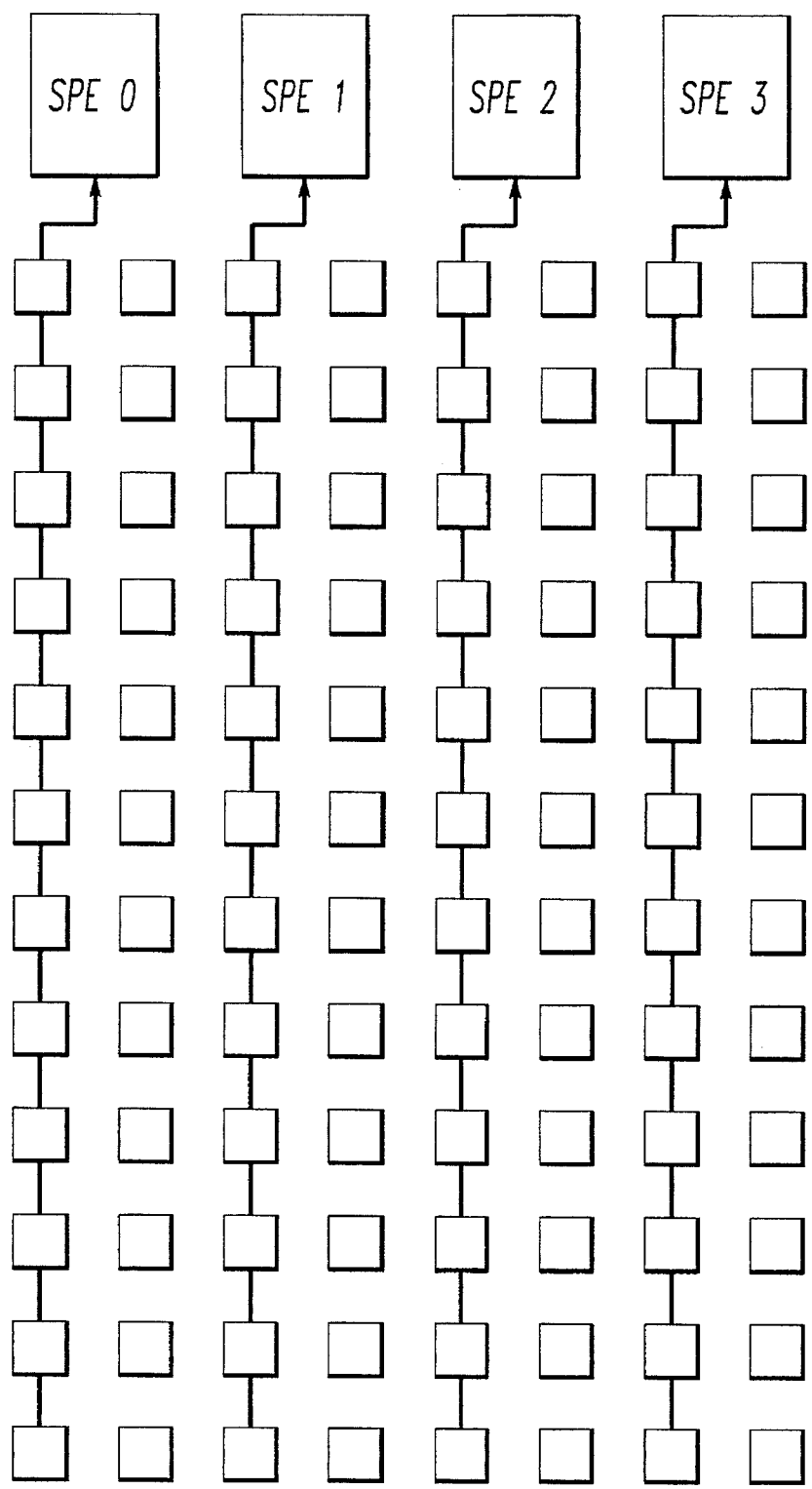
Figure 15:
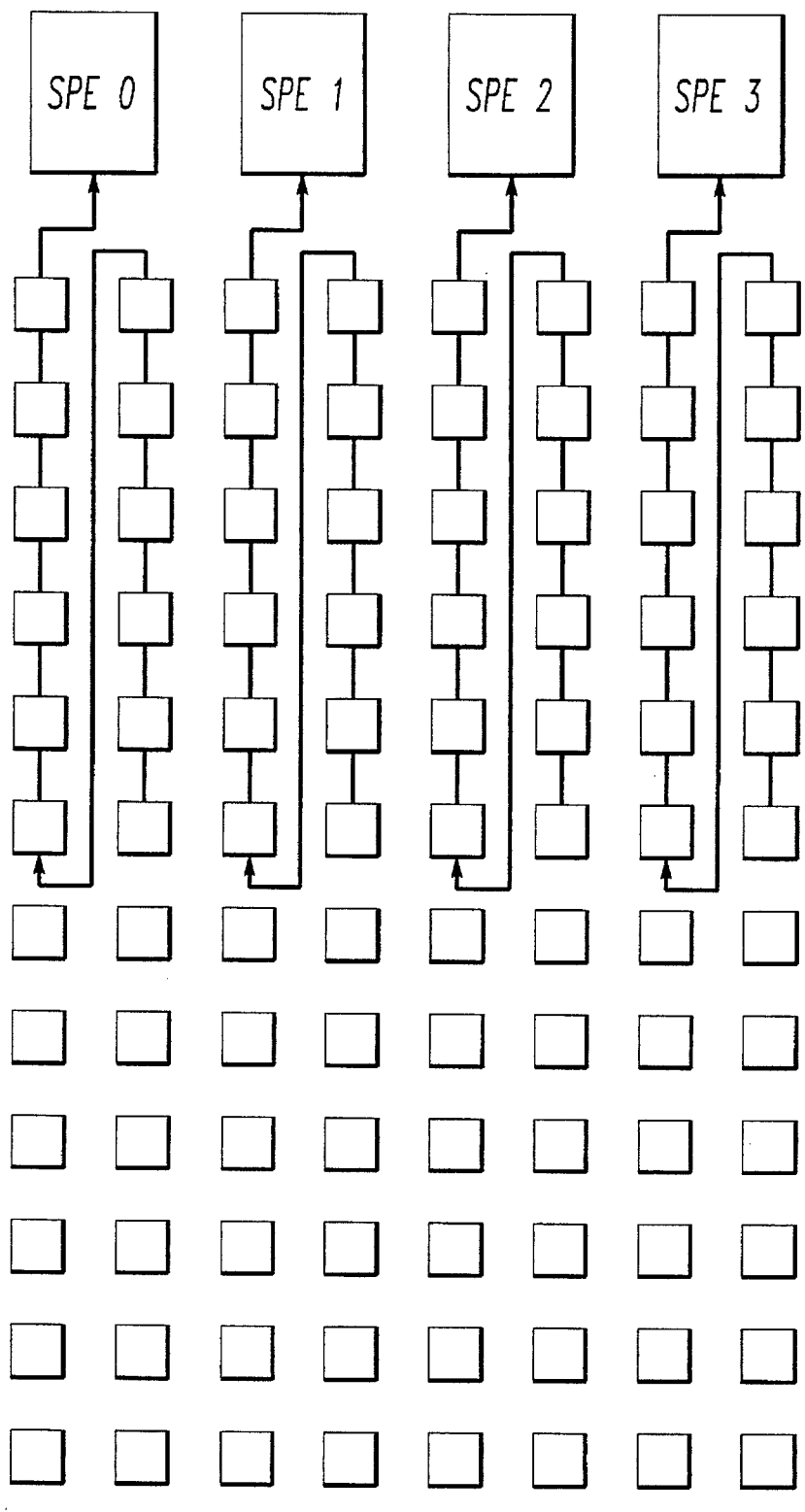

By Column addressing may only be used on files of COL_CONVERSION or ROW_COL_ACCESS storage style. This addressing style provides few options. By Column addressing begins accessing at the point defined by the 'Initial Row Or Column' and 'Initial Row Or Column Element' parameters, accessing either 'Number Of Rows Or Columns' or a contiguous 'Number Of Matrix Elements' (only one of which may be specified). An example of how to access a file with By Column addressing is shown in FIG. 14.

Figure 18:
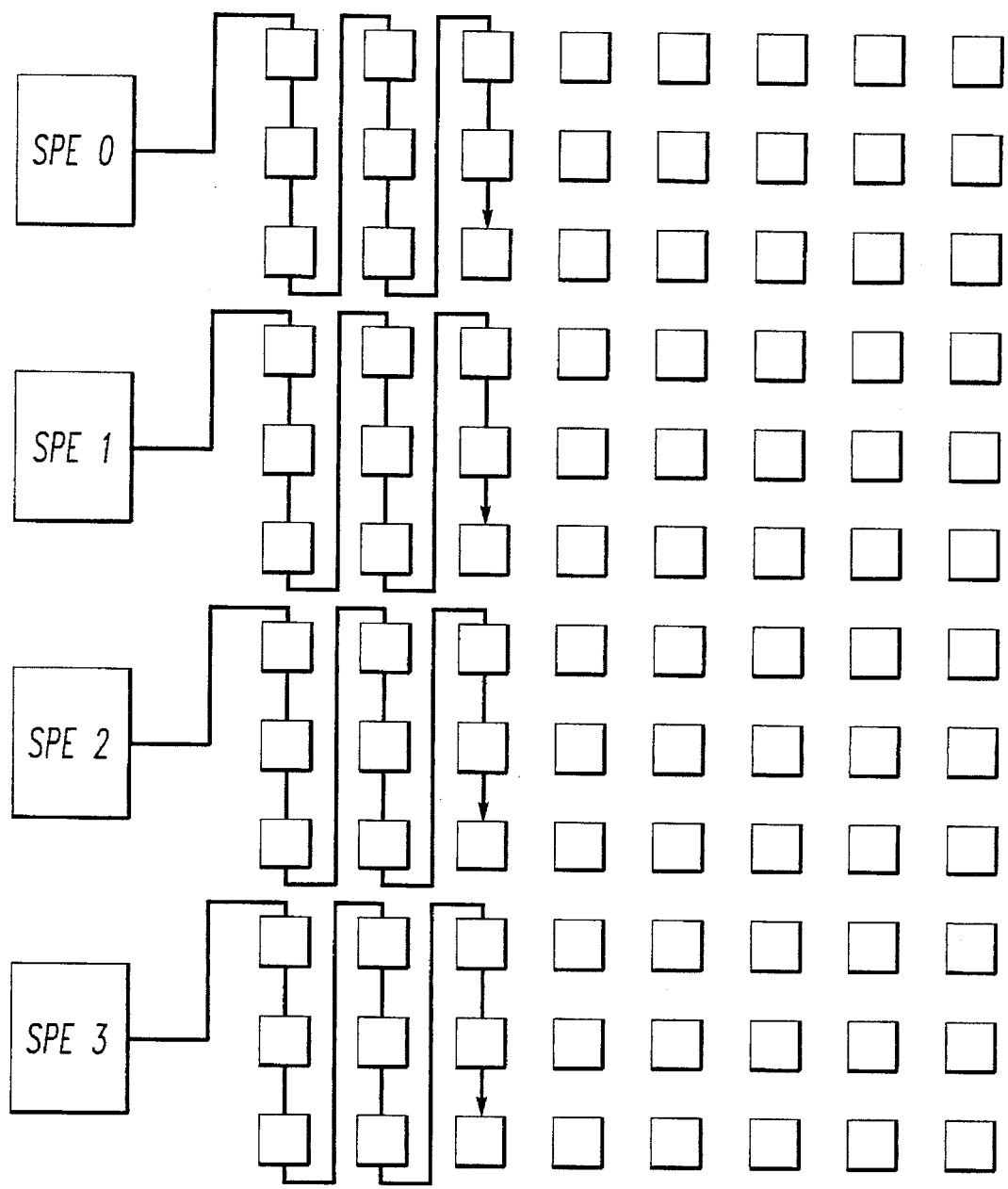

By Segmented Row addressing may only be used on files of ROW_COL_ACCESS storage style. This addressing style provides few options. By Segmented Column addressing begins accessing at the 'Row Or Column' parameter, accessing 'Number Of Rows Or Columns' columns. An example of how to access a file with Segmented Column addressing is shown in FIG. 18.

Figure 19:
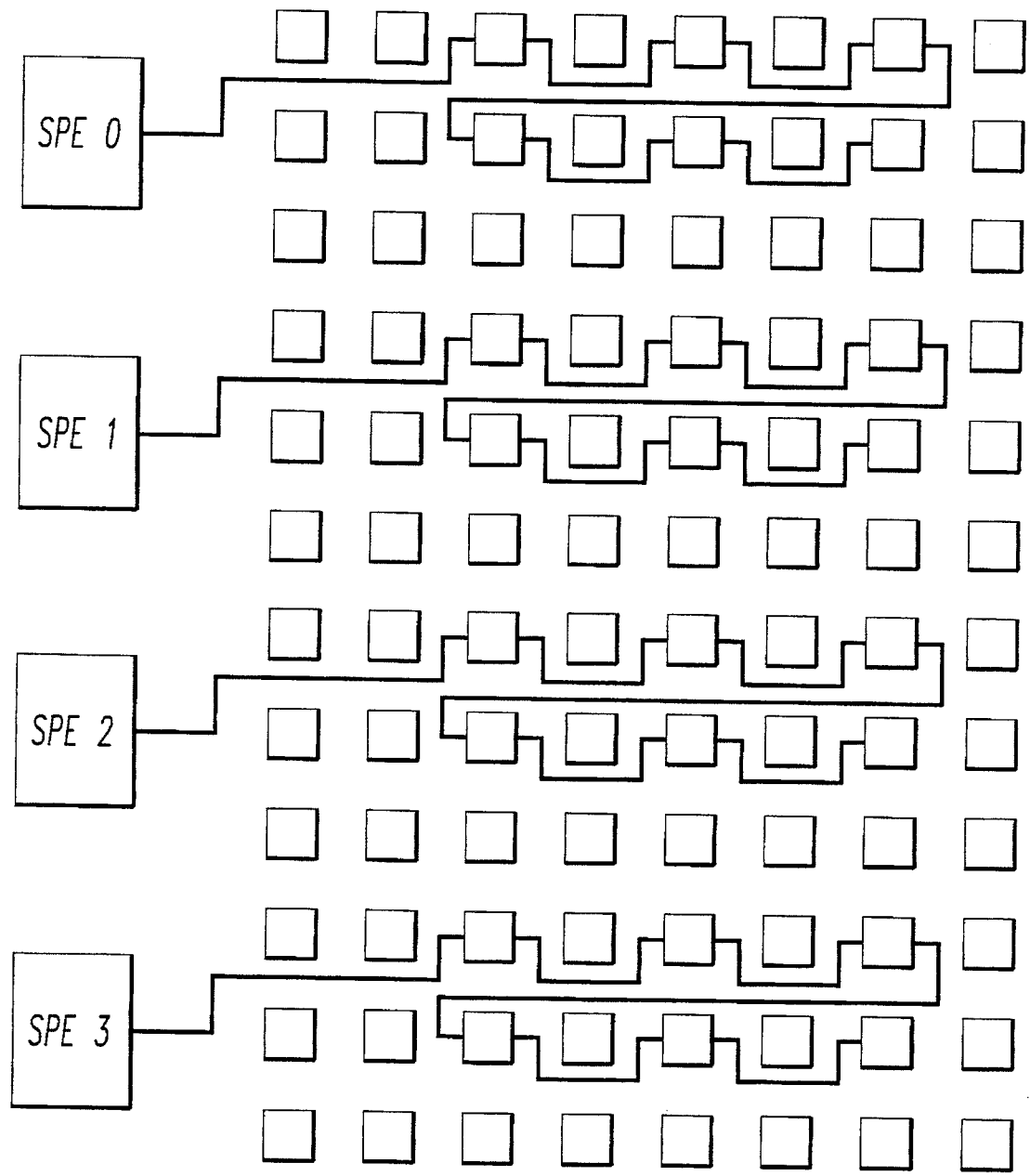

By Partial Row addressing may only be used on filed of ROW_COL_ACCESS storage style. By Partial Row addressing begins accessing at the point defined by the 'Initial Row Or Column' and 'Initial Row Or Column Element' parameters. The transfer accesses the 'Number Of Matrix Elements' per row, skipping 'Column Delta' elements between each element access. The transfer completes when 'Number Of Rows Or Columns' rows have been traversed in this manner. An example of how to access a file with Partial Row addressing is shown in FIG. 19.

PBM Lookup addressing may only be used on files of LOCAL storage style. This type of transfer occurs when the SPEs use the PBM as a lookup table, thus the SPE Array will provide the necessary addressing parameters to perform the lookup. PMB Lookups may result in data flow from the PBM to the SPE Array in the case of a Lookup Table Read, or in data flow from the SPE Array to the PBM in the case of a Lookup Table Write. PBM DOS becomes involved because PBM DOS must know that the PBM is being accessed and set up the PBM for the data transfer. The lookup completes when 'Element Count' matrix elements have been transferred.

Copy addressing may only be used on any file for PBM to PBM transfers only. The 'Row Or Column' parameter defines the transfer to be either a row transfer or a column transfer. Copy addressing begins accessing at the point defined by the 'Initial Row Or Column' and 'Initial Row Or Column Element' parameters, accessing data elements in a contiguous manner until 'Number Of Rows Or Columns' or 'Number Of Matrix Elements' are transferred. Copy addressing accesses a file the same way as Linear addressing with 'Increment' set to 1, An axample of this type of Linear addressing transfer is shown in FIG. 11.

Again, in PBM-related transfers, a single element may be one BME, one SPE, the PBMC or an external device, and multiple elements may be a PBM (multiple BMEs) or an SPE Array (multiple SPEs). The terminology for a legal transfer as follows:

SS to SD=Single source to single destination. A transfer of data from one element to another, e.g., one BME to one SPE.

SS to MD=Single source to multiple destinations. A transfer of data from one element to multiple elements, e.g., an external device to the PBM.

MS to SD=Multiple source to single destination. A transfer from multiple elements to a single destination, e.g., the PBM to an external device.

MS to MD=Multiple source to multiple destinations. A transfer from multiple elements to multiple destinations, e.g., the PBM to the SPE Array.

In summary, and referring to FIG. 4 therein the sytem of the present invention provides for data flow as represented by the double lined arrows of FIG. 4 therein. As represented by arrow A, data information from multiple sensor input 50 flows through subbus data network 32 for processing by array processor group 38,40 where the data is processed. The processed or partially processed data, representative of target reports or other post detection information, for example, is transferred from the AP group over PI bus 34 to general purpose computer 1750A 42,44, as represented by arrow B. Computer 42,44 in response to information over arrow B and mode commands over arrow C from I/O module 46, processes and transfers over PI bus 34 signal processing mode commands to AP group 38,40 as represented by arrow D. Control and narrow band data flows into and out of module 46 as represented by arrow E.

Group Modules

For a more detailed description of DP module 114, discussed in connection with FIG. 2, reference is made to FIG. 5. wherein data processing group module 114 comprises a set of 32- bit processor modules 240, 242, 244, and 246, which are interconnected as a transparent multi-processor subsystem by a oair of 32- bit buses 248. Data processing group 56 also includes global RAM modules 250 and 252, connected to buses 248, and an input/output module 254 coupled to one of the buses 248. In the preferred embodiment, there are up to 16 processor modules 240, 242, 244, 246, 248, connected in parallel to interface bus 34 by lines such as 86. Input/output module 254 is connected to data network 32 over line 93. Each processor is a single board computer with 512K bytes of RAM, 128K bytes of PROM, two serial input/outputs such as 256 and 258, and programmable timers (not shown). Each of the processors may be similar to the conventional 32- bit processor manufactured and sold as Model 60820 by Motorola, which can handle 2.5 million instructions per second at a 16MHz clock rate. This group of data processing modules is for demanding data processing applications, such as target extraction, sensor control, sensor networking, sensor fusion, and tracking. These data processing applications may be contrasted with typical radar signal processing, in that the execution stream is not able to be vectored, the algorithms contain many conditional tests and branches on tests, and the program flow is highly dependent on the various values of the input data.

Processor modules 240, 242, 244, and 246 within group 114 are interconnected by multiple buses as a tightly coupled, shared memory multiprocessor. Group 114 is modularly expandable from one processor module to sixteen processor modules, plus another sixteen modules of global memory or input/output, as required. Each processor and global module within group 114 supports communication over at least two buses 248. Buses are typically in use simultaneously. However, in the unlikely event a bus fails, all accesses can be routed over the remaining bus. Intercommunication buses are clocked at 20MHz, with the peak single word communication rate being about 6.7 million accesses per second per bus 248.

Figure 6:
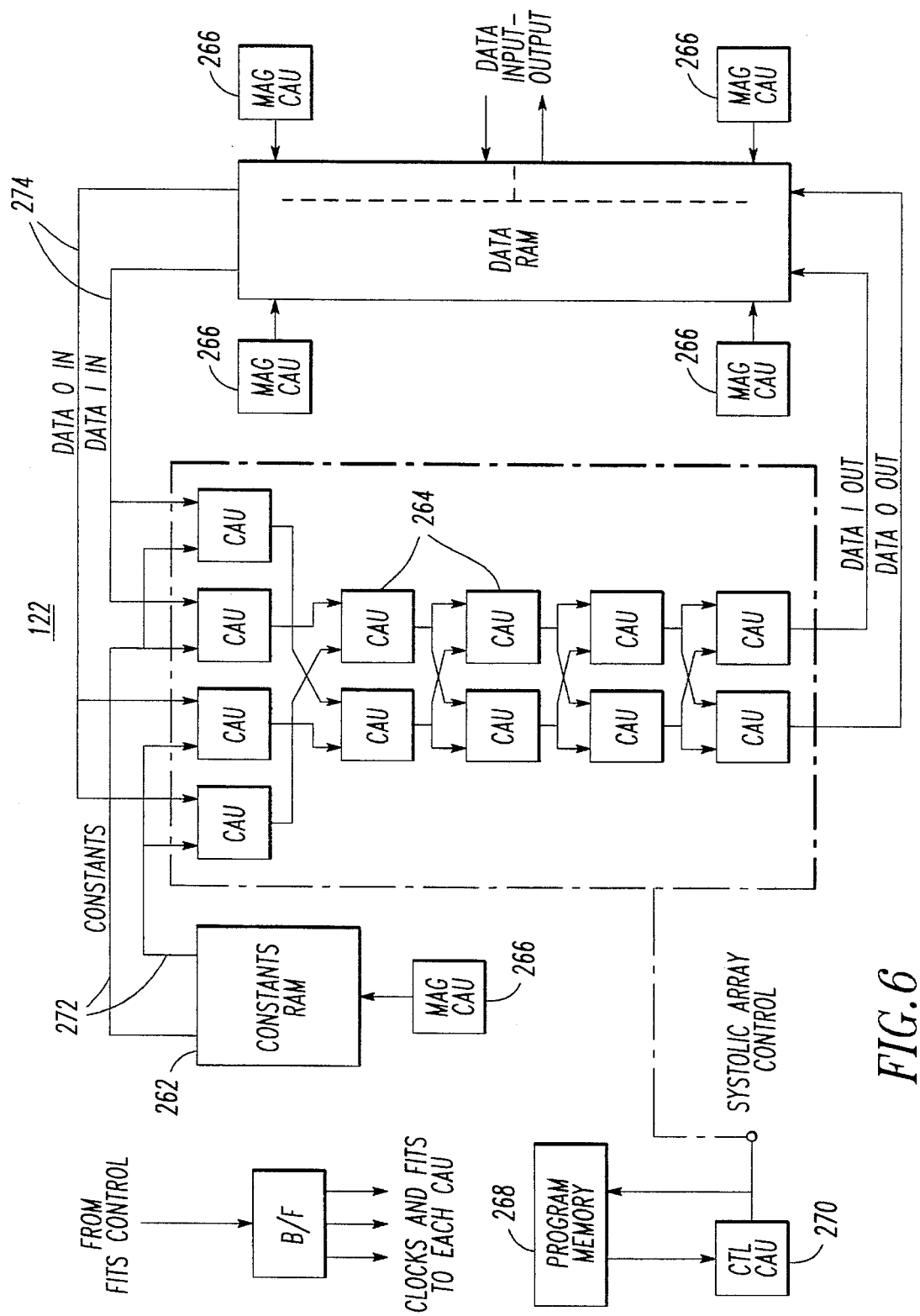
FIG. 6 is a schematic block diagram of a systolic vector processor module which may be used in the system of FIG. 2.

Large groups of more than eight processors, such as 240, may be served by a four bus intercommunication network having an aggregate single word communication rate of about 26.8 million accesses per second or in other words 107 million bytes per second. Even applications having the four bus network, no physical module need support more than two intercommunication buses. The shared memory paradigm as shown in FIG. 6 is still an accurate programmers model for a four bus network, because application programmers need not be aware of the number of buses. All arbitration and low level coordination is performed in hardware.

Applications for the data processing group 114 are as are the other application programs herein, programmed in ADA. Intra-group task scheduling is performed by a multi-tasking, multi-processing operating system that can dynamically or statically allocate tasks to physical processors. The application programmer need not be aware of which physical processing module is to actually execute the task. Thus, the operating systems task allocation procedure is also said to be transparent. In the event processor modules such as 240 have special resources; for example, the PI-Bus is connected to a particular processor module, tasks needing the special resource can be declared local and will always run on the selected processing module.

Systolic Vector Processor Module

Systolic vector processor module 114, which was discussed in connection with the description of FIG. 2 is described in more detail in connection with FIG. 6 wherein processor 122 comprises a RAM 260 for storing data, a RAM 262 for storing constants, twelve complex arithmetic units (CAU) refered to at 264, and four memory address generators (MAG CAU) referred to at 266. There is also provided a program memory 268 and a systolic array control 270.

RAM 262 is connected to provide constants to CAU's 264 over lines 272; and RAM 260 provides input data to the CAU's over lines 274 and receives data from the CAU's over lines 276. Complex arithmetic units 264 are interconnected in a two dimensional array of single chip systolic elements for the completion of full five stages of processing before the data must enter memory 260 or be recycled again over lines 274 through the array of systolic units 264. Single chip systolic element 264, which is the heart of the systolic vector processor, supports a throughput of 150 million operations per second at a clock rate of 30MHz.

As shown in FIG. 6, the CAU,s serve not only as the arithmetic systolic elements, but also as the memory address generators for for data RAM 260, Constants RAM 262, and program memory 268. Module 58 performs arithmetic in a variety of computational forms, including integer computation in any multiple of sixteen bits and single or double precision floating point. At 30MHz module 58 can sustain 2.4 billion operations per second, 180 million complex operations per second, or 288 million floating point operations per second. These different formats can be intermixed clock to clock because all microcode is stored on chip in a micro instruction store.

The systolic vector processor is particularly suitable for signal processing that includes pulse compression, adaptive beam forming, FFT's, and multi-dimensional filtering and correlation.

Bulk Volatile Memory Module

Figure 7:
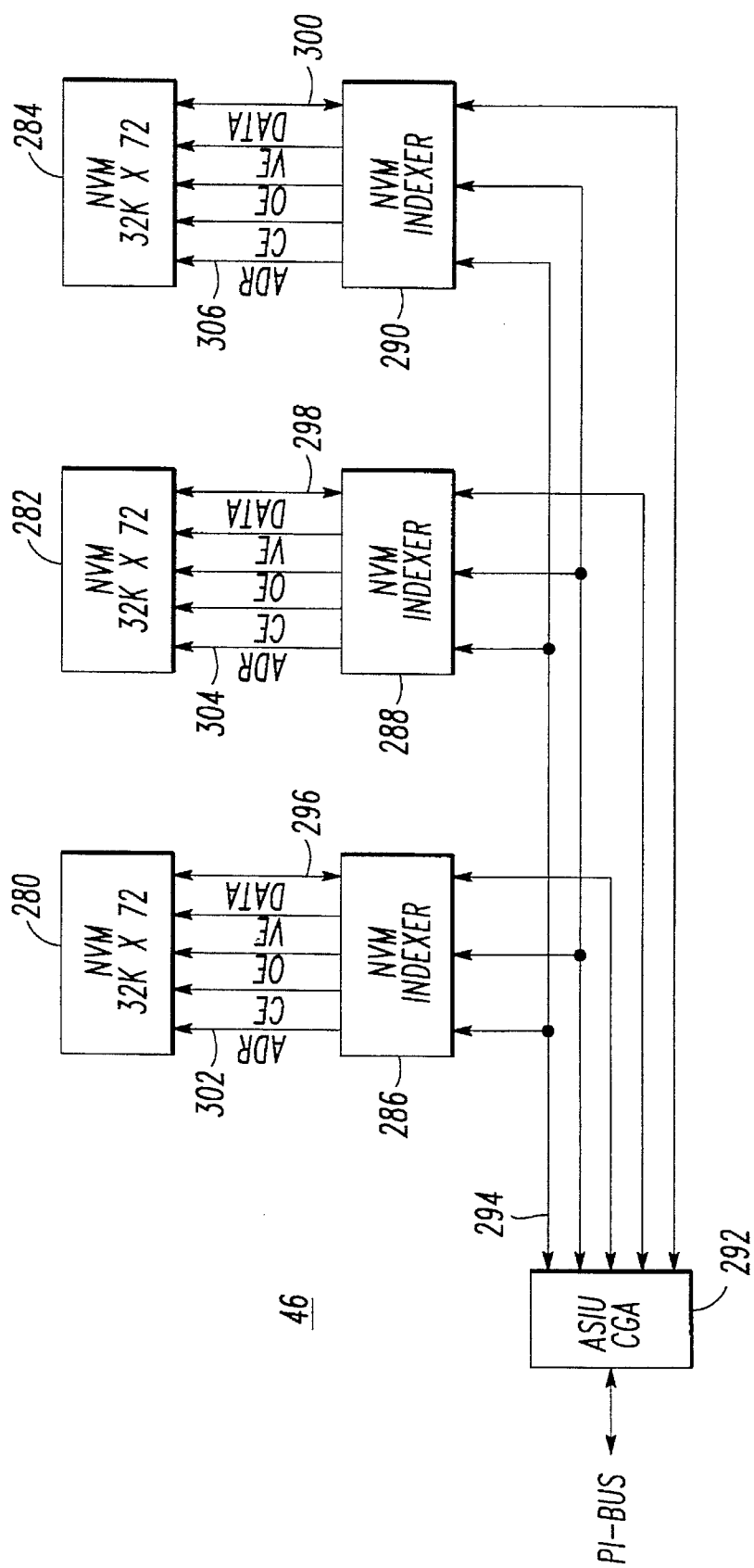
FIG. 7 is a schematic block diagram of a typical nonvolatile memory module that may be utilized in the system of FIG. 1.

Memory module 120, which was referred to in connection with the discussion of the system of FIG. 2 is shown in more detail in FIG. 7 wherein module 120 may provide 2,048K words of program storage for the entire signal processing system; and preferably includes memory stores 280, 282, and 284, with corresponding indexers 286, 288, and 290; and asynchronous interface unit 292. Memory 120 may be used for initial program downloading at power up, and for dynamic program overlays during system operation. Unit 292 receives requests from PI-bus 34, which transmits address requests over line 294 to indexers 286, 288, and 290. Storage 280, 282, or 284, as the case may be transmits and receives data on lines 296, 298, or 300, at the proper address selected by information on lines 302, 304, or 306.

General Purpose 1750A Computer

Figure 8:
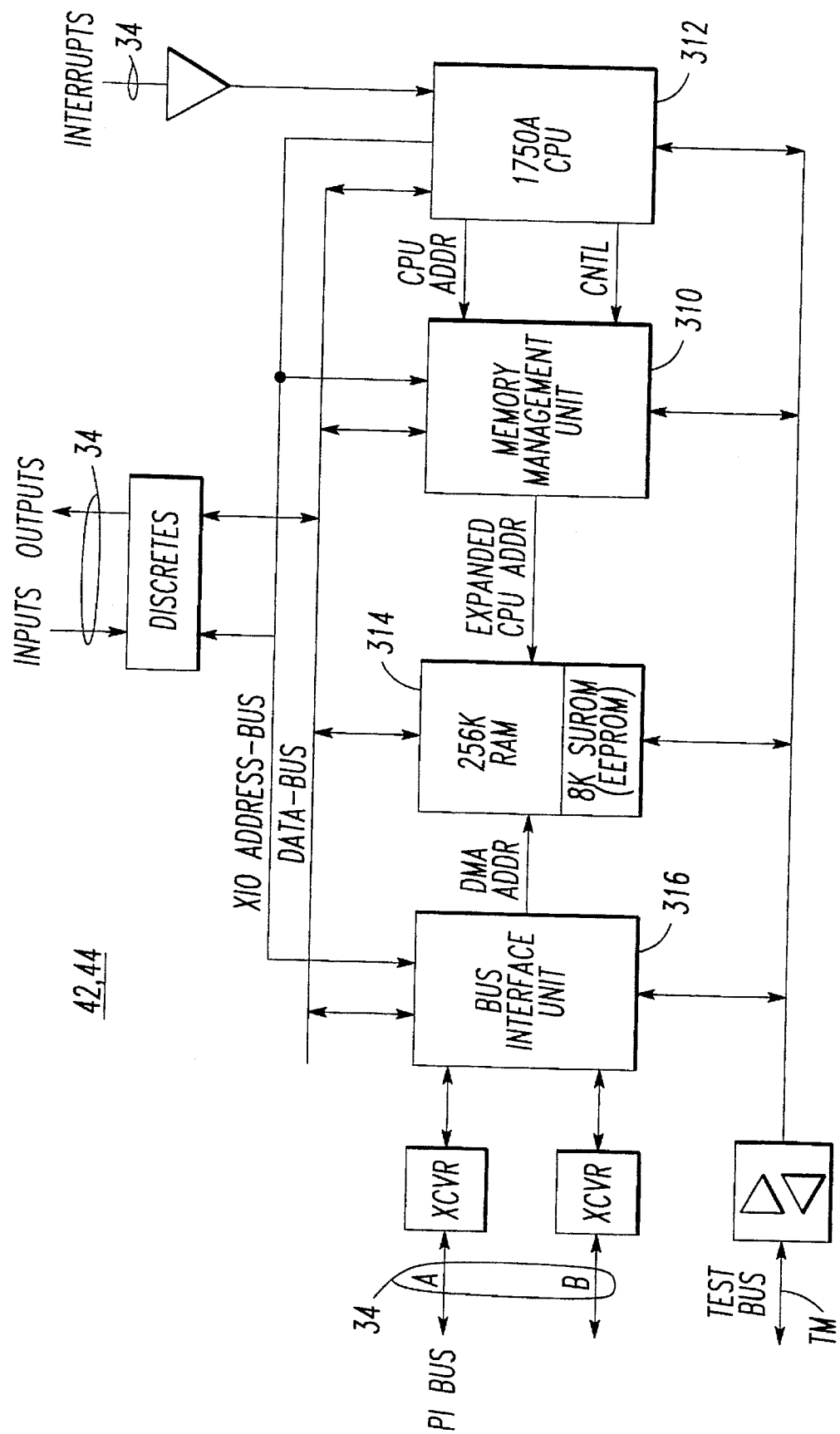
FIG. 8 is a schematic block diagram of a typical 1750A general purpose computer utilized in the system and method of the FIG. 9 is a schematic diagram illustrating the functional subbus data network interconnect of the bulk memory module and the signal processing module of the array processor group of FIG. 3.
Figure 9:
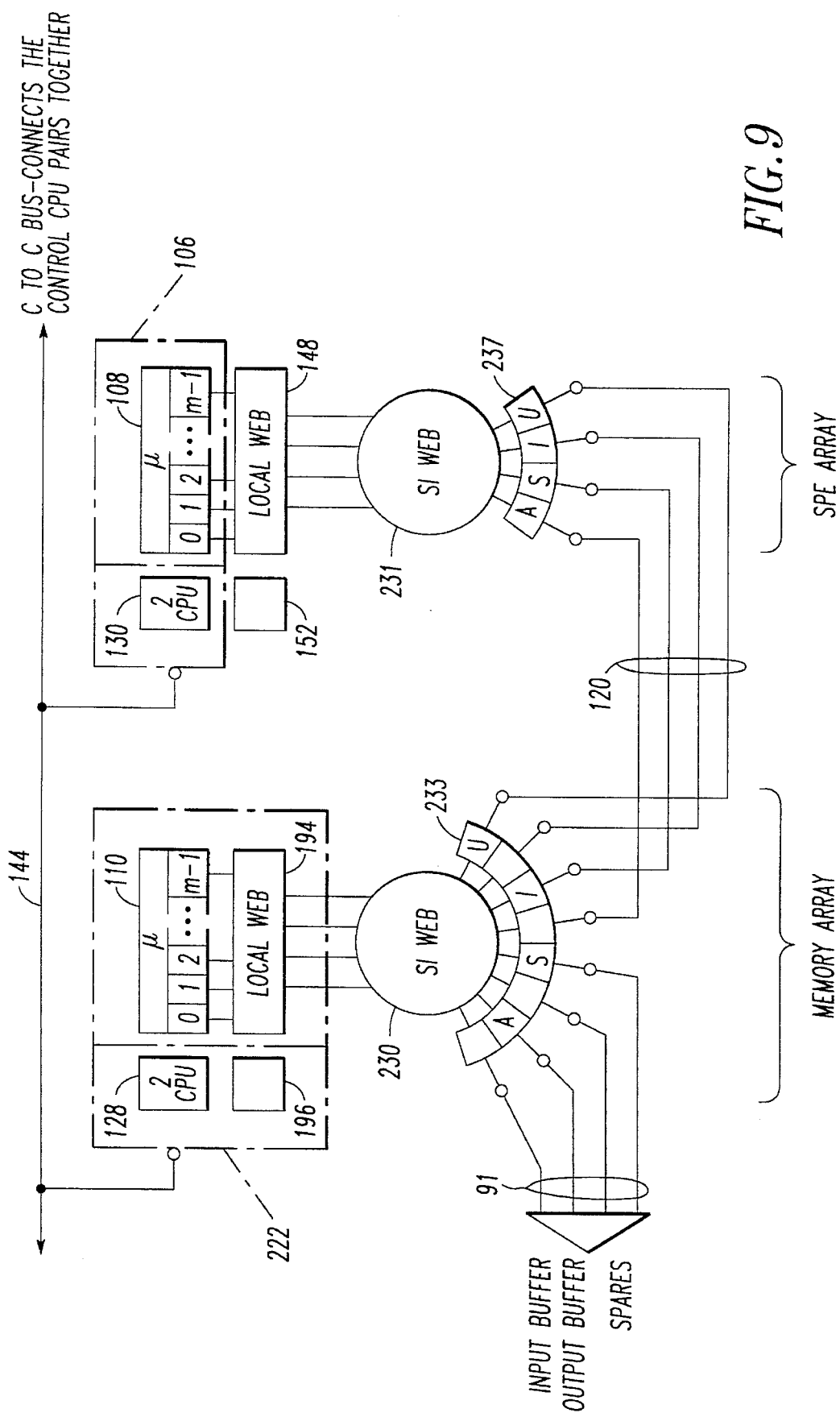

Referring to FIG. 8, there is illustrated schematically well known 1750A computer 42, 44, which includes a memory management unit 310, a central processing unit 312, a memory 314, and a bus interface unit 316. Modules 42,44 provide data processing functions, for both the processing system and for partially or fully processed signals; and also provides executive functions for the distributed operating system hereinafter discussed. Modules 42,44 interface to PI-bus 34 to pass data and control messages between the modules 42, 44, and other modules including AP group modules 38,40 coupled to the PI-bus. Computers 42,44 have a 12.5MHz transfer rate,labelled addressing, thirty-two module capability, and a fault tolerant design that includes bus level redundancy, control signal redundancy, and parity.

Data Network Description

Referring again to FIG. 1, high speed data network referred to at 32 for interconnecting the signal processing inputs and outputs of the system modules therein, is shown in more detail in FIG. 3 in connection with group 38. The data network may be considered to include for each module or module group one or more WEBs, which are input/output switches for creating data paths. Associated with processsot bulk memory 110 of array processor 38 of FIG. 3 is a "local" PBMWEB 194 and a subbus interface (SI) WEB 230. An asynchronous interface unit (ASIU) is coupled to SIWEB 230. As previously mentioned in the present embodiment of the invention, the signal processing modules, such as 108 109, include local SPEWEBs 148 and 149, respectively that are coupled to subbus data network switch SIWEB 231. Asynchronous interface units ASIU 233 and 237 interconnect SIWEBs 230 and 231 at lines 120.

Data network 32 in the present system performs the function of signal processing data transfer wherein blocks of data to be processed are transferred from one element of an array, such as SPE, BME, for example. This is a critical data network application and it is measured by the maximum rate at which blocks of words can be moved into or out of an elemental array. This rate is the product of the word rate of each bus times the number of buses used. Thus, it is advantageous to keep the number of input/outputs small, so that the available number of input/outputs can support as many buses as possible. For sixteen bits of data the subbus requires only two control bits per input/output port plus one bit for a clock if it is necessary to cross an asynchronous boundary.

Data network 32 may also provide internal control of a particular module. Each module has at least one CPU that controls the SPE's or the BME's, for example. In the SPE array, for example, one of the controllers 152 sets up each macroinstruction execution by giving the SPE's the initial microcode address, instructing the number of times to repeat the loops in the microcode, what initial scratch memory addresses and increments to use, etc. Such setup operations require outputting small quantities of data to each of several different ports; and consequently the agility of the bus is more important than its ability to transfer large contiguous blocks of data at maximum speed. Since there is normally only one bus master, the time required to resolve bus contention (hereinafter described) is unimportant for setup transfers.

Data network 32 may also provide controller to controller transfers. Since many controllers are connected to a common bus, they must contend to get control of a bus each time the controllers send a message. Here, bus contention time is critical, agility is unimportant, and the data transfer rate is usually less important because most messages are short. It is also important that the system has the capability to connect as many ports as possible to a common bus.

In the system of the present invention, the clock rate of most of the circuitry is 20MHZ and the individual board pairs are numerous. Thus, for reliability the maximum acceptable synchronous domain is preferably four board pairs. Thus, many ASIUs are used to cross the asynchronous boundaries between the domains. Since there are physical limits on the length of a bus, and the number of ports connected to it, and such limits are particularly inconvenient for controller to controller transfers, the data network is configured for constructing a large logical bus from several smaller physical buses that are interconnected by active couplers. Thus, different subsets of physical buses can also be

Subbus Building Blocks

Subbus data network 32 uses several logical building blocks implemented in two forms of well known configurable gate arrays (CGA). One CGA is a three bit slice of an 18 bit Subbus Interface WEB (SIWEB) hereinbefore mentioned; and the other CGA is the previously mentioned Asynchronous Subbus Interface Unit (ASIU) which has several different modes for serving as an asynchronous interface between two subbuses, a coupler between two subbuses, an interface between the internal circuitry of a CPU and a subbus, or a transmogrifier that translates a fully fledged subbus to any of several simpler subsets of the subbus interface that slaves can talk to.

The subbus is a bidirectional sixteen bit data bus that can connect multiple ports. Each physical subbus can support a maximum of about eight ports before clock waveform degradation sets in, but in the data network of the system of the present invention the physical subbuses may be connected together using either SIWEB's or ASIU couplers to make a logical bus of arbitrary length with an arbitrary number of ports up to the logical limit of 16,383 ports.

The SIWEB is the primary means of interconnecting subbuses. In the present embodiment of the invention, it has up to sixteen subbus ports, and can interconnect the ports, such as the inputs and outputs of SIWEB 230 of FIG. 3, for example. It can connect a subbus on any one port to a subbus on any other port, or can connect several subbus ports together to form a single logical subbus. The SIWEB can simultaneously and independently support several such connection groups provided each group uses a different set of subbus ports. An ASIU may also be referred to herein as a CASIU when it has a control function. One of the operating modes of the ASIU is the coupler mode where it functions in a manner similar to a two port SIWEB, with the exception that the two ports can be running at different clock rates, whereas in the SIWEB all ports must run synchronously. The ASIU also operates in several converter modes that converts the full fledged subbus interface to a simpler form to facilitate interfacing with other circuitry. The ASIU can permit the controller CPU to talk to many different parts of the array of SPE's (see FIG. 3). Another subbus converter mode of the ASIU includes a memory that can store set up sequences for up to eight slaves, and pass the sequences along in an independent interleaved fashion.

Figure 10:
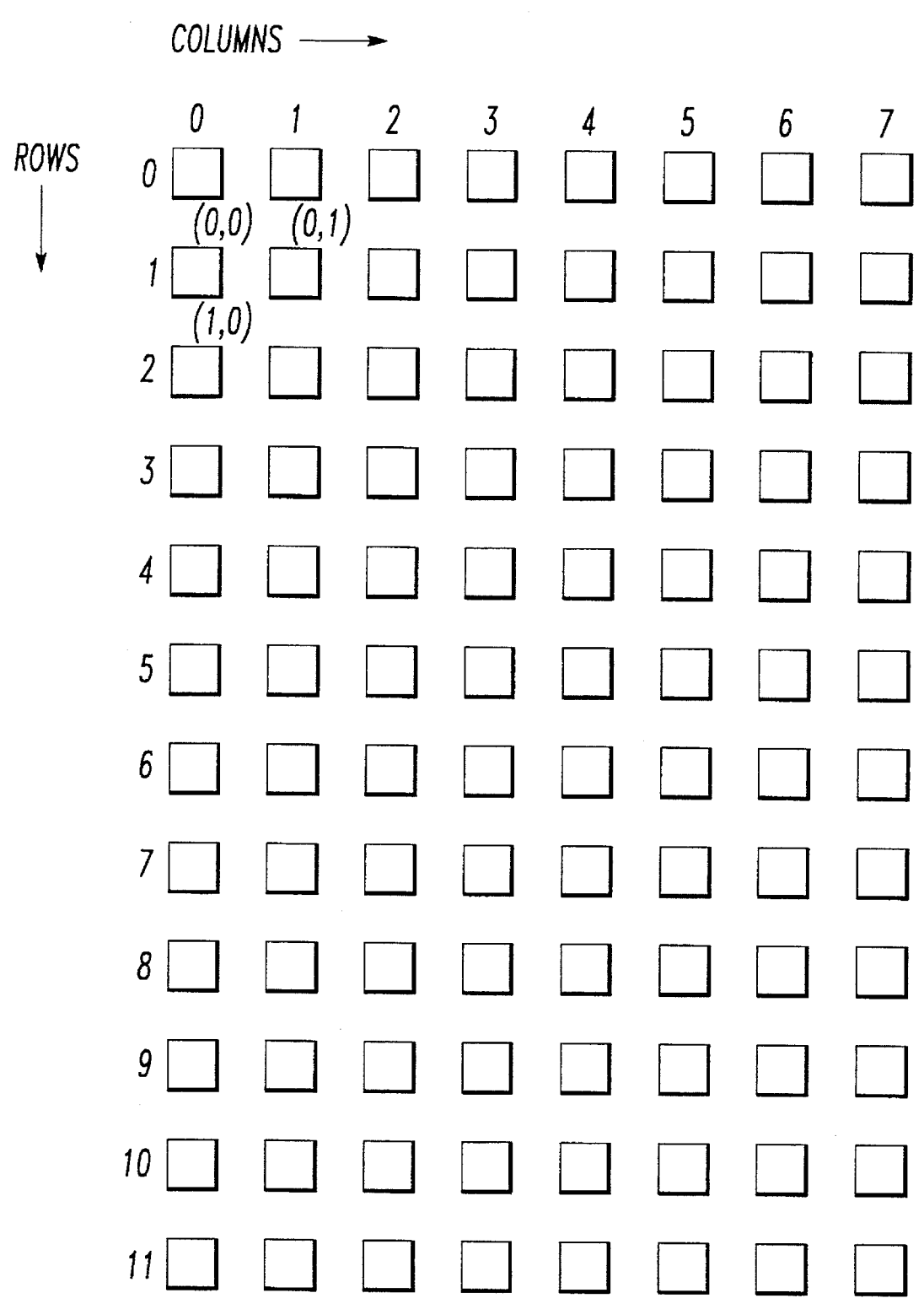

Referring to FIG. 10, there is illustrated the interconnection of a PBM and SPM through the data network similar to FIG. 3. SPM array 108 is connected to PBM array 110 through four 20MHz buses with four 20MHz buses 91 available for connection to other modules of the system, such as AP group 40 or DP group 114, for example. C to C bus 144 allows the control CPU's of each pair to talk to each other and to other devices in the system.

PI-Bus 1750A Interface

PI-bus 34 is a well known military standard linear multi-drop, synchronous bus which supports digital communications between up to 32 distributed operating system elements residing on a single backplane. The PI-bus system of the system of the present invention uses the sixteen bit error detection option and relies on a redundant bus for fault tolerance in the corresponding portion of the system. The PI-bus uses a master-slave communication protocol which allows the bus master to read data from one slave or write data to any number of slaves in a single message sequence. Messages may be routed to particular modules using either physical or logical addressing.

Reference is made to Appendix C pages C1 through C44 herein for a more detailed understanding of PI bus interface.

Data Transfer Format

Subbus data network 32 supports transfers between array processing groups containing one, two, four, eight, or sixteen elements through pipelines of one, two, or four subbuses; for data types having from one to sixteen words per datum. A real single precision datum (SP) has one sixteen bit word; a complex double precision word (DP) has four sixteen bit words, floating point (FP) has four words per datum, etc. While subbus network 32 supports any combination of the above possibilities, the elemental arrays, such as SPE and BME may not. The SPE array, for example, cannot talk through a four bus pipe when the number of SPE's in the array is less than four, nor through a two bus pipe when the number of SPE's is less than two. For applications where the ASIU's support synchronized input/output transfers to local WEBs to keep the gate count down, there are restrictions as to what groups of ports in two or four bus pipes to form a pipe. This implies that the ASIU,s must coordinate their input/output to the local WEB,s through the SIWEBs which means that the ASIU,s must know what other ASIU,s are in the pipeline. In a one bus pipe, there are no restrictions. For a two bus pipe, one of the buses must be physical port N, where N is even, and the other must be N+1. For a four bus pipe, which is illustrated herein, one of the buses must be physical port N where N is a multiple of four, and the others must be N+1, N+2, and N+3. For a more detailed understanding of the data format for the subbus data network in the system of the present invention, reference is made to Appendix B herein, which consists of pages (1) through (5) inclusive. For a more detailed understanding of the operating codes for subbus data network 32, reference is made to Appendix D herein, which consists of pages D1 through D45 inclusive.

Distributed Operating System (DOS)

The DOS, in the system of the present invention, provides four functions; namely, process scheduling, communications, fault tolerance, and input handling. DOS resides in each of of the 1750A CPU modules, such as 42 and 44 of FIGS. 1 and 2, and 131 and 132 of FIG. 3, for example. Although DOS does not reside in modules other than the 1750A, it controls the operation of and interfaces with other modules across PI bus 34. In the present embodiment DOS uses the well known MIL-STD-1815A ADA Programming Language and MIL-STD 1750A Instruction Set Architecture.

Each of the above four functions plays an important role in the control of the system and the application processes. An application process is an ADA main procedure designed by the application programmer and scheduled by DOS on the above mentioned processor modules. A process is limited to one address state. Processes that are grouped together to be executed on the same processor are known as a family. A process may be mapped to a particular process family at the time of the processes definition.

Process scheduling function is a term embracing the scheduling and synchroniztion of application processes, sometimes referred to as tasks, which perform the actual functions of the embedded application. The process scheduling function permits process definition, process allocation, process scheduling, process execution, and process synchronization using semaphores and events. Process definition provides the applications programmer with the ability to define processes within a processor module based on a set of attributes. Process allocation designates on which processor module each process is to be executed. Process scheduling determines which process is currently active on each local processor module. This scheduling performs the operation necessary for causing a process to change state from one of five process states to another. The five process states are as follows: undefined, dormant, waiting, ready, and active. Process execution performs the operations necessary to set up a process for execution, execute the process, and clean up the process after execution. There is a set of semaphores and events that are available to each processor module. These are accessible by all processor modulus within a group, and global to the system. Semaphores, which have a one to one relationship are implemented using a counter which is incremented by a call to Signal and decremented by each call to Wait/Waits. A process may signal a semaphore many times before any process waits on it, so that when a processor later waits on it, the wait is immediately satisfied and the semaphore decremented. Local semaphores may only be signalled and waited on within a CPU, while global semaphores may be signalled from any CPU but only may be waited on by processes within the family associated with the semaphore where it was defined. The maximum value a semaphore may be incremented is a value determined during definition. Events, which have a one to many relationship, when signalled can cause more than one process to have its Wait(s) satisfied. Additionally there must be a process currently waiting on an event in order for the signalling of that event to produce any effect. If an event is signalled and there is no process currently waiting on the event, nothing will happen. Unlike semaphores, events have no memory, and are included in DOS for accomodating the scheduling of processes, which must occur at the moment of some external or data driven event. If an event occurs and a process is ready to handle processing of the event; that is, it is waiting on the event, it becomes unblocked for that invoking condition, otherwise the event will pass and no processing will occur. The existence of two CPU's 142 and 143 within controller 106 has caused specific differences in the function of DOS and the scheduling of processes. Controller 106 does not use the same dispatcher that general processor 42,44 employs. The DOS functions run on CPU 142 while application software runs on CPU 143. The controlling portion of the general processor 42,43 dispatcher is located on CPU 143 since the dispatcher implementation of controlling a process on the same CPU does not work when the dispatcher is on CPU 142 and it wants to give control of CPU 143 to an application process. The dispatcher in CPU 142 places information concerning the process to control to a shared area of memory, and then interrupts CPU 143 through XIO. CPU 143 has an interrupt handler which takes this information and performs dispatch to the appropriate application process. Both 142 and 143 execute concurrently. By utilizing the shared memory of both CPU's for passing parameters. CPU 143 can continue executing code immediately following the CPU output call while CPU 142 is performing the CPu output. This is not possible in a single CPU configuration.

The communications function allows for the reading and writing of data between two modules in system 30 and between a module in the system 30 and an outside entity, such as a receiver, transmitter, etc. via the PI bus. The application process that requires communications service shall be called the requesting process, and the process at the other end is called the remote process. All PI bus communications are carried out between two PI bus labels, the requesting PI bus label and the remote PI bus label. The logical addressing, which is enforced by this use of PI bus labels, enhances flexibility in application software location. A data transfer can be performed between label A and label B whether or not the data source are on the same or different CPU's. This flexibility of the location of the application software is enhanced through usage of process families, which are associated with PI bus logical module identifiers. PI bus 34 logical module identifiers allow one transfer to go to one or more physical modules. Logical module identifiers forty-four to two hundred fifty-four are available when assigning logical module ids to families, or any other purpose. For the sake of efficiency, DOS's sysgen package requests a number in the aforementioned range to be chosen as the Max_Single_Slave_Logical_Id. Any logical id below this value is interpreted as having one destination only. Any other ids are interpreted as potentially existing on multiple processors. A transfer which is made to a logical identifiers is interpreted as a single slave logical identifiers, and resides on the same processor as the requesting process. DOS performs the intra-CPU copy and does not have to go out on the PI bus. DOS communications also provides for determining with the use of a semaphore when a transfer completes. When the transfer completes DOS signals an optional transfer parameter. The requestor can wait on the semaphore until the transfer finishes, at which point the requestor is again ready to run. If it is required that the requestor be informed of the results of the transfer, an address is passed to the DOS for storing the result of the completed transfer. The potential results of a transfer are Success, Failure, and Busy. The user determines that the address passed to DOS is a valid address when transfer is completed. At the time of the transfer request, due to PI bus loading, the address for storing the transfer results are unknown. Since both status and semaphore parameters are optional, specifying one does not require specifying the other. For transfers that do not complete successfully, DOS may be told to Retry through an optional parameter. In the event of a busy or error response, the transfer is requeued at its priority and retried if the Retry parameter is set to True, which it is by default. The number of times a transfer may be retried is specified in the DOS sysgen package. Any time a label is accessed (written to or read from) after association with a semaphore, the label is made Busy to the PI bus. This Busy state persists until the request is made that the Busy bit be cleared via a call to the DOS procedure Modify_Label_Table. Through this semaphore association, it is assured that the data being processed is not overwritten from the PI bus until the proper time for updating. By not associating a semaphore with a label, the data buffer can be updated at any time without the users or DOS's knowledge. The user can request DOS to make the label Busy during the critical access time, which prevents the PI bus from destroying the user while in the middle of accessing data buffer. The user may clear the Busy bit when finished accessing the data buffer. Another option is to make the label on the PI bus inactive during the critical time and then activating the label when finished.

The Fault Tolerance function responds to fault indications and status requests. It also monitors the health of the PI bus, interconnecting buses, and the loss of a processor module. Upon notification of a failure this function determines the most suitable reconfiguration of the system to compensate for the failed resources. If sufficient spare resources are available to support the current processing requirements, Fault Tolerance function performs the reconfiguration and informs the System Executive Software (SES) of the systems new status. If sufficient resources are not available to support the current processing requirements, Fault Tolerance informs the SES of the degraded nature of the system. The application programs provide a Self-Test program that is scheduled by DOS to continuously monitor the integrity of the processor module on which it is executing at a rate chosen by the applications program. Only confirmed faults are reported to the Fault Tolerance function for logging and potential reconfiguration. For situations where a processor module fails completely or becomes disconnected from the PI bus, the SELF Test function, of course, is unable to notify the CME of its failure; thus, Fault Tolerance function provides for periodically broadcasting a heartbeat report from each processor module to reassure the other modules of the continued existence of the rest of the processors. Several processor modules keep timers on these heartbeat reports; and when a timer expires with no report from a processor module, the delinquent processor module is presumed completely failed or disconnected and the fault logged, and reconfiguration initiated. Upon declaration of a faulty module, a suitable spare module is sought. If one is found, the processes executing on the faulty spare are defined and started on the spare processor module by the previously mentioned Processor Scheduling function and restarted. Process scheduling is also directed to execute Built-In-Test on the faulty processor module to further isolate the fault, and determine if it was due to a transient condition or a true fault. If BIT passes, the fault is assumed to be transient and the faulty module is returned to the system as a spare. If the BIT fails, of course, the faulty module is taken off line. If the number of transient faults exceed a predetermined threshold, the processor module is taken off line permanently; and the condition logged.

If a spare processor module is unavailable in the system, it is determined if the processes required in the current application software load can be redistributed over the remaining healthy processor modules. If not, the SES is notified of the current status; and the SES may request degraded processing modes to be executed. Since the DOS does not determine how much bad data has propogated through the system as a result of a module failure, the applications programs decide how to respond after a reconfiguration. For example, the present mode may be terminated, or the system may back up to some predetermined point when critical data was stored, or the system may continue execution with bad data. Input/output timeout conditions may also indicate that a processor is faulty. If a process waits longer than an amount of time referred to as the Deadline Time, specified for triggering data or an event, Process scheduling alerts Fault Tolerance of the problem. Fault Tolerance attempts to determine if the timeout was caused by a hardware failure, in which case it shall respond to the failure.

The processing required for the Input Handler function includes Interrupt Handling, Interrupt Assignments, and Hardware status forwarding. When an interrupt occurs, the Input Handler function determines the meaning of the interrupt. If appropriate for the interrupt, the Input Handler function signals the appropriate event or semaphore (if assigned) by calling a procedure of the Process Scheduling function. If appropriate for the interrupt, the Input Handler function forwards the message associated with the interrupt to either the Process Scheduling function, the Fault Tolerance function or the Communications function. Process Scheduling function allows for the assignments of semaphores/events to the spare interrupts. When the interrrupt occurs, the Input Handler function signals the semaphore/event to the Process Scheduling function. The status of system 30's hardware, such as processor modules, I/O devices, and buses, is forwarded by the Input Handler function to the Fault Tolerant function.

An application process is an entity scheduled by DOS on a processor module and implemented as a main Ada procedure. Each process is compiled and linked separately using a Ada 1750A compiler and linker. The maximum number of processes in a system is a DOS sysgen parameter. One application process exists per address state, limiting the size of the processor in the following manner. An address state contains 64K of code address space and 64K of data address space. To minimize PI bus traffic from process communication, processes that interact frequently should be placed on the same processor. This is accomplished by putting the processes in the same family. A process must be in a family even if it is the only process in the family; and a process may belong to more than one family. When a processor failure occurs requiring process relocation, all processes in a family must be located on a common processor. For each family there is a family initialization executive and a family shutdown executive for starting up and deleting a family, respectively. The family initialization executive defines local environment for the family, such as processes in the family, PI bus labels for data buffers in family processes, and semaphores local to the family processes System Executive Software (SES), a user written Ada procedure, is the highest level of control in the system. The SES tells DOS which application processes to execute at any point in time, and tailors control of the system to the particular application at hand. Additionally, SES is the final authority in deciding how to reconfigure the system if the DOS is unable to handle a failure that has occurred. In this instance, the DOS would tell the SES that it cannot handle the currently requested set of processes and ask for further instrucions. First, the SES defines the family initialization executive processes and the global semaphores. The family initialization processes then execute because they are a higher priority than the SES. A variable is set when the processs stops, causing the SES to define the family shutdown executives, delete the global semaphores after the family shutdown executives on other processors have completed executing, and finally delete itself.

Reference is made to Appendix E, pages E1 through E27 attached herein for a more detailed description of DOS including the various calls that are available to the programmer through the user interface. The following are listed for each call: Inputs, Outputs, Exceptions, Parameter Descriptions, and Examples. Some of the inputs of the system calls are Ada records. In these instances, the components of the records are listed.

Figure 20:
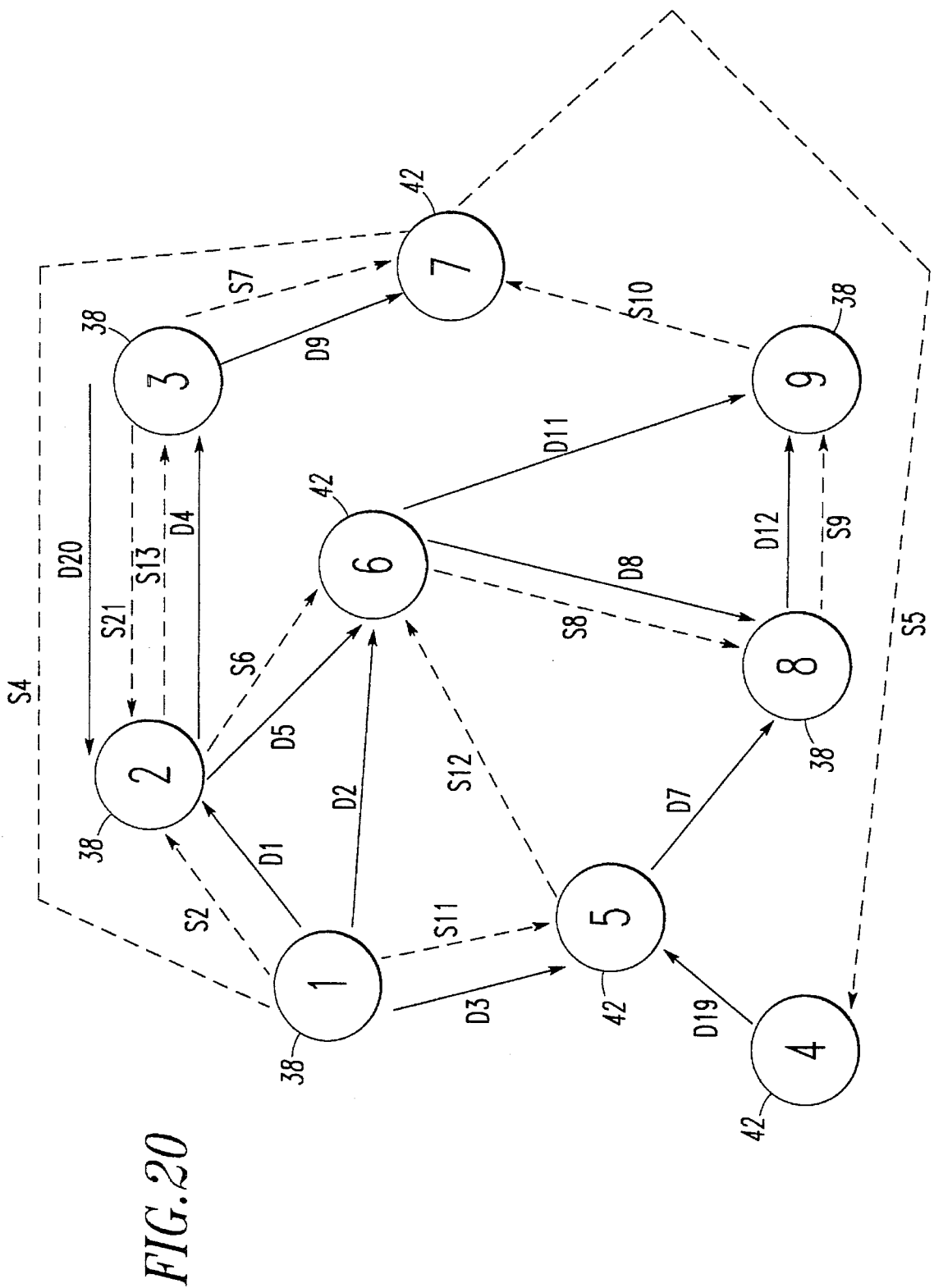
FIG. 20 is a flow diagram illustrating an example of application process scheduling in the system of the present invention.

As previously mentioned all of the applications code is written in Ada and resides and executes on the 1750A CPU modules 140 and 142, and 42, 44 of the system. The applications software consists of a number of processes which interact with each other and are distributed between the two modules. The DOS functionalities demonstrated by the applications processes are: (a) code executing on a 1750A CPU, (b) multiple processes on separate CPU's operating asynchronously using DOS process scheduling facilities, heretofore mentioned, for process synchronization, (c) processes communicating on one processor, such as 38 for example, (d) processes communicating across processors via PI bus 34, such as 38 and 40 for example, (e) preemption of processes, and (f) atomic process capabilities. Reference is made to the flow diagram of FIG. 20, wherein the individual circles referenced as 38 and 42 for example represent different modules in the system such as array processor group 38 and GP processor 42. The numerals 1 through 9 inclusive each represent a different application process residing in a respective one of the modules. For example processes 1, 2, 3, 8 and 9 may represent a family of processes and reside in a single CPU of a module; while processes 4, 5, 6 and 7 represent another family of processes residing in a different module. The dashed lines labeled S2, S4 through S13 and S21 represent semaphores or events; while the solid lines represent the flow of data referenced D1 through D4, and D4 through D9, D11, D12, D19 and D20. In operation, process 4 awaits semaphore S5 for transferring data D19 internally in the same processor. Process 5, for example, residing in module 42 awaits the arrival of semaphore S11 for transferring data D7 to another processor 38. From the preceding exemplary explanation, it is considered that the transfer of the remaining data in response to the semaphores is evident. For a more detailed understanding of the capabilities of the DOS system of the present invention, reference is made to Appendix H, pages H1 to H62 herein, which includes a series of tables that summarize application process definition information, semaphore and event information, and data buffer information.

Reference is also made to Appendix F, pages F1 through F20 attached herein for a more detailed description of the User Interface (UIF) package specification of DOS.

It will be apparent to those skilled in the art that various modifications and variations can be made in the system of the present invention without departing from the spirit or scope of the invention. Thus, it is intended that the present invention cover the modifications and variations provided they come within the scope of the appended claims and their equivalents.

APPENDIX A

PBM - DOS 10.3 PBM DOS SOFTWARE The PBM DOS software resides in the PBMC 32K shared memory between PBMC_A and PBMC_B, and uses the PBM MIC, as described below. PBM DOS controls the PBM users. The PBM may entertain up to three concurrent users at any point in time. One user is dedicated to receiving sensor input. This user will be controlled by PBMC_B. Another user will be dedicated to PBM/SPE Array transfers. This user will be controlled by PBMC_A. The remaining user will shared between the two controllers. When a PBM/PBM transfer is requested, PBMC_B will utilize the shared user. When a PBM/SPE Array transfer requires two users, PBMC_A will involve the shared user in the transfer. Arbitration of which controller is to own the shared user at any point in time will be on a transfer priority basis.

PBMC_A receives high-level requests for I/O services over the CtoC Subbus interface. These messages are received into a queue within the PBMC memory. PBMC_A interprets these messages, determines the priority of the request, and either responds to the request or forwards the request to PBMC_B. If necessary, PBMC_A returns any status or error message concerning the request back to the APC and handles all other APC I/O that may be required by DOS. PBMC_A also maintains a directory of the files currently active in the PBM memory elements and, as a growth option, dynamically allocates/deallocates storage as required. As an efficiency consideration, PBMC_A will interpret and respond to PBM/SPE transfer requests from the APC to minimize latency between the APC's transfer request and the data transfer. Generic control words in the request message may be used to generate specific controls required by the hardware. Finally, PBMC_A passes the hardware-intensive controls to the lower level hardware of the PBM MIC.

PBMC_B accepts PBM transfer requests from PBMC_A that are not PBM/SPE Array transfer requests and facilitates the PBM transfer. PBMC_B is also responsible for receiving set-up information from the Data Subbus as a slave of a transfer with an external entity (PBM or device) and coordinating the transfer's execution. PBMC_B may also specify or create the Data Subbus paths needed to perform an I/O transfer. Generic control words in the request message may be used to generate specific controls required by the hardware. Finally, as with PBMC_A, PBMC_B passes the hardware-intensive controls to the lower level hardware of the PBM MIC.

The PBM MIC contains a set of general purpose I/O service utilities that form the basic PBM instruction set. These instructions can direct the hardware to send data to, or receive data from, the SPE Array in a variety of different ways. They can also be used to communicate with other PBMs, or with external interfaces (Input Buffers, Output Buffers, etc.). The hardware controls passed to the PBM MIC from PBMC_B and PBMC_A are used to parameterize these general utilities for a specific transfer.

The software required for system initialization and for both controllers will be described in the rest of this document. To assist in the timely development of this software, a Baseline Version of PBM DOS will be defined that provides the overall structure for the entire package and a specific set of services that will provide a basic capability. To this overall structure, eventual enhancements can be made to improve the capabilities of PBM DOS.

20. <u>Initialization</u>. The PBMC has certain data structures that must be initialized at start-up and maintained at run-time. These data structures are the following:

o A Volume Allocation Table (VAT), which maps volumes of files onto physical processor modules. A volume of files are those files that will always exist within the same PBM.

o A SIWEB Path Table, which maps each external physical entity accessible via the I/O Subbus to the correct sequence of path creations necessary to connect a transfer's source and destination.

The Volume Allocation Table (VAT) allows the application to group together files that are always on the same physical PBM as a volume. PBM DOS will use this table to translate from a specified volume to that volume's host processor module, if the volume exists. Once the physical processor is known, PBM DOS can use the SIWEB Path Table to determine what path creation specification(s) must be given to the PBM's lower level hardware to effect path creation, if necessary. Often the volume will be resident on the same processor, in which case a path need not be created.

Downloading the system generation constants is part of the system initialization. Two of the constants specify the configuration of the PBM. The PBM may be Static, Dynamic, or a mixture of the two. If the PBM is a mixture of the two PBM types, the PBM contains some static pages and the rest dynamic pages. The PBM will be laid out such that the top of the PBM contains all of the static pages, followed by the dynamic pages, or vice versa. The system generation constants are the following:

- o NUMBER_OF_SPES : The number of SPEs in an AP's SPE Array.

- o NO_OF_STATIC_PAGES : Number of static pages in the PBM.

- o NO_OF_DYNAMIC_PAGES : Number of dynamic pages in the PBM.

- o PBM_SPE_PRIORITY : Priority for transfers between the PBM and an SPE or the SPE Array.

- o PBM_PBM_PRIORITY : Default priority for transfers between PBMs, whether intra-processor or inter-processor.

- o PBM_DEVICE_PRIORITY : Default priority for transfers between PBM and device.

- o MAX_PBM_RETRIES : Number of times a transfer set-up is to be attempted before giving up.

- o PBM_TIMEOUT : Time allowance for transfer completion after PBMC_B's initial sending of the transfer's VIOB to lower-level hardware.

At start-up, these tables and constants are downloaded into the PBMC's memory from a Non-Volatile Memory (NVM) module via the PI-Bus. Since the PBMC's memory is not directly accessible to the PI-Bus, the data is loaded into the APC's memory and then forwarded to the PBMC via the CtoC Subbus. Each processor will have its own unique SIWEB Path Table and an identical copy of the VAT. The initial configuration of the VAT downloaded to each PBMC's memory will dictate the volumes that are to be stored on that module's PBM.

If the system's configuration changes due to faults, the VAT must be updated for each volume moved to a new physical processor. An updated SIWEB Path Table may or may not be needed. The SIWEB Path Table must be updated only when different paths required to reach physical destinations are necessary due to failures in the I/O Subbus. These updates are accomplished via NVM downloads.

WSP USER'S MANUAL 1.2.1.2.4 <u>Compiling and Linking Applications</u>. Applications processes should be compiled separately into a sublibrary of the DOS library (which is pointed to by the DOSLIB VMS logical).

When ready to link the application main procedure, a linker control statement file is used, normally contained in a file with the same filename as the main application process and a .LOD file extension. A typical example of an application process .LOD file is contained in the file DOS_TOOLS:TYPICAL_APPLICATION.LOD and may be used as the linker control statement file by linking with the VAX VMS command

```
$ @kos_tools:link_process main_program
```

The file DOS_TOOLS:TYPICAL_APPLICATION.LOD is included here for discussion:

```
**********************************************************************
*                                                                     *
*            Runtime Executive Linker control statements              *
*                        release C.0                                  *
*                                                                     *
*                                                                     *
*       - - - Link program running in address state other than 0 - - - *
*       - - 128K expanded memory size, user-controlled multiprogramming - - *
*                                                                     *
**********************************************************************
*          ACTRTE_Device:[Common.Control]MPUAS0128K.LodBase           *
*    modified for linking the application processes to run under the DOS *
**********************************************************************

COPY ADALOD$TARGET

**********************************************************************
*       Section definitions for common RTE code/data/literals         *
*                   for user-controlled MultiProgramming              *
**********************************************************************

MEMSIZE 1FFFF

* * * Section definitions for compiler generated code/data/literals
SECTION 0 CODE
SECTION 1 DATA
SECTION 2 LIT

* * * Shared storage definitions for RTE code/data/literals
* * *           (addressable by all address states)
* The ending address of Section 3 depends upon if the module RTDEBUG is
*    selected.  If selected, the ending address for Section 3 is 1FFF,
*    otherwise, the ending address is 0FFF.  Sections 0, 1 and 2 will
*    pick up where Section 3 leaves off.
```

WSP USER'S MANUAL

```
SECTION 3 CODE   0000,1FFF
SECTION 4 DATA   10400,10FFF
SECTION 5 LIT    10000,103FF
SECTION 6 LIT    10020,1003F

*** Unshared storage (local to address state)
SECTION 7 DATA 11000,113FF
SECTION 8 LIT    11400,117FF

*** Put in shared memory compiler runtime support routines
***                which are also used by RTE.
FORCE RTSCNSP.00    CSECT=3
FORCE RTSCS.00      CSECT=3

* The linker should NOT load the shared RTS code, data and literals.  These
* shared modules are loaded in the DOS Address State ONLY.
NOLOAD 3
NOLOAD 4
NOLOAD 5
NOLOAD 6

* Must be selected for compiled code references to be consistent for all
* Address States.
SELECT RTSINIT
SELECT RTSTASKS
SELECT RTSTASKR
SELECT RTSTASKM
SELECT RTSTASKU
SELECT RTSTIME
SELECT RTSACPTI
SELECT RTDEBUG
SELECT RTSCUSTM

* Define heap/stack information
DEFINE  RTS.System.Heap.Size    1400
DEFINE  RTS.Mainstack.Size      1000
DEFINE  RTS.Subtaskstack.Size   0200
DEFINE  RTS.System.Heap                 2000
SECTION 31 DATA                         2000,33FF

COPY ADALOD$WEXTREFS

COPY ADALOD$RTECUSTOM

* Local_UI_Data_ data
FORCE U04171.01                         CSECT=7
```

WSP USER'S MANUAL

The significant pieces of information in this .LOD file are:

```
MEMSIZE 1FFFF
SECTION 0 CODE
SECTION 1 DATA
SECTION 2 LIT
SECTION 3 CODE      0000,1FFF
SECTION 4 DATA      10400,10FFF
SECTION 5 LIT 10000,103FF
SECTION 6 LIT 10020,1003F
SECTION 7 DATA      11000,113FF
SECTION 8 LIT 11400,117FF
```

This MEMSIZE (128K), in conjunction with these Section definitions, allows:

a. the RTS shared code references (Section 3) to be made from Instruction Page Registers 0 and 1 b. the RTS shared data (Section 4) and literal (Sections 5 and 6) references to be made from Operand Page Register 0 c. the RTS local data (Section 7) and local literal (Section 8) references to be made from Operand Page Register 1.

Any other method of linking these Sections would either cause the creation of different references to areas within these Sections for each process or inefficient placement of these sections within a process's address space. The references to areas within these Sections must be the same no matter what address state is executing. This is an important factor within the use of these Section definitions.

```
* Define heap/stack information
DEFINE  RTS.System.Heap.Size        1400
DEFINE  RTS.Mainstack.Size    1000
DEFINE  RTS.Subtaskstack.Size 0200
DEFINE  RTS.System.Heap             2000
SECTION 31 DATA                     2000,33FF
```

The process's stack/heap area is defined to be from 2000,33FF. With this type of memory allocation scheme, the process's code/data/literals (Sections 0, 1 and 2) can then be placed in the process's address space starting at 3400, as the linker sees fit. The user need not be concerned about fitting all of his code, data and literals "above" the stack and heap, which ultimately will waste memory.

```
NOLOAD 3
NOLOAD 4
NOLOAD 5
NOLOAD 6
```

WSP USER'S MANUAL

These NOLOAD statements tell the linker not to place the records comprising these Sections (3-6) into the process's image. These Sections are the RTS's shared code/data/literals, which are already a part of the DOS, so the process should not also have a copy in his address space. The process references the shared RTS code/data/literals by making his page registers point to the DOS memory containing the RTS.

```
*** Put in Unshared storage (local to address state)
* Local_UI_Data_ data
FORCE U04125.01                    CSECT=7      ORG=11000
```

The above FORCE directive tells the linker to place the data for a DOS data module that is local to every process, much like the RTS's Section 7. This local data is used to efficiently implement exception propagation.

```
*** Put in Shared storage (global to CPU)
* Global_UI_Data_ data
FORCE U04146.01                    CSECT=4      ORG=10400
```

The convention exercised in this document is that the initiator of a data transfer is called the Requestor and the other involved party is called the Remote. This convention results in the Requestor being the data source for output transfers and the data recipient for input transfers. Data may be sent from PBM to PBM in several different ways. The most basic way is by PBM to PBM Copy, in which the PBM destination of the transfer receives a physical copy of the PBM source data; no formatting occurs. The other methods of accomplishing PBM to PBM transfers are grouped under the column heading 'Requestor - Default or User Specified', 'Remote - Default or User Specified'. This heading correctly implies that the data may be differentially treated on both ends of the transfer, i.e., data is read from the PBM source according to some addressing style and is written into the PBM destination according to some (possibly different) addressing style.

When a file is OPENed (as will be seen later), the user may optionally specify what default addressing style to use when accessing that file and the chosen style's parameters. For each PBM to PBM transfer then, the user may utilize this default addressing style or may explicitly specify a style to override the default addressing style. Consequently, four PBM to PBM transfers exist: 1) Both use default addressing styles, 2) Requestor uses default style and Remote is user specified, 3) Requestor is user specified and Remote uses default style, and 4) Both are user specified.

PBM to/from External Device transfers may only involve ROW_CONVERSION or COL_CONVERSION files which are distributed throughout the PBM. Therefore, the transfer type is indicated as MS to SD and SS to MD transfers, where the single element is the external device and the multiple elements are the PBM's BMEs.

30.3 <u>PBM DOS Commands</u>. This section defines the commands available to the user through the DOS's User Interface. The features of these commands that will not be supported fully in the PBM DOS baseline version are documented throughout this text. The commands supported by PBM DOS are:

- o OPEN       - Allocate PBM memory for a file.
- o CLOSE      - Deallocate PBM entirely or for a file(s).
- o TRANSFER   - Request for a PBM transfer.
- o PREP       - Prepare for a transfer, to be triggered by a later TRANSFER command.
- o UNPREP     - Remove a previously PREPped transfer from DOS's PREPped queue.
- o INIT_FILE  - Initialize a file to a specified value(s).
- o TEST       - Perform PBM test software.

30.3.1 OPEN Command. The user defines PBM files to the PBM DOS via the OPEN command. When this command is encountered, PBM DOS will calculate and allocate the necessary amount of memory for the file if the VAT (described in the PBM Initialization section) agrees that the specified volume exists in this PBM. The parameters necessary to perform the allocation are:

VOLUME
: an identifier that indicates the volume with which this file is to be associated. The VAT must affirm this volume is resident to be a legal command.

FILE_ID
: an identifier for the OPENed file. This id must be system-unique to accomplish inter-processor transfers.

SEMAPHORE
: (opt) Semaphore to signal upon unsolicited data being written to this file, as opposed to intentionally having data read into this file via an input TRANSFER. Defaults to no semaphore.

NUMBER_OF_ROWS : number of rows to be allocated.
NUMBER_OF_COLUMNS : number of columns to be allocated.
DATA_TYPE :
SINGLE_REAL => 1 word
SINGLE_COMPLEX => 2 words
DOUBLE_REAL => 2 words
DOUBLE_COMPLEX => 4 words
SINGLE_FLOAT => 4 words
DOUBLE_FLOAT => 8 words
QUAD_FLOAT => 16 words STORAGE_STYLE :
GLOBAL,
LOCAL,
ROW_CONVERSION,
COL_CONVERSION,
ROW_COL_ACCESS
where the storage style is as defined in Section 30.1.1 "File Storage Styles".

DEF_ADD_STYLE : (Opt)
LINEAR,
INTERVAL,
PST,
BY_ROW,
BY_COL,
BY_SEG_ROW,
BY_SEG_COL,

| | PARTIAL,<br>PBM_LOOKUP,<br>COPY |
|---|---|
| DEF_ADD_PARAMS | Default addressing style for opened file.<br>: (Opt) If DEF_ADD_STYLE is specified this parameter will contain a record of the necessary addressing parameters (see Table 3-1). |
| NUMBER_OF_ELEMENTS | : (opt) Number of elements in the accessing module (defaults to NUMBER_OF_SPES in Initialization section). Legal value are 1,2,4 and NUMBER_OF_SPES. |

30.3.2 <u>CLOSE COMMAND</u>. The CLOSE command informs PBM DOS to deallocate the memory occupied by the specified file(s) or all of the memory (ALL). Initially, only the ALL option will be supported. Specification of files will be an add-on feature.

30.3.4 <u>TRANSFER</u> Command. The user initiates a PBM-related transfer with the TRANSFER command. The TYPE_OF_TRANSFER field indicates what types of transfers may occur. PBM_LUT_READ/PBM_LUT_WRITE are the transfers utilized to use the PBM as a lookup table for the SPE Array. PBM_TO_REMOTE/REMOTE_TO_PBM are PBM to PBM transfers that may or may not result in an intra-PBM transfer, i.e., the REMOTE's location must be determined by PBM DOS.

There are six pieces of information that must be known to perform a transfer. They are:

1. Whether this command is to reference a previously PREPPED transfer (PREPPED & PREP_I/O). If so, rest of parameters are ignored.
2. What kind of transfer is to occur (TYPE_OF_TRANSFER),
3. Who is requesting the transfer (REQ_INFO),
3a. If the requestor is a PBM file (REQ_FILE), how the requestor's PBM file is to be accessed (REQ_ADD_STYLE & REQ_ADD_PARAMS),
4. Who the other end of the transfer is (REM_INFO),
4a. If the remote is a PBM file (REM_FILE), how the remote PBM file is to be accessed (REM_ADD_STYLE & REM_ADD_PARAMS),
5. Control information (NO_BUSSES & PRIORITY), and
6. What to do when the transfer is finished (SEMAPHORE & STATUS).

The TRANSFER command requires the following parameters:

| Parameter | Description |
|---|---|
| PREPPED | : (Opt) YES, NO<br>- If YES, the transfer has already been set up via the PREP command. The only other parameter necessary is PREP_ID. Defaults to NO. |
| PREP_ID | : (Opt) If PREPPED = YES, this parameter will contain the identifier by which PBM DOS recognizes which PREPPED transfer is being requested. All parameters are ignored. If PREPPED = NO, this field is ignored. |
| TYPE_OF_TRANSFER | : PBM_TO_REMOTE,<br>REMOTE_TO_PBM,<br>PBM_TO_SPE,<br>SPE_TO_PBM,<br>PBM_TO_DEVICE,<br>DEVICE_TO_PBM,<br>PBM_TO_PBMC,<br>PBMC_TO_PBM,<br>PBM_LUT_READ,<br>PBM_LUT_WRITE.<br>- Indicates the direction of the transfer. |
| REQ_INFO | : The requestor of the transfer. If the requestor is a PBM, the following three parameters are legal. |
| REQ_FILE | : The requestor's file id.<br>- if PBM_TO_XXXX or PBM_LUT_READ => data source,<br>otherwise => data destination. |
| REQ_ADD_STYLE | : (Opt)<br>LINEAR,<br>INTERVAL,<br>PST,<br>BY_ROW,<br>BY_COL,<br>BY_SEG_ROW,<br>BY_SEG_COL,<br>PARTIAL,<br>PBM_LOOKUP,<br>COPY |

| | |
|---|---|
| REQ_ADD_PARAMS | Addressing style for requesting file. If not specified, will use default addressing style of REQ_FILE.<br>: (Opt) If REQ_ADD_STYLE is specified, this parameter will contain a record of the necessary addressing parameters (see Table 3-1). |
| REM_INFO | : The remote of the transfer. If the remoteis a PBM file, the following four parameters are legal. |
| REM_VOLUME | : The remote's volume id.<br>- Illegal for PBM_TO_XXXX, except for PBM_TO_REMOTE. |
| REM_FILE | : The remote's file id.<br>- if REMOTE_TO_PBM or PBM_LUT_READ => data source<br>- all other legal transfers => data destination |
| REM_ADD_STYLE | PBMC_TO_PBM, SPE_TO_PBM, DEVICE_TO_PBM, REMOTE_TO_PBM and PBM_LUT_WRITE.<br>: (Opt) LINEAR, INTERVAL, PST, BY_ROW, BY_COL, BY_SEG_ROW, BY_SEG_COL, PARTIAL, PBM_LOOKUP, COPY |
| REM_ADD_PARAMS | Addressing style for remote file. If not specified, will use default addressing style of REM_FILE.<br>: (Opt) If REM_ADD_STYLE is specified, this parameter will contain a record of the necessary addressing parameters (see Table 3-1). |

| | |
|---|---|
| NO_BUSSES | : (Opt) No. of busses for the transfer.<br>- Defaults to 2.<br>- If PBM_LUT_READ,<br>    PBM_LUT_WRITE,<br>    PBM_TO_PBMC, or<br>    PBMC_TO_PBM,<br>this field is ignored because the number of busses is fixed by the hardware. |
| PRIORITY | : (Opt) Priority of the transfer (0-15). Defaults to the Sysgen value of the transfer priority type. |
| SEMAPHORE | : (Opt) Semaphore to signal upon transfer Defaults to no semaphore. |
| SATUS | : Global APC memory location where a status will be returned for the user to examine, if desired. |

Note that many of these parameters are optional.

To execute a transfer that has been PREPPED (see the later PREP command), all that must be specified is the PREP_ID, with the PREPPED parameter set to YES.

To the user, all PBM transfers will occur logically. The user need not be aware of on which physical processor the remote volume exists, PBM DOS determines the physical processor of the remote volume.

All PBM <-> SPE/SPE array transfers must be of the same priority to ensure the PBM and SPE(s) are synchronized for the proper transfer. This priority is specified at initialization (PBM_SPE_PRIORITY). In order to guarantee synchronization between the PBM and SPE(s) for transfers, the application programmer must guard against preemption of an SPE process waiting for a PBM/SPE(s) transfer by a higher priority SPE process that will desire a PBM/SPE(s) transfer. This situation can be prevented by disabling interrupts before a PBM/SPE(s) transfer request in a process that may be preempted and enabling interrupts after the transfer has occurred.

30.3.3.1 <u>TRANSFER Restrictions</u>. Only LINEAR addressing will be supported for LOCAL and GLOBAL files for the baseline version of PBM DOS.

For local transfers, either 'Number_Of_Rows_Or_Columns' or 'Number_Of_Matrix_Elements' must be a legal value.

PBM transfers to/from external system entities and the PBMC will be limited to either row or column transfers only, depending upon how the file is OPENed (ROW_CONVERSION or COL_CONVERSION). The user will specify PREPPED (opt), PREP_ID (opt), TRANSFER_TYPE, the addressing style and the associated parameters. Only ROW_CONVERSION and COL_CONVERSION files may be involved in these transfers.

30.3.4 <u>PREP Command</u>. The PREP command allows the user to set up transfers before actually requesting the transfer. Use of this command will improve the PBM DOS's response time to a TRANSFER command. After this set-up, the transfer is later initiated by the user executing the TRANSFER command with the PREPPED parameter set to YES and specifying the PREP_ID. Everything else will be ready. PBM DOS will support up to TBD PREPPED transfers at a time. The parameters of the PREP command are the same as the TRANSFER command minus the PREPPED and PREP_ID parameters plus a RETAIN parameter. The RETAIN parameter that specifies whether or not PBM DOS is to remember the PREPPED transfer after PBM DOS executes a TRANSFER command.

30.3.5 <u>UNPREP Command</u>. The UNPREP command will remove any reference of a previously PREPped transfer. Any future TRANSFER requests referring to this transfer with the PREPPED parameter set to true will not result in a transfer. For example, this command can be used to get rid of PREPped transfers that are being RETAINed in order to be TRANSFERred X times during some period of time.

30.3.6 <u>INIT_FILE Command.</u> The INIT_FILE command can be used to clear a target file to a specified value(s). Potentially, a file can be injected with software-generated test targets. This command will not be supported in the baseline of PBM DOS.

30.3.7 <u>TEST Command.</u>The TEST command initiates PBM Self-Test or BIT. An add-on feature will be for the user to specify precisely which BIT or Self-Test tests (ie, a subset) to run. This command's parameters are:

```
TEST_TYPE    : BIT, SELF-TEST
TEST_SUBSET  : Test Subset specification (add-on feature).
```

30.4 <u>SEND_CTOC_MSG COMMAND</u>. The SEND_CTOC_MSG command is available for the user to send control messages to devices (a synchronizer, a core module, or an RDFP), which reside on the CtoC Subbus. This command will not be implemented in the baseline version of AP DOS.

40. PBMC_A SOFTWARE.
This section will describe the software necessary for PBMC_A to perform the required PBM DOS functions. The software run by this controller will respond to commands listed in the User Interface section that are initiated by application software on the APC and forwarded across the CtoC Subbus.

40.1 TASK DESCRIPTIONS.
PBMC_A software's tasks can be grouped into the following categories:

- Accepting and responding to I/O commands,
- Allocating/Deallocating PBM storage,
- Initializing files, and
- Passing transfer result information to the APC.

40.1.1 Accepting And Responding To I/O Commands.
PBMC_A receives all of the PBM's commands from the CtoC Subbus. The commands are described in the User Interface section. Receipt of these commands from the CtoC Subbus will generate an interrupt that is serviced by the PBM DOS. Decoding of the message will determine how the PBM DOS must respond.

Response to OPEN and CLOSE commands will involve setting and/or maintaining the previously mentioned VAT and as well as a Directory, which will contain the current memory allocation of the PBM. For an OPEN command, PBMC_A will determine if enough memory is available to accomodate the file. For a CLOSE command, the PBMC_A will close the specified file(s) (in a future version) or will deallocate the entire PBM (ALL option); no status will be returned.

The PREP, UNPREP, and TEST commands will be passed to PBMC_B for processing.

Upon reception of a TRANSFER command, PBMC_A will react depending upon what type of transfer is being requested. If the requested transfer is not a PBM/SPE(s) transfer, PBMC_A will screen the transfer parameters for proper content. If an improper transfer is requested, PBMC_A will return an ILLEGAL status to the APC-resident requestor. For example, TRANSFER commands involving single, external elements (i.e., PBMC or devices) must be involved with either ROW_CONVERSION or COL_CONVERSION files, a file OPENed as a ROW_CONVERSION file cannot be transferred by columns to the SPE Array, etc.

If the transfer is a PBM/SPE(s) transfer and the parameters are legal, PBMC_A will respond by generating the data constructs necessary to initiate the data transfer. The transfer may only occur if the PBM/SPE Array user is available. If the transfer requires two users, the shared user must also be available. If the needed PBM user(s) is (are) unavailable, the transfer will be queued and executed when the PBM user(s) becomes (became) available.

40.1.1.1 PBM/SPE Array Global Data Transfers.
The SPE Array may view some (or all) files in the PBM as global by OPENing the file with the GLOBAL storage style (see the OPEN command).

40.1.1.1.1 PBM To SPE Array.
Global data transfers may occur from the PBM to the SPE Array. The user will initiate the transfer with the TRANSFER command. The TRANSFER command's parameters shall indicate a GLOBAL transfer is requested to an SPE/the SPE Array. Legal transfers shall be from the BME containing the file to the associated SPE ('SS to SD') and from the BME to the SPE Array ('SS to MD').

40.1.1.1.2 Single SPE To PBM.
Global data transfers may occur from an SPE to the associated BME. The user will initiate the transfer with the TRANSFER command. The TRANSFER command's parameters shall indicate a GLOBAL transfer is requested to the PBM. The only type of legal transfer shall be from one SPE to the associated BME, which contains the global file ('SS to SD').

40.1.1.2 PBM/SPE Array Local Data Transfers.
In addition to the SPE Array's ability to access PBM data globally, the PBM may be divided such that each SPE has a portion of the PBM. To each SPE, the PBM portion is an extension of the SPE's local memory. In order to access files in this manner, the user must OPEN them with the LOCAL storage style.

40.1.1.2.1 BME/SPE Assignment.
As previously mentioned, in the local mode, each SPE has a portion of the PBM, a BME, for local storage. An assignment is made that maps these BMEs to SPEs. The mapping of BMEs to SPEs is always a sequential mapping, and this mapping may be rotated. For example, an initial configuration could be:

```
BME 0 <-> SPE 0
BME 1 <-> SPE 1
      :
BME E <-> SPE E
BME F <-> SPE F
```

By rotating, another legal configuration would be:

```
BME 1 <-> SPE 0
BME 2 <-> SPE 1
      :
BME F <-> SPE E
BME 0 <-> SPE F
```

The mapping of BMEs to SPEs is part of the transfer's set-up parameters. This rotation of the BMEs with respect to SPEs will not be supported in the baseline version. Only the default configuration is valid.

40.1.1.2.2 PBM To SPE Array - Linear Addressing. Local linear addressing transfers may occur from the PBM to the SPE Array. The user will initiate the transfer with the TRANSFER command. The TRANSFER command's parameters shall indicate a transfer is requested from a LOCAL file to the SPE Array with LINEAR addressing.

40.1.1.2.3 PBM To SPE Array - Interval Addressing. Local interval addressing transfers may occur from the PBM to the SPE Array. The user will initiate the transfer with the TRANSFER command. The TRANSFER command's parameters shall indicate a transfer is requested from a LOCAL file to the SPE Array with INTERVAL addressing.

40.1.1.2.4 PBM To SPE Array - PBM Lookup Addressing. PBM Lookup addressing transfers may occur from the PBM to the SPE Array when the SPE Array wants to use the PBM as a lookup table. The user will initiate the transfer with the TRANSFER command. The TRANSFER command's parameters shall indicate a PBM_LUT_READ transfer is requested from a LOCAL file to the SPE Array. The SPE Array will be responsible for generating an addressing scheme for the data transfer. The PBM DOS must inform the PBM's lower level hardware to coordinate for a read of 'Element Count' elements.

40.1.1.2.5 SPE Array To PBM - Linear Addressing. Local linear addressing transfers may occur from the SPE Array to the PBM. The user will initiate the transfer with the TRANSFER command. The TRANSFER command's parameters shall indicate a transfer is requested from the SPE Array to a LOCAL file with LINEAR addressing.

40.1.1.2.6 SPE Array To PBM - Interval Addressing. Local interval addressing transfers may occur from the SPE Array to the PBM. The user will initiate the transfer with the TRANSFER command. The TRANSFER command's parameters shall indicate a transfer is requested from the SPE Array to a LOCAL file with INTERVAL addressing.

40.1.1.2.7 SPE Array To PBM - PST Addressing. Local PST addressing transfers may occur from the SPE Array to the PBM. The user will initiate the transfer with the TRANSFER command. The TRANSFER command's parameters shall indicate a transfer is requested from the SPE Array to a LOCAL file with PST addressing.

40.1.1.2.8 SPE Array To PBM - PBM Lookup Addressing. PBM Lookup addressing transfers may occur from the SPE Array to the PBM when the SPE Array wants to prepare the PBM for usage as a lookup table. The user will initiate the transfer with the TRANSFER command. The TRANSFER command's parameters shall indicate a PBM_LUT_WRITE transfer is requested from the SPE Array to a LOCAL file. The SPE Array will be responsible for generating an addressing scheme for the data transfer. The PBM DOS must inform the PBM's lower level hardware to coordinate for a write of 'Element Count' element..

40.1.2 <u>Allocating/Deallocating PBM Storage</u>. In the baseline of PBM DOS, memory will be allocated dynamically via the OPEN command, but dynamic deallocation will be restricted to CLOSE(ALL), ie, clearing the entire PBM. As an add-on feature, the CLOSE command will allow specification of one or more files to dynamically deallocate.

40.1.3 <u>Initializing PBM Files</u>. The INIT_FILE command initializes a PBM file to specified values. This command will not be implemented in the baseline version.

40.1.4 <u>Passing Transfer Result Information To The APC</u>. PBMC_A will be responsible for forwarding transfer result information when a transfer completes. The result may be either a success or a failure. If a transfer fails, PBMC_A must also send a message to APC DOS to inform Fault Tolerance of the detected problem for logging and analysis.

50. <u>PBMC_B SOFTWARE</u>. This section will describe the software necessary in PBMC_B to perform the required PBM DOS functions. The software run by this controller will respond to the TRANSFER, PREP, UNPREP, and TEST commands listed in the User Interface section, as well as responding to transfer results from the Subbus interfaces' (Data Subbus and CtoC Subbus) hardware.

50.1 <u>PBMC/PBM CONTROL OPERATIONS</u>. To accomplish PBM transfers, interaction must occur between the PBMC and the lower level hardware of the PBM.

50.1.1 <u>PBMC To PBM Hardware Interaction</u>. To initiate execution of transfers, the PBMC must furnish the lower level PBM hardware with a sequence of instructions, grouped into a VIOB (Vectored I/O Block). defined in the ... In general, the VIOB will inform the hardware of a memory array's address, a description of that memory array (#rows, #columns, #words/element), how the other end of the transfer is configured (#elements) and where and how to access the data. The VIOB also specifies the transfer's priority, pipe size, path creation and a tag id.

50.1.2 <u>PBM Hardware To PBMC Interaction</u>. PBM to PBMC control interactions will be accomplished via interrupts. The hardware will inform the PBM of transfer set-up statuses, transfer completion statuses, reception of a set-up sequence from the Data Subbus and reception of data. The set-up status will only elicit a response from the PBMC if the status indicates failure. In this case, the PBMC will attempt retry, if allowed by the user specified MAX_PBM_RETRIES value specified at initialization. However, before attempting retry, PBM DOS will check to see if any higher priority transfers are now in the transfer queue.

If the transfer completion status indicates failure, the transfer will be attempted again by the hardware. If the transfer completion status indicates success, the PBMC will remove the transfer from the internal queue of prioritized transfers, deallocate the PBMC memory inhabited by that transfer's VIOB, and inform any application software awaiting word of the transfer's completion via a CtoC transfer to the APC.

Upon reception of a set-up sequence from the Data Subbus, the PBMC will perform whatever steps are necessary to synchronize with the external module and execute the transfer.

An interrupt that has occurred because unsolicited data has been received from an external source shall cause the PBMC to determine if any application software is interested in knowing the data arrived. If so, a message is sent to the APC DOS with this information via a CtoC transfer.

Along with control interaction, data transfers may occur from the PBM to the PBMC memory. Since the PBMC is seen as a single element, these transfers may only involve files OPENed of the ROW_CONVERSION or COL_CONVERSION storage style.

50.2 COMMAND OPERATIONS. PBMC_B software will build a prioritized queue of transfers, in VIOB form, from forwarded TRANSFER commands and execute the highest priority transfer queued when PBMC_B has control of the PBM's shared user (see Section 10.3). When a just-queued transfer is the highest priority queued transfer, PBMC_B will check on the present status of the transfer currently executing on the lower level hardware. If a lower priority transfer is in the process of transfer, the hardware will not allow PBMC_B to preempt the lower priority transfer. However, if the lower priority transfer has not yet started transferring, perhaps due to problems attaining system busses, the higher priority transfer will take the lower priority transfer's place and the lower priority transfer will be retried later.

When a transfer completes, PBMC_B determines the transfer's status (SUCCESS, FAILED). If the transfer was a success, PBMC_B relays information to the APC and then removes the transfer from the Data Subbus transfer queue. When an attempted transfer encounters checksum problems, the hardware will continue automatically retrying the transfer until stopped by PBM DOS. If the transfer runs out of time, ie., surpasses the PBM_TIMEOUT specified at initialization, PBMC_B returns a FAILED response to the APC and will stop the hardware transfer. Whether a transfer is finished because of success or failure, PBMC_B will return the status to the APC and will remove the transfer from the Data Subbus transfer queue.

Upon receipt of a PREP command, PBMC_B will generate the VIOB necessary to perform the transfer. However, instead of queuing the transfer according to the normal priority, the transfer will be placed in a different PBM DOS queue, storing the transfer's VIOB and PREP_ID. When a later TRANSFER command is received with the PREPPED parameter set to YES, this PREPPED queue will be indexed by PREP_ID for the proper VIOB and the transfer will be queued according to its priority. If the transfer cannot be found in the PREPPED queue, an ILLEGAL status will be returned to the APC. If the RETAIN parameter was set when the transfer was PREPPED, the transfer may be referenced by TRANSFER commands (with the PREPPED parameter set to YES) until the user UNPREPs the transfer. At that time, PBM DOS will no longer recognize it as PREPPED. Otherwise, a PREPPED transfer's information will be deleted from the PREPPED queue after one reference by a TRANSFER command.

To accomplish simultaneous transfers, PBMC_B's software must maintain a record of how many users the PBM is currently entertaining and which busses are presently occupied. PBM DOS will also allow for a software maintained/utilized "Busy" file status through which PBM DOS will be able to ensure that not more than one user may access a file at any given time.

50.3 <u>PATH CREATION</u>. When PBM transfers involve entities external to the PBM's module, PBMC_B must give the PBM's lower level hardware the transfer's VIOB that contains the necessary path creation specification(s) to create a communication link between the two ends of the transfer. These path creation specifications are extracted from the SIWEB Path Table (see User Interface section for description). All inter-processor communication is accomplished with the aid of this table.

50.4.1 <u>Input Data Operations</u>. In the scenario of an input data operation, the request initiator specifies to PBM DOS the file to receive the data and the volume and file that is to supply the data, among all the other information specified in the TRANSFER command (see the User Interface section). The lower level hardware will be given the information described in the "PBMC to PBM" section along with an indication that the transfer is an input.

50.4.2 <u>Output Data Operations</u>. In the scenario of an output data operation, the request initiator request specifies to PBM DOS the file to supply the data and the volume and file that is to receive the data, among all the other information specified in the TRANSFER command (see the User Interface section). The lower level hardware will be given the information described in the "PBMC to PBM" section along with an indication that the transfer is an output.

50.4.3 __PBM To PBM Operations__. If a requested transfer involves a file within the same PBM, PBM DOS compiles a VIOB to perform the transfer, specifying which files are involved, the direction of data transfer, and the addressing parameters for both files. If the requested transfer is required to involve a file in a different PBM, control information must precede the data to allow synchronization between the data transmitter and receiver. The availability of the file (i.e., the Busy field) will determine when the transfer can occur. Until the file is available, the accessing PBM will wait.

This control information is PBM DOS-defined and shall contain the following:

- Transfer direction (ie, INPUT, OUTPUT)
- File being accessed
- (Opt) Addressing Style and parameters
- Number of accessing elements
- Conversion type, for device transfer (ie, ROW, COLUMN)
- Word Count (as a check)

Note that the addressing style to be used by the remote PBM may be specified by the requesting PBM. Otherwise, a default addressing style for the remote file must have been specified when the remote file was OPENed.

50.4.4 __PBM/Device Operations__. Besides other modules' PBMs, a PBM will also communicate with devices on the Data Subbus, eg, Input Buffer, Output Buffer. To effectively communicate with devices that input data to the signal processing system, the Array Processor will implement control transfers. For input devices to be capable of responding requires some intelligence, whether in an embedded controller or in a CASIU. Therefore, the system can have devices either on or independent of the PI-Bus. If the device is on the PI-Bus, the device can receive PI-Bus control messages informing the device where to forward data it receives from external entities, e.g., sensors. Optionally, if the device is not on the PI-Bus, similar control information may be sent across the Data Subbus to be interpreted by the device's CASIU. The exact format of the control transfer is TBD, but will contain the following information:

- Device-dependent reference of what data to transfer,
- Destination physical processor,
- Destination file (which must be of either ROW__CONVERSION or COL__CONVERSION storage style),
- Word Count (optionally, all data for a period of time),
- Priority (will be defaulted)

Note that this information implies the device has the intelligence to be able to create the necessary transfer VIOB for each Data Subbus transfer, including determining the proper path creation specification(s). The device must also be capable of associating different control communications with different Data Subbus transfers. Finally, in order to initiate Data Subbus transfers, the device must perform a leading setup control transfer as defined for PBM to PBM transfers involving the Data Subbus in the last section.

Data Subbus transfers from APs to devices are expected to not require any special control information transfers to the device. However, the file involved in the transfer must be of either ROW_CONVERSION or COL_CONVERSION storage style.

50.4.5 <u>PBM/PBMC Transfers</u>. Data transfers may also occur between the PBM and the PBMC's memory, perhaps using the PBMC as alternative storage when the PBMC's memory is exhausted. Logically, the PBMC is viewed the same as an external device by the PBM. Therefore, the files involved with transfers to/from the PBMC must be of either ROW_CONVERSION or COL_CONVERSION storage style. The file must be on the host module's PBM for the transfer to be legal.

50.2 <u>TEST</u>. When the TEST command is received, PBMC_A will take the appropriate steps to have the PBM's test software run. An interface must be set up between the PBM DOS and whatever test software is written to execute in the PBM's side of the AP. The test software will most likely involve the running of a background Self-Test periodically and an exhaustive Built-In-Test (BIT) at power-up and reboot.

APPENDIX B

Data Transfer Formats

Effect of Pipe Size:

Given the data format for a 1 bus pipe it is possible to convert it to the 2 or 4 bus pipe formats independently of the number of elements in the array involved in the transfer or the data type.

| Pipe Size | Bus # | Word Sequence |
|---|---|---|
| 1 | 0 | 0 1 2 3 4 5 6 7 8 9 A B C D E F ... |
| 2 | 0 | 0 2 4 6 8 A C E ... |
|   | 1 | 1 3 5 7 9 B D F ... |
| 4 | 0 | 0 4 8 C ... |
|   | 1 | 1 5 9 D ... |
|   | 2 | 2 6 A E ... |
|   | 3 | 3 7 B F ... | increasing time ----->

Data Transfer Formats

One Bus Pipe Formats for Single Element Arrays:

| Data Type | Word Sequence For 1 Bus Pipe |
|---|---|
| SP real | 0 1 2 3 4 5 6 7 8 ... |
| DP real | 0L 0M 1L 1M 2L 2M 3L 3M ... |
| SP complex | 0I 0Q 1I 1Q 2I 2Q 3I 3Q 4I 4Q ... |
| DP complex | 0IL 0IM 0QL 0QM 1IL 1IM 1QL 1QM 2IL ... |
| FP real | 0L 0M 1L 1M 2L 2M 3L 3M ... | increasing time ------>

L => least significant half, SP bits 00:15, 1750A bits 31:16
M => most significant half, SP bits 16:31, 1750A bits 15:00
I => in phase component
Q => quadrature component Data Transfer Formats One Bus Pipe Formats for Eight Element Arrays:

| Data Type | Word Sequence For 1 Bus Pipe |
|---|---|
| SP real | 0/0 0/4 0/2 0/6 0/1 0/5 0/3 0/7<br>1/0 1/4 1/2 1/6 1/1 1/5 1/3 1/7<br>2/0 2/4 2/2 2/6 2/1 2/5 2/3 2/7<br>3/0 3/4 3/2 3/6 3/1 3/5 3/3 3/7 ... |
| DP real | 0L/0 0L/4 0L/2 0L/6 0L/1 0L/5 0L/3 0L/7<br>0M/0 0M/4 0M/2 0M/6 0M/1 0M/5 0M/3 0M/7<br>1L/0 1L/4 1L/2 1L/6 1L/1 1L/5 1L/3 1L/7<br>1M/0 1M/4 1M/2 1M/6 1M/1 1M/5 1M/3 1M/7<br>2L/0 2L/4 2L/2 2L/6 2L/1 2L/5 2L/3 2L/7<br>2M/0 2M/4 2M/2 2M/6 2M/1 2M/5 2M/3 2M/7 ... |
| SP complex | 0I/0 0I/4 0I/2 0I/6 0I/1 0I/5 0I/3 0I/7<br>0Q/0 0Q/4 0Q/2 0Q/6 0Q/1 0Q/5 0Q/3 0Q/7<br>1I/0 1I/4 1I/2 1I/6 1I/1 1I/5 1I/3 1I/7<br>2I/0 2I/4 2I/2 2I/6 2I/1 2I/5 2I/3 2I/7<br>2Q/0 2Q/4 2Q/2 2Q/6 2Q/1 2Q/5 2Q/3 2Q/7<br>3I/0 3I/4 3I/2 3I/6 3I/1 3I/5 3I/3 3I/7<br>3Q/0 3Q/4 3Q/2 3Q/6 3Q/1 3Q/5 3Q/3 3Q/7<br>4I/0 4I/4 4I/2 4I/6 4I/1 4I/5 4I/3 4I/7<br>4Q/0 4Q/4 4Q/2 4Q/6 4Q/1 4Q/5 4Q/3 4Q/7 ... |
| DP complex | 0IL/0 0IL/4 0IL/2 0IL/6 0IL/1 0IL/5 0IL/3 0IL/7<br>0IM/0 0IM/4 0IM/2 0IM/6 0IM/1 0IM/5 0IM/3 0IM/7<br>0QL/0 0QL/4 0QL/2 0QL/6 0QL/1 0QL/5 0QL/3 0QL/7<br>0QM/0 0QM/4 0QM/2 0QM/6 0QM/1 0QM/5 0QM/3 0QM/7<br>1IL/0 1IL/4 1IL/2 1IL/6 1IL/1 1IL/5 1IL/3 1IL/7<br>1IM/0 1IM/4 1IM/2 1IM/6 1IM/1 1IM/5 1IM/3 1IM/7<br>1QL/0 1QL/4 1QL/2 1QL/6 1QL/1 1QL/5 1QL/3 1QL/7<br>1QM/0 1QM/4 1QM/2 1QM/6 1QM/1 1QM/5 1QM/3 1QM/7<br>2IL/0 2IL/4 2IL/2 2IL/6 2IL/1 2IL/5 2IL/3 2IL/7 ... |
| FP real | 0L/0 0L/4 0L/2 0L/6 0L/1 0L/5 0L/3 0L/7<br>0M/0 0M/4 0M/2 0M/6 0M/1 0M/5 0M/3 0M/7<br>1L/0 1L/4 1L/2 1L/6 1L/1 1L/5 1L/3 1L/7<br>1M/0 1M/4 1M/2 1M/6 1M/1 1M/5 1M/3 1M/7<br>2L/0 2L/4 2L/2 2L/6 2L/1 2L/5 2L/3 2L/7<br>2M/0 2M/4 2M/2 2M/6 2M/1 2M/5 2M/3 2M/7 ... | increasing time ------>

D/E => D is datum number, E is array element number
L, M, I, Q - see single element table for definitions.

Data Transfer Formats

One Bus Pipe Formats for Sixteen Element Arrays:

| Data Type | Word Sequence For 1 Bus Pipe |
|---|---|
| SP real | 0/0 0/8 0/4 0/C 0/2 0/A 0/6 0/E<br>0/1 0/9 0/5 0/D 0/3 0/B 0/7 0/F<br>1/0 1/8 1/4 1/C 1/2 1/A 1/6 1/E<br>1/1 1/9 1/5 1/D 1/3 1/B 1/7 1/F<br>2/0 2/8 2/4 2/C 2/2 2/A 2/6 2/E<br>2/1 2/9 2/5 2/D 2/3 2/B 2/7 2/F<br>3/0 3/8 3/4 3/C 3/2 3/A 3/6 3/E ... |
| DP real | 0L/0 0L/8 0L/4 0L/C 0L/2 0L/A 0L/6 0L/E<br>0L/1 0L/9 0L/5 0L/D 0L/3 0L/B 0L/7 0L/F<br>0M/0 0M/8 0M/4 0M/C 0M/2 0M/A 0M/6 0M/E<br>0M/1 0M/9 0M/5 0M/D 0M/3 0M/B 0M/7 0M/F<br>1L/0 1L/8 1L/4 1L/C 1L/2 1L/A 1L/6 1L/E<br>1L/1 1L/9 1L/5 1L/D 1L/3 1L/B 1L/7 1L/F<br>1M/0 1M/8 1M/4 1M/C 1M/2 1M/A 1M/6 1M/E<br>1M/1 1M/9 1M/5 1M/D 1M/3 1M/B 1M/7 1M/F<br>2L/0 2L/8 2L/4 2L/C 2L/2 2L/A 2L/6 2L/E ... |
| SP complex | 0I/0 0I/8 0I/4 0I/C 0I/2 0I/A 0I/6 0I/E<br>0I/1 0I/9 0I/5 0I/D 0I/3 0I/B 0I/7 0I/F<br>0Q/0 0Q/8 0Q/4 0Q/C 0Q/2 0Q/A 0Q/6 0Q/E<br>0Q/1 0Q/9 0Q/5 0Q/D 0Q/3 0Q/B 0Q/7 0Q/F<br>1I/0 1I/8 1I/4 1I/C 1I/2 1I/A 1I/6 1I/E<br>1I/1 1I/9 1I/5 1I/D 1I/3 1I/B 1I/7 1I/F<br>1Q/0 1Q/8 1Q/4 1Q/C 1Q/2 1Q/A 1Q/6 1Q/E<br>1Q/1 1Q/9 1Q/5 1Q/D 1Q/3 1Q/B 1Q/7 1Q/F<br>2I/0 2I/8 2I/4 2I/C 2I/2 2I/A 2I/6 2I/E ... |
| DP complex | 0IL/0 0IL/8 0IL/4 0IL/C 0IL/2 0IL/A 0IL/6 0IL/E<br>0IL/1 0IL/9 0IL/5 0IL/D 0IL/3 0IL/B 0IL/7 0IL/F<br>0IM/0 0IM/8 0IM/4 0IM/C 0IM/2 0IM/A 0IM/6 0IM/E<br>0IM/1 0IM/9 0IM/5 0IM/D 0IM/3 0IM/B 0IM/7 0IM/F<br>0QL/0 0QL/8 0QL/4 0QL/C 0QL/2 0QL/A 0QL/6 0QL/E<br>0QL/1 0QL/9 0QL/5 0QL/D 0QL/3 0QL/B 0QL/7 0QL/F<br>0QM/0 0QM/8 0QM/4 0QM/C 0QM/2 0QM/A 0QM/6 0QM/E<br>0QM/1 0QM/9 0QM/5 0QM/D 0QM/3 0QM/B 0QM/7 0QM/F<br>1IL/0 1IL/8 1IL/4 1IL/C 1IL/2 1IL/A 1IL/6 1IL/E ... |
| FP real | 0L/0 0L/8 0L/4 0L/C 0L/2 0L/A 0L/6 0L/E<br>0L/1 0L/9 0L/5 0L/D 0L/3 0L/B 0L/7 0L/F<br>0M/0 0M/8 0M/4 0M/C 0M/2 0M/A 0M/6 0M/E<br>0M/1 0M/9 0M/5 0M/D 0M/3 0M/B 0M/7 0M/F<br>1L/0 1L/8 1L/4 1L/C 1L/2 1L/A 1L/6 1L/E ... | increasing time ------>

D/E => D is datum number, E is array element number
L, M, I, Q - see single element table for definitions.

Data Transfer Formats

Multi-Element Arrays with Multi-Bus Pipes

To determine the multi-bus formats, take the single bus formats defined earlier and transform them as described in the Effect of Pipe Size table. For each AWG size and each pipe size the results are:

16 Element Array:

1 bus pipe:
    0:   X/0 X/8 X/4 X/C X/2 X/A X/6 X/E X/1 X/9 X/5 X/D X/3 X/B X/7 X/F 2 bus pipe:
    0:   X/0 X/4 X/2 X/6 X/1 X/5 X/3 X/7
    1:   X/8 X/C X/A X/E X/9 X/D X/B X/F 4 bus pipe:
    0:   X/0 X/2 X/1 X/3
    1:   X/8 X/A X/9 X/B
    2:   X/4 X/6 X/5 X/7
    3:   X/C X/E X/D X/F 8 Element Array:

1 bus pipe:
    0:   X/0 X/4 X/2 X/6 X/1 X/5 X/3 X/7

2 bus pipe:
    0:   X/0 X/2 X/1 X/3
    1:   X/4 X/6 X/5 X/7

4 bus pipe:
    0:   X/0 X/1
    1:   X/4 X/5
    2:   X/2 X/3
    3:   X/6 X/7

APPENDIX C
PI-BUS
Interface

5.1. INTRODUCTION

The data link layer of the PI-bus is specified herein. The general protocol used by the PI-bus is defined through specification of the protocol state transitions and the generic message sequence. Detailed requirements for the protocol and communications sequences are specified by defining each sequence and the rules associated with the PI-bus protocol. Responses to exception conditions are defined.

5.2. GENERAL REQUIREMENTS

5.2.1. Introduction

The PI-bus uses a master-slave protocol under which communications sequences are defined for 1) transferring messages between modules and 2) changing bus mastership. The PI-bus communications sequences, including sequences not supported by V1750A module set are listed in Table 5-1. The Vie sequence shall be performed only when there is no current bus master. All other sequences shall be performed under the control of the current bus master.

The PI-bus uses a set of protocol state transitions to define and control the communication sequences. Protocol state transitions shall be signaled on the Cycle Type (CT) lines and shall be controlled by the bus master. The slave(s) shall operate in synchronization with the bus master and shall signal compliance with protocol state transitions using the Acknowledge Set (AS) lines. Slave(s) shall also use the AS lines to notify the bus master of any errors that are detected.

The seven sequence states defined for the PI-bus protocol are summarized in Table 5-2. Within each sequence state, bus states are defined to distinguish individual bus cycles. The specific sequences of bus states required to perform PI-bus communications are defined under "5.3 DETAILED REQUIREMENTS.." In this section, general requirements for the overall operation of the PI-bus are specified by reference to the sequence states and the generic message protocol they support.

Table 5-1: PI-Bus Communications Sequences

| Sequence Type | Function |
|---|---|
| Mastership Sequences: | |
| Vie | Assigns bus mastership to the highest priority module contending for mastership through arbitration |
| Tenure Pass (1) | Transfers bus mastership from current bus master to another module or changes the bus master's message priority. |
| Message Sequences: | |
| Parameter Write (2) | Transfers a 1 word parameter and a 32 bit address from the bus master device to the slave device(s). |
| Block Message (3) | Transfers up to 65,536 datum units from slave device to master device or from master device to slave(s). Master sends a 32 bit address and may send 6 other Header words. May be used to continue a suspended message. |
| Bus Interface (1) | Transfers up to 256 words from slave bus interface to the master device or from master device to slave bus interface(s). The Master provides an 8 bit address. |
| Exception Sequences: | |
| Suspend | Suspends a Block Message data sequence and transfers resume control information from the slave to the master. |
| Abort | Terminates current sequence. |

Note:
1) Not supported by V1750A Module set.
2) V1750A module set shall not respond to Parameter Write as a slave.
3) Extended Header sequences are not supported by V1750A Module.

5.2.2. Protocol State Transitions

The protocol states which shall be supported by V1750A module set for PI-bus operations are illustrated in Figure 5-1. All state transitions shall occur on the high-to-low transition of Bus Clock. The allowable transitions between protocol states are specified in the sections below and in Figure 5-1.

5.2.2.1. Idle

The bus shall enter the Idle state whenever all Cycle Type lines are released. There shall be no bus master during Idle and the current bus master priority code shall be undefined. Idle shall consist of two or more consecutive bus cycles in which the Cycle Type lines are released. No PI-bus operations shall be performed during Idle except that the symbol NAK (Negative Acknowledgement) may be posted on the AS lines as specified in "5.2.3.1.2.2 Uncorrectable Errors." Vie shall be the only valid successor state to Idle. The Idle state shall be terminated and the Vie state entered only when one or more modules post the symbol V on the Cycle Type lines.

5.2.2.2. Vie

The Vie state shall consist of eight bus cycles which shall be used to select the next bus master from one or more contenders. The Vie state shall be succeeded by the Header state except that if no bus master is selected due to erroneous operation, the bus shall return to the Idle state.

5.2.2.3. Header

A bus master's tenure shall begin when the Header state is entered from the Vie state. The current bus master's tenure shall continue when the Header state is entered from the Data Acknowledge state or from the Abort state. During the Header state, the bus master shall transmit header information across the bus on two or more bus cycles.

The Header shall specify the type of message sequence to be performed, identify the modules required to participate in the sequence as slaves and define the number of data transfer cycles required for the sequence. The Header state shall be succeeded by the Header Acknowledge state except that Abort may be entered to terminate the sequence.

5.2.2.4. Header Acknowledge

The Header Acknowledge state shall be used to transmit message status from the slave module(s) to the master.

1. For a Parameter Write message sequence, the successor states to Header Acknowledge shall be Header, Idle and Abort. A transition to Header shall initiate a new message and extend the current bus master's tenure. A transition to Idle shall terminate the current bus master's tenure. Abort may be entered to terminate the Parameter Write message.

2. For Block Message, the successor states to Header Acknowledge shall be Data and Abort. A transition to Data continues the current bus master's tenure. Abort may be entered to terminate the message.

5.2.2.5. Data

The Data state shall consist of a sequence of Data transfer cycles performed as part of a Block Message. Data may be transferred from the master to the slave(s), which is defined as a write sequence or from the slave to the master which is defined as a read sequence. For single slave Block Message sequences, the Data sequence may be suspended and resume control information transmitted as specified in the detailed requirements. For multi-slave Block Message sequences, the Data sequence may be suspended and no resume control information transmitted as specified in the detailed requirements. The successor state to Data shall be Data Acknowledge except that the message may be terminated by entering Abort.

5.2.2.6. Suspend

The Suspend state shall be used to signal the pending interruption of a Block Message Data sequence as specified in the detailed requirements (see "5.3.5.1 Suspend."). A suspended Block Message Data sequence can be resumed by another Block Message whose header contains the appropriate Resume Control Words. The successor state to Suspend shall be Data Acknowledge except that the sequence may be terminated by entering Abort.

5.2.2.7. Data Acknowledge

The Data Acknowledge state shall be used to transfer acknowledge information from the slave(s) to the master during a Block Message or Bus Interface Message sequence. The successor states to Data Acknowledge are Header, Idle and Abort. A transition to Header shall initiate a new message and extend the current bus master's tenure. A transition to Idle shall terminate the current bus master's tenure. Abort may be entered to terminate a message.

5.2.2.8. Abort

The Abort state shall consist of four consecutive bus cycles in which the Abort cycle type is posted on the CT lines. The successor states to Abort shall be Header and Idle. A transition to Header shall initiate a new message and extend the current bus master's tenure. A transition to Idle shall terminate the current bus master's tenure.

5.2.3. Generic Message

The generic message sequence that forms the basis for the PI-bus message sequences is described in this section. The vie sequence is specified in "5.3.3 Bus Mastership," and the exception sequences are specified in "5.3.5 Exception Sequences.."

Table 5-3 illustrates the generic PI-bus message sequence which shall be composed of Header, Header Acknowledge, Data and Data Acknowledge sequences that correspond to the protocol states described in the preceding section.

5.2.3.1. Generic Message Sequence 5.2.3.1.1 <u>Normal Operation.</u> The Data (D) lines transfer a series of information between the master and slave modules to:

1. signal the type of message sequence to be performed, 2. establish a communications path to the slave module(s), 3. transfer data between the master and the slave(s), and 4. transfer acknowledge information from the slave(s) to the master.

The Cycle Type (CT) and Acknowledge Set (AS) lines shall provide handshaking between the master and slave(s) to control the sequence of bus states. The AS lines shall also be used by the slave(s) to report errors.

5.2.3.1.1.1 <u>Header.</u> The bus master shall initiate a message sequence by transmitting Header information on the D lines. The bus master shall post the symbol H0 on the Cycle Type (CT) lines during the first bus cycle of Header transfer and shall post H for each of the remaining bus cycles of header transfer.

The header shall specify the module(s) which are selected as slave(s) for the message sequence. Active module(s) which are specified as slave(s) shall signal their participation in the message by posting the symbol RCG (Recognize) on the Acknowledge Set (AS) lines beginning with the third cycle of header transfer and continuing until header transfer is complete. All modules shall ensure that the AS lines are released during the first two cycles of Header except that NAK shall be asserted as specified in "5.2.3.1.2.2 Uncorrectable Errors" to report errors from the preceding sequence.

5.2.3.1.1.2 Header Acknowledge. The Header Acknowledge sequence shall follow the Header sequence. A single Header Acknowledge transfer cycle shall be used for all single slave sequences. The bus master shall post the Header Acknowledge Cycle (A) symbol on the CT lines during the Header Acknowledge cycle in which the slave is scheduled to post the slave Acknowledge word. The slave shall indicate synchronization with the bus master by posting ACK on the AS lines during the Header Acknowledge cycle. Five Header Acknowledge transfer cycles shall be used for a multiple slave sequence. During the first acknowledge cycle, all selected modules shall post their multiple slave acknowledge status symbols on the data lines and shall indicate synchronization with the bus master by posting ACK on the AS lines. During the next four acknowledge cycle, eight of the thirty-two modules are assigned a bit position on the data lines upon which to post an acknowledge bit and shall indicate synchronization with the bus master by posting ACK on the AS lines.

The Header Acknowledge sequence shall complete the Parameter Write Message. The Block Message sequences shall continue with a Data sequence consisting of one or more data transfer bus cycles.

5.2.3.1.1.3 Data. The bus master shall post the symbol D during each cycle of the Data sequence. The slave module(s) shall post RCG during each cycle of the Data sequence. The bus master shall transmit data during write sequences and the slave shall transmit data during the read sequences.

5.2.3.1.1.4 Data Acknowledge. The Data sequence shall be followed by a Data Acknowledge sequence. The Data Acknowledge sequence is identical in form to the Header Acknowledge sequence. Block Messages shall be concluded at the end of the Data Acknowledge sequence.

5.2.3.1.2 Operation Under Exception Conditions.

5.2.3.1.2.1 Block Message Suspend. The Data sequence of a Block Message may be suspended by the bus master to permit higher priority communications. The Suspend sequence shall be performed as defined in "5.3.5.1 Suspend.."

5.2.3.1.2.2 Uncorrectable Errors. Modules which are slaves shall signal uncorrectable detected errors by posting the symbol NAK on the AS lines and providing an error log in the Acknowledge words as specified herein. Modules shall post the symbol NAK in response to an error which occurs during a Vie sequence.

A slave that detects an error which applies to the operation of bus cycle N shall post the symbol NAK on bus cycle N+2. If the detected error occurred during the last two cycles of a message, the resultant NAK occurs during the first two cycles of the following message or Idle. The bus interface shall not notify the device any error which occures during the last two cycles of a message. Modules which are not slaves nor contenders in a particular message sequence shall not otherwise active modules excluding the master, with the given Slave ID enabled. The slave ID values 40 to 255 are optional.

5.2.3.2.1.2 Format Field (F). The Format field shall be set equal to "zero" to specify that the message sequence will be performed using 16 bit transfers (F=0).

5.2.3.2.1.3 Message Type Field (MSG TYPE). The message Type field shall specify the type of message sequence to be performed. The V1750A module set shall support the message sequence according to the values in Table 5-4. The master device must insure that the only multiple slave Message Types are used when more than one module is selected by the Slave ID field.

5.2.3.2.1.4 Access Type Field (AT). The Access Type (AT) field as supported by V1750A module shall be passed from the master device to the slave module for use as defined herein and listed in Table 5-5.

For Block Messages, there shall be an AT code assigned to signal the slave device that the current message is a resumption of a previously suspended Block message.

Reserved AT codes shall be defined only by future versions of this specification.

5.2.3.3. Header And Data Sequence Acknowledgement.

Header and Data Acknowledge sequences have the same form and use the same word formats. There are two basic formats for the acknowledgement, single slave and multiple slave. The single slave Acknowledge sequence, which transfers one word of message status information from the slave to the master, shall be used whenever the Sequence Type field in HWA specifies a single slave sequence. The multiple slave Acknowledge sequence, which transfers one bit of message status information from each of the 32 possible slave devices to the master, shall be used whenever the Sequence Type field of HWA specifies a multiple slave sequence.

Table 5-4: Message Type Codes Supported by V1750A Module set

| MESSAGE TYPE | SINGLE OR MULTIPLE SLAVES | READ OR WRITE | MESSAGE TYPE CODE HWA <12...9> |
|---|---|---|---|
| PARAMETER WRITE* | SINGLE | WRITE | 0 0 0 1 |
|  | MULTIPLE | WRITE | 0 0 1 1 |
| BLOCK MESSAGE -SHORT HEADER | SINGLE | WRITE | 0 1 0 1 |
|  | SINGLE | READ | 0 1 0 0 |
|  | MULTIPLE | WRITE | 0 1 1 1 |

NOTE: Codes not listed above are reserved.
*Not supported as a slave.

Table 5-5: Access Type Codes Supported by V1750A Module set

| SEQUENCE TYPE | ACCESS TYPE CODE HWA <15..13> | |
|---|---|---|
| PARAMETER WRITE | 000 THRU 111 | - MASTER PASSED TO BUS, RESERVED FOR SLAVE |
| BLOCK MESSAGE | 000 | - LABEL (PASSED TO DEVICE) |
|  | 001 | - RESUME, LABEL (PASSED TO DEVICE) |
|  | 010 THRU 111 | - RESERVED |

The definition of each error type supported by the V1750A module set in the single slave acknowledge word shall be as listed below:

| | |
|---|---|
| Line Error | A signal line error has been detected. |
| Sequence Error | The Cycle Type, Acknowledge Set, Wait and Bus Request line sequence of states is not in agreement with defined protocol sequences or rules. |
| Command Error | A Header Word A has been received which is not in agreement with the defined format supported by the V1750A module set. |
| Resource Not Present Error | A resource or capability that is not implemented has been addressed in this module. |
| Device Error | Module device has detected an error attempting to perform a bus related operation. |

5.2.3.3.1.4 <u>Busy Field.</u> The slave module shall specify in bit 14 of the Acknowledge word whether the slave device is Busy or not Busy. The device shall be recorded as Busy only when the device is unable to accept an otherwise valid message because of other operations in progress. The master should abort any sequence in which the slave device is specified as Busy. The master may retry the message at a later time.

5.2.3.3.1.5 <u>Suspendability Field.</u> The slave module shall specify in bit 15 of the Acknowledge word whether the slave device is suspendable or not suspendable during the Header Acknowledge. During the Data Acknowledge, bit 15 of the Acknowledge word shall specify whether the message is suspended or completed normally. This Suspendability field works in conjuction with the AWT field to futher specified the Acknowledge Word type (see 5.2.3.3.1.2 AWT Field).

5.2.3.3.2 Multiple Slave Acknowledge. A Multiple Slave Acknowledge sequence shall consist of five bus transfer cycles which shall be used to transmit multiple slave Acknowledge Symbols from the slave(s) to the master. The five transfer cycles are labeled HA0, HA1, HA2, HA3 and HA4 for a Multiple Slave Header Acknowledge sequence or DA0, DA1, DA2, DA3 and DA4 for a Multiple Slave Data Acknowledge sequence.

During cycles HA0 and DA0, all selected modules shall post their multiple slave status symbol on the Data Group using the symbol shown in Figure 5-4. During cycles HA1 and DA1, Modules with MID values 0 through 7 shall post Acknowledge or No Acknowledge symbol on the Data Group using the symbols shown in Table 5-6. Modules with MID values 8 through 15 shall post their Acknowledge/No Acknowledge symbol during cycles HA2 and DA2 of the sequence. Modules with MID values 16 through 23 shall post their Acknowledge/No Acknowledge symbol during cycles HA3 and DA3 of the sequence and modules with MID values 24 through 31 shall post their Acknowledge/No Acknowledge symbol during cycles HA4 and DA4 of the sequence. Modules shall not assert any Data Group line other than the lines included in their symbol on their assigned Acknowledge cycle.

The multiple slave Acknowledge symbols posted by the slave(s) during a particular Acknowledge cycle shall be logically OR'ed on the bus to produce one of the five Multiple Slave Acknowledge Words (AWM0, AWM1, AWM2, AWM3 or AWM4) which shall be used during each multiple slave acknowledge sequence.

In addition to posting their assigned acknowledge symbol, slave modules shall post the symbol ACK (or NAK if required in response to an error) on the AS lines during their assigned Acknowledge cycle. Slave modules shall post the symbol NS (or NAK if required in response to an error) on the AS lines during the Acknowledge cycles in which they are not assigned to post their Acknowledge symbol.

The multiple slave Acknowledge symbol shall be posted on the Data Group during the assigned cycle of a Header Acknowledge sequence whenever the module is a slave. The multiple slave Acknowledge symbol shall be posted on the Data Group during the assigned cycle of a Data Acknowledge sequence when the module is a slave and has detected no errors in the current sequence. Otherwise the slave shall post "No Acknowledge" during the assigned Acknowledge cycle.

Table 5-6: Multiple Slave Acknowledge Symbol Formats (Four Words)

| MODULE ID ASSIGNMENT | | | | DATA LINES | | | | | | | | | | | | | | | |
|---|---|---|---|---|---|---|---|---|---|---|---|---|---|---|---|---|---|---|---|
| AWM1 | AWM2 | AWM3 | AWM4 | 15 | 14 | 13 | 12 | 11 | 10 | 9 | 8 | 7 | 6 | 5 | 4 | 3 | 2 | 1 | 0 |
| 0 | 8 | 16 | 24 | 0 | 0 | 0 | 0 | 0 | 0 | 0 | A | 0 | 0 | 0 | 0 | 0 | 0 | 0 | A |
| 1 | 9 | 17 | 25 | 0 | 0 | 0 | 0 | 0 | 0 | A | 0 | 0 | 0 | 0 | 0 | 0 | 0 | A | 0 |
| 2 | 10 | 18 | 26 | 0 | 0 | 0 | 0 | 0 | A | 0 | 0 | 0 | 0 | 0 | 0 | 0 | A | 0 | 0 |
| 3 | 11 | 19 | 27 | 0 | 0 | 0 | 0 | A | 0 | 0 | 0 | 0 | 0 | 0 | 0 | A | 0 | 0 | 0 |
| 4 | 12 | 20 | 28 | 0 | 0 | 0 | A | 0 | 0 | 0 | 0 | 0 | 0 | 0 | A | 0 | 0 | 0 | 0 |
| 5 | 13 | 21 | 29 | 0 | 0 | A | 0 | 0 | 0 | 0 | 0 | 0 | 0 | A | 0 | 0 | 0 | 0 | 0 |
| 6 | 14 | 22 | 30 | 0 | A | 0 | 0 | 0 | 0 | 0 | 0 | 0 | A | 0 | 0 | 0 | 0 | 0 | 0 |
| 7 | 15 | 23 | 31 | A | 0 | 0 | 0 | 0 | 0 | 0 | 0 | A | 0 | 0 | 0 | 0 | 0 | 0 | 0 |

A) 0=NO ACKNOWLEDGE / 1=ACKNOWLEDGE

Table 5-7: Bus State Definitions

| BUS STATES | CT | PROTOCOL STATE | COMMENT |
|---|---|---|---|
| I | I | Idle | Bus Idle cycle. |
| V0..V3 | V | Vie | Vie priority bits resolved, 3 per step. |
| VZ0..VZ3 | V | Vie | Non-Transfer cycle for vie decision time. |
| H0 | H0 | Header | First cycle of header transfer. |
| H1..H9 | H | Header | Additional cycles of header transfer. |
| HZ | H | Header Ack | Non-Transfer cycle for decision time. |
| HA0 | A | Header Ack | Single slave or first multicast Header Acknowledge. |
| HA1..HA4 | A | Header Ack | Additional multicast header acknowledge. |
| HAZ | H | Header Ack | Non-Transfer cycle for decision time. |
| D | D | Data | Datum transfer cycles. |
| DZ | D | Data Ack | Non-Transfer cycle for decision time. |
| DA0 | A | Data Ack | Multicast or single slave Data Acknowledge |
| DA1..DA4 | A | Data Ack | Multicast Data Acknowledge cycles. |
| S0..S2 | S | Data | Cycles announcing message being suspended. |
| AB0..AB3 | AB | Abort | Cycles announcing sequence being aborted. |

Source <23-16> For Multiple slave case, the Source maybe any slave(s) (S) with an MID value of 16 thru 23.

Source <31-24> For Multiple slave case, the Source maybe any slave(s) (S) with an MID value of 24 thru 31.

WAIT

Allowed  Defines bus cycles where Wait may be asserted. A source for Wait is not shown in these sequences since the scheduled sequence of bus states assumes that Wait is not asserted.

A set of four colons (::::) in a sequence diagram indicates that a number of bus states occur in the sequence at that point.

5.3.3. Bus Mastership

The protocol governing bus mastership and the Tenure Pass Message not supported by V1750A module are specified herein. The Vie sequence which assigns bus mastership to a particular module is defined. The protocol which allows a module with higher priority than the current bus master to request a Vie sequence by asserting Bus Request is specified.

5.3.3.1. Vie Sequence

The Vie sequence shall be used to determine a single bus master for the first Header sequence which occurs after the bus enters the Idle state. The bus master shall be selected on the basis of the Vie Priority code stored in each contender's Vie Priority Register (see "5.3.7.1.5 Vie Priority Register - Address 4.").

Any module that requires bus mastership may initiate Vie after two or more cycles of Idle. Modules shall be capable of participating in a Vie sequence which begins on the third or any later cycle of Idle. All active modules shall monitor each step of the Vie process and store the Vie Priority level of the winning module.

Due to pipeline delays, a module may attempt to initiate Vie up to one cycle after Vie is initiated by another module. In that case, the module which attempted to initiate the late Vie sequence shall cease to contend on next cycle and shall complete the original Vie sequence as a non-contender. Modules shall not attempt to initiate Vie more than one cycle after the V cycle type has been posted on the Cycle Type lines.

The Vie sequence shall be a four step sequence as defined in Table 5-8. Each vie step shall use two bus cycles to resolve three of the twelve bits of Vie Priority code. Modules which are contending for bus mastership shall decode the three most significant bits (VP<11..9>) of their Vie Priority code into a one-of-eight Module Vie Code as shown in Table 5-9. Modules Modules shall read the logical-OR of the Module Vie Codes posted by the contenders from the Data line group at the end of the first cycle of Vie (bus state V0) as an Aggregate Vie Code (VC0). During the second cycle of each step, each contender (C) shall compare the Module Vie Code posted to the Aggregate Vie Code read from the bus. If the Aggregate Vie Code read from the bus has a bit asserted in a more significant bit position than the Module Vie Code posted by the module then the module has lost contention and shall not drive the bus on any other cycles remaining in the Vie sequence. If the contender's posted Module Vie Code has the same bit asserted as the most significant bit asserted in the Aggregate Vie Code and there are no errors in the Data or Cycle Type group lines, the module has not lost the vie step and shall proceed to the next vie step as a contender. If there is an error in the Data line group, the module shall assume that both lines in any affected pair of redundant lines are asserted.

This process shall be repeated in the second, third and fourth vie steps using Vie Priority code bits VP<8..6>, VP<5..3> and VP<2..0>, respectively. At the conclusion of the fourth vie step, at most one module remains as a contender and that module shall become the new bus master. If a bus master is selected, uniqueness is guaranteed by the five MID bits within the Vie Priority Code. The bus master must post NO on the bus cycle immediately following the VZ3 cycle. If no bus master is selected due to error conditions, the bus shall return to the Idle state.

Table 5-8 defines the detailed sequence of bus states and module actions during the Vie sequence. The Data lines are shown as one group of sixteen lines each. Contending modules shall post their Module Vie Codes on D<15..0>. The Module Vie Codes posted by the contending modules shall be logically OR'ed during the first cycle of each vie step to form the Aggregate Vie Code for that step. Contenders shall post the symbol V on the Cycle Type lines during each cycle of Vie as illustrated. Contenders shall also post the symbol RCG on the AS lines during each cycle of the second, third and fourth vie steps. All active modules shall post NAK on the AS lines on cycle N+2 each time a Data group or Cycle Type group error which applies to the operation of bus cycle N is detected.

Modules shall not assert Wait nor Bus Request during the Vie sequence. Non-contenders shall not assert any line or post any symbol during the Vie sequence other than posting NAK on the AS lines as specified above. All active modules shall monitor the Vie sequence and record the winning bus master's priority code. Data or Cycle Type group line errors detected during the Vie sequence shall cause the modules which lose vie to store "unknown" as the current bus master's priority code.

5.3.3.2. Tenure Pass Message

A V1750A module shall not support the Tenure Pass message sequence. The formats which shall be used for the Tenure Pass header words are shown in Figure 5-5.

All active V1750A modules shall monitor the Tenure Pass sequence (MSG TYPE = "1010") and shall store "unknown" as the current bus master's priority code.

A V1750A module which is selected as a slave during a Tenure Pass sequence shall respond as specified in Table 5-10. On the HA0 state, the V1750A slave shall cease to participate in the sequence by posting "NS" symbol on the AS lines, and releasing all PI-bus lines until "HO" or "IDLE" state is detected. A V1750A module shall not assert wait during a Tenure Pass Message sequence.

The Tenure Pass message shall not affect the Vie Priority Register of any module.

HEADER WORD A (HWA)

| AT | | | MSG TYPE | | | F | SLAVE ID | | | | | | | |
|----|----|----|----|----|----|----|----|----|----|----|----|----|----|----|
| 15 | 14 | 13 | 12 | 11 | 10 | 9 | 8 | 7 | 6 | 5 | 4 | 3 | 2 | 1 | 0 |
| 0 | 0 | 0 | 1 | 0 | 1 | 0 | 0 | 0 | 0 | 0 | MID | | | | |

HEADER WORD B (HWB)

| 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|
| | | | | MSB | | | | | | LSB | MSB | | | | LSB |
| RESERVED (ZEROES) | | | | NEW MASTER LOGICAL PRIORITY CODE | | | | | | | NEW MASTER MODULE IDENTIFICATION (MID) | | | | |

Fig. 5-5: Tenure Pass Header Word Formats

5.3.3.3. Bus Request

The Bus Request line shall be asserted by a module to signal the current bus master that the module has a higher priority requirement for bus mastership. The module asserting Bus Request shall ensure that this condition is met by only asserting Bus Request when the module's Vie Priority register contains a higher priority code than that of the current bus master. The current bus master shall honor Bus Request by relinquishing tenure and releasing all bus signal lines by the end of the Vie Interval defined by the sum of the bus cycles specified by the contents of the Vie Interval A Register plus the contents of the Vie Interval B Register plus six cycles.

The assertion of bus Request shall be allowed on any bus cycle, except for the cycles starting on the third cycle of idle and continuing through the last cycle of Vie.

The bus master shall count all bus cycles, including non-transfer cycles, whenever Bus Request is asserted. The first cycle counted shall be the first cycle after the cycle containing the initial assertion of Bus Request. Any subsequent cycle in which Bus Request is released shall not be counted and shall cause the accumulated count to be discarded. To relinquish tenure, the bus master may:

1. release all bus lines to place the bus in the Idle state rather than post an HO cycle or 2. if a suspendable Block Message data sequence is in progress, the bus master may perform a Suspend Sequence (see "5.3.5.1 Suspend.") and release all bus lines before the vie interval time elapses.

If the cycle count reaches the sum of the value specified in the Vie Interval A Register plus the value specified in the Vie Interval B Register, the bus master shall perform an Abort sequence such that the first cycle of the Abort sequence occurs on the second bus cycle immediately following the cycle that exceeds the Vie Interval limit. After completing the Abort sequence the master shall immediately relinquish tenure and release all bus lines (see "5.3.5.2 Abort.").

5.3.4. Message Sequences

The protocol governing bus message sequences supported by the V1750A module set is specified herein. The Block Message - Short Header and Parameter Write Message sequence are defined. The response by V1750A module set to future message sequences, that have not been defined, is also specified. The response to Parameter Write as a slave, Block Message - Extended Header, and Bus Interface Message sequences, which are not supported by the V1750A module set, is specified in Section 5.3.4.3.

Fig. 5-6: Parameter Write Header Word Format

HEADER WORD A (HWA)

| AT | MSG TYPE | P | SLAVE ID |
|---|---|---|---|
| 15\|14\|13 | 12\|11\|10\| 9 | 8 | 7\|6\|5\|4\|3\|2\|1\|0 |
| ACCESS TYPE | 0001-SS 0011-MS | | |

HEADER WORD B (HWB)

```
|15|14|13|12|11|10| 9| 8| 7| 6| 5| 4| 3| 2| 1| 0|
MSB <-------------- PARAMETER --------------> LSB
```

HEADER WORD C0 (HWC0)

```
|15|14|13|12|11|10| 9| 8| 7| 6| 5| 4| 3| 2| 1| 0|
15 <-------- LEAST SIGNIFICANT ADDRESS BITS ---> 0
```

HEADER WORD C1 (HWC1)

```
|15|14|13|12|11|10| 9| 8| 7| 6| 5| 4| 3| 2| 1| 0|
31 <-------- MOST SIGNIFICANT ADDRESS BITS --->16
```

Table 5-12: Parameter Write Sequence - Multiple Slave

| SIGNAL LINES | BUS STATE | | | | | | | | | |
|---|---|---|---|---|---|---|---|---|---|---|
| | H0 | H1 | H2 | H3 | HZ | HA0 | HA1 | HA2 | HA3 | HA4 |
| DATA<br>D<15..0><br>Source= | HWA<br>M | HWB<br>M | HWC0<br>M | HWC1<br>M | 0 | AWM0<br>S | AWM1<br>S | AWM2<br>S | AWM3<br>S | AWM4<br>S |
| CYCLE TYPE<br>Source=M | H0 | H | H | H | H | A | A | A | A | A |
| ACKNOWLEDGE<br>Source(7..0)=<br>Source(15..8)=<br>Source(23..16)=<br>Source(31..24)= | NS | NS | RCG<br>S<br>S<br>S<br>S | RCG<br>S<br>S<br>S<br>S | RCG<br>S<br>S<br>S<br>S | ACK<br>(NS)<br>S<br>S<br>S | ACK<br>(NS)<br>S<br>S | ACK<br>(NS)<br>S | ACK<br>(NS)<br>S | ACK<br>(NS)<br><br><br>S |
| WAIT<br>Allowed | 0<br>NO | 0<br>NO | 0<br>YES | 0<br>YES | 0<br>YES | 0<br>YES | 0<br>YES | 0<br>YES | 0<br>YES | 0<br>YES |

Note: S = Slave Set not including V1750A Modules

Fig. 5-7: Block Message – Short Header Word Label Address

HEADER WORD A (HWA)

| AT | MSG TYPE | P | SLAVE ID |
|---|---|---|---|
| 15 14 13 | 12 11 10 9 | 8 | 7 6 5 4 3 2 1 0 |
| ACCESS TYPE 000 | 0101-SSW 0100-SSR 0111-MS | | |

HEADER WORD B (HWB)

```
|15|14|13|12|11|10| 9| 8| 7| 6| 5| 4| 3| 2| 1| 0|
MSB <--------------- DATUM COUNT ----------------> LSB
```

HEADER WORD C0 (HWC0)

```
|15|14|13|12|11|10| 9| 8| 7| 6| 5| 4| 3| 2| 1| 0|
| 0| 0|  |  |  |  |  |  |  |  |  |  |  |  |  |  |
        MSB <------- LABEL --------------------> LSB
```

HEADER WORD C1 (HWC1)

```
|15|14|13|12|11|10| 9| 8| 7| 6| 5| 4| 3| 2| 1| 0|
<------------ RESERVED BITS = "0" ------------>
```

Table 5-13: Block Message - SH Sequence - Single Slave

| | BUS STATE | | | | | | | | | | |
|---|---|---|---|---|---|---|---|---|---|---|---|
| SIGNAL LINES | H0 | H1 | H2 | H3 | HZ | HAO | D0 | :::: | Dn | DZ | DAO |
| DATA D<15..0> Source= Read Source= Write Source | HWA M | HWB M | HWC0 M | HWC1 M | 0 | AWS S | D0 S M | :::: S M | Dn S M | 0 | AWS S |
| CYCLE TYPE Source=M | H0 | H | H | H | H | A | D | :::: | D | D | A |
| ACKNOWLEDGE Source= | NS | NS | RCG S | RCG S | RCG S | ACK S | RCG S | :::: S | RCG S | RCG S | ACK S |
| WAIT Allowed | 0 NO | 0 NO | 0 YES | 0 YES | 0 YES | 0 YES | 0 YES | :::: YES | 0 YES | 0 YES | 0 YES |

5.3.4.3. Message Sequences Not Supported By V1750A Module Set

The V1750A module set response to undefined message and the PI-bus message sequences not supported by the V1750A module shall be specified herein. The message sequence not supported by the V1750A module set shall include Tenure Pass Message, Block Message - Extended Header, Bus Interface Message and Slave response to Parameter Write Message. Any reserved code detected in the AT or MSG Type fields of the Header Word A shall be considered an undefined message. All of the above messages shall be referred to as "Non-Supported" Message.

A V1750A module which is selected as a slave during any one of the above message sequences shall respond as specified in Table 5-15. The selected V1750A slave shall post "NAK" on the AS lines two cycles after the H0 state and shall set "Command" error bit in the slave Acknowledge word (see "5.3.9.3.1 Header Semantic Errors"). On the detection of a Non-Supported Message Header Word A, the V1750A slave shall cease to participate in the sequence threeclocks after H0 state by ceasing to assert all PI-bus lines except Bus Request where applicable, until "H0" or "IDLE" state is detected. A V1750A module shall not assert wait during any "Non-Supported" Message sequence. The V1750A module shall responded in an identical sequence to both Non-Supported single slave and multi slave Message.

5.3.5. Exception Sequences

5.3.5.1. Suspend.

If a block message is suspendable and the current bus master elects to suspend the message, the bus master shall initiate a suspend sequence as defined herein providing that there are at least three Data Cycles remaining. Single slave block messages are suspendable if the Header Acknowledge Word had an S field of 0 and AWT field of 01. Multiple slave block message are suspendable if all modules, including the master module, involved in the bus sequence interpret the AT code in the same manner. Depending on the uniqueness of the slave, the master shall initiate the appropriate suspend sequence. After completing the Suspend sequence, the current bus master may initiate a new message with an H0 cycle or release the bus to initiate the Idle state.

The V1750A module set shall not support the Suspend Sequence with 8 Resume Control Words (S=0, AWT=10). If the master receives a Header Acknowledge Word indicating "Header Received, Data Expected, 8 RCWs", then the master shall respond in the same manner as if the AWT were "Header Received, Data Expected, Not Suspendable". The Suspend Sequence may be used in conjunction with the Vie Interval A and Vie Interval B Registers to optimize the trade-off between short bus acquisition latency and large message sizes by allowing a Block message to be interrupted and resumed at a later time.

The PI-Bus Vie Interval A and Vie Interval B timers are used by the V1750A bus interface to determine when a Suspend sequence is required to meet the Vie Interval requirement and to limit the number of non-transfer cycles caused by assertion of Wait during a Suspend sequence. The Vie Interval A timer shall define a checkpoint whether or not to initiate a suspend sequence. The Vie Interval B timer shall define the number of bus cycles allowed for completion of the Suspend sequence, including non-transfer cycles that may be required as a result of waits. If the actual number of waits causes the total bus cycles to exceed the number specified by the contents of the Vie Interval A timer plus the contents of the Vie Interval B timer, the master shall perform an Abort sequence such that the first cycles of the Abort sequence occurs on the second bus cycle immediately following the cycle that exceeds the Vie Interval limit. This Abort cycle shall be the first cycle in the Abort Sequence, described in "5.3.5.2 Abort..". At the end of the Abort sequence the master shall release the bus to the Idle state.

For multi-slave suspend sequences, the master module must have the capability to generate the slaves' implementation/device specific resume control data that will be needed for the master to resume the suspended message.

After the message is suspended, the suspended master shall not issue any new message until the suspended message is completed or aborted.

5.3.5.1.1 Single Slave Suspend. The Single Slave Suspend Sequence shall be used if the AWT field of the Single Slave Acknowledge Word of the message is 01 and the Suspendability field is 0. To resume this message, the bus master shall transmit the two Resume control information words back to the slave during the appropriate header cycles of a Block Message with the AT field of HWA set to 001 (resume message) as described in "5.3.4.1 Block Message - Short Header Sequence".

In terms of the data transfer operation, the S cycles of these sequences shall be considered normal D cycles and all Bus Interfaces shall respond accordingly. The slave shall post ACK during the last of the three S cycles to indicate that the Suspend Sequence has been recognized.

Beginning on the fourth cycle of a Suspend sequence, the slave shall transmit to the bus master two implementation/device specific Resume Control Words that the master shall store for later use in resuming the message. The Resume Control Words shall be followed by a Data Acknowledge Word. For the V1750A module, the first Resume Control Word (RCD0) shall be the LABEL value of the current message and the second Resume Control Word (RCD1) shall be the OFFSET value as defined in "5.3.4.2 Block Message ".

The Single slave Suspend sequence of bus states shall be as defined in Table 5-16.

5.3.5.1.2 Multiple Slave Suspend.

In a Multiple Slave Suspense Sequence, the master module shall have the capability to generate the slaves' implementation/device specific resume control data that will be needed for the master to resume the suspended message. To resume this message, the bus master shall transmit Resume control information back to the slave during the appropriate header cycles of a Block Message with the AT field of HWA set to 01 (resume message) as described in "5.3.4.1 Block Message - Short Header Sequence.".

In terms of the data transfer operation, the S cycles of these sequences shall be considered normal D cycles and all Bus Interfaces shall respond accordingly. The slaves shall post ACK during the last of the three S cycles to indicate that the Suspend Sequence has been recognized. The slaves shall then respond with the multislave acknowledge sequence (see "5.2.3.3.2 Multiple Slave Acknowledge").

The Multiple slave Suspend sequence of bus states shall be as defined in Table 5-17.

5.3.5.2. Abort.

The Abort Sequence may be used to terminate a message prior to completion due to errors or other reasons. No header or acknowledge words are required for the Abort sequence. A master may initiate the Abort Sequence at any time during its tenure. The master shall issue an abort sequence for the conditions listed in Section 6.3.6.1 "Deviations from Scheduled Sequence).

The Abort Sequence shall be as shown in Table 5-18. The first three of the four bus cycles with the AB cycle type are used to give the slave time to recognize that an abort has occurred. The slave (or slaves in the case of multicast or broadcast) shall respond by posting ACK on the AS lines during the third AB cycle to inform the master that an Abort has been recognized. At the end of the third AB cycle, no modules shall be slaves. There are no slaves on the fourth AB cycle and the master is the only module that may assert Wait on that cycle. After the last AB cycle, the master may continue with the H0 of another message or relinquish control of the bus by releasing the bus signal lines.

Table 5-18: Abort Sequence

| SIGNAL LINES | BUS STATE | | | |
|---|---|---|---|---|
| | AB | AB | AB | AB |
| DATA D<15..0> Source= | X M or S | X M or S | 0 | 0 |
| CYCLE TYPE Source=M | AB | AB | AB | AB |
| ACKNOWLEDGE Source= | X X | X X | ACK S | NS |
| WAIT Allowed Source= | 0 a a | 0 a a | 0 | 0 b b | a) Slave Wait assertion allowed but not honored by master
b) Master Wait allowed, no slaves exist
X) not defined 5.3.6.1.2.1.2 Cycle Type Group during NT Cycles. The value on the CT lines shall be ignored except for line error checking and the occurrence of Suspend or Abort. An Abort shall mark the beginning of an Abort Sequence. The occurrence of Suspend shall start the count of Suspend Waits, see "5.3.5.1 Suspend..". The master module responsible for posting the CT lines on the next scheduled transfer cycle shall source a valid symbol on the CT lines during the NT cycle(s).

5.3.6.1.2.1.3 AS Group during NT Cycles. If a module is responsible for posting the AS lines on the next transfer cycle it shall post a valid symbol on the AS lines during the NT cycle(s). A symbol other than NAK shall be ignored during non-transfer cycles. NAK shall be posted on cycle N, to signal that as error associated with cycle N-2 was detected.

5.3.6.1.2.1.4 Wait Lines during NT Cycles. The rules for asserting Wait are specified in "5.3.6.1.1 Rules for Asserting Wait..". The effects of asserting Wait on a non-transfer cycle shall be the same as specified herein for asserting Wait on a transfer cycle.

5.3.6.1.2.1.5 Bus Request Lines during NT Cycles. The rules for asserting Bus Request are specified in "5.3.3.3 Bus Request..". Bus Request is completely independent of Wait.

5.3.7. Data Link Facilities.

The V1750A module's Data Link facilities are not accessable from the PI-Bus. However, the Data Link facilities resides in the bus interface unit shall be accessable from the V1750A (see "6.3.4.3 Configuration Load CCB").

5.3.8. Initialization.

A reset mechanism shall be provided to initialize the Bus Interface. Reset shall be invoked by the attached device. The Bus Interface shall respond to reset by becoming inactive, releasing all bus drivers and initializing the Bus Interface Registers (see "6.3.2 Power On Reset Procedure"). Following register initialization, modules may become active on the bus. However, a potential bus master module shall not initiate a Vie sequence prior to determining that the bus has been Idle for a minimum of two bus cycles and shall not assert Bus Request (BR) prior to determining that the current bus master is operating at a lower priority than the potential bus master's priority.

5.3.9. Error Detection, Recovery and Diagnostics.

This section describes the detection of and responses to line, sequence and semantic errors.

Table 5-19: Interpretation and Response for Invalid Symbols

| SIGNAL LINE GROUP | INTERPRETATION AND RESPONSE |
|---|---|
| Wait | If Wait is not allowed: No Wait. If Wait is allowed: Wait asserted on first cycle of detected error and No Wait asserted on remaining contiguous error cycles. |
| Cycle Type | Scheduled Cycle Type (per defined sequences). |
| Cycle Type (during HO) | No slave ID match. |
| Bus Request | No Bus Request asserted. |
| Acknowledge Set | NAK posted. |
| Acknowledge Set (during Vie) | If not a contender, set master priority unknown. If a contender, should notify device. |
| Data lines (during Vie) | If a contender, assume that redundant bits which disagree are both asserted. If not a contender, set master priority unknown. If not the winner of vie, set master priority unknown. |
| Data lines (during Multi-slave acknowledgement) | For redundant bits which disagree, no acknowledgement for corresponding module. |
| Data lines (during HO) | No slave ID match. |
| Data lines (during header, except HO) | Slaves shall discard header words, take no action based on header words, set the Acknowledge Word AWT field to 100 and become not selected after Header Acknowledge. |

Table 5-20: Slave Response to Cycle Type Sequence Deviations

|   |   | CYCLE TYPE (CT) LINE SYMBOLS ||||||||
|---|---|---|---|---|---|---|---|---|---|
|   |   | I | V | HO | H | D | A | S | AB |
| B<br>U<br>S<br><br>S<br>T<br>A<br>T<br>E | I | - | 1 | error | error | error | error | error | error |
| | V0 | 2 | - | error | error | error | error | error | error |
| | V1, V2, V3, VZ | error | - | error | error | error | error | error | error |
| | H0 | 4 | error | - | error | error | error | error | 5 |
| | H1..H9, HZ | error | error | error | - | error | error | error | 5 |
| | HA0..HA4 | error | error | error | error | error | - | error | 5 |
| | HAZ | error | error | error | error | error | - | error | error |
| | D | error | error | error | error | - | error | 3 | 5 |
| | DZ | error | error | error | error | - | error | error | 5 |
| | DA0..DA4 | error | error | error | error | error | - | error | 5 |
| | S | error | error | error | error | error | error | - | 5 |
| | AB | error | error | error | error | error | error | error | - |

Table 5-22: Sequence Error Response

| SIGNAL LINE GROUP | SEQUENCE ERROR RESPONSE |
|---|---|
| Acknowledge Set | During vie, if not the winner set master priority unknown |
| Wait | Assume Wait is not asserted. |
| Bus Request | Assume Bus Request is not asserted. |

5.3.9.3. Semantic Errors.

5.3.9.3.1 Header Semantic Errors. Each Bus Interface shall detect any error in information transfer that has protocol significance. Table 5-23 lists and defines the errors in this category. In response to these errors, the Bus Interface shall post NAK on the AS lines within two cycles after the error is detected and not later than two cycles after the end of the message or partial message. The Bus Interface shall also log the error in the Acknowledge Word by making the bit named in Table 5-25 a logic 1. The device should be notified that an error was detected.

5.3.9.3.2 Header And Data Acknowledge Semantic Errors. A bus master Bus Interface shall report semantic errors in the Header and Data Acknowledge Word to the device. A semantic error shall be reported if the Acknowledge Word Type (AWT) field of the Acknowledge Word is not valid for the current Acknowledge cycle.

5.3.9.4. Diagnostics.

5.3.9.4.1 On-Line Testing. On-Line testing of the PI-Bus shall be accomplished through the Error Detection capability provided by the standard message sequences and protocol defined in previous sections of this specification.

5.3.9.4.2 Off-Line Testing. Each Bus Interface shall be capable of transmitting and receiving arbitrary bit patterns on all signal lines of the bus (D, DC, CT, CTC, AS, W and BR) in parallel. Multiple clock cycles may be used to establish and read each pattern. Control and coordination of this test shall be through an alternate path independent from the PI-bus under test. The test controller should 1. provide the line patterns to the Bus Interface transmitting the test pattern, 2. read the received patterns from the receiving Bus Interface(s) and 3. analyze the patterns for correctness.

The signal line bit patterns should guarantee detection of 1) a failed line stuck at zero or one and 2) a short between any two lines for any path from the signal line latch of the transmitting Bus Interface to the signal line latch of the receiving Bus Interface(s).

The transmitting Bus Interface shall be capable of being placed in the off-line test mode, accepting patterns for transmission and transmitting the patterns.

The receiving Bus Interface, when in the off-line test mode, shall be capable of being commanded to clock in the test pattern from the bus and transfer that received pattern to the controlling device.

| | |
|---|---|
| SLAVE RECEIVE LIST CONTENTS COUNTER | A four bit counter, which indicates the number of labels which are in the Slave Receive List queue. |
| SLAVE RECEIVE LIST TAIL POINTER | A four bit counter, which indicates the next available location in the Slave Receive List. |

6.2.4. Device Data Structures

The following data structures shall be utilized by the BIU and the device to allow the BIU to participate in PI-Bus sequences. Each of these structures shall consist of a contiguous block of memory except where noted. The usage of these data structures are described herein.

| | |
|---|---|
| LABEL TABLE | Used by the BIU during slave sequences to translate label value into memory addresses. The Label Table may contain up to 16,384 Label Table Entries. |
| SLAVE RECEIVE LIST | A 16 word list used by the BIU to report the messages received as a slave. The BIU shall interrupt the device as each entry is placed into the Slave Receive List. |
| ERROR REPORT | A two word mailbox for the BIU to place error status information. The Slave Receive List and the Error Report are located contiguously in memory. |
| CONFIGURATION IMAGE | Provides the BIU with the PI-Bus and device interface parameters necessary to participate in PI-Bus sequences. |
| CONFIGURATION REPORT | Provides the device with an image of the current BIU operational parameters. |
| COMMUNICATION CONTROL BLOCK (CCB) CHAIN | The CCB chain consists of one or more sections of CCB entrys. Each section of the CCB entrys must be stored in contiguous memory locations, but the boundary between each CCB |

6.3. DETAILED REQUIREMENTS

6.3.1. Introduction

The detailed requirements for the BIU to V1750A interfaces are specified in this section. The V1750A XIO facilities, which are required to initialize, start and stop the BIU operations are specified. The data structures used by the V1750A software and the BIU for message transfer and error reporting are specified. Finally, the BIU response to errors and exception conditions are specified.

6.3.2. Power-on Reset Procedure

Upon receiving a valid System Reset signal or a Reset XIO Output command from the device, the BIU shall be placed in a known state as specified in section 6.3.3.5 " BIU RESET".

6.3.3. XIO Command Formats

The device shall issue XIO commands to the BIU to initiate BIU activity. The BIU shall respond to an input command by presenting the device with the requested data. The BIU shall respond to an output command by setting the XIO Pending flag in the Status Register. The XIO Pending flag shall be cleared once the BIU can accept another XIO output. The XIO address space for these XIO commands are listed in Table 6-1. The XIO command format is shown in Figure 6-1.

6.3.3.1. Status Register

The BIU shall report its operational status to the device through the Status Register. The Status Register defined herein provides the BIU's present interrupt condition and operational mode to the device. After reset the Status and Interrupt fields shall be reset to zero and the Health bit indicates the result of self-test. The ID field shall be set according to the Vendor Identifier. Vendors shall support XIO Input access to this register. The XIO Output access to this register is optionally specified by the BIU vendor. The Status Register format shall be as shown in Figure 6-2 and specified below.

6.3.3.1.1 ID Field. This Vendor Identifier field specifies the source of the BIU.

6.3.3.1.2 Status Field. The BIU shall report its present operational mode to the device through the Mode field. The BIU shall report self test results, pending device commands and PI-Bus response mode through this field. Each of the status bit shall be as defined below:

| | |
|---|---|
| BIU ADDRESS MODE | This flag indicates the BIU is currently using Logical or Physical addressing mode to access the module memory. |
| CCB CONTROL WORD SEQUENCE ERROR | If this flag is set to "1", the BIU has received a XIO output command (CCB Control Word 2) before the first XIO command (CCB Control Word 1) was received. |
| MASTER SUSPENDED | If this flag is set to "1", the BIU master has suspended a block message transfer and has not regain the bus to resume the message. |
| HEALTH | The results of Vendor Specific internal self test initiated at power up or XIO Reset Command. |
| BIU BUSY | The BIU is responding to all PI-Bus message sequences addressed to the module as Busy. The BIU will preempt CCB Chain processing when operating in the Busy Mode. |
| CCB PENDING | The BIU is presently serving a CCB Chain. Servicing a CCB Chain shall include active processing and processing preempted due to error or loss of PI-Bus Mastership. |
| XIO PENDING | The BIU is presently serving an XIO Output command and is not able to accept another XIO Output. |

6.3.3.1.3 Interrupt Field. The BIU shall report its accumulated interrupt status to the device through the Interrupt field. Individual interrupt status bits are reset to zero by the XIO Discrete command. After reset the interrupt field shall equal zero. Each of the interrupt bits shall be as defined below:

SLAVE ERROR     A PI-Bus error occurred during the Data state of an unsolicited PI-Bus message directed to a label. This error indicates that the contents of the label buffer may be in error.

MASTER ERROR     An error was detected by the module's BIU or by a slave BIU during the processing of a CCB Chain.

LABEL PROGRAM
CONTROL INTR.     The Slave Receive List is non-empty. An interrupt is generated when the slave BIU has completed receiving a message with no error and the SRL contents counter has been updated. This bit is clear only when the SRL contents counter is empty.

CCB PROGRAM
CONTROL INTR.     The Master BIU has completed processing a CCB with the PCI option invoked.

6.3.3.2. CCB Control Word 1

The device shall supply the BIU with CCB Chain control parameters through CCB Control Word 1. The CCB Control Word 1 defined herein provides the BIU with the PI-Bus priority for all PI-Bus messages in the CCB Chain and an address bits 16 to 23 of the first CCB in the chain.

Vendors shall support XIO Output access to this register. XIO Input access to this register is optionally specified by the BIU vendor. After reset the parameters specified by the CCB Control Word 1 shall be set equal to zero. The CCB Control Word 1 format shall be as shown in Figure 6-3.

6.3.3.3. CCB Control Word 2

The device shall supply the BIU with the address bits 0 to 15 of the first CCB entry in a CCB chain through the CCB Control Word 2. Once the BIU received the CCB Control Word 2, it shall begin accessing the first CCB by utilizing the latest update of the parameters specified by CCB Control Word 1.

Vendors shall support XIO Output access to this register. XIO Input access to this register is optionally specified by the BIU vendor. The CCB Control Word 2 format shall be as shown in PROGRAM CONTROL
BUSY                          If the Program Control Busy flag is set
                              to busy, the BIU shall respond to all
                              PI-Bus message sequences addressed to
                              the module as Busy. If set the BIU
                              shall not respond to a concurrent
                              Continue command.

6.3.3.4.3 *Clear Interrupt Field.* The device shall command the BIU to clear interrupt conditions through the Clear Interrupt field. Except where noted, the BIU shall reset the appropriate Interrupt bit in the Status Register upon processing each clear interrupt command. Each of clear interrupt command shall be as defined below:

CONTINUE (CLEAR BUSY)         Resets the Master Error Interrupt,
                              Slave Error Interrupt and busy
                              conditions generated by device hardware.
                              Allows the BIU to resume processing of
                              the preempted CCB chains and receiving
                              unsolicated message if the SRL is not
                              full. The Program Control Busy command
                              overrides a concurrent Continue
                              command.

SRL POP                       Indicates that the device has removed
                              one entry from the top of the Slave
                              Receive List Queue. If the SRL
                              Content counter=1 before executing this
                              command, the BIU shall clear the LABEL
                              PCI interrupt flag in the Status
                              Register.

CCB PCI                       Commands the BIU to clear the CCB PCI
                              bit in the Status Register.

6.3.3.5. BIU Reset

The device shall command the BIU to perform the functions associated with power-on reset through the Reset XIO. Vendors shall support XIO Output access to this function. Upon processing the Reset command, the BIU shall reset the BIU to a known state. The vendor specified known state shall include the requirements specified herein as a minimum. The BIU shall perform the following functions after a reset command:

1) Disable all PI-Bus transceivers.
2) The SRL Tail pointer shall be set equal to zero.
3) The SRL Contents counter shall be set equal to zero.
4) The internal Program Control Busy flag shall be set to not busy.
5) The BIU shall perform any self-test functions necessary to establish the state of the Health status bit.
6) Bits 15-9 of the Status Register shall be set equal to zero.

6.3.4. Generic Communication Control Block (CCB) Formats

The device shall specify BIU initialization, verification and PI-Bus master operations through Communication Control Block (CCB) chains. A CCB chain may contain one or more CCBs. The device shall store CCB chains in device memory segments in which the BIU has been allocated read privileges.

The device informs the BIU of the starting address of the first entry in the CCB Chain through an XIO sequence. The XIO sequence shall provide the BIU with two CCB Control Words. CCB Control Word 1 shall inform the BIU of the Logical PI-Bus Priority which shall be used for any Message CCB within the chain. CCB Control Word 1 shall also supply the upper eight bits of the address of the CCB chain. Following a reset, the device shall issue a CCB Control Word 1 before issuing any CCB Control Word 2. CCB Control Word 2 shall inform the BIU of the lower 16 bits of the address of the CCB chain. CCB Control Word 2 shall also command the BIU to begin CCB chain processing. If the device issues another CCB Control Word 2 without updating CCB Control Word 1, the BIU shall utilize the parameter provided by the last CCB Control Word 1.

Upon reception of CCB Control Word 2, and the BIU shall begin accessing CCB entries. The BIU shall continue CCB processing until the chain has ended or an error condition is detected. Upon error-less completion of the chain the BIU shall reset the CCB Pending bit and if specified by the last CCB entry, the BIU shall interrupt the device and set the CCB Program Control Interrupt (PCI) bit in the status register. The device clears the interrupt status bit through the BIU Discrete Control Word XIO.

If the Master BIU detects an error while processing the chain, the BIU shall halt chain processing, reset the CCB Pending Bit, place a two word error report in device memory, set the Master Error bit in the status register, and interrupt the

Fig. 6-7: CCB Word 0 Format
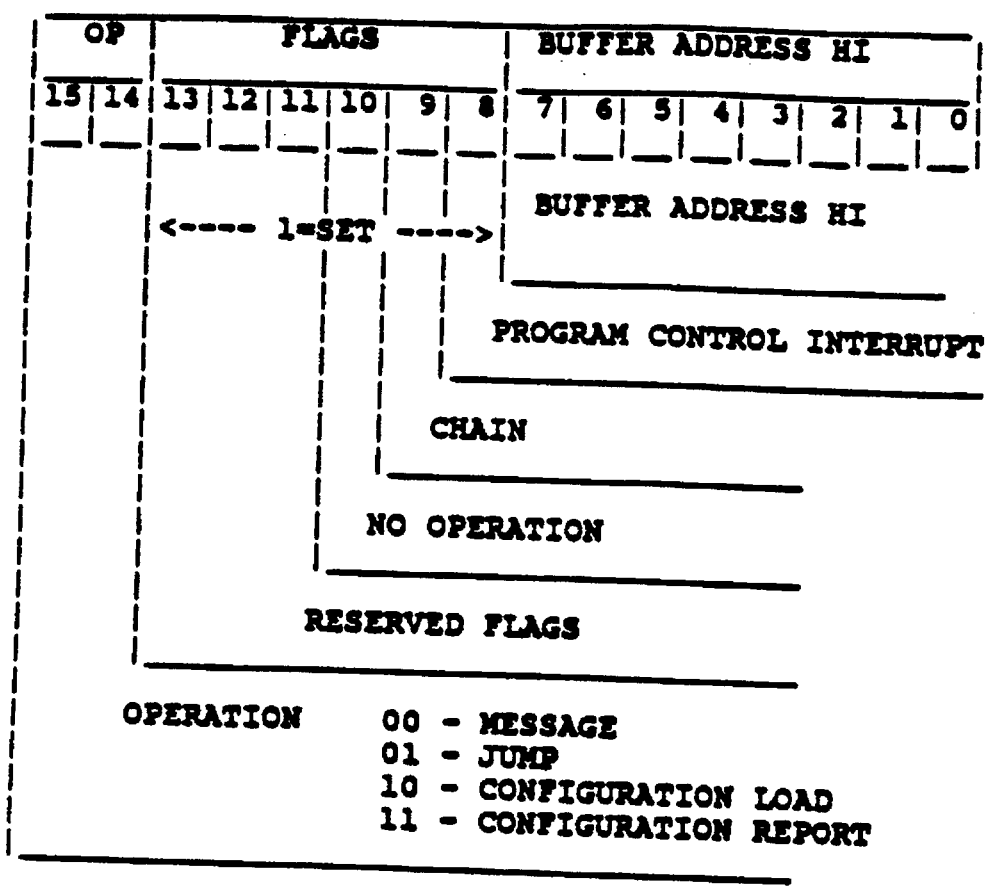

6.3.4.2. Jump CCB

The device shall link a section of the CCB chains together through the Jump CCB. The Jump CCB shall specify the starting address of the succeeding CCB chain. The remaining fields of the Jump CCB shall be as defined below:

| | |
|---|---|
| NO OPERATION | The BIU shall perform the jump operation regardless of the state of this flag. |
| CHAIN | The BIU shall perform the jump operation regardless of the state of this flag. |
| PROGRAM CONTROL INTERRUPT (PCI) | If set the BIU shall generate an interrupt and set the CCB PCI bit in the Status Register upon error-free reading of the Jump CCB. The BIU shall terminate chain processing and clear the CCB Pending bit in the Status Register. |
| BUFFER ADDRESS HI | Specifies the upper 8 address bits of the next CCB to be processed. |
| BUFFER ADDRESS LO | Specifies the lower 16 address bits of the next CCB to be processed. |
| HWA | Spare field. |
| HWB | Spare field. |
| HWC0 | Spare field. |
| HWC1 | Spare field. |

The Configuration Image format shall be as shown in figure 6-8. The Configuration Image shall be stored in consecutive memory locations of the device with the minimum length of six words. The Configuration Image fields shall be as specified below:

| | |
|---|---|
| LABEL TABLE BASE | Specifies the upper 9 address bits of the label table. Where Bit 15 is label address bit 15 and bit 0 to 7 is the label address bit 16 to 23. |
| MAXIMUM LABEL VALUE | Specifies the largest label value the module shall recognize. If the PI-bus label value exceeds this value, the BIU shall cease to participate in a PI-Bus sequence, and shall not signal an error condition to the master BIU nor the module device. |
| VIE INTERVAL TIMER A | Specifies the 16 bits value of the PI-Bus Vie Interval Timer A facility. |
| VIE INTERVAL TIMER B | Specifies the 8 bits value of the PI-Bus Vie Interval Timer B facility. |
| SRL ADDRESS HI | Specifies the upper 8 address bits of the Slave Receive List. |
| SRL ADDRESS LO | Specifies bits 15 thru 5 of the address of the Slave Receive List. |
| TRW VENDOR SPECIFIC | Shall be completely defined by the TRW. |
| WESTINGHOUSE VENDOR SPECIFIC | Shall be completely defined by the WESTINGHOUSE. |

6.3.4.4. Configuration Report CCB

The Configuration Report CCB shall command the BIU to report the current parameter values utilized in the PI-Bus and Device Interface facilities. The Parameter Report shall at a minimum provide the current values of the facilities loaded by the Configuration Image (CI). The Parameter Report may also provide the values of vendor specified facilities. The BIU shall not participate in any PI-Bus sequence while processing the Parameter Report CCB. The Parameter Report CCB shall specify the starting address where the BIU shall store the current parameter values. The remaining fields of the Dump CCB shall be as defined below:

| | |
|---|---|
| NO OPERATION | If set the BIU shall not perform an Configuration Report sequence, and shall perform the operation commanded by the chain flag. |
| CHAIN | Indicates the CCB chain contains additional CCBs. The next CCB shall be located in the next six memory locations. The PCI flag overrides the Chain flag. |
| PROGRAM CONTROL INTERRUPT (PCI) | If set the BIU shall generate an interrupt and set the CCB PCI bit in the Status Register upon error-free completion of the Configuration Report sequence. The BIU shall terminate chain processing and clear the CCB Pending bit in the Status Register. |
| ADDRESS HI | Specifies the upper 8 address bits of the Configuration report. |
| ADDRESS LO | Specifies the lower 16 address bits of the Configuration report. |
| HWA | Spare field. |
| HWB | Spare field. |
| HWC0 | Spare field. |
| HWC1 | Spare field. |

The Parameter Report format shall be as shown in Figure 6-9. The Parameter Report shall be stored in consecutive memory locations. The length of the Parameter Report shall be vendor specific and shall be equal to the vendor specified length of the Configuration Image.

Fig. 6-9: BIU Configuration Report

The Configuration Report is created by executing a Configuration Report CCB and contains the following information:

```
CCB Pointer                                  Bits
Plus   15   14   13   12   11   10   09   08   07   06   05   04   03   02   01   00   (15)
 0    :15:   0    0    0    0    0    0    0  :23------Label Table Base----16---15:
 1      0    0  :13------Maximum Label Value----------------------------------00:
 2    :15----------Vie Interval Timer A----------------------------------------00:
 3    :23------Abs Ten Timer--------16::07----Vie Inter Timer B------00:
 4      0    0    0    0    0    0    0    0  :23--------SRL Address--------16:
 5    :15----------SRL Address------------------------05:   0  :03--SRL PT--00:
 6    :15--------------------------LOGICAL IDs------------------------------00:
 7      0    0    0    0    0    0    0    0    0    0    0    0  :04-----MID-----00:
 8      0    0    0    0    0    0    0    0    0    0    0    0  :03-SRL CNT-00:
 9      0    0    0    0    0    0    0    0  :07------CURR CCB ADRH-------00:
10    :15------------------------CURR CCB ADRL--------------------------00:
11    :15------------------------------HWA----------------------------------00:
12    :15------------------------------HWB----------------------------------00:
      :15------------------------------HWC0---------------------------------00:
      :15------------------------------HWC1---------------------------------00:
15    :15------------------------Abs Ten Timer------------------------------00:
16    :15--------------------------Word Count-------------------------------00:
17    :255----------Logical IDs--------------------------------------------240:
      :239----------Logical IDs--------------------------------------------224:
      :223----------Logical IDs--------------------------------------------208:
20    :207----------Logical IDs--------------------------------------------208:
21    :191----------Logical IDs--------------------------------------------192:
22    :175----------Logical IDs--------------------------------------------176:
23    :159----------Logical IDs--------------------------------------------160:
24    :143----------Logical IDs--------------------------------------------144:
25    :127----------Logical IDs--------------------------------------------128:
26    :111----------Logical IDs--------------------------------------------112:
27    :095----------Logical IDs--------------------------------------------096:
28    :079----------Logical IDs--------------------------------------------080:
29    :063----------Logical IDs--------------------------------------------064:
30    :047----------Logical IDs--------------------------------------------048:
31    :031----------Physical ID------------------------------------033:   0:
32    :015----------Physical ID----------------------------------------------016:
33    :MSB----------Header Word A--------------------------------------------000:
34    :MSB----------Header Word B--------------------------------------------LSB:
35    :MSB----------Header Word C0-------------------------------------------LSB:
36    :MSB----------Header Word C1-------------------------------------------LSB:
37    : X    0    0    0  :MSB---PI Bus Priority--LSB::MSB----MID-----LSB:
      : 2--CT---0:UNK::MSB--------------Master Priority--------------LSB:
      :MSB------------BIU Status---------------------------------------------LSB:
```

NOTE!!!!Only the Physical ID equal to the MID and Logical ID 32 will be set.

T... report data contained in Words 0 through 14.

H&C report data contained in Words 0 through 5 and 15 through 39.

When the BIU places an entry in the SRL it shall increment the LTE Content counter and the LTE Tail pointer. When the device removes an entry from the SRL, it shall notify the BIU through the BIU Discrete XIO. The BIU shall then decrement the SRL Content counter. If the SRL Content counter equal 15, the BIU shall respond Busy to all PI-Bus messages.

If the slave BIU detects an error during the data transfer, the BIU shall not place an entry into the SRL and shall not clear the LBB bit. The BIU shall place a two word error report (see "6.3.6.3.3 Slave Error Report") in device memory, set the slave error bit in the status register and interrupt the device. After detecting the error, the BIU shall respond to all PI-Bus messages with Busy asserted in the Header Acknowledge. The device shall clear the BIU Busy condition through the BIU Discrete Control Word via the XIO interface.

6.3.5.1. Label Table Entry

The device shall specify the response to unsolicited messages through the Label Table. The Label Table consists of a collection of two word Label Table Entries (LTE). Each LTE specifies the device's ability to accept the label, the physical address of the label buffer and the BIU's responsibility for notifing the device of the label buffer access. The BIU shall access the LTE and perform the tests specified herein before participating in the header acknowledge state of the message sequence.

The Label Table shall be stored in consecutive device memory locations in which the BIU has been allocated read and write privileges. The Label Table contains up to 16,384 Label Table Entries. The size of the module implemented Label Table is specified by the device through the Configuration Image.

Access of LTE Word 0 by either the BIU or the device shall be performed as an atomic operation to insure the integrity of the LTE. The memory system of the device shall allow the BIU (or the device) to complete a read, modify and write cycle while inhibiting access to the device (BIU).

The LTE format shall be as shown in figure 6-10. The flags field in the LTE Word 0 specify the BIU/device interaction for a label value. The LTE flags define the module's affinity for the label, the present status of the label buffer, and the device notification procedure. The format of the LTE Word 0 shall be as shown in figure 6-11. The field of the LTE shall be as defined below:

RESERVED                    The BIU shall take no action on
                            these bits, and the BIU shall
                            not modify these bits.

Subbus Opcodes

APPENDIX D

Subbus Opcodes

The acceptable values for each hex character of the opcode are 0, 1, 4, and 5 only to avoid conflicts with the short range serial opcodes (see Local Web Data Subbus Interface Definition, Short Range Sliced Commands for more detail).

Opcode Groups:

```
0/0000 -> 0/0055   noop and short range parallel opcodes
0/0100 -> 0/0155   path creation opcodes
0/0400 -> 0/0455   bus contention opcodes
0/0500 -> 0/0555   beginning & end of data blocks, instrumentation on/off
0/1000 -> 0/1155   data type codes, up to 32
0/1400 -> 0/1555   user definable opcodes for CPU to CPU transfers
0/4000 -> 0/5555   reserved
```

Individual Opcodes:

→ 0/0000  NOOP

→ 0/0001  ENDDAT - marks end of data flow for input or output.

→ 0/0100  VERIFY - verify successful path creation and/or checksum correctness. Returns either Busy Ack if OK, or ATN if not. Used at end of transfer to check the checksums, or in array transfers (see Local Web section) to verify that the path was created successfully just before turning control over to the spider.

→ 0/0101  CANNTRY - destroy current path creation attempt if it was successful. Used when creating multi bus paths at random rather than at scheduled times to eliminate deadlocks in which two or more multi-bus paths each win the path creation for some but not all of the buses.

→ 0/0104  -KILLTOPPATH - destroy topmost level of path, and reduce level 1 notch.

→ 0/0105  KILLALLPATH - destroy all levels of path, and reduce level to 0.

0/0400  DOCON - Execute a bus contention cycle.
0/0401  ABDICATE - Master yields bus control to contention winner, which may be the current master.
0/0404  DOIDLE - Puts bus in idle state. Used after a bus contention cycle with no winners.

0/0500  DOIN - Commence specified input transfer - source switches SCON=rdy low to force bus reversals where necessary - other ports

Subbus Data Type Opcodes

0/4000     DTHEAD - header, first word of any transfer,
              bits 04:07 = priority (0 highest, E lowest, F reserved),
              bits 08:09 = path width (0 = 1 bus, 1 = 2, 2 = 4, 3 reserved),
              bit 15 = random emission flag, 1 => collision is possible.

0/4010     DTCREPAT - Path creation data type,
              word 2*n+0 = SIWEB ID, word 2*n+1 = path creation spec.
0/4011,4,5   reserved to simplify differentiation of different words
              in path creation.

0/4020     DTCREPATUP1 - = DTCREPAT, but raise path level on existing parts
              of the path 1 notch prior to creating first path, unless data
              type is empty (either no data before next opcode, or all SIWEB
0/4021,4,5   IDs = 0000). ??? Emptiness necessary?
              reserved to simplify differentiation.

0/4040     DTOUTPORT - Deselect all currently selected ports, and use the
              following data words to select ports for output.
0/4044     DTINPORT - Deselect all currently selected ports, and use the
              first data word to select a single port as the source of
              an input transfer. Ignore all port selects after the first.
0/4144     DTINPORTO - = DTINPORT, but let currently selected output ports
              be. Selected input port will shovel data to both the bus
              master and the selected output ports. The selected output
              ports may have received initial address or block length data
              before DTINPORTXO, and should ignore subsequent initial
              addresses or block lengths.
0/4145     DTINPORTNO - = DTINPORTO except that the master ignores the
              input data.
0/4041     DTOUTPORTATT - deselect all currently selected ports, and
              select a group of ports for output by attribute. Multiple
              data words can hierarchically select first one of n groups,
              then one of n subgroups, etc. VPSP currently has 2
              attribute, bit 0 = 1 => all APC CPU As, bit 1 = 1 => all
              APC CPU Bs. For this output port select only, all selected
              ports respond with SCON=rdy low as they get the selection,
              and let it go high when they're ready to take the data.
              This Busy Ack feature is used when synchronizing the real
              time clocks.

0/4050     DTTAG - tag, 1 word only, compared to similar tag at receiving
              end to verify data is expected, or to figure out what to do
              with it.
0/4051     DTIA - initial address, default value = 0. First word is
              bits 00:15, second word is bits 16:31, etc.
0/4054     DTBL - block length, default = 0, first word = bits 00:15,
              second word = bits 16:31, etc. Subbus requires ENDDAT
              even if block length is defined.
0/4055     DTDAT - data, the point of this whole exercise.

SCON Slotting in Linear Subbuses

After a bus contention cycle with no winner (nobody needed the bus), the bus master puts the bus in the idle state using DOIDLE. On linear Subbus segments the bus master drives SCON high and leaves it high and undriven (the pullup resistor holds it high) with the SCON state timer = 0 until someone needing the bus starts bus contention by pulling SCON low. During the clock after SCON low the SCON slotting timer = 1. It then cycles 1,2,3,0,1,2,3,0... where:

0 => SCON=ATN- (normally 0 => error or message rejection)

1 => SCON = 1 (driven high to permit any port to pull it low during the next clock period)

2 => SCON=rdy

3 => SCON = 1

SIWEB Variation:

In the SIWEB the SCONSYNC slotting timer that defines the SCON=rdy and SCON=ATN- slots runs continuously because there can be several paths operating simultaneously, which could be upset if we initialized the SCONSYNC timer every time any of the paths went idle. On the other hand, since there is a single source for the SCONSYNC timing pulse, it cannot very well get out of sync with itself, so there is less reason to reinitialize the SCONSYNC counter than the equivalent counters that exist in each port on a linear Subbus.

In addition, the SIWEB ANDs the SCON signals together using gates rather than pullup resistors on a common line, so the SCON slotting assignments in the SIWEB do not have the clocks allocated to driving the SCON to 1 in between the SCON=rdy and SCON=ATN- slots.

Bus Contention

Initially one master on each path gets mastership of the bus. Its physical bus segment is considered the center of the path, and each step through a switched-on coupler or SIWEB is to a physical segment that is farther away from the center.

The bus is initially in the idle state. If the master needs the bus and nobody else has requested it, the master may go ahead and use the bus <u>without going through a contention cycle</u>.

Any non-master port needing the bus can <u>start bus contention</u> by switching <u>SCON low</u>.

Switched on couplers (or SIWEBs) that receive SCON low on their master facing side switch their own SCON=rdy slot low to delay the bus contention until they can determine the highest priority bus request on their part of the path, that part that is connected to the other side of the coupler. Each such coupler relays the SCON low to the other side of the coupler, which applies it to its own physical bus, and then echos the SCON on its physical bus back to the master facing side.

Switched on couplers receiving SCON low on their master away sides pass the pulse towards the center, and then echo the SCON=rdy from the master away side to the master facing side.

All ports on a physical bus segment hold the SCON=rdy low until they are ready to contend. When SCON=rdy goes high again on a physical bus segment each master puts the priority of his message in his nibble. 0 is the highest priority, E the lowest, F => don't need the port. Port 0's nibble is data bus bits 00:03 during clock 0 of the contention, port 1's nibble is data bus bits 04:07 of clock 0, 2 gets 08:11 of clock 0, 3 gets 12:15 of clock 0, 4 gets 00:03 of clock 1, etc. Where the number of masterly ports on a physical bus segment is not an exact multiple of 4, the current bus master drives F on the unused contention nibbles.

The FITS interface assigns the nibbles to the masterly ports at power up initialization, as well as specifying which masterly port is the initial bus master.

Each master notes whether he is the local winner of the contention cycle or not. Switched on couplers that face away from the master pass the priority of the local winner toward the center by giving it to the master facing side of the coupler. The master facing side lets the SCON=rdy slots on its physical segment of the path go high, and when all ports on this physical segment let the SCON=rdy float high they execute a similar bus contention cycle.

Bus Contention in SIWEBs

Bus contention in SIWEBs is a little different.

Contention Nibble Assignment:

The number of ports on the SIWEB path can change dynamically as paths are created or destroyed, so the FITS interface cannot assign bus contention nibbles at power up reset. Instead, when the path is created all ASIUs on the SIWEB receive the path creation spec on their SIWEB/ASIU data bus, and from it determine how many ports are on the physical path segment within the SIWEB and where their bus contention nibble is.

Getting Started:

When the bus is in the idle state, any non master port on the SIWEB path that receives SCON low echos that low to the SIWEB's local master, which passes it on to both its master facing side by echoing it, and to the other non master ports on the SIWEB path by issuing the DOCON command. The latter step is necessary because the SIWEB ANDs the SCON signals from the different non master ports together internally before passing them on to the master port, so the non master ports see only their own contribution to the ANDed SCON, not the composite result (the non-master ports that didn't issue the SCON low pulse didn't see it.). The non-master port that issued the SCON low suppresses the DOCON. The other non-master ports convert it to an SCON low pulse.

If the master port on the SIWEB path segment receives an SCON low from its linear Subbus physical segment while the bus is idle, it uses the DOCON command to pass it on to the non-master ports on the SIWEB path because it cannot drive the SIWEB SCON signal. The non-master ports receive it, and convert it to a low pulse on the SCON line.

If the master port on the SIWEB path segment receives a DOCON command while the bus is not idle, it passes it on to the non-master ports on the SIWEB, which echo it as a DOCON opcode.

Contention:

Regardless of how the master and non-master ports on the SIWEB found out that they were contending for the bus, the non-master ports hold SCONrdy low until they're ready to go through the SIWEB contention cycle, then let it go high. The master port on the SIWEB path segment issues DOCON (possibly for the second time, depending on how the contention cycle got started) to tell all the non-master ports that now is the time.

```
    ┌─────────────────────────┐
    │   Subbus Header Format  │
    └─────────────────────────┘

15  14         10  09  08  07              04  03
 ─────────────────────────────────────────────────────
 | RE |  I/O TYPE   |  PIPE  |   PRIORITY    |  IP#  |
 |    |             |  SIZE  |               |       |
 ─────────────────────────────────────────────────────
```

PRIORITY - The priority of the message, used in bus contention.

PIPE SIZE - the size of the pipe used for this message. 0 => pipe is 1 bus wide, 1 => 2 buses wide, 2 => 4 buses wide, 3 is reserved.

RE - Random Emission Flag - 1 => this is a random emission, which may be rejected by a head on collision with a higher priority message. If the pipe width is greater than 1 bus wide, then it is possible that any path creations for this transfer will collide with those of another multibus path transfer in a way that will give each transfer control of some but not all of the buses they need to proceed. In this case both transfers will be deadlocked, with each waiting for the path segments the other possesses.

To break free from this deadlock, the ASIUs adjacent to the source of the message (either 2 or 4 outer ASIUs supporting an array data transfer originated by a CASIU and passing through a local web) issue the path creation specs one at a time on each bus simultaneously (actually that works out to 2 or 4 specs at a time depending on the pipe width), waiting to see how each turned out before proceeding with the next one. The ASIUs creating the path, during this irregular circumstance only, respond to the path creation by switching SCONsrdy low to show they have received the command and are working on it, and switch SCONsrdy high after the path creation succeeds. If the path creation collides head on with a higher priority transfer, the creation ASIUs return ATN- before the end of the SCONsrdy low period to abort the transfer.

The originating ASIUs monitor and share their path creation commands. When any one or more bus paths are successfully created, all the originating ASIUs start a timer. They reset the timer each time another of the bus paths is successfully created. If the timer overflows before all bus paths are created, the originating ASIUs together cancel the successful bus path creations only using the CANNTRY opcode, and reissue the cancelled creation requests after a semi-random interval. So long as the semi-random intervals are computed differently for each local web module there should eventually come a time that one or the other of the two transfers gets all of the paths it needs to proceed.

Required Buffering
SIWEB Outer ASIU

When a HOASIU is sending data to a local web port and the local web port runs out of space to put it, the local web issues a busy signal to the HOASIU by switching SCON low during the SCON=ready slots. The data flow does not stop immediately, however, because:

1) the local web may have to wait a clock to assert the busy, 2) there's a one clock delay through the SIWEB before the SCON gets to the outer ASIU, 3) the outer ASIU needs a clock to respond to the busy, 4) even after the ASIU has stopped shipping data, there may still be some in the SIWEB going to the local web.

The following diagram shows this loop. If the local web port receives a word during clock N that makes it decide to issue SCON busy, it can still receive data continuously up till clock N+4. This implies that the local web should issue the busy signal while it still has 5 or more words of buffer left to store the data in (1 word for the data that arrives during clock N, plus 4 for the overrun data).

For safety's sake, the amount of buffer left that triggers a SCON busy should either be programmable, or greater than or equal to 8.

ASIU Simplified Subbus Definition

The simplified subbus provides a subset of the Subbus functions in a simplified format that reduces the cost of interfacing a slave circuit to the Subbus network.

There is a variant of the simplified Subbus called the CASIU that we use with the SPE and PBM local webs, which is described in a later section.

I/O:

The simplified Subbus has 16 bidirectional data lines, a 3 bit port select, an INFLAG signal to control the direction of data flow, a 2 bit control bus, and 8 ready inputs (each slave on the simplified Subbus drives only 1 input). The total I/O count for the slave is 16 bidi, 1 out, and 6 inputs.

The CONO:1 commands are:

0 - noop
1 - LDIA - load initial address, used only when INFLAG = 0. Address is present on SDAT during time SCONO:1 = 1.
2 - DATIO - read or write data depending on state of INFLAG. For output (write), ASIU issues commands on CONO:1 in sync with the data on SDAT. For input the ASIU can handle a constant delay of 0 to 14 clocks from the time (both CONO:1 equals DATIO and all the readys are high) to the time the data is placed on SDAT. Timing details below.
3 - illegal, not used.

The ASIU also provides an 8 bit address bus, which the slave can use in place of an internally generated address based on an initial address from the ASIU data bus.

The ASIU can if required provide a fourth port select bit.

Idle State:

Normally the ASIU drives the SDAT bus to 0000 while the slave circuit leaves it undriven, CONO:1 = 0 (noop), INFLAG = 0 (output from ASIU to slave), and the slave readys = 1.

Output Transfers:

The ASIU switches the port select to the desired value and the INFLAG to 0 one clock before it starts issuing commands or data to give the port select time to stabilize in the slave circuit, thereby avoiding the cost of D flipflops in the port select or INFLAG signals. The CASIU will hold the port select and INFLAG steady throughout the transfer, and for 1 clock after the last word is on the data bus.

The default initial address is 0000, and the slave circuit should initialize its internal address counter to 0000 when the port select is 0 so that it will be 0 at the beginning of each transfer. This implies that port 0 cannot use the address, and should be used for a single control word, or not at all.

If the ASIU needs a different initial address, it will issue the command LDIA with CONO:1 = 1 while the initial address is on SDAT. The slave circuit should load the initial address from SDAT to its internal address counter.

The ASIU will then issue DATIO commands (CONO:1 = 2) with each data word that it places on SDAT.

If the slave cannot accommodate the data, it can switch its ready signal low to block the flow of data. The ASIU assumes that the slave ignores any commands issued when the ready line is low, and the ASIU keeps repeating that command until the slave switches the ready high.

The slave can also switch the ready low as soon as its port is selected to hold off the initial address load.

Prop delays prohibit using the value of CONO:1 during clock n to determine the state of the slave's ready during time n, i.e. there isn't enough time to generate the command, pass it from the ASIU to the slave circuit, decide whether to accept the command, generate a ready, and pass it back to the ASIU. The slaves can, however, use the port select to determine the state of the ready.

Each time the slave accepts a word from the ASIU it should automatically increment its address so that the first word gets stored at the initial address IA, the second at IA+1, the third at IA+2, etc.

Input Transfers:

For input transfers the default value of the initial address is also 0000. If the transfer does not require a different initial address, the ASIU can switch the port select to the desired port and the INFLAG to 1 immediately. For an initial address other than 0000, the ASIU first selects the desired port with INFLAG = 0, then outputs the initial address as for an output transfer, then switches the INFLAG to 1, waits a clock, and starts issuing DATIO commands. The ASIU will drive the data bus during the clock in which it switches the INFLAG, and the slave circuit will drive it thereafter.

To simplify the slave circuit's input transfer, the ASIU assumes that each time it issues a DATIO command while the slave's ready is 1 the slave will increment its address counter. The data Distributed I/O:

The simplified Subbus supports distributed I/O of the sort that occurs in the SPE Array, in which we have a logical module spread over several board pairs with multiple ASIUs, each controlling a part of the whole.

There are, for example, six MICC microcode address generators, each of which provides the address for part of the SPE microcode memory. When the user wants to specify an initial microcode address and loop count for executing a macro, he wants for speed's sake to be able to output the address and loop count to all MICCs simultaneously rather than each in succession. For test purposes, however, we would like to be able to read back data from each of the MICCs individually.

The ASIU has a port group selection option that is enabled by a bit in the FITS mode control register which uses the 12 lsbs of the port select to select one or a group of the ASIUs, and one of 16 ports controlled by those ASIUs.

```
 15         12 11           08 07        04 03         00
----------------------------------------------------------
|  PS12:15   |     MASK      |   ASIU SEL  |    PORT    |
----------------------------------------------------------
```

PORT selects one of the 16 ports connected to the ASIU. Port F is reserved for controlling the ASIUs when two of them have to cooperate on a transfer. The slave circuits typically use only ports 0 through 7, as described earlier.

The ASIU SEL selects one of up to 16 ASIUs in the group.

The MASK suppresses comparison of bits of the ASIU SEL field. If, for example, ASIU SEL = 0 and MASK = 1, the comparison for bit 04 of the port select is suppressed, and both ASIUs 0 and 1 are selected. If ASIU SEL = 7 and MASK = 3, then ASIUs 4, 5, 6, and 7 will be selected.

PS12:15 functions normally, and can be used to select one of 16 groups of ASIUs, or one group of 16 ASIUs and 61,440 other individual ports, or whatever.

INPT - 0 = default, 1 => input on trigger.

ENDT - 0 = default, 1 => append ENDDAT to triggered data. Used to pull in data from very simple interfaces, as in receiver to signal processor differential interfaces. Uses two timing signals, sync and data valid. A low to high transition on the sync identifies a point in time, typically the start of a look's data. The data valid indicates what words in between syncs are valid. Once the ASIU is armed by loading the control register, it waits for the low to high on the sync, then passes data whenever the data valid signal is high.

If ENDT = 1, when the sync makes a high to low transition the ASIU appends an ENDDAT opcode to the data, which tells the device receiving the data (typically a PBM) that the data transfer is over. The PBM must then arrange for another input transfer from the ASIUs before they will be ready to respond to another low to high transition on the sync. The minimum gap between high to low and low to high transitions on the sync is somewhere in the vicinity of 5 microseconds plus 20 times the clock period of the differential interface, and depends on lots of factors, many of which are unpredictable at this time. It is possible to reduce the minimum gap to less than a microsecond by using a full differential Subbus interface with ASIUs located in the LRU that is shipping the data, which are controlled by a universal widget #1 that provides the control required to demarcate the blocks of data.

Maximum data rate is 20 MHz (probably much less over TTL differential lines).

Details may vary during the ASIU implementation.

The slave's ready can control the rate at which data is read or written only in modes 0 and 4, when a single ASIU controls both the address and data. When the address control is in one ASIU and the data handling in another, the slaves must leave the readys to the data handling ASIU high, but can use the readys connected the the address handling ASIU to regulate the transfer.

When the address controller and data handler are in separate ASIUs they must both be driven by the same physical true Subbus, so they can coordinate the transfer by observing the MCON signal. The master of the bus will issue the select port for input, the address handling ASIU will respond by switching SCONrdy low and holding it low until the slave's readys are high, then start the transfer.

For inputs, ordinarily the address controller issues up to 12 DATIOs to get 12 words flowing to the data handler (which has >15 words of internal buffering available), and will thereafter send an additional word for each MCON that it has seen on the true Subbus. For checksum inputs the address controller changes the address continuously.

MICC Details

Normal MICC Ports:

| Port | Addresses | Function |
|---|---|---|
| 0 | not used | OLDSETUP, bit 00 = 1 => old code setup coming Output only port, switch ready line low if off-line buffer is full, and hold the ready low till the off-line buffer is empty. |
| 1 | not used | SPE Select (bits 00:03), output only, may be ignored except when in microcode read/write mode. Ready = 1. |
| 2,3,4 | | noop, used by other CGAs. Ready = 1. |
| 5 | 0:3 | 0 = Initial Address<br>1 = Loop Count 0<br>2 = Loop Count 1<br>3 = Loop Count 2 |

Loading Initial Address and deselecting port marks end of setup, which tells the MICC that it can start the new macro as soon as it finishes the ongoing one.

A read from this port reads data from the off-line setup buffer, not the working latch file, and does not start a new macro.

Only the two lsbs of the address are important, the others should be ignored.

Ready = 1.

For old code port 5 addresses 0:3 (only the two lsbs are important, the rest should be ignored) are equivalent to old Subbus addresses 0140:0143, which are noop, FINCS counter, MIA, and loop count. Ready = 1.

| 6 | not used | For newcode, MICC state, input only, ready = 1. |

MICC State, input only. The value returned should be 8000, 0000, or 0001 as described in the APC CPU BIFs document. The MICC should place the value on SDAT one clock after the port select = 6 and INFLAG = 1, and hold it there until the port select/INFLAG change, so that the effective delay from OPCDNO:1 = DATIO to the time the data is present on SDAT will be 0.

For old code port 6 this is an output only port, and the MICC should hold the ready line low until the MICC is quiescent. This is equivalent to old code Subbus address 0168.

Slave00, and Slave32 applications.

For input with a value of 5 the Master MICC only should pass the data coming out of micromemory bits 080:095 to SDAT through a 1 register delay.

For input with a value of 7 the Near Master MICC only should pass the data coming out of micromemory bits 112:127 to SDAT through a 1 register delay.

IXR Details

Normal IXR Ports:

Port 0 = OLDSETUP, bit 00 = 1 => old code setup coming, output only, switch ready line low if off-line buffer is full, and hold the ready low till the off-line buffer is empty.

Port 1 = SPE Select (bits 00:03), output only, may be ignored except when in microcode read/write mode. Ready = 1.

Port 2 = For new code, ready = 1, read or write, accesses MIXR off-line latch file. In the GIXR this port is a noop. Only the 4 lsbs of the address matter.

For old code, this port is output only with ready = 1. It accesses the MIXR and GIXR latch files using the intertwingled order used for old code Subbus addresses 0100:011F.

```
0100 - Load MIXR latch 0
0101 - Load MIXR latch 8
0102 - Load GIXR latch 0
0103 - Load GIXR latch 8
0104 - Load MIXR latch 1
0105 - Load MIXR latch 9
0106 - Load GIXR latch 1
0107 - Load GIXR latch 9
0108 - Load MIXR latch 2
0109 - Load MIXR latch A
010A - Load GIXR latch 2
010B - Load GIXR latch A
...
...
0118 - Load MIXR latch 6
0119 - Load MIXR latch E
011A - Load GIXR latch 6
011B - Load GIXR latch E
011C - Load MIXR latch 7
011D - Load MIXR latch F
011E - Load GIXR latch 7
011F - Load GIXR latch F
```

Port 3 = For new code this port is the GIXR off-line latch file. Addresses 0:F (bits 04:15 of SADR should be ignored) load latches 0:F. Ready = 1, and this is a read/write port.

proper times.

For inputs with a value of 6 the EVEN MIXR should do likewise for bits 096:111.

When the ASIU selects the SBGLOK port, however, the GIXR should examine the microcode that tells it what to do, determine whether the SBGLOK RAMs will be available for initialization, and issue a ready signal to the ASIU when the GIXR can accept data from the Subbus. Note that this ready signal is independent of the values on the Subbus control bus.

Loading the SB GLOK is singularly ugly in that both the MIXR and GIXR must cooperate in loading it, with the GIXR providing the address and the MIXR providing the data, as shown in the APC SRU interconnection document. This regrettable situation is caused by the low number of bidirectional drivers available on the CGA chip. This implies that the MIXR (off-line MIXR only in double-buffered applications) must pass data from the Subbus through one or two clock delays (whatever is required to get the data to the SB GLOK when the write cycle occurs) to the MIXR's SB GLOK data drivers. The MIXR uses SBGWOE- from the GIXR to turn on its drivers if either:

a) the MIXR is in the single buffered application, and its the SBG port is selected, or b) the MIXR is in the double buffered application, and is the off-line MIXR.

Local Web Applications

The local web's job includes:

1) internal operations - for the SPE array these include SPE to SPE transfers, table lookups, etc. These operations are largely unrelated to the Subbus interface system.

2) transfer setups to a remote elemental array - while this is not the most efficient way of controlling data transfers between modules in a predictable application, it may prove necessary for some unpredictable ones to avoid excessive loads on the CtoC Subbus. If an SPE array, for example, wants to write data into a bulk memory through a pipe composed of Subbuses, it can execute one of the PBM's BIFs that will generate a setup data block, then transfer it to the PBM's microcontroller through the pipe, wait for the PBM's microcontroller to get ready, and then start writing the data through the same pipe.

3) Pass messages from one control CPU to another through the data pipes rather than the CtoC bus - this is similar to 2) above.

4) Execute data transfers between elemental arrays. These can occur with the local web operating as the master, or as the slave; and in addition can be either input or output.

5) Destroy entire path, or prune it by eliminating the paths connected within one or more SIWEBs.

ASIU Support for Local Webs:

The local webs have a lot to do, and some unique problems due to their partitioning and the number of ports connected to them. They consequently rely on the control ASIU and the outer ASIUs for considerable support.

1) The sliced partitioning of the local webs, and the high number of ports connected to them, makes it too expensive to provide full Subbus capability in the webs, so we've transferred almost all of the Subbus protocol interpretation load to the ASIUs. For example, port select comparisons or tag comparisons are difficult to do in a sliced structure because the I/O required to combine the results of each slice's part of the comparison and distribute the result to all slices is high, and doing it for several ports is prohibitive. To get around this the ASIU performs the port select and tag comparisons for the local webs.

2) It is also expensive to provide a dedicated Subbus control circuit for each port (at least in the PBM WEB, which has 8 of the dratted things), so the outer ASIUs need to allow for prowling intellects in the webs (called Subbus Port Intelligence Devoted to Exchanging Roles in the PBM, or Designated I/O Controllers in the SPE Array) that service ports as necessary. If an outer ASIU, for example, receives the first of a batch of data that must be passed to the local web, it requests a prowler and waits till one is available before passing the data along.

3) There can be 1, 2, or 4 buses in a pipeline. If they all operate naturally, then the multi-bus pipes will present data to the local web on each of the pipes whenever it's available, rather than in synchronized groups of 2 or 4 words. This makes the local web control and data buffering circuitry too expensive, so we've rigged the ASIUs so that they will present the data to the local web in synchronized groups of words. This places a restriction on what combinations of motherplate ports may be grouped together to form a 2 or 4 bus pipeline. For a 2 bus pipe the physical number of one of the buses should be a multiple of 2, and the other should be that number plus 1. For a 4 bus pipe the physical number of one of the buses should be a multiple of 4, and the other three should be that number plus 1, plus 2, and plus 3.

4) The amount of memory required to hold the Subbus opcodes and data to control a data transfer is much greater than what we can fit into a CGA in this generation, so the local web depends on the control ASIU Subbus convertor to buffer the Subbus protocol and pass it through the unwitting local web to the outer ASIUs.

Since there are several ports on the local web there may be several operations going on simultaneously. This implies that the ASIU Subbus convertor must support several queues simultaneously, and pass the data from those queues to the local web in an interleaved fashion. This "Multiple Interleaved Queue Intended for Multiple Asynchronous User Support" feature also supports mixtures of different kinds of operations, such as transfer setup on one port, at the same time as a CPU to CPU message is passing on another port, at the same time as designated I/Os 0 and 1 are occurring on two other ports. How many things one can actually do simultaneously may be limited by the number of prowling intellects available in the local webs.

5) The amount of intra CGA memory required to buffer an array to array transfer without peristalsis is too large for the webs to handle alone, so during such transfers the Outer ASIUs make the status of their buffers available to the local webs using the exposed buffer mode.

Multiple Queue Simplified Subbus Commands

SCONO:3

| Opcode | Function |
|---|---|
| 0 | Noop |

1. Initial Address Out
   Specifies the initial address to access. Used in the SPE Array to access the LUT, and in the PBM to access the microcode memory. In the SPE array the local web doesn't provide the address for the microcode I/O, serving instead only as a conduit for the data.

2. Outer Port Group Select
   SPSO:2 specifies the initial outer port number, and each two bit field of the data bus (00:01 is the first two bit field, 14:15 is the last) specifies the pipe width (0 => 1 bus wide, 1 => 2, 2 => 4, 3 is reserved).
   OPGS = Outer Port Group Select F. Input Flags
   SPS = 0 => SCON from the local web's outer ports. Outer ports that are driving SCON return 0.
   SPS = 4 => Outer Port Ready flags - return 0 for those outer ports that the spiders or the designated I/O are currently using, return 1 for those that are available. In the PBM these flags come from the CCC.
   SPS = 5 => bit 15 = APC<->PBM or SPE I/O ready flag. 1 => ready for a contiguous group of 4 words. In the PBM this flag comes from the CCC.
   SPS = 6 => Spider Idle flags -
   In the PBM:
   bits 0->n are the ready flags for spiders 0->n (1 => ready)
   bit 15 = 1 if any spiders are ready, and bit 14 = 1 if the PBM central resources are available.
   In the PBM these flags come from the CCC.
   In the SPE Array:
   bits 0->n are the ready flags for designated I/O 0->n (1 => ready), and bit 15 is the setup ready flag, and = 1 if the off-line setup buffers are completely empty.

8. Data Out (CASIU to web)
   If SPSO:2 = 5 (outer port group I/O), then output data on CASIU data bus to outer port(s) selected by OPGS with MCON = 1, so the outer ASIUs will treat the outer ASIUs based on the header's initial local web port number, the pipe width, and the existing paths. The Arbiter passes the wakeup command on to the outer ASIUs, which eventually win the paths for the CASIU's transfer and inform the CASIU about each path win via the Arbiter's buses.

4 Load OPnCON State

OPGS selects the group of outer port controllers that will be affected. The local webs force the controllers to the state specified by the 2 bit fields of the data bus (00:01 is the first 2 bit field, 14:15 is the last).
0 = idle, 1 = HTOC (Outer ASIUs -> Local Web/CASIU),
2 = CTOH (Local Web/CASIU -> Outer ASIUs), 3 = disaster.

6 Pulse Ready

OPGS selects what port or group of ports to pulse ready on. Used when the local web's outer port controllers are receiving data from the HOASIU and are holding the SCONardy slots in the busy state. CASIU uses SCON slotted timing to issue this command in sync with the local web/SIWEB SCONardy slots.

Sliced Support:

Normally all I/O occurs in parallel, 16 bits per clock. Sliced structures, however, such as the local webs, need to get all 16 bits of some words of the setup information entirely into all slices, so the CASIU also handles serial 8, serial 4, and serial 2 I/O formats. The serial 4 format, for example, uses 4 successive clocks to transfer a 16 bit data word. During the first clock it places bits 00:03 of the data word on each of the four nibbles of the data bus, during the second clock it places bits 04:07 of the data on all nibbles of the bus, etc. The detailed timing is shown later in this section.

The PBM Web doesn't use any serial I/O.

The SPE local web uses serial 4 format for many of its ports.

SPE Array Local Web Details

The SPE WEB port assignments and functions are:

Port#   Function               (Port# = SPS0:2)

0    Old Code Setup - output only, single buffered, serial 4. Bit 00 = 1 when the following setup will be old code. The CASIU loads this port once per macro setup. The SPE WEB should clear the setup buffer ready flag when the CASIU loads this port, and set the ready when the SPE WEBs start a new macro after all SPE WEB setup buffers can accept another setup.

1    Selected SPE # - output only, double buffered, serial 4. 4 LSBs specify initial SPE select, default value is 0. The microcode and LUT read operations also use this to select which LUT or micro field to read. Used for both old and new code.

2    SPE order table - output only, double buffered, serial 4. Uses format defined in CPU BIF document. For 8 SPEs there may only be two words to addresses 0:1, for 4 SPE arrays there may only be 1 word to address 0. For old code the buffering of 4 order tables takes place in the controller CPU, as does the selection and output of one of the four to the SPE WEB.

3    Array State - output only, single buffered, serial 4. Bit 00 is the SPE array state. 0 => normal, 1 => rotated. Amount of rotation depends on number of SPEs in array, see Shauck. Used only in new code, and probably rarely there.

6    Designated I/O 0 Control -
      For new code setups;
        output only, single buffered, serial 4 format.
      For old code setups;
        the first of the seven deadly words.
        output only, double buffered, serial 4 format.
      For both old and new code the Designated I/O #0 ready should be 1 when the SPE WEBs can handle a port 6 output.

For new code the control word defines what the SPE WEB is to do for the designated I/O. The format is:

| MSB 15 | | 10 | 09 | 08 | 07 | | 04 | 03 | | LSB 00 |
|---|---|---|---|---|---|---|---|---|---|---|

Subbus protocol does not apply.

The Loop and Load bus tells the SPE WEBs when they are in the micromemory load mode, and the data input/output command on SCONO:3 tells them whether it is a read or write operation. The command on SCONO:3 will be continuous throughout the operation.

For a MIC micromemory write operation, the SPE WEBs in the SPMs just echo the data on the Subbus to the SPEs through a 1 clock delay.

For a MIC micromemory read operation, the SPE WEBs select part of the data coming back from the SPEs and echo it to the Subbus. What part to pick is controlled by the Selected SPE # as defined in the CPU BIF document. Note that the SPE WEBs only pay attention to the 2 LSBs of the selected SPE #, while the ASIU uses the 2 MSBs to select one SPM, or the other, or the microcode on the APC SRU.

5 if
MI R/W

LUT. parallel format. For reads, selected SPE # determines what LUT is read. A 16 SPE array has LUTs 0, 1, 2, and 3; an 8 SPE array has LUTs 0 and 1; and a 4, 2, or 1 SPE array has LUT 0 only. For outputs the local web should write all the LUTs in parallel with the same data. For reads, the local web should change the LUT address in accordance with the Data In/Data In with No Address Update commands, and pass the output of the selected LUT to the CASIU data bus through a fixed delay. No FIFO style buffering is required.

LUT access is through the SPE WEBs and CASIU on the SPM board pairs.

The LUTs are accessible only during the microcode load/read mode.

This port has a default initial address of garbage, so the CASIU must always load an initial address before reading this port, even if the initial address is 0000.

Designated I/O Interrupt:

The SPE WEBs should issue this interrupt when:

one of the designated I/O controllers becomes ready, or the setup ready flag switches to ready.

Oldcode Macro Setups:

When the CASIU has a macro setup ready to go, it waits until the setup ready flag is 1, then outputs the old setup flag to port 0 first. The SPE WEBs zero the ready flag when port 0 gets loaded.

The CASIU then loads the rest of the setup into the appropriate ports in whatever order they were received from the CPU pair while ignoring the SPE WEB's setup ready flag.

If part of the setup includes an oldcode I/O transfer, the meanings of the designated I/O registers are different. The CASIU:

saves the header, which is also the NPBM I/O control word,
sends out the first of the seven deadly words to the designated I/O #0 port after the designated I/O #0 ready flag is high,
waits until the Outer Port ready flags are all high for the group of local web outer ports that are involved in the transfer,
outputs the leading Subbus protocol block,
reverses the bus direction to outer ASIU -> local web if the transfer is inbound,
sends out the NPBM control word to the designated I/O #1 port after the designated I/O #1 ready flag is high,
waits again until the designated I/O ready flag is high, which implies that the array is done with the transfer, (or, if possible, waits until the outer ports involved in the transfer are all ready (OPnCONs in idle state) - this approach is faster than waiting for the designated I/O ready flag when the transfer is inbound), and
finally outputs the trailing Subbus protocol block.

CPU to CPU Messages:

These are located in 4 queues, one for each SPE WEB outer port. These queues operate independently of the macro setup queue. When the CASIU has a message waiting for one of the outer ports and the outer port is ready, the CASIU sends out the message.

This implies that the CASIU in the SPE WEB application has 5 interleaved jobs, and when the one it is working on becomes blocked (due to a busy outer port, for example) the CASIU should switch to another that is not blocked.

The macro setup job is the highest priority one, and when the SPE WEBs issue the Designated I/O interrupt the CASIU should drop whatever it is working on as soon as decently possible, and start shoveling the macro setup queue again.

ready only when it has buffering available for 16 or more words, and the CASIU will ship the words in contiguous blocks of 16 words. The total number of words is an even multiple of 16.

The local web should switch its ready flag to busy when it receives the first of a group of 16 words if it will have space for fewer than 16 words left after it stores this group of 16. PBM->APC transfers should switch the ready flag similarly.

5     Outer Port transfer port - parallel format.
Same as 4, but accesses the outer ports, and word group size is 8.

6 if MI R/W     PBM micromemory read/write data path
This is an abnormal Subbus mode in which the PBM CCC serves only as a conduit for the microcode going to or from the microcode RAMs, and the normal Subbus protocol does not apply.

The FITS Interface tells the PBM CCC when it is in the micromemory load mode, and the data input/output command on SCONO:3 tells it whether it is a read or write operation. The command on SCONO:3 will be continuous throughout the operation.

Spider Idle Interrupt:

The PBM CCC should issue this interrupt whenever one of the spiders becomes idle, i.e. finishes its transfer.

d) loads OPGS (Outer Port Group Select) to identify what local web outer port group the PBM spider will be using.

e) executes a Spider Wakeup command, which assigns an idle spider (what spider it is is arbitrarily determined by the hardware), and tells it by way of OPGS what outer ports, if any, it will be using. Both CCC and slices assign the same spider at the same time.

f) outputs the PIXR setup information, which is stored in the slices. The PBM microcode uses this information to initialize the PIXRs before it starts transferring data. The setup data always is output in blocks of n*4 contiguous words, and the maximum PIXR setup is 32 words. This data goes to port 1, and the last word will be sent with Data Out (not Last Opcode Out). The CASIU must synchronize the data outputs with the SCON slotted timer.

g) outputs the CCC setup block of exactly 4 words contiguously to port 2 using Data Outs. This setup includes microcode initial address, priority, and loop counts. Receipt of the last of the four CCC setup words tells the CCC spider that it can start setting up the PBM PIXRs using the PIXR setup stored in the slices. The PBM spider suspends program execution when it is ready to start transferring data, and waits for a L.O.O. opcode from the CASIU.

h) As the outer ASIUs acquire control of their respective buses, they send acknowlege opcodes to the CASIU via the Arbiter control buses. The CASIU saves these acks as they arrive regardless of what else it may be doing. When all the outer ports associated with the transfer are ready, the CASIU outputs the leading Subbus protocol block to the outer ASIUs. Usually the CASIU sends the same control block to all outer ASIUs simultaneously, but it can send each of them individualized control blocks if necessary. The CASIU outputs the protocol in blocks of n*8 contiguous words, and assumes that the outer ASIUs can initially accept 16 words, after which the CASIU checks the outer ASIU ready flags before each group of 8 words.

i) The last word of the control block will be either SPIDI or SPIDO, to tell the outer ASIUs whether the data flow will be outbound or inbound. Upon receipt of the SPIDI or SPIDO opcode the HOASIU will switch to the exposed buffer mode, so the CASIU must immediately after issuing the SPIDx opcode switch the OPnCON state to HTOC if the data flow is inbound, and also immediately issue a L.O.O. with SDAT = 0000 to tell the CCC spider to start counting the G4 pulses associated with the exposed buffer mode.

For outbound transfers the outer ASIU pulses the SCONrdy high once for each G4 (group of 4 words) that it has space for, or has made space for by passing them on to the next station on the Subbus.

For inbound transfers the outer ASIU switches the bus direction in response to the SPIDI, then pulses MCON high once for every G4 that it has space for, or has made space for.

the outer ASIUs, wait for the outer ASIUs response if necessary (e.g. for verification of checksum), put the OPnCON controllers in the idle state, and quit.

End of Inbound Transfer:

For inbound transfers the outer ASIU signals the end of the data by sending the command ENDDATsrs to the slices, which relay it to the CCC spider. When the G16 buffer is empty the CCC spider executes a line of microcode that terminates the transfer.

Inbound CASIU Messages - shows how the HOASIU and CASIU handle and inbound message.

Array Messages - same as CASIU messages except that part way through the transfer the local webs take over the buses and transfer data to or from either the SPEs in the SPE array, or the memory elements in the PBM array.

Exposed Buffering - describes how the outer ASIUs reduce the local web buffering requirements, by letting the local web see how full the ASIU buffers are.

Destroy Local Path - shows what the local web has to do to initiate and/or support path destruction.

Short Range Parallel Commands

These commands go from the local web's port to the outer ASIUs located on this SIWEB only. They are restricted to using values 00 and 01 in each of the eight 2 bit fields of the data bus, see Short Range Serial Commands for details.

| Opcode MCON/Bus | Function |
|---|---|
| 0/0000 | Noop |
| 0/0004 | SPIDOsrp - tells the outer ASIUs that the local web port has finished outputting the control block, and will output the array data. |
| 0/0005 | SPIDIsrp - tells the outer ASIUs that the local web port has finished outputting the control block, and will start inputting the data for the array. This command kicks off a bus reversal, in which the HOASIU issues a CASIUwu in the SCON=Localwu slot, but no CASIUwu/srs. |
| 0/0001 | ENDDATsrp - tells the outer ASIUs that the array data output is done, and terminates the transfer. The HOASIU and outer port controller reverse the bus direction and the outer port controller goes idle, leaving the HOASIU to ship the rest of the data and perform any cleanup required, such as destroying paths, before going idle itself. |

For array data inputs, the HOASIU terminates the transfer with the ENDDATsrs command.

the ATN can precede the the verify command.

The outer ASIUs give inbound messages priority over outbound messages. If an outbound message conflicts with an inbound one, the outer ASIU directs the outbound one to the bit bucket, buffers up the inbound one, and issues CASIU wakeup until the CASIU responds.

Mixing Input with an Outbound Message:

The CASIU performs a normal outbound message until it reaches the point at which it wants to input data. It then ships the DOIN opcode to the outer ASIUs, immediately switches the OPnCON state to HTOC, and receives the input data. The HOASIU terminates the message with ENDDATsrs, which puts OPnCON in the idle state. The CASIU puts OPnCON in the CTOH state to resume the transfer. The delay from ENDDATsrs to CTOH is not critical, the outer ASIUs will receive and ignore 1/FFFF until loading OPnCON with CTOH switches the bus to 0/0000, whereupon the outer ASIUs will start paying attention to the bus again.

Array Messages

An array message is identical to a CASIU message, except:

1) it may involve 2 or 4 buses operating in parallel rather than just one for a CPU to CPU message.

2) part way through the message the CASIU turns control of the buses over to the spider (or designated I/O controller in the SPE application) using either the SPIDI or SPIDO commands so the spider can shovel data to or from the elements in the array. SPIDI designates an inbound transfer, SPIDO an outbound transfer. For SPIDI the CASIU must immediately change the 3) upon receipt of the SPIDx command the outer ASIUs change bus direction if necessary, and switch to the exposed buffering mode to handle the array data until the end of the data.

For outbound data flow, the spider will restore control of the buses to the CASIU by going idle, and the CASIU will output a trailing Subbus protocol block, the first word of which will be ENDDAT.

For inbound data, the source of the data will send an ENDDAT opcode, which the outer ASIUs will reissue as the ENDDATsrs opcode to the local web.

Restriction:

When operating in the exposed buffer mode, and
the transfer is outbound, and
the local SIWEB path connects to more than one outer ASIU, then
you're in trouble. The SIWEB will AND the SCON signals from the two or more outer ASIUs together, which will tend to suppress G4 pulses going to the local web because the outer ASIUs have no way of issuing their G4 pulses in sync. Consequently outbound array data transfers from the local array must involve paths in which each bus through the SIWEB connects to two and only two ports - one a local web port and the other an outer ASIU.

Data Output From Master Module to Plate

Path Creation:

Creating a path is a two step process. First the CASIU uses the Arbiter to create a path in the local SIWEB, and then the local web's control ASIU ships a set of control words to the outer ASIUs, which use them to create extensions of the path in remote SIWEBS.

The path creation BIF doesn't explicitly differentiate between local and remote SIWEBs, so the BIF's microcode or more likely the CASIU must check the port ID of the first SIWEB specified to see whether it is local or not. If it is local, then the path spec goes to the Arbiter.

Data Transfers:

Once the path is created, the ports on the path can perform an unlimited number of data transfers before destroying the path. They can also mix in path addendums (that add more ports or buses to the path without destroying the original path), or path prunings (that delete part of the path without destroying the original path). There are several types of data transfers one can perform that involve the local web. They are:

scheduled array data output - in this a master array outputs data to a slave array, and expects the slave array to know what to do with the data. The master array is the one that issues the port selects. One array's control CPU pair sets up the output for its array, while the other control CPU pair sets up the other array independently. This foresighted style of control, in which each CPU pair knows what to do next, is most efficient, but sometimes not possible except by using control CPU to control CPU transfers on the CtoC bus, which increases the load on the CtoC bus.

random emission array data outputs - in this output the master array first outputs a block of control data to the control CPU pair of the slave array over the same data buses it will use to transfer the data, then ships the data. The slave CPU pair receives and interprets the control data block, then sets up its array to receive the data as directed by the master CPU pair. A variation on this that may prove possible (TBD during U/W1 design) would be to have the master CPU pair completely prepare the setup for the slave array, and then have the slave array's local web's control ASIU pass the setup directly to the slave array's microcontroller without involving the slave array's CPU pair. This approach to controlling the transfer makes some types of processing easier to control at the expense of more dead time on the data buses.

Scheduled Array Data Input:

Same as above, except for direction of data flow and for parts of the contents of the leading and trailing Subbus protocol blocks.

Random Emission Array Data Out/Input:

Same as above, except the leading Subbus protocol block has a verify command just before the SPIDI/SPIDO command that confirms the path for this transfer is open before committing the array to passing data. This step is necessary because the array cannot abort an ongoing transfer; and often could not repeat an aborted transfer even if it could abort because in some macros the data used to compute the data transferred is wiped out as the transferred data goes out.

Path Destruction

There are two ways of destroying paths - totally, and by pruning.

Total destruction is simpler. It breaks all the connections in all the SIWEBs that are part of the path the port is connected to.

Pruning a path requires building it so that the part to be pruned exists at a higher level than the rest of the path. One can then delete the topmost level of the path using the Subbus command KILLTOPPATH. The paths are limited to a maximum of 8 (??? TBD during gate level designs) levels.

To the local webs both forms of path destruction look much the same. The control CPU pair passes a path destruction control block that specifies either total or partial destruction to the local web's control ASIU, which passes it on to the outer ASIUs through the local web, after which the local web port becomes absent-minded. The outer ASIUs execute the Subbus protocol associated with the path destruction. If the path in the array's local SIWEB must be destroyed, the HOASIU issues the KILLPATsrs command to the local web port, and that port then helps destroy the path.

```
-------------------------
|   4F      |   FF      |
-------------------------
|   VIOB    |   00      |
-------------------------              DA
|       ADDR            |   >-->   -------------------------
-------------------------           |      MADRBASE         |
|   MIXR    |   02      |           -------------------------
-------------------------           |      MADRINC          |
|   GIXR    |   03      |           -------------------------
-------------------------           |      GADRBASE         |
|BEGARRADATA|   02      |           -------------------------
-------------------------           |      GADRINC0         |
|  OUTPORT  |   01      |           -------------------------
-------------------------           |      GADRINC1         |
|  SPEDAT   |   00      |           -------------------------
-------------------------           | 0000 (designated I/O 0)|
|ENDARRADATA|   00      |           -------------------------
-------------------------           |      HEADER 0         |
|BEGARRADATA|   02      |           -------------------------
-------------------------           |    OUTPUT PORT 0      |
|  OUTPORT  |   01      |           -------------------------
-------------------------           | 0001 (designated I/O 1)|
|  SPEDAT   |   00      |           -------------------------
-------------------------           |      HEADER 1         |
|ENDARRADATA|   00      |           -------------------------
-------------------------           |    OUTPUT PORT 1      |
|  ORDER    |   04      |           -------------------------
-------------------------           |      OT 0:3           |
| SELECTSPE |   01      |           -------------------------
-------------------------           |      OT 4:7           |
|  MICC     |   03      |           -------------------------
-------------------------           |      OT 8:11          |
|  F0       |   00      |           -------------------------
-------------------------           |      OT 12:15         |
                                    -------------------------
                                    |    SELECTSPE #        |
                                    -------------------------
                                    |     MICCADR           |
                                    -------------------------
                                    |    MICCLOOP 0         |
                                    -------------------------
                                    |    MICCLOOP 1         |
                                    -------------------------
```

This example:

outputs an SPE data memory base address and increment,
    outputs a GLOK memory base address and two increments,
    outputs a setup block for designated I/O #0, whose header specifies what group of outer ports to use, and which then specifies with the port select what other module to do the I/O with,
    outputs a similar setup block for designated I/O #1,

| | | |
|---|---|---|
| 1 | HEADER 0 | defines what outer ports to use |
| 0 | DTOUTPORT | |
| 1 | OUTPUT PORT 0 | |
| 0 | SPIDER | tells CASIU to insert array data here |
| 0 | ENDDAT | marks end of array data for outer ASIUs |
| 0 | DTCAPSULE | end of encapsulation |
| 0 | DTOUTPORT | |
| 1 | 0346 | |
| 0 | DTDATA | |
| 0 | DTCAPSULE | |
| 1 | 0001 (designated I/O 1) | |
| 1 | HEADER 1 | |
| 0 | DTOUTPORT | as above, but for desio 1. |
| 1 | OUTPUT PORT 1 | |
| 0 | SPIDER | |
| 0 | ENDDAT | |
| 0 | DTCAPSULE | |
| 0 | DTOUTPORT | |
| 1 | 0342 | select SPE WEB order table port |
| 1 | OT 0:3 | load order table for SPEs 0:3 |
| 1 | OT 4:7 | load order table for SPEs 4:7 |
| 1 | OT 8:11 | load order table for SPEs 8:11 |
| 1 | OT 12:15 | load order table for SPEs 12:15 |
| 0 | DTOUTPORT | |
| 1 | 0341 | select SPE WEB SPE select port |
| 1 | SELECTSPE # | load selected SPE number |
| 0 | DTOUTPORT | |

| DT | MCON | DATA | |
|---|---|---|---|
| P | 1 | XXX0 | select CASIU OLDSETUP flag port 0 |
| D | 1 | 0000 | OLDSETUP flag = 0, => newcode |
| P | 1 | XXX6 | select CASIU port 6 (nominally desio 0) |
| E | 1 | 0000 (designated I/O 0) | tells CASIU what designated I/O this is |
| E | 1 | HEADER 0 | IP#/PW => what queue to load |
| E | 0 | DTOUTPORT | |
| E | 1 | OUTPUT PORT 0 | |
| E | 0 | SPIDER | tells CASIU to insert array data here |
| E | 0 | ENDDAT | marks end of array data for outer ASIU |
| P | 1 | XXX6 | |
| E | 1 | 0001 (designated I/O 1) | |
| E | 1 | HEADER 1 | |
| E | 0 | DTOUTPORT | as above, but for desio 1. |
| E | 1 | OUTPUT PORT 1 | |
| E | 0 | SPIDER | |
| E | 0 | ENDDAT | |
| P | 1 | XXX2 | select SPE WEB order table port |
| D | 1 | OT 0:3 | load order table for SPEs 0:3 |
| D | 1 | OT 4:7 | load order table for SPEs 4:7 |
| D | 1 | OT 8:11 | load order table for SPEs 8:11 |
| D | 1 | OT 12:15 | load order table for SPEs 12:15 |
| P | 1 | XXX1 | select SPE WEB SPE select port |
| D | 1 | SELECTSPE # | load selected SPE number |
| D | 0 | ENDDAT | end it all |

(MCON = 0 => opcode, = 1 => data)

local SIWEB ID and the path creation spec. The CASIU has to store such creations specially so that when it is outputting that setup it can create that path before waking up the outer ASIUs. The outer ASIUs keep track of what local web outer port they're connected to by monitoring path creations in the local SIWEB, and will ignore any requests the CASIU issues before the path exists.

The CASIU handles this by reserving the first two words of each designated I/O setup for a possible local SIWEB path creation, initializing them to 0000, and storing the designated I/O setup immediately after these words. The number 1 Subbus monitors the data as it flows into the queues and switches a signal high to identify the local SIWEB ID, if any. The CASIU accepts the local SIWEB ID from the Subbus but stores it in the bit bucket rather than in the queue. It then stores the following word, the path creation spec, in the first reserved location, writes the header into the second reserved location with bits 0:3 equal to the designated I/O number so the Arbiter's path creation acknowledgement will go to the proper queue, and continues writing the rest of the designated I/O setup in the usual way.

End of Macro Setup:

An ENDDAT opcode occurring outside the encapsulated data/opcodes marks the end of the macro setup for the CASIU. At this time the CASIU should mark the off-line buffer full. If the on-line buffer is empty, then the CASIU can toggle the buffers and start trying to output the macro setup to the SPE WEBs. If the on-line buffer is full, the CASIU should continue shipping it to the SPE WEBs until it is empty, then toggle the buffers.

How To Get Rid Of It:

The CASIU to SPE WEB interface is defined in earlier Local Web Applications sections.

When the on-line bugger is full with a macro setup, the CASIU waits until the setup ready flag is 1, then outputs the buffer to the SPE WEBs.

The CASIU first outputs queue F, the miscellaneous macro setup queue, to the SPE WEBs. The first output will be to port 0, the old code setup flag. The SPE WEBs zero the setup ready flag when port 0 gets loaded, so the CASIU should ignore that flag except at the beginning of the output.

The XXXn port selects stored in queue F correspond to the port selects defined for the SPE WEB, and may be used directly without modification, except that a bit in the mode control register should optionally suppress outputs to ports 8 through F, because the SPE WEB only has a 3 bit port select, while the distributed ASIU network uses a 4 bit select. It may be simpler to put this suppression in The CASIU waits until the designated I/O ready flag for the queue its working on is high, and outputs the header to port 6 for designated I/O #0 setups, or port 7 for designated I/O #1 setups. The SPE WEBs switch the designated I/O ready flag low until they're done with the SPE array data transfer. The CASIU places the setup queue on hold until the outer ports involved in the transfer are ready, which will occur when the array data transfer is over.

If the transfer is a random emission (header bit 15 = 1), then the CASIU substitutes a VERIFY opcode for the SPIDER opcode, and waits for an acknowlege from the outer ASIUs through the Arbiter before proceeding with the SPIDI or SPIDO opcodes. It may be easier, and certainly will be more efficient, to have the number 1 Subbus insert the VERIFY opcode at this point if required. If the CASIU receives an ATN instead of the ack, the transfer has wiped out, and the CASIU should try to output the designated I/O setup again starting at 1). It should also put the outer port controllers in the idle state.

5) After the array data transfer is over, the CASIU puts the outer port controllers in the CTOH position if the array data was inbound, and outputs the remainder of the setup, which is the trailing Subbus protocol block.

If there is a VERIFY command in the trailing protocol, the CASIU should issue it to the outer ASIUs, and wait for either an ack or an ATN. If it receives the ack, it outputs the rest of the trailing protocol normally. If it receives an ATN, it outputs the rest of the trailing protocol normally, but then places an error message on the queue of messages bound for the APC. The format of the error message is TBD.

Finally the CASIU puts the outer port controllers in the idle state.

6) 1) through 5) repeat for as many designated I/O setups as there are in the queues.

```
E   0   |        SPIDER         |
        -------------------------
E   0   |        ENDDAT         |
        -------------------------
0   0   |        ENDDAT         |   end it all
        -------------------------
``` confusion when a new macro starts at the same time as this input is executed.

Shauck Delay:

In the SPE WEB application Shauck needs a one clock delay from any CASIU to SPE WEB output to any ready flag input, so he can save some flipflops in the SPE WEB.

the CASIU RTC time when the currently executing transfer on the selected queue started, the number of setups in the selected queue's CASIU buffers (8000 => none, 0000 => one, 0001 => two (both buffers full). The value of the last word must be determined at the same time as the third word to avoid confusion when a new transfer starts at the same time as this input is executed.

Temporal Blocking:

Temporal blocking provides software with a way of scheduling the time that a transfer will start. It applies to both the SPE and PBM applications. Software specifies the earliest acceptable time to start the operation in terms of the 32 bit real time clock visible to software, and the APC converts this time to an equivalent time in terms of the 16 bit physical RTC located on the Universal Widget #1, and ships it out to the CASIU immediately after the header. The CASIU can tell that the temporal block is present by noting that there is a data word after the header rather than an opcode. When the temporal block is present the CASIU waits until the CASIU RTC time is later than the specified time, then proceeds with the setup.

When the APC considers outputting a setup with a temporal block it inputs the CASIU status, which includes the current value of the CRTC (CASIU RTC). This 16 bit counter counts at a rate of 8 clocks per quantum, as do the physical counters in the APC upon which the RTC visible to software is based. The APC simultaneously saves the current value of the CRTC and its internal RTC, computes the difference in time between the current time and the temporal block, and outputs the setup if the block is less than 13 milliseconds in the future (range of CRTC is 26 milliseconds). When the APC outputs the setup, it converts the difference to units of 0.4 microseconds (8*50 ns), adds it to the saved value of the CRTC, and outputs it to the CASIU as a 16 bit temporal block.

Multi-bus Path Transfers:

When the APC sends an I/O transfer setup to the PBM CASIU it may use 1, 2, or 4 local web outer ports. If 2 or 4 the CASIU must put the header of the setup in all of the queues used by the transfer to fill those buffers lest a later transfer setup that uses fewer buses sneak in ahead of the multi-bus transfer. The remainder of the transfer setup should go only in the initial port's queue.

Typical PBM Transfer Setup:

A typical PBM transfer setup following number 1 Subbus filtering is:

| DT | MCON | DATA | |
|----|------|------|---|
| P | 1 | XXX0 | (MCON = 0 => opcode, = 1 => data) select CASIU port 0 |

CASIU to Arbiter Interface

The CASIU to Arbiter interface has two parts. The Arbiter monitors the CASIU to Local Web data, control, and port select and executes the CASIU's Arbiter Request commands as defined previously. The Arbiter provides a discrete ready signal that tells the CASIU when the Arbiter is ready to accept another command.

The CASIU also monitors the 4 bit Outer ASIU/Arbiter command buses for Outer ASIU to CASIU commands. There can be as many as 8 Outer ASIUs in those modules that have a local web, so the CASIU has to monitor 2 four bit buses.

Initially the Arbiter drives the 4 bit buses, and issues nibble opcodes to command operations. The opcodes, and their operations, are fairly complex, and the CASIU is only interested in a small part of it, so the Arbiter issues a separate signal that tells the CASIU when the outer ASIU to CASIU communication will be on the bus. There are separate signals for each of the two nibble buses that the CASIU monitors. The signals are in sync with the presence of the HTOCOMM opcode on the nibble buses.

1 - HTOCOMM - Outer ASIU to CASIU communication - the four clocks following this opcode are divided into eight 2 bit fields, one for each of the local web's outer ports. The translation from outer ASIU number to local web outer port number occurs in the outer ASIUs, not in the CASIU.

Bits 00:01 of nibble 0 are for local web outer port 0,
bits 02:03 of nibble 0 for port 1,
bits 00:01 of nibble 1 for port 2, etc.

The commands in each 2 bit field are:
0 - noop,
1 - CASIUwu (outer ASIU waking up CASIU),
2 - Ack (either HOASIUwu ack or Busy Ack, depending on what command the CASIU most recently issued), and
3 - ATN, attention, tells the CASIU that the transfer going through the local web outer port has been rejected.

ATN overrides the other opcodes, and CASIUwu and Ack cannot occur simultaneously.

U/W#1 CASIU Application I/O Count

| I | O | bidi | Function |
|---|---|------|----------|
| 3 | 3 | 1 | FITS (C, D, clkA, clkB, 2-WEs, 1-OE) (The CASIU doesn't require byte WE-s, but the output dedicated to that function in the display applications is not recoverable.) |
| 2 | 7 | 16 | CASIU/Local Web Interface (16 data, 4 opcode, 3 port select) |
|   |   | 18 | Number 1 Subbus |
|   | 13 | 16 | RAM (13 address bits) |
| 1 |   |    | SCONSYNC, lets CASIU synchronize its operations with the SCON=rdy slots |
| 4 |   |    | Arbiter local path creation acknowledge (ALPCACK0:3), 0 => noop, 8->F => path creation done on local web outer port 0->7 |
| 1 |   |    | Arbiter/L.W. interface ready |
| 10 |   |    | Arbiter/Outer ASIU Nibble buses, including HTOCOMM flags |
| 3 |   |    | L&L Bus input, so CASIU can save CRTC time that each SPE macro started execution for later retransmittal to APC. In PBM application CASIU saves CRTC (CASIU RTC) time each time it empties the first word out of a setup buffer. |
| -- | -- | -- | |
| 23 | 23 | 51 | Totals, note O+bidi = 74. |

APPENDIX E

3. EXECUTION PROCEDURES
USER INTERFACE (UIF)

a. modify the address pointed to by a PI-Bus label at run-time. What this means is that a PI-Bus label may be made to point to a local object. In this type of usage, however, care must be taken so that the PI-Bus label is made inactive when leaving the local object's scope. If this is not done, data may be written from the PI-Bus to memory occupied by something other than what was intended.

b. specify a value for the Active and/or Busy bits. If no value is specified for these values, they are set to false.

INPUTS
- Label : Label_Type;
- Object_Address : System.Address;
- Init_Active_Bit : Boolean;
- Init_Busy_Bit : Boolean;

OUTPUTS
- None

WSP USER'S MANUAL

EXCEPTIONS    Illegal_Label_Value

PARAMETERS
   Label    Label that is to be altered by this procedure.

Object_Address    Logical address to be pointed to by Label. It is of System.Address for ease of use.
"Local_Object'Address" is a typical actual parameter expected through this formal.

Init_Active_Bit    Value for Label's Active bit. Defaults to False.

Init_Busy_Bit    Value for Label's Busy bit. Defaults to False.

EXAMPLES

```
Alter_Label_Address(Label         => Label_1,
                    Object_Address => Temp_In_Buffer'Address,
                    Init_Active_Bit => True);
```

NOTE: As a result of this call, Label_1 will point to Temp_In_Buffer, which may be a local procedure object. The label is active and non-busy.

```
Alter_Label_Address(Label         => Label_100,
                    Object_Address => System.Address_Zero);
```

NOTE: As a result of this call, Label_100 points to Temp_In_Buffer, which may be a local procedure object. The label are unactive and non-busy.

```
Alter_Label_Address(Label         => Label_101,
                    Object_Address => Temp_In_Buffer'Address,
                    Init_Active_Bit => False,
                    Init_Busy_Bit  => True););
```

NOTE: As a result of this call, Label_101 points to Temp_In_Buffer, which may be a local procedure object. The label is unactive and busy.

3.1.2 <u>Atomic</u>. Characteristics of this call are:

a. Makes the current active process atomic, i.e., the process may not be preempted. It will continue to execute until it either runs to completion is made non-atomic or becomes blocked on an event/semaphore. For processes defined to be non-atomic this DOS primitive, in conjunction with the Non_Atomic DOS primitive allows a segment of code to become atomic.

b. Informs the DOS that the process is now non-preemptible by a higher priority process.

WSP USER'S MANUAL

INPUTS
  None

OUTPUTS
  None

EXCEPTIONS
  None

PARAMETERS
  None

EXAMPLES
  Atomic;
  ...
  code
  ...
  Non_Atomic;

3.1.3 Change BIU Logical Id.

Characteristics of this call are:

a. Changes the state of a logical identifier in the BIU. This call is most often used by executive processes to enable or disable PI-Bus messages destined for that executive family's processes.

b. Enables/Disables BIU logical identifiers.

c. Normally used by family executive processes when starting up/shutting down a family.

INPUTS
  Logical_Id:  Process_Family_Type

To_Enabled:  Boolean

OUTPUTS
  None

EXCEPTIONS
  None

PARAMETERS
  Logical_Id — The BIU logical identifier to be enabled or disabled. This value will often be a family identifier, but may be used for non-family logical identifiers for application software multicasting.

WSP USER'S MANUAL

To_Enabled    If true, the BIU logical identifier is enabled. If false, the BIU logical identifier is disabled.

EXAMPLES

Change_BIU_Logical_Id(Logical_Id => 50,
                          To_Enabled => True);

NOTE: The above example enables BIU logical identifier 50.

Change_BIU_Logical_Id(Logical_Id => Family_10,
                          To_Enabled => False);

NOTE: The above example disables BIU logical identifier contained in Family_10.

3.1.4 <u>CPU_Input</u>. This call allows data to be input from a remote CPU object to a requesting CPU object. When this call is made, the DOS will determine whether or not the object to be read is local to the module where the call was made. If the object is local to the module, the DOS will copy the data of the remote object to the requesting object. If the object is not local to the module, the data is read from a remote PI-Bus label across the PI-Bus. See Appendix A: User Interface Package Specification for default parameter values.

The user must understand how semaphores may be signalled with a transfer. In the parameter list, the user may provide a semaphore to be signalled when the transfer completes, regardless of the transfer result. The Status parameter can provide the transfer result, if desired. Additionally, if either of the two labels involved in the transfer have semaphores associated with them (see Section ***5.7: Define_SE to see how to associate the two), these semaphores are signalled.

An example for use with CPU_Input is to associate a semaphore with the remote label (i.e., pointing to the data source). Suppose the process that provides the source data doesn't want to refresh it until it has been read by some other process. That first process should associate a semaphore with the label to read from by the second process. When the data is read, the semaphore is signalled and the first process may freely update the data again.

Characteristics of this call are:

a. All transfers are between two PI-Bus labels, even if the two objects are located on the same processor.

b. User has the option of knowing when the transfer completed c. User has the option of finding out what the transfer's result was.

d. Messages are prioritized by the user.

WSP USER'S MANUAL e. User determines whether or not the DOS is to retry a transfer in the event of a failure.

f. Destination processor may be physically or logically selected. User must be very careful that a logical processor selection does not result in more than one remote processor. If it does, the transfer is totally unpredictable.

INPUTS
```
Req_CPU_Object_Label : Label_Type
Rem_PI_Bus_Id        : PI_Bus_Slave_Id_Type
Rem_CPU_Object_Label : Label_Type
Status               : System.Address
Word_Count           : Word_Count_Type
Priority             : Comm_Priority_Type
Semaphore_Id         : Semaphore_Id_Type
Retry                : Boolean
```

OUTPUTS
None

EXCEPTIONS
None

PARAMETERS

Req_CPU_Object_Label — PI-Bus label that points to the destination address for the transfer. This label must be active on the host processor. If a semaphore has been associated with the label, it is signalled after the transfer completes.

Rem_PI_Bus_Id — Physical or Logical processor value.

Rem_CPU_Object_Label — PI-Bus label that points to the source address for the transfer. This label must be active on the processor(s) selected by the Rem_PI_Bus_Id parameter. If a semaphore has been associated with the label, it is signalled after the transfer completes.

Status — Address of an object where the DOS places the transfer's result as an enumeration value. This parameter is passed as an address instead of as an out parameter because of the unknown amount of time between the user's request for transfer and the actual transfer due to PI-Bus contention.

Word_Count — Number of data words to transfer.

WSP USER'S MANUAL

Priority              Priority of the transfer, 0 being the lowest priority.

Semaphore_Id      Semaphore for the DOS to signal when the transfer completes.

Retry                Informs the DOS of what to do in the event of a failure. If true, the DOS retries the transfer until it reaches the threshold values set in the Sysgen Parameters (Section 4.1).

EXAMPLES

```
CPU_Input(Req_CPU_Object_Label  => In_Label_170,
          Rem_PI_Bus_Id          => Family_17_Processor,
          Rem_CPU_Object_Label   => Out_Label_150,
          Word_Count             => 10);
```

NOTE: The above example is representative of the minimum number of parameters for a call to CPU_Input. 10 data words are transferred from the Family_17_Processor module, Out_Label_150 label to the host processor, In_Label_170 label. No semaphore is signalled after the transfer completes, no status are returned. If the transfer fails, it are retried since the default value for the Retry parameter is True. The transfer is queued and sent at a default priority.

```
CPU_Input(Req_CPU_Object_Label  => Label_A,
          Rem_PI_Bus_Id          => Memory_Module_Physical_Id
          Rem_CPU_Object_Label   => Label_B,
          Status                 => Transfer_Status'Address,
          Word_Count             => 500,
          Priority               => 32,
          Semaphore_Id           => BMM_Read_Sem,
          Retry                  => False);
```

NOTE: In the above example, 500 data words are read from PI-Bus module Memory_Module_Physical_Id, label Label_B into the host processor's label Label_A. The transfer are sent at priority 32. When the transfer completes, the BMM_Read_Sem semaphore is signalled and the result of the transfer are placed in the user's variable, Transfer_Status. If the transfer fails, it is not retried.

3.1.5 CPU_Output. This call allows data to be output from a requesting CPU object to a remote CPU object. The object to be written is in a 1750A CPU module. When this call is made, the DOS determines whether or not the object to be written is local to the module where the call was made. If the object is local to the module, the DOS copies the data into the requesting object. If the object is not local to the module, the data are written to a remote PI-Bus processor module and PI-Bus label.

WSP USER'S MANUAL

Characteristics of this call are:

a. All transfers are between two PI-Bus labels, even if the two objects are located on the same processor.

b. User has the option of knowing when the transfer completed c. User has the option of finding out what the transfer's result was.

d. Messages are prioritized by the user.

e. User determines whether or not the DOS is to retry a transfer in the event of a failure.

f. Destination processor may be physically or logically selected. Logical selection may result in a single slave or multiple slave (including broadcasts).

INPUTS
```
Req_CPU_Object_Label    : Label_Type
Rem_PI_Bus_Id           : PI_Bus_Slave_Id_Type
Rem_CPU_Object_Label    : Label_Type
Status                  : System.Address
Word_Count              : Word_Count_Type
Priority                : Comm_Priority_Type
Semaphore_Id            : Semaphore_Id_Type
Retry                   : Boolean
```

OUTPUTS
None

EXCEPTIONS
None

PARAMETERS

Req_CPU_Object_Label   PI-Bus label that points to the source address for the transfer. This label must be active on the host processor. If a semaphore has been associated with the label, it is signalled after the transfer completes.

Rem_PI_Bus_Id   Physical or Logical processor value.

Rem_CPU_Object_Label   PI-Bus label that points to the destination address for the transfer. This label must be active on the processor(s) selected by the Rem_PI_Bus_Id parameter. If a semaphore has been associated with the label, it is signalled after the transfer completes.

WSP USER'S MANUAL

Status
: Address of an object where the DOS places the transfer's result as an enumeration value. This parameter is passed as an address instead of as an out parameter because of the unknown amount of time between the user's request for transfer and the actual transfer due to PI-Bus contention.

Word_Count
: Number of data words to transfer.

Priority
: Priority of the transfer, 0 being the lowest priority.

Semaphore_Id
: Semaphore for the DOS to signal when the transfer completes.

Retry
: Informs the DOS of what to do in the event of a failure. If true, the DOS retries the transfer until it reaches the threshold values set in the Sysgen Parameters

EXAMPLES

```
CPU_Output(Req_CPU_Object_Label => Out_Label_177,
           Rem_PI_Bus_Id         => Family_12_Processor,
           Rem_CPU_Object_Label  => In_Label_190,
           Word_Count            => 10);
```

NOTE: The above example is representative of the minimum number of parameters for a call to CPU_Output. 10 data words are transferred from the host processor module, label Out_Label_177, to the Family_12_Processor module (logical id), label In_Label_190. No semaphore are signalled after the transfer completes, no status are returned. If the transfer fails, it is retried since the default value for the Retry parameter is True. The transfer is queued and sent at a default priority.

```
CPU_Output(Req_CPU_Object_Label => Label_A,
           Rem_PI_Bus_Id         => Memory_Module_Physical_Id
           Rem_CPU_Object_Label  => Label_B,
           Status                => Transfer_Status'Address,
           Word_Count            => 22,
           Priority              => BMM_Xfer_Priority,
           Semaphore_Id          => BMM_Write_Sem,
           Retry                 => False);
```

NOTE: In the above example, 22 data words are written from the host processor module, label Label_A to PI-Bus module Memory_Module_Physical_Id, label Label_B. The transfer is sent at priority BMM_Xfer_Priority. When the transfer completes, the BMM_Write_Sem semaphore is signalled and the result of the transfer is

WSP USER'S MANUAL placed in the user's variable, Transfer_Status. If the transfer fails, it is not be retried.

3.1.6 <u>Define Process</u>. This call defines a process to DOS. The attributes of the process are specified by the user at the time the process is defined. A process can be defined with an initial state of ready (the default) or dormant. A process which is defined with an initial state of ready will immediately be eligible for execution. A newly-defined process with an initial state of ready will immediately preempt a lower priority non-atomic active process. A process which is defined with an initial state of dormant must be awakened via the Wake_Process primitive. The procedure's parameter is a record. By performing aggregate assignment to the record object, the user loses the benefit of the record's default parameters.

Characteristics of this call are:

a. Makes a process known to the DOS.

b. Processes may be prioritized relative to one another.

c. A process may be defined as initially ready or dormant.

d. A process may be defined as atomic. Once an atomic process becomes active, it remains active until it makes itself Non-Atomic (and a higher priority process is Ready), runs to completion or becomes blocked on a semaphore/event.

e. A process may be time-sliced. To be time-sliced means to shared CPU time with other processes of your priority. Therefore, if a process is to be time-sliced, all other processes of that priority should also be time-sliced.

INPUTS
Process_Definition    : Process_Definition_Type (record)

OUTPUTS
None

EXCEPTIONS
Illegal_Process_Id
Max_Processes_Exceeded

PARAMETERS
Process_Definition    A record containing the following fields:

Name    Process identifier

Process_Family    Process's family. Legal range 45-254.

WSP USER'S MANUAL

| | |
|---|---|
| Priority | Process's Priority. Legal range 0-15. |
| Initial_State | Ready or Dormant. If initially ready, the process is eligible for execution immediately after definition. If initially dormant, the process will not be ready until it is awakened via the Wake_Process primitive. |
| Atomic | Boolean value that determines if the process may be preempted by processes of a higher priority. Once an atomic process becomes active, it remains active until it either makes itself non-atomic, runs to completion or becomes blocked on a semaphore/event. |
| Sliced | Boolean value that determines if the process is to be time-sliced with the other processes of its priority. If a process is sliced, it only makes sense for all processes of that priority to be time-sliced. |
| Processor | The type of module the process (family) may run on. This field is for the benefit of DOS Fault Tolerance in the event of reconfiguration. |
| Deadline | Relative time by which a process must be run. Also exists for the benefit of Fault Tolerance. If the deadline expires before a process runs, a fault is logged to system memory. Granularity in 10 microseconds. |

EXAMPLES

```
Process_Def_A.Name            := Process_A;
Process_Def_A.Process_Family  := Family_89;
Define_Process(Process_Def_A);
```

NOTE: The above code represents the smallest amount of code to use for a process definition. Process_A in Family_89 is defined at a default priority, initially ready to run, non-atomic, not time-sliced, running on a GP with a default deadline of 1 hour.

```
Process_Def_B := (Name           => Process_B,
                  Process_Family => Family_67,
                  Priority       => 12,
                  Initial_State  => Dormant,
                  Atomic         => False,
                  Sliced         => False,
                  Processor      => User_Interface.GP,
                  Deadline       => 50_000);
Define_Process(Process_Def_B);
```

WSP USER'S MANUAL

NOTE: This process definition is accomplished via aggregate assignment, hence the default values for the record fields are lost. Process_B of Family_67 is defined at priority 12, initially dormant, non-atomic, not time-sliced, running on a GP with a deadline of one-half second (500,000 microseconds).

3.1.7 <u>Define_SE</u>. This call defines a semaphore or event to the DOS. If a semaphore or event name of -1 is passed into this procedure, the DOS will automatically assign the semaphore or event the next available semaphore or event number and return it to the caller. A semaphore or event defined with a number within the range of 0 to 15 and equal to the value of a spare interrupt (as defined in MIL-STD-1750A) is mapped to the appropriate 1750A interrupt. A semaphore or event defined with a number within the range of 16 to Max_Local_Semaphores (defined in DOS_Sysgen) are defined as a local semaphore or event. A semaphore or event defined with a number within the range Max_Local_Semaphores+1 to Max_Semaphores (defined in DOS_Sysgen) is defined as a global semaphore or event.

Only the processes within the family associated with a global semaphore/event may Wait on it. A violation of this rule will result in raising of the Non_Resident_Global_Semaphore exception For a description of how semaphores and events work, see Process Scheduling Function.

The Number identifier of a semaphore/event may be chosen by the user or left to the DOS by the user passing in a -1. The DOS will return the value as an out parameter.

Characteristics of this call are:

a. Only processes of the family associated with a global semaphore/event may wait on that semaphore/event.

b. A semaphore may be defined with an initial value.

c. A maximum value may be defined. If -1, no maximum can be reached.

d. The Logical_Module_Id record field defines what family may wait on a global semaphore/event.

e. A semaphore/event may be associated with one or more PI-Bus labels. See Section 5.4 for implications of this association.

f. A semaphore/event may be associated with a spare interrupt.

INPUTS

SE_Definition : SE_Definition_Type (Discriminated Record)

WSP USER'S MANUAL

OUTPUTS
   Record field :
   Number             : Semaphore_Id_Type

EXCEPTIONS
   Illegal_SE_Value
   Insufficient_SE_Value
   Label_Already_Mapped

PARAMETERS

SE_Definition — A record parameter with the following fields:

Label_Count — The number of PI-Bus labels associated with this semaphore/event.

Semaphore_or_Event — Distinguishes between the two.

Global_or_Local — Distinguishes between the two.

Number — Semaphore/Event Identifier. If passed in as -1, the DOS will assign an identifier and pass it back.

Value — Current value of a semaphore. User can give the semaphore a non-zero initial value.

Max_Value — Maximum semaphore value. An increase beyond this value will result in an exception.

Logical_Module_Id — Family associated with a global semaphore/event. Only processes within this family may wait on this semaphore/event.

Label_Array — An array containing the label(s) to associate with the semaphore/event. For a discussion on this, refer to Section 5.4.

EXAMPLES

```
Sem_Def_A.Number         := Local_Sem_A;
Define_SE(Sem_Def_A);
```

NOTE: This code represents the minimum amount of code that can be used for a semaphore/event definition. Local_Sem_A is defined as a local semaphore with an initial value of 0, a maximum value of 1 and is not associated with a PI-Bus label.

```
Sem_Def_B.Global_or_Local    := Global;
Sem_Def_B.Number             := Global_Sem_B;
Sem_Def_B.Value              := 1;
Sem_Def_B.Max_Value          := 10;
Sem_Def_B.Logical_Module_Id  := Family_51;
Define_SE(Sem_Def_B);
```

WSP USER'S MANUAL

NOTE: Global_Sem_B is defined as a global semaphore with an initial value of 1 and a maximum value of 10. It is associated with Family_51 and is not associated with a PI-Bus label.

```
Labels := (1 => Label_165, 2 => Label_166, 3 => Label_170);
Event_Def_C := (Label_Count                               => 3,
                Semaphore_or_Event                        => Event,
                Global_or_Local                           => Global,
                Number                          => Global_Event_C,
                Value                                     => 0,
                Max_Value                                 => 1,
                Logical_Module_Id     => Family_73,
                Label_Array           => Labels);
Define_SE(Event_Def_C);
```

NOTE: This code shows an event definition via an aggregate assignment, so all default values within the record are lost. Global_Event_C is defined as a global event with an initial value of 0 and a maximum value of 1 (Maximum values don't mean anything for events). It is associated with Family_73 and PI-Bus labels Label_165, Label_166, Label_170.

3.1.8 <u>Define_Timer</u>. This call defines a timer to the DOS. A timer is considered by the operating system to be a special type of event. They allow the application programmer to write periodic processes which are to be executed on a processor. If a timer name of -1 is passed into this procedure, the DOS will automatically assign the timer the next available timer number and return it to the caller. A timer defined with a number within the range of 0 to 15 is mapped to the appropriate 1750A interrupt, if that interrupt number is defined as spare by MIL-STD-1750A. A timer defined with a number within the range of 16 to Max_Local_Semaphores (defined in DOS_Sysgen) is defined as a local timer. A timer defined with a number within the range Max_Local_Semaphores+1 to Max_Semaphores (defined in DOS_Sysgen) is defined as a global timer.

Characteristics of this call are:

a. Timers allow the application to have periodic processes.

b. A timer may be mapped to an interrupt.

c. A timer may be defined to go off periodically or just one time.

d. A timer may be global or local.

e. User can change the base rate of the timer

INPUTS

Timer_Definition:   Timer_Definition_Type (Record)

WSP USER'S MANUAL

OUTPUTS
    Field in record
    Number : Semaphore_Id_Type

EXCEPTIONS
    Illegal_SE_Value
    Insufficient_SE_Value
    Illegal_Timer_Number
    Max_Timers_Exceeded
    No_Timer_ID_Available
    Timer_Already_Defined
    Timer_Base_Rate_Changed
    Timer_Not_Defined

PARAMETERS

| | |
|---|---|
| Timer_Definition | A record containing the following fields: |
| Number | Timer identifier. If passed in as -1, the DOS will assign an identifier to the timer and pass it back. |
| Family_ID | Family associated with a global semaphore/event. Only processes within this family may wait on this semaphore/event. |
| Periodic_Delay | Determines whether the timer is to go off periodically or just one time. |
| Period | The rate at which the timer is to go off (periodic) or the amount of delay time before it goes off its only time (delay timer). Granularity is 10 microseconds. |

3.1.9 <u>Define_Timer</u>.

EXAMPLES
```
    Timer_A_Def.Number      := Timer_A;
    Timer_A_Def.Family_ID   := Timer_A_Family;
    Timer_A_Def.Period      := 1_000;
    Define_Timer(Timer_A_Def);
```

Timer_A is defined as a Periodic timer with a 10,000 microsecond (10 millisecond) period.

```
    Timer_B_Def := (Number                                   => Timer_B,
                    Periodic_Delay  => Delay_Timer,
                    Period          => 50_000);
    Define_Timer(Timer_B_Def);
```

WSP USER'S MANUAL

Timer_B is defined as a Delay timer that is to go off in 500,000 microseconds (.5 seconds).

3.1.10 <u>Delete Process</u>. This call deletes a process. After this call, the DOS no longer has any knowledge of the existence of the process.

Characteristics of this call are:

- a. Deletes a process from the DOS.

- b. Processes may be deleted from across processors.

- c. Allows a process to be in more than one family. User can delete the process in Family_A and it will not be deleted from Family_B.

- d. A process may delete itself.

INPUTS
Process         : Process_Id_Type
Process_Family  : Process_Family_Type

OUTPUTS
None

EXCEPTIONS
Process_Not_Found

PARAMETERS
Process            Identifier of the process to be deleted.

Process_Family     Family containing the process to be deleted. This family may or may not be on the same processor as the delete request was made.

EXAMPLES
Delete_Process (Process        => Process_10,
                Process_Family => Family_57);

This call will delete process Process_10 from family Family_57.

3.1.11 <u>Delete SE</u>. This call deletes a semaphore or event. After this call, the DOS no longer has any knowledge of the existence of the semaphore or event.

Characteristics of this call are:

- a. Deletes a semaphore/event from the DOS.

- b. Deleting a semaphore/event that is being currently waited on will raise the Process_Waiting_On_SE exception.

WSP USER'S MANUAL c. The Delete_SE call must be made on the same processor that defined the semaphore/event via Define_SE.

INPUTS
    Number : Semaphore_Id_Type

OUTPUTS
    None

EXCEPTIONS
    Illegal_SE_Value
    Label_Not_Found
    Process_Waiting_on_SE

PARAMETERS
    Number        Identifier of the semaphore/event to be deleted.

EXAMPLES
    Delete_SE(Semaphore_22);

3.1.12 <u>Delete Timer</u>. This call deletes a timer. After this call the DOS no longer has any knowledge of the existence of the timer.

Characteristics of this call are:

a. Deletes a timer from the DOS.

b. Deleting a timer that is being currently waited on will raise the Process_Waiting_On_SE exception.

c. The Delete_Timer call must be made on the same processor that defined the timer via Define_Timer.

INPUTS
    Number : Semaphore_Id_Type

OUTPUTS
    None

EXCEPTIONS
    Illegal_SE_Value
    Process_Waiting_on_SE
    Timer_Not_Defined

PARAMETERS
    Number        Identifier of the timer to be deleted.

WSP USER'S MANUAL

EXAMPLES
   Delete_Timer(Timer_A);

3.1.13 <u>Dorm Process</u>. This call transitions a process to the dormant state. Once a process has transitioned to the dormant state, it will not execute until it is awakened, even if its invoking conditions are satisfied.

Characteristics of this call are:

a. Makes a process dormant.

b. A dormant process is not eligible to run.

c. A call to Dorm_Process may be made on a process on another processor.

INPUTS
   Process         : Process_Id_Type
   Process_Family  : Process_Family_Type OUTPUTS
   None EXCEPTIONS
   Process_Not_Found PARAMETERS
   Process          Identifier of the process to be dormed.

Process_Family   Family containing the process to be dormed. This family may or may not be on the same processor as the dorm request was made.

EXAMPLES
   Dorm_Process (Process         => Process_10,
                 Process_Family  => Family_57);

This call will dorm process Process_10 in family Family_57.

3.1.14 <u>End Redefine Process</u>. This call marks the end of a process redefinition sequence. Any process not defined during the sequence is deleted. Used in conjunction with the Redefine_Process primitive (Section 5.17).

Characteristics of this call are:

a. Marks the end of a process redefinition sequence that was begun with the Redefine_Process primitive.

WSP USER'S MANUAL

INPUTS
    None

OUTPUTS
    None

EXCEPTIONS
    None

PARAMETERS
    None

EXAMPLES
    Redefine_Process;
    Define_Process(...);
    Define_Process(...);
              :
    Define_Process(...);
    End_Redefine_Process;

Normal invocation.

3.1.15 End_Rewake_Process. This call marks the end of a process rewake sequence. Any process not awakened during the sequence is made dormant. Used in conjunction with the Rewake_Process primitive Characteristics of this call are:

a. Marks the end of a process redefinition sequence that was begun with the Rewake_Process primitive.

INPUTS
    None

OUTPUTS
    None

EXCEPTIONS
    None

PARAMETERS
    None

WSP USER'S MANUAL

EXAMPLES
    Rewake_Process;
        Wake_Process(...);
        Wake_Process(...);
           :
        Wake_Process(...);
    End_Rewake_Process;

Normal invocation.

3.1.16 <u>Modify Label Table</u>. This call gives the user access to the PI-Bus Label Table, which is in the DOS address state. The user has the ability to make a label active/inactive or busy/free. The user does not have the ability to change the address pointed to by the label. The address is determined pre-load time as described in             Label Table Generation and cannot be changed. An application label becomes busy when it is accessed (i.e., read or written) and it has a semaphore associated with it. Once the label becomes busy, transfers involving that label are unsuccessful until the user clears the label's busy bit via this procedure call. Up to 20 labels can be modified with one call.

Characteristics of this call are:

a. Alters the Active and/or Busy bits in the PI-Bus Label Table.

b. Can modify up to 20 labels with one call.

INPUTS
    Label_Count    : Natural
    Label_Array    : Label_Array_Type

OUTPUTS
    None

EXCEPTIONS
    None

PARAMETERS

| | |
|---|---|
| Label_Count | The number of labels to be modified during this call. |
| Label_Array | 20-element array of three fields/element. The fields are: |
| Label | The label number to change |
| Bit | Which bit to change, i.e., the Active bit or the Busy bit. |
| To_Enabled | Set or clear the bit. |

WSP USER'S MANUAL

EXAMPLES
Code segment:

```
Label_Array(1) := (Label       => 200,
                   Bit         => ACTIVE_BIT,
                   To_Enabled  => True);
Label_Array(2) := (Label       => 250,
                   Bit         => BUSY_BIT,
                   To_Enabled  => False);
Modify_Label_Table (Label_Count => 2,
                    Label_Array => Label_Array);
```

As a result of this call, Label 200's Active bit is set and Label 250's Busy bit are cleared.

3.1.17 <u>Non_Atomic</u>. This call makes the current active process non-atomic. A non-atomic process is preempted by a higher priority ready process. This primitive is normally used in conjunction with the Atomic primitive Characteristics of this call are:

a. Informs the DOS that the process is non-preemptible by a higher priority process.

INPUTS
None

OUTPUTS
None

EXCEPTIONS
None

PARAMETERS

EXAMPLES
```
Atomic;
   ...
   code
   ...
Non_Atomic;
```

Normal invocation.

WSP USER'S MANUAL

3.1.18 Redefine_Process. This call marks the beginning of a process redefinition sequence. A companion to this primitive is End_Redefine_Process (Section 5.13). All Define_Process calls between these two primitives are considered to be process redefinition commands. Any process not defined during the sequence is deleted. The difference between the redefinition and the definition of a process is as follows: If a process has already been defined, it will not be defined again. If a process is not named in the sequence of define calls between the Redefine_Process and End_Redefine_Process calls, and is currently defined, it is deleted.

Characteristics of this call are:

a. Used for fast, selective process deletion.

b. Application does not need to name all the processes to be deleted, just the ones to keep.

INPUTS
None

OUTPUTS
None

EXCEPTIONS
None

PARAMETERS
None

EXAMPLES
Redefine_Process;
    Define_Process(...);
    Define_Process(...);
        :
    Define_Process(...);
End_Redefine_Process;

Normal invocation.

3.1.19 Redefine_Timer_Begin. This call marks the beginning a timer redefinition sequence. A companion to this procedure is the Redefine_Timer_End primitive (Section 5.19). All Define_Timer calls between these two primitives are considered to be timer redefinition commands. Any timer not defined during the sequence is deleted. The difference between the redefinition and the definition of a timer is as follows: If a timer has already been defined, it will not be defined again. If a timer is not named in the sequence of define calls between the Redefine_Timer_Begin and Redefine_Timer_End calls, and is currently defined, it is deleted.

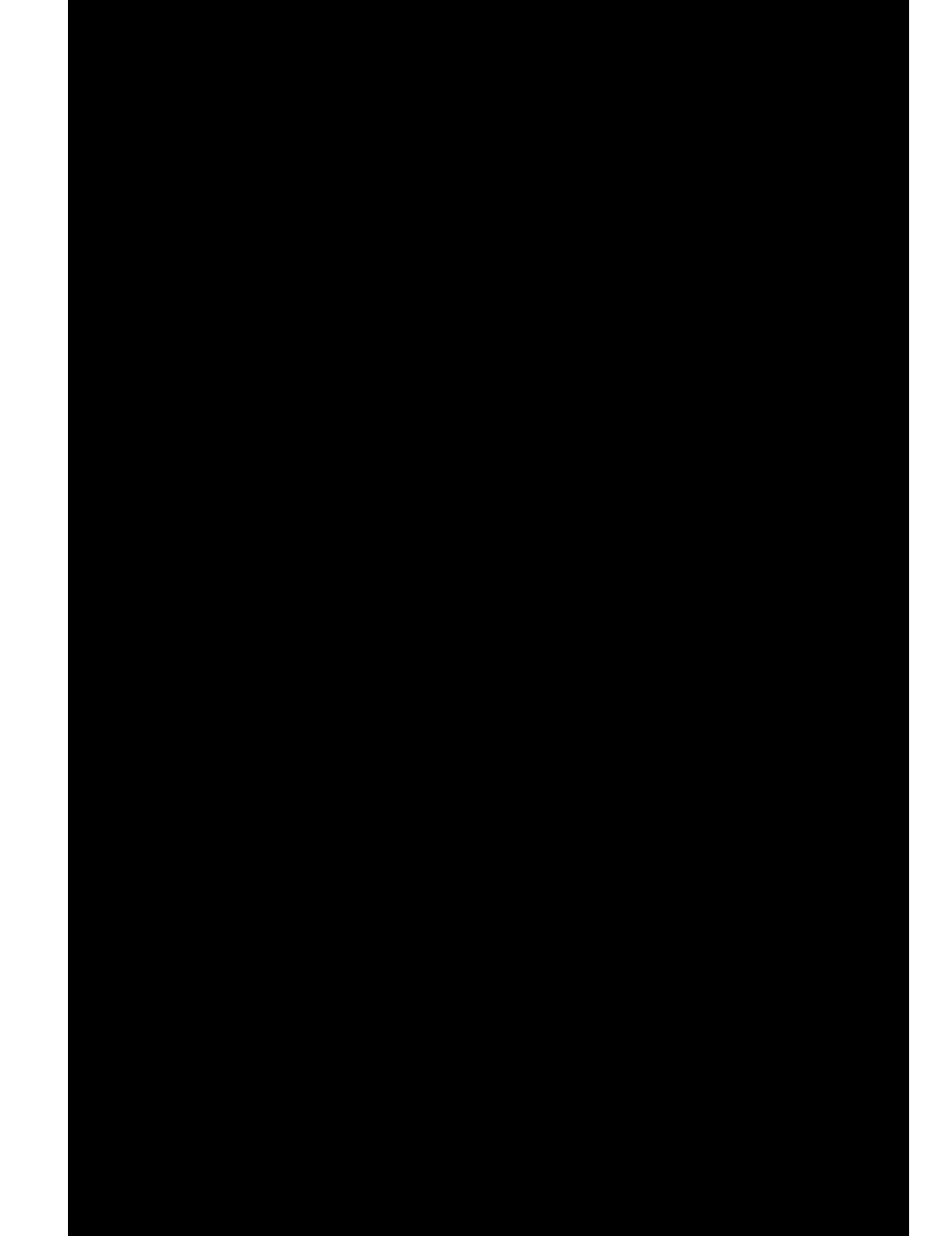

WSP USER'S MANUAL

EXAMPLES
    Redefine_Timer_Begin;
        Define_Timer(...);
        Define_Timer(...);
            :
        Define_Timer(...);
    Redefine_Timer_End;

Normal invocation.

3.1.21 Report Application Fault. This call reports faults found by application software (presumably Self-Test) to the CME. This information is used by DOS to keep track of the number of healthy modules throughout the system. This will enable decisions to be made as to how to reconfigure the system and redistribute the families across the processors following a failure. A call to this procedure will cause the entry in the data base for the particular entity which was tested to be updated with the new condition of the tested entity.

Characteristics of this call are:

a. Method for allowing application software to report faults.

b. Allows DOS to maintain health status on modules in the system.

INPUTS
    Application_Fault : Application_Fault_Type

OUTPUTS
    None

EXCEPTIONS
    None

PARAMETERS
    Application_Fault    Enumerated value describing the type of fault uncovered by application software.

EXAMPLES
    Software module is TBD.

3.1.22 Report BIT Results. This call reports the results of the Built-In-Test (BIT) execution to the CME. It allows the application programmer to record a fault in the system's memory module for later examination. A call to this procedure will cause an entry to be created in the fault log data base which will describe the type of failure which occurred. This call is to be used by an application process to determine when data is out of bounds or an exception condition has occurred.

WSP USER'S MANUAL

Characteristics of this call are:

a. Allows recording of BIT results in system's memory module.

INPUTS
  Results : BIT_Results_Type

OUTPUTS
  None

EXCEPTIONS
  None

PARAMETERS
  Results          Enumerated value that describes the result returned by BIT.

EXAMPLES
  Software module is TBD.

3.1.23 <u>Rewake_Process</u>. This call marks the beginning of a process rewake sequence. A companion to this procedure is the End_Rewake_Process primitive. All Wake_Process calls between these two primitives are considered to be process rewake commands. Any process not awakened during the sequence is made dormant. The difference between the awakening and the reawakening of a process is defined as follows: If a process has already been awakened, it will not be awakened again. If a process is not named in the sequence of wake calls between the Rewake_Process and End_Rewake_Process calls and is currently awake, it is made dormant.

Characteristics of this call are:

a. Used for fast, selective process dorming.

b. Application does not need to name all the processes to be dormed, just the ones to keep waked.

INPUTS
  None

OUTPUTS
  None

EXCEPTIONS
  None

WSP USER'S MANUAL

PARAMETERS
   None

EXAMPLES
   Rewake_Process;
      Wake_Process(...);
      Wake_Process(...);
            :
      Wake_Process(...);
   End_Rewake_Process;

Normal invocation.

3.1.24 <u>Signal</u>. This call signals a semaphore or event. In the case of a semaphore, the specified semaphore is incremented by one. If there are processes waiting on a semaphore, then the first process that was waiting on the semaphore will have its invoking condition satisfied for that semaphore. In the case of an event, all of the processes waiting on the signalled event will have their invoking condition satisfied for that event.

Characteristics of this call are:

a.   Any process may signal a global semaphore/event from any processor.

INPUTS
   Number : Semaphore_Id_Type

OUTPUTS
   None

EXCEPTIONS
   Illegal_SE_Value
   Maximum_Signal_Count_Exceeded

PARAMETERS
   Number                Identifier of the semaphore.

EXAMPLES
   Signal(Semaphore_15);

The active process signals semaphore Semaphore_15.

3.1.25 <u>Wait</u>. This call causes the active process to wait on a single semaphore or event. In the case of a semaphore, the specified semaphore is decremented by one. If the semaphore has a non-negative value, control returns to the caller. If the semaphore is negative, the calling process is added to the queue waiting for this semaphore (blocked) and the next highest priority ready process is made active. In the case of an event, the calling process is added to the queue waiting for this event (blocked) and the next highest priority ready process is

WSP USER'S MANUAL made active. If the semaphore is a global semaphore, the process must belong to the family associated with the semaphore.

Characteristics of this call are:

- a. Calling process waits on either a semaphore or an event.

- b. If the semaphore/event is global, the process must belong the family that was associated with the semaphore/event at definition time (see Section 5.7 Define_SE). If it does not, the Non_Resident_Global_Semaphore exception is raised.

- c. Wait for a semaphore is performed in a FIFO manner.

- d. Wait for an event is performed as everyone becomes ready after it is signalled.

INPUTS
    Number : Semaphore_Id_Type

OUTPUTS
    None

EXCEPTIONS
    Illegal_SE_Value
    Non_Resident_Global_Semaphore
    Wait_Q_List_Overflow PARAMETERS
    Number              Identifier of the semaphore/event to wait on.

EXAMPLES
    Wait(Event_45);

The process waits on event Event_45.

3.1.26 Waits. This call causes the active process to wait on multiple semaphores and/or events. These semaphores and/or events are either ANDed or ORed to denote this particular invoking condition for the calling process. An application process may wait on a combination of multiple semaphores or events, but only one invoking condition may exist. The list of semaphores and/or events that a process is waiting on is processed as follows: In the case of a semaphore, the specified semaphore is decremented by one. If the semaphore is negative, the calling process is flagged to be added to the queue waiting for this semaphore (blocked). In the case of an event, the calling process is flagged to be added to the queue waiting for this event (blocked). If all of the semaphores and/or

WSP USER'S MANUAL

Appendix F
User Interface Package Specification

10.1 Introduction. This appendix contains the User Interface (UIF) package specification. The UIF has a filename of User_Interface_.ADA. It contains the constant, type, object, and procedure declarations that are available to the application programmer. For the user's Ada program to gain access to the UIF, it must reference the package within an Ada with clause (i.e. with User_Interface).

10.2 UIF Package Specification.

```
with DOS_Sysgen;
with Local_UI_Data;
with System;
with Target; use Target;
--
-- Title              USER_INTERFACE
--
--                    Copyright (c) 1986, 1987 Westinghouse Electric Corporation
--
-- Contractor
--
--                    Westinghouse Electric Corporation
--                    P.O. Box 746
--                    Baltimore, Maryland   21203
--
-- Subsystem          DOS
--
-- Overview
--       This package defines the interface between the application software and
-- the DOS functions of the operating system. This package defines the types
-- and procedures that provide the application software with the necessary
-- services for writing application software using the operating system.
--
-- Modification History
--
--      Author              Date            Description
--      Greg Christ         08/14/86        Created
--      Greg Christ         01/05/87        New user interface
--                                          Defined types and procedures
--      Rich Vrabel         09/09/87        Remove System_Process,_Flag,
--                                          and _Timer
--      Karen Overbeke      09/14/87        added Set_Timer_Base routine
--      Rich Vrabel         10/20/87        added Alter_Label_Address
--
--+++++++++++++++++++++++++++++++++++++++++++++++++++++++++++++++++++++++++
--++++++++
```

WSP USER'S MANUAL

```ada
package User_Interface is

-- +++++++++++++++++++++++++++++++
-- ++   Process Scheduling Types   ++
-- +++++++++++++++++++++++++++++++

Illegal_Family_Id,
    Illegal_Label_Value,
    Illegal_Process_Id,
    Illegal_SE_Value,
    Insufficient_SE_Value,
    Label_Already_Mapped,
    Label_Not_Found,
    Max_Allowed_Timers_Exceeded,
    Max_Processes_Exceeded,
    Max_Signal_Count_Exceeded,
    Non_Resident_Global_Semaphore,
    Process_Not_Found,
    Process_Waiting_On_SE,
    Timer_Not_Defined,
    Wait_Q_List_Overflow,
    Catch_All_Others            : Exception;
-- Lists the different exceptions that can be raised during the execution
-- of a DOS service routine. Not including the exceptions found in
-- package STANDARD (Constraint_Error, Numeric_Error, Program_Error,
--                  Storage_Error, Tasking_Error).
-- **** Any edit to the list of exceptions must be DUPLICATED in
-- **** Dos_Exceptions_.
-- type PI_Bus_Slave_Id_Type is new Integer_16 range -1..255;
-- Slave ID code for other end of PI-Bus message.

Host_Processor : PI_Bus_Slave_Id_Type;
-- Reflects the physical PI-Bus Id of the host processor.

subtype Logical_ID is PI_Bus_Slave_Id_Type range 33..255;
-- 33 to 39 are Logical IDs on both WEC and TRW BIUs.
-- 40 to 255 are Logical IDs on the WEC BIUs.

SES_Scorecard : constant Logical_ID := 36;
-- Value application code may specify in the Rem_PI_Bus_Id field of
-- CPU_Input/CPU_Output in order to communicate with the SES.
```

WSP USER'S MANUAL

```
subtype Process_Family_Type is Logical_Id range 44..255;
-- Process Family 44 is an illegal default value.

Illegal_Process_Family : constant Process_Family_Type :=
                                   Process_Family_Type(44);

type Process_Ids is new Integer_16 range 0..4095;
-- The range of process indentifiers including the null process
-- identifier of 0.

Null_Process_Id : constant Process_Ids := 0;
-- A null process identifier.

type Module_Type is (GP,        -- General Purpose 1750A processor
                     SP,        -- Signal Processor
                     EMSP,      -- Extended Memory Signal Processor
                     HSDB,      -- High Speed Data Bus
                     SDD,       -- Sensor Distribution Display
                     VIDEO,     -- Video Interface
                     EMPTY);    -- Slot is empty
-- Designates the types of hardware that can appear at a PI-Bus port.

type RTC_Duration is new Integer_32;

Hour : constant RTC_Duration := 360000000;
-- 1 Hour

Max_Process_Priority : constant := DOS_Sysgen.Max_Process_Priority;
-- The maximum priority which can be given to a process.

Default_Process_Priority : constant := Max_Process_Priority/2;
-- The default priority for a processs.

subtype Priority_Type is Integer_16 range 0..Max_Process_Priority;
-- A type defining the range of legal priorities for processes.
-- The range is determined by the value of Process_Priority type Initial_State_Type is (Ready, Dormant);
-- A type specifying the initial state of a defined process.
```

WSP USER'S MANUAL

```
type Process_Definition_Type is
-- A type describing a process which is to be defined.
   record
        Name                    : Process_Ids := Null_Process_Id;
        -- The process identifier.

Process_Family          : Process_Family_Type := Illegal_Process_Family;
        -- The logical processor identifier.

Priority                : Priority_Type := Default_Process_Priority;
        -- The priority of the process.

Initial_State           : Initial_State_Type := Ready;
        -- The initial state of the process.

Atomic                  : Boolean := false;
        -- Is the process preemptable?

Sliced                  : Boolean := false;
        -- Is the process to be sliced with other processes of
        -- equal priority?  Slicing is done by priority.

Processor               : Module_Type := GP;
        -- The type of processor on which the process executes.

Deadline                : RTC_Duration := Hour;
        -- The deadline for the process to be made ready.
end record;

subtype Process_Id_Type is Process_Ids range 1..4095;
-- The process identifier.

type Semaphore_Event_Type is (Semaphore, Event);
-- A type to distinguish between a semaphore and an event.

type Global_Local_Type is (Global, Local);
-- A type to distinguish between local and global semaphores and events.

type Semaphore_Id_Type is new Integer_16 range -1..127;
-- Identifier for semaphores, events, and timers.
```

WSP USER'S MANUAL

```
Null_Semaphore_Id : constant Semaphore_Id_Type := Semaphore_Id_Type(-1);
-- Default semaphore/event value.

subtype Semaphore_Value_Type is Integer_16 range -128..127;
-- A type specifying the range of a semaphore value.

type Label_Type is new Integer_16 range -1..DOS_Sysgen.Max_Appl_Label;
-- A type specifying the legal range of PI-Bus Labels.

Illegal_Label : constant Label_Type := -1;
-- Stuffed in the Slave Receive List by the Input Handler to indicate when
-- an entry has been read.
type SE_Definition_Type is
-- A type describing a semaphore/event which is to be defined.
   record
      Semaphore_or_Event   : Semaphore_Event_Type := Semaphore;
      -- Is it a semaphore or event?

Global_or_Local      : Global_Local_Type := Local;
      -- Is it a global or local?

Number               : Semaphore_Id_Type := -1;
      -- The identifier for the semaphore. If the value is -1, then
      -- DOS will return a value for the semaphore to the caller. If
      -- the value is not -1, then DOS will assign the interrupt to
      -- the identifier provided.

Value                : Semaphore_Value_Type := 0;
      -- The initial value of the semaphore.

Max_Value            : Semaphore_Value_Type := 1;
      -- The maximum value the semaphore is to be allowed to reach.
      -- If the value is -1, no maximum is checked.

Logical_Module_Id    : PI_Bus_Slave_Id_Type := 0;
      -- The logical processor identifier.

Label                : Label_Type := Illegal_Label;
      -- The label of the PI-Bus message, if the semaphore is being used
      -- as a wait on some data that is to be received on the PI-Bus.
   end record;

type Timer_Base_Type is new Integer_16;
-- A type to define the base rate for timer A.
```

WSP USER'S MANUAL

```
type Timer_Type is (Periodic, Delay_Timer);
-- A type to define if the timer is to be triggered periodically or
-- only once.

type Timer_Definition_Type is
-- A type describing a timer which is to be defined.
   record
      Number           : Semaphore_Id_Type := Semaphore_Id_Type(-1);
      -- The identifier of the timer to be defined.
      -- If the value is -1, then DOS assigns a value.

Periodic_Delay   : Timer_Type := Periodic;
      -- Is the timer a periodic timer or a delay timer.

Period           : Unsigned_Integer_16 := 1;
      -- At what rate is the timer to go off.

Resolution       : Unsigned_Integer_16 := 1;
      -- How far off the actual time can the timer go off.
end record;

type AND_OR_Type is (A_N_D, O_R);
-- A type to distinguish between the AND condition and the OR
-- condition for multiple waits.

Semaphore_List_Size : constant := DOS_Sysgen.Semaphore_List_Size;
-- The maximum number of semaphores/events allowed for a multiple wait.

type Semaphore_List_Type is array (1..Integer_16(Semaphore_List_Size))
   of Semaphore_Id_Type;
-- A type defining a chain of semaphores or events.

type DOS_Routine_Type is (CPU_Input,              -- Communications
                          CPU_Output,
                          Change_BIU_Logical_Id,
                          Modify_Label_Table,
                          Alter_Label_Address,
                          Atomic,                 -- Process Control Table
                          Define_Process,
                          Delete_Process,
                          Dorm_Process,
                          End_Redefine_Process,
                          End_Rewake_Process,
                          Non_Atomic,
                          Redefine_Process,
                          Rewake_Process,
```

WSP USER'S MANUAL

```
Wake_Process,
Define_SE,              -- Semaphore Table
Delete_SE,
Signal,
Wait,
Waits,
Set_Timer_Base,
Define_Timer,           -- Timer Table
Delete_Timer,
End_Redefine_Timer,
Redefine_Timer,
Report_Application_Fault,  -- Fault Tolerance
Report_BIT_Results);
```

WSP USER'S MANUAL

```
-- +++++++++++++++++++++
-- ++   Communications Types   ++
-- +++++++++++++++++++++

Memory_Module_Physical_Id : constant Integer_16 :=
       DOS_Sysgen.Memory_Module_Physical_Id;
    -- Physical PI-Bus address of the memory module.

type Word_Count_Type is new Integer_16;
    -- Represents the number of 16 bit words of data in a PI-Bus message.
    -- A value of 0 represents a 64K transfer.
    -- A transfer of between 32K and 64K-1 (inclusive) will require a word
    --    count that is a negative number. The 16-bit word is treated
    --    as an unsigned integer by the hardware. (For example, a word count
    --    of -1 will mean a 64K-1 word transfer.

type Comm_Priority_Type is new Integer_16 range 0..127;
    -- Range of message priorities permitted on the PI-Bus.

Default_Priority : constant Comm_Priority_Type := 64;
    -- Default communication priority for the PI-Bus.

type Comm_Status_Type is (SUCCESS, FAILED, BUSY, UNKNOWN);
    -- Type for the user to declare objects of in order to determine
    -- the status of transfer that has completed.
```

```
--AP      Max_PBM_Files : constant := 200;
--AP      -- Defines the maximum number of PBM files in the system.
--AP
--AP
--AP      type PBM_File_Id_Type is new Integer_16
--AP          range -1..Max_PBM_Files;
--AP      -- Define the legal range of PBM File identifiers.
--AP
--AP
--AP      type Processor_Type is new Integer_16 range 0..255;
--AP      -- This type assumes that logical processor selection is available
--AP      -- on the Data Subbus. It is based upon the logical processor
--AP      -- selection of the PI-Bus.

type Label_Table_Bit_Type is (ACTIVE_BIT, BUSY_BIT);
```

WSP USER'S MANUAL

```
type Label_Array_Element_Type is record
    Label      : Label_Type;
    Bit        : Label_Table_Bit_Type;
    To_Enabled : Boolean;
end record;
type Label_Array_Type is array (Unsigned_Integer_16 range 1..20) of
    Label_Array_Element_Type;
```

WSP USER'S MANUAL

```
-- +++++++++++++++++++++
-- ++   Fault Tolerance Types   ++
-- +++++++++++++++++++++ type Application_Fault_Type is (Extended_Memory_Bad,
                                    Process_Active,
                                    Process_Ready,
                                    Process_Waiting,
                                    Process_To_Be_Dormed_Not_Found,
                                    Process_To_Be_Waked_Not_Found);
-- Lists the different kinds of processor faults that can be reported
-- to the operating system by the application program Self-Test.

type BIT_Results_Type is (Pass, Fail);
-- Lists the information returned by BIT after analyzing a processor.
```

WSP USER'S MANUAL

```
-- +++++++++++++++++++++++
-- ++   Communications Procedures   ++
-- +++++++++++++++++++++++ procedure CPU_Input
      (Req_CPU_Object_Label : Label_Type;
       Rem_PI_Bus_Id         : PI_Bus_Slave_Id_Type;
       Rem_CPU_Object_Label  : Label_Type;
       Status                : System.Address := Target.Address_Zero;
       Word_Count            : Word_Count_Type;
       Priority              : Comm_Priority_Type := Default_Priority;
       Semaphore_Id          : Semaphore_Id_Type := Null_Semaphore_Id;
       Retry                 : Boolean := TRUE);

-- Overview
   --    This procedure is called by application software to input data
   --    from a remote CPU object to a requesting CPU object.
   --
   -- Interface
   --    Procedure call
   --
   -- Invocation
   --    Unconditionally procedure CPU_Output
      (Req_CPU_Object_Label : Label_Type;
       Rem_PI_Bus_Id         : PI_Bus_Slave_Id_Type;
       Rem_CPU_Object_Label  : Label_Type;
       Status                : System.Address := Target.Address_Zero;
       Word_Count            : Word_Count_Type;
       Priority              : Comm_Priority_Type := Default_Priority;
       Semaphore_Id          : Semaphore_Id_Type := Null_Semaphore_Id;
       Retry                 : Boolean := TRUE);

-- Overview
   --    This procedure is called by application software to output data
   --    from a requesting CPU object to a remote CPU object.
   --
   -- Interface
   --    Procedure call
   --
   -- Invocation
   --    Unconditionally
```

WSP USER'S MANUAL

```
procedure Modify_Label_Table
   (Label_Count       : Natural_16;
    Label_Array       : Label_Array_Type);
```

-- Overview
--     This procedure allows the user to modify the PI-Bus Label Table.
--
-- Interface
--     Procedure call
--
-- Invocation
--     Unconditionally

```
procedure Alter_Label_Address (Label         : Label_Type;
                               Object_Address : System.Address;
                               Init_Active_Bit : Boolean := False;
                               Init_Busy_Bit   : Boolean := False);
```

-- Overview
--     This procedure allows the user to alter the address that a
--     label is associated with.
--
-- Interface
--     Procedure call
--
-- Invocation
--     Unconditionally

```
procedure Change_BIU_Logical_Id (Logical_Id : Process_Family_Type;
                                 To_Enabled : Boolean);
```

-- Overview
--     This procedure is called application software when it desires
--     to change the state of a logical id in the BIU.
--
-- Interface
--     Procedure call
--
-- Invocation
--     Unconditionally

WSP USER'S MANUAL

```
-- ++++++++++++++++++++++++++++++++
 ++   Process Control Table(PCT) Procedures   ++
-- ++++++++++++++++++++++++++++++++
``` procedure Atomic;

-- Overview
   --    A procedure to make a section of a process atomic.
   --
   -- Interface
   --    Procedure call
   --
   -- Invocation
   --    Unconditional procedure Define_Process(Process_Definition : in Process_Definition_Type);
      -- The description of a process.

-- Overview
   --   A procedure to add process descriptions to the process control
   --   table.
   --
   -- Interface
   --    Procedure call
   --
   -- Invocation
   --    Unconditionally procedure Delete_Process
      (Process       : in Process_Id_Type;
       -- The name of the process to be deleted.

Process_Family : in Process_Family_Type);
       -- The logical processor identifier.

-- Overview
   --    A procedure to remove a process from the Process Control Table.
   --
   -- Interface
   --       Procedure call
   --
   -- Invocation
   --       Unconditionally

WSP USER'S MANUAL procedure Dorm_Process
  (Process       : in Process_Id_Type;
    -- The name of the process to be made dormant.

Process_Family : in Process_Family_Type);
    -- The logical processor identifier.

-- Overview
--    A procedure to move a process to the dormant state.
--
-- Interface
--    Procedure call
--
-- Invocation
--    Unconditionally procedure End_Redefine_Process;

-- Overview
--    A procedure to signify the end of a redefine sequence. Any
--    processes not defined during the sequnce are deleted from
--    the Process Control Table.
--
-- Interface
--    Procedure call
--
-- Invocation
--    Unconditionally procedure End_Rewake_Process;

-- Overview
--    A procedure to signify the end of a rewake sequence. Any processes
--    which were not waked during the sequence are made dormant.
--
-- Interface
--    Procedure call
--
-- Invocation
--    Unconditionally procedure Non_Atomic;

WSP USER'S MANUAL

-- Overview
--      A procedure to make a section of a process non-atomic.
--
-- Interface
--      Procedure call
--
-- Invocation
--      Unconditional procedure Redefine_Process;

-- Overview
--      A procedure to mark the beginning of a Redefine sequence.
--
-- Interface
--      Procedure call
--
-- Invocation
--      Unconditionally procedure Rewake_Process;

-- Overview
--      A procedure to signify the beginning of a rewake sequence.
--
-- Interface
--      Procedure call
--
-- Invocation
--      Unconditionally procedure Wake_Process
    (Process         : in Process_Id_Type;
    -- The name of the process which is to be awakened.

Process_Family : in Process_Family_Type);
    -- The logical processor identifier.

-- Overview
--      A procedure to move a process from the dormant state to the
--      waiting state.
--

WSP USER'S MANUAL

```
-- Interface
--      Procedure call
--
-- Invocation
--      Unconditionally -- ++++++++++++++++++++++
-- ++   Semaphore Procedures   ++
-- ++++++++++++++++++++++ procedure Define_SE(SE_Definition : in out SE_Definition_Type);
                -- The desription of a semaphore/event.

-- Overview
--      A procedure to define a global/local semaphore/event to the
--      operating system.
--
-- Interface
--      Procedure call
--
-- Invocation
--      Unconditionally procedure Delete_SE(Number : in Semaphore_Id_Type);
                -- The identifier for the semaphore/event which
                -- is to be removed.

-- Overview
--      A procedure to remove a semaphore or event from the list of
--      semaphores and events defined to the operating system.
--
-- Interface
--      Procedure call
--
-- Invocation
--      Unconditionally procedure Signal(Number : in Semaphore_Id_Type);
                -- The Identifier for the semaphore or event which
                -- is to be signaled.
```

WSP USER'S MANUAL

-- Overview
--     A procedure to signal a semaphore or event via a direct call.
--
-- Interface
--     Procedure call
--
-- Invocation
--     Unconditionally procedure Wait(Number : in Semaphore_Id_Type);
              -- The semaphore or event to be waited on.

-- Overview
--     A procedure to cause a wait on a single semaphore or event
--     by a process.
--
-- Interface
--     Procedure call
--
-- Invocation
--     Unconditionally procedure Waits
    (Condition : in AND_OR_Type;
      -- Is the waiting condition an AND or an OR of the set
      -- of semaphores/events.

Count     : in Integer_16;
      -- The number of semaphores/events to wait on.

Numbers   : in Semaphore_List_Type);
      -- The list of semaphores and events to be waited on.

-- Overview
--     A procedure to cause a wait on multiple semaphores/events by
--     a process.
--
-- Interface
--     Procedure call
--
-- Invocation
--     Unconditionally

WSP USER'S MANUAL

```
-- +++++++++++++++++++++
-- ++   Timer Table Procedures   ++
-- +++++++++++++++++++++ procedure Set_Timer_Base(Timer_Base : in Timer_Base_Type);

-- Overview
--    A procedure to define the rate of the timer base.
--
-- Interface
--    Procedure call
--
-- Invocation
--    Unconditionally procedure Define_Timer(Timer_Definition : in out Timer_Definition_Type);
                       -- The description of a timer.

-- Overview
--    A procedure to define a new timer and add it to the timer table.
--
-- Interface
--    Procedure call
--
-- Invocation
--    Unconditionally procedure Delete_Timer(Number : in Semaphore_Id_Type);
                       -- The identifier for the timer which is to
                       -- be deleted.

-- Overview
--    A procedure to remove a timer description from the timer table.
--
-- Interface
--    Procedure call
--
-- Invocation
--    Unconditionally
```

WSP USER'S MANUAL procedure End_Redefine_Timer;

-- Overview
--     A procedure to signify the end of a sequence of timer definitions
--     that are to be treated as redefines. Any timers that were defined
--     prior to this sequence and were not defined again are deleted.
--
-- Interface
--     Procedure call
--
-- Invocation
--     Unconditionally procedure Redefine_Timer;

-- Overview
--     A procedure to signify the beginning of a sequence of timer
--     definitions that are to be treated as redefines. Any timers
--     currently defined that are not defined again are deleted
--     after the call to End_Redefine_Timer.
--
-- Interface
--     Procedure call
--
-- Invocation
--     Unconditionally
--

WSP USER'S MANUAL

```
-- ++++++++++++++++++++++++++
-- ++   Fault Tolerance Procedures   ++
-- ++++++++++++++++++++++++++ procedure Report_Application_Fault
        (Application_Fault : in Application_Fault_Type);

--
    -- Overview
    --     This procedure reports faults found by the Application
    --     program (presumably Self Test) to the CME.
    --
    -- Interface
    --     Procedure call
    --
    -- Invocation
    --     Unconditionally
    -- procedure Report_BIT_Results(Results : in BIT_Results_Type);
    --
    -- Overview
    --     This procedure reports the results of the BIT execution
    --     back to the CME.
    --
    -- Interface
    --     Procedure call
    --
    -- Invocation
    --     Unconditionally
    -- end User_Interface;
```

WSP Signal Processing Instruction Library

| FUNCTION | DESCRIPTION |
|---|---|
| ABCD_CORR | ABCD correlation to allow low velocity target rejection and not have high velocity blind spots. Probably will require a set of instructions. |
| ABS | Determines the magnitude of each element of vector X by generating the positive vector Z |
| ACC | Calculates the sum of the elements of a vector and generates a scalar with the same precision |
| ACCD | Calculates the sum of the elements of a vector and generates a scalar with twice the precision |
| ADD | Sums two vectors |
| AND | Determines a bit-wise logical AND on the Elements of two input vectors |
| APC_SPE | Performs an Array Processor Controller (APC) to Signal Processing Element (SPE) transfer |
| ARCTAN | Determines the arctangent of input vector X |
| CENTROID | Performs centroid operation to determine the range gate location for pulses. |
| COORD_ROT | Performs coordinate rotation |
| CVTCPX | Converts two real vectors to a complex vector |
| CVTDFX | Convert input vector to a double precision fixed point vector |
| CVTREL | Converts one complex vector to two real vectors |
| CVTSFX | Converts input vector to a single precision fixed point vector |
| DET | Performs $(XR^2 - XI^2)^{.5}$ where XR and XI are the real and imaginary components of the complex vector X. |
| DETX | Performs the detect operation $MAX(XR,XI) - MIN(XR,XI) \cdot X$ where X is a constant. |
| DIV | Divides two input vectors X and Y and generates the quotient in output vector Z |
| DOT | Determines the dot product of vectors X and Y generating a scalar result |
| DOTJ | Determines the dot product of a single precision complex vector and a single precision complex conjugate vector generating a scalar result. |
| DPEXT | Adds a double precision fixed real vector to a single precision fixed real vector with sign extend. |
| DPFFT | Computes double precision base 2 FFT |
| EXP | Determines the inverse of ln X, $Y = e^X$ |
| FFT2 | Determines a base 2 Fast Fourier Transform on a given time series data block |
| FFTW | Multiplies the input vector by a set of real numbers (weights) and then performs the first stage of an FFT. |
| GLOK_SPE | Performs GLOK to SPE transfer |
| HIST_SORT_1D | Sorts RF pulses into bins and create a histogram for each RF region. |
| HIST_SORT_2D | Sort RF pulses into RF-AOA combination bins and create a histogram for each RF-AOA combination. |
| INIT0 | Initializes the input vector to all zeros |
| INIT1 | Fills all bits of the input vector with ones. |
| LN | Determines the natural log of input vector X. |
| LOG | Determines the log base 10 of input vector X |
| MACC | Multiplies two vectors and sums their products to generate a scalar with the same precision. |
| MACCD | Multiplies two vectors and sums their products to generate a scalar with twice the precision of the input vectors. |
| MADD | Multiples two vectors and sums the product with a third vector to generate the resulting vector. |
| MAXV | Compares two vectors X and Y and generates a vector Z containing the maximum values. |
| MAXW | Determines the word in vector X which has the maximum value. The result is the maximum value and its index. |
| MINV | Compares two vectors X and Y and generates a vector Z containing the minimum values. |
| MINW | Determines the word in vector X which has the minimum value. The result is the minimum value and its index. |

| | |
|---|---|
| MMAD | Multiplies two sets of vectors and sums their products $Z = (V * W) - (X * Y)$ |
| MOVE | Transfers data from one memory location to another |
| MPY | Multiplies two vectors to produce a resulting vector with the same precision |
| MPYC | Determines the conjugate of the two-word real multiplication of the input vector X by vector Y. $Z = (X_U * Y_R) - j(X_L * Y_I)$ |
| MPYCJ | Multiplies two complex vectors X and Y to produce a two-word vector Z. The upper word of vector Z is the complex result of the instruction MPY; the lower word of vector Z is the complex result of the vector X by the conjugate vector Y. $Z1 = X * Y$, $Z2 = X * Y$ |
| MPYD | Multiplies two vectors and generates an output vector with twice the precision. |
| MPYFL | Calculates the full length 16 x 16 multiply and out puts the lower 16 bits. |
| MPYRCC | Multiplies a real vector X by a complex vector Y to produce a complex vector Z. |
| NEG | Performs a two's complement on each element of input vector X |
| NOT | Performs a bit-wise logical NOT of the elements of vector X to generate the result Z. |
| OR | Performs a bit-wise logical OR of the elements of vectors X and Y to generate the result Z. |
| P1Z1 | Performs a one-pole, one-zero filter on a complex data vector |
| P2Z2 | Performs a two-pole, two-zero filter on a complex data vector |
| POLE1 | Performs a one-pole feedback filter |
| POLE1RE | Performs a recursive one-pole filter |
| PST | Performs Pulse Sort Transform - determines signal PRF, agility parameters, and stagger levels. |
| ROUND | Rounds input vector X |
| SAP | Scales a double precision complex vector by a single precision constant and rounds to single precision. |
| SLIDE_AVE | Performs a sliding window average operation |
| SPE_APC | Performs an SPE to APC transfer |
| SPE_INIT | SPE specific vector initialization. It presets a vector in SPE memory as determined by a value X. If X does not equal SPE identifier passed by the GLOK then no operation is performed in the SPE. If X does not equal the SPE identifier, vector Y is written into vector Z. This is useful to initialize or blank specific range gates. |
| SPE_BRDC | SPE broadcast |
| SPE_EXT | Performs a SPE to external location transfer |
| SPE_PBM | Performs a SPE to PBM transfer |
| SPE_SPE | Performs an SPE to SPE transfer |
| SPE_SPEC | Clockwise SPE to SPE transfer |
| SPE_SPECC | Counterclockwise SPE to SPE transfer |
| SPE_SPE_CND | Conditional SPE to SPE transfer |
| SQRT | Determines the square root of the input vector X |
| SUB | Subtracts two vectors to produce a difference vector |
| SWAP | Swaps the upper 16 bits of a word with the lower 16 bits |
| TBLUP_SPE | Performs a SPE table lookup function using the addresses stored in vector X to obtain the contents of the specified locations in vector Y. The result is stored in vector Z. |
| TBLUP_PBM | Performs an extended table lookup to obtain the contents of the locations in the PBM. |
| THCNT | Determines the number of times the value of the elements in the input vector X exceeds the values of the threshold vector Y and generates the final count in scalar Z. |
| THV_ARR | Compare the hit count in each sort bin to a threshold and generate a compressed bin tabulation array of those bins exceeding the threshold. |
| XOR | Determines a bit-wise logical XOR on the elements of two vectors X and Y to generate the resulting vector Z. |
| ZERO1 | Determines a one-zero complex, feed-forward filter. |
| ZERO1RE | Determines a one-zero recursive filter |

WSP USER'S MANUAL

Table 1.1 Application Process Definition Table

| FILENAME | PROCESS NAME | FAMILY | CPU | PRIORITY | ATOMIC | INITIAL STATE |
|---|---|---|---|---|---|---|
| SES | 255 | 255 | B | 7 | F | READY |
| F1INIT | 254 | 254 | A | 15 | T | READY |
| F2INIT | 253 | 253 | B | 15 | T | READY |
| F1SHUTDOWN | 252 | 252 | A | 15 | T | READY |
| F2SHUTDOWN | 251 | 251 | B | 15 | T | READY |
| PROCESS1 | 1 | 50 | A | 8 | F | DORMANT |
| PROCESS2 | 2 | 50 | A | 8 | T | READY |
| PROCESS3 | 3 | 50 | A | 9 | F | READY |
| PROCESS4 | 4 | 51 | B | 8 | F | READY |
| PROCESS5 | 5 | 51 | B | 8 | F | READY |
| PROCESS6 | 6 | 51 | B | 9 | F | READY |
| PROCESS7 | 7 | 51 | B | 9 | F | READY |
| PROCESS8 | 8 | 50 | A | 8 | F | READY |
| PROCESS9 | 9 | 50 | A | 12 | F | READY |

Table 1.2 Semaphore and Event Definition Table

| ID | GLOBAL LOCAL | NUM | INIT VALUE | MAX VALUE | LOG. ID | LABEL | PROCESS FROM | PROCESS TO |
|---|---|---|---|---|---|---|---|---|
| S2 | L | 16 | 0 | 10 | 50 |  | 1 | 2 |
| S3 | L | 21 | 1 | 10 | 50 | 60 | 3 | 2 |
| S4 | G | 64 | 1 | 10 | 50 |  | 7 | 1 |
| S5 | L | 20 | 1 | 10 | 51 |  | 7 | 4 |
| S6 | G | 66 | 0 | 10 | 51 |  | 2 | 6 |
| S7 | G | 67 | 0 | 10 | 51 |  | 3 | 7 |
| S8 | G | 68 | 0 | 10 | 50 |  | 6 | 8 |
| S9 | L | 19 | 0 | 10 | 50 |  | 8 | 9 |
| S10 | G | 69 | 0 | 10 | 51 |  | 9 | 7 |
| S11 | G | 65 | 0 | 10 | 51 |  | 1 | 5 |
| S12 | L | 17 | 0 | 10 | 51 |  | 5 | 6 |
| S13 | L | 18 | 0 | 10 | 51 |  | 2 | 3 |
|  | G | 70 | 0 | 1 | 255 |  | F2SD | SES |
|  | G | 71 | 0 | 1 | 254 |  | F2INIT | F1INIT |
|  | L | 22 | 0 | 1 | 255 | 2 |  | SES |

WSP USER'S MANUAL

Table 1.3  Data Buffer Definition Table

| ID | NUM WORDS | SOURCE PROCESS | DEST. PROCESS | SOURCE LABEL | DEST. LABEL |
|----|-----------|----------------|---------------|--------------|-------------|
| D1 | 100 | 1 | 2 | 61 | 62 |
| D2 | 50 | 1 | 6 | 63 | 64 |
| D3 | 100 | 1 | 5 | 65 | 66 |
| D4 | 100 | 2 | 3 | 67 | 68 |
| D5 | 100 | 2 | 6 | 69 | 70 |
| D7 | 50 | 5 | 8 | 73 | 74 |
| D8 | 30 | 6 | 8 | 75 | 76 |
| D9 | 20 | 3 | 7 | 77 | 78 |
| D11 | 100 | 6 | 9 | 80 | 79 |
| D12 | 30 | 8 | 9 | 81 | 82 |
| D19 | 50 | 4 | 5 | 89 | 90 |
| D20 | 10 | 3 | 2 | 91 | 60 |

WSP USER'S MANUAL

```
with User_Interface;           use User_Interface;
with B1553_Messages;           use B1553_Messages;
with B1553_Routines;           use B1553_Routines;
with SES_Vars;

--
-- Title      SES
--
--
--                 Copyright (c) 1987 Westinghouse Electric Corporation
-- Contractor
--
--                 Westinghouse Electric Corporation
--                 P.O. Box 746
--                 Baltimore, Maryland 21203
--
-- Subsystem  N/A
--
-- Abstract
--
--                 This program defines and starts the executive processes to
--                 initialize each CPU, defines global semaphores, and defines
--                 and starts the executive processes to "cleanup" the CPUs when
--                 the demo is exited.
--
-- Environment
--
--                 Oriented towards VAMP hardware architecture.
--
-- Modification History
--
--                 Author              Date         Description
--                 Karen Overbeke      01/21/87     Created
--                 Karen Overbeke      05/08/87     Removed wakes, added atomic
procedure SES is Process_Def     : User_Interface.Process_Definition_Type;
   SE_Def          : User_Interface.SE_Definition_Type;

procedure Define_Family_Init_Execs;
   procedure Define_Family_Shutdown_Execs;
   procedure Define_Global_Semaphores;
   procedure Delete_Global_Semaphores;
```

WSP USER'S MANUAL

```
-- ----------------------------------------------------------------
--
-- Module          DEFINE_FAMILY_INIT_EXECS
--
-- Overview
--     This procedure defines the initialization process for each family.
--     The initialization exec is atomic and maximum priority.
--
-- Modification History
--          Author              Date
--          Karen Overbeke      02/12/87      Created       Description
--
-- ---------------------------------------------------------------- procedure Define_Family_Init_Execs is
begin

-- define the initialization executive process for Family 1
        Process_Def.Name           := 254;
        Process_Def.Process_Family := 254;
        Process_Def.Priority       := User_Interface.Max_Process_Priority;
        Process_Def.Atomic         := True;
        Define_Process (Process_Definition => Process_Def);

-- define the initialization executive process for Family 2
        Process_Def.Name           := 253;
        Process_Def.Process_Family := 253;
        Process_Def.Priority       := User_Interface.Max_Process_Priority;
        Process_Def.Atomic         := True;
        Define_Process (Process_Definition => Process_Def);

end Define_Family_Init_Execs;
```

WSP USER'S MANUAL

```
-- ----------------------------------------------------------------
--
-- Module         DEFINE_FAMILY_SHUTDOWN_EXECS
--
-- Overview
--     This procedure defines the shutdown process for each family
--     The initialization exec is atomic and maximum priority.
--
-- Modification History
--              Author                    Date               Description
--         Karen Overbeke               02/12/87             Created
-- ---------------------------------------------------------------- procedure Define_Family_Shutdown_Execs is
begin

-- define the cleanup executive process for Family 1
      Process_Def.Name            := 252;
      Process_Def.Process_Family  := 252;
      Process_Def.Priority        := User_Interface.Max_Process_Priority;
      Process_Def.Atomic          := True;
      Define_Process (Process_Definition => Process_Def);

-- define the cleanup executive process for Family 2
      Process_Def.Name            := 251;
      Process_Def.Process_Family  := 251;
      Process_Def.Priority        := User_Interface.Max_Process_Priority;
      Process_Def.Atomic          := True;
      Define_Process (Process_Definition => Process_Def);

end Define_Family_Shutdown_Execs;
```

WSP USER'S MANUAL

```
-- ----------------------------------------------------------------
--
-- Module         DEFINE_GLOBAL_SEMAPHORES
--
-- Overview
--   This procedure defines global semaphores in the application.
--
-- Modification History
--            Author                  Date              Description
--        Karen Overbeke             02/12/87           Created
--
-- ---------------------------------------------------------------- procedure Define_Global_Semaphores is
  begin

-- define a global semaphore to coordinate initialization of the processors
      SE_Def.Semaphore_Or_Event  := Semaphore;
      SE_Def.Global_Or_Local     := Global;
      SE_Def.Number              := 71;
      SE_Def.Value               := 0;
      SE_Def.Max_Value           := 1;
      SE_Def.Logical_Module_ID   := 254;
      Define_SE (SE_Definition => SE_Def);        -- family 1 init -- define a global semaphore to coordinate shutdown of the processors
      SE_Def.Semaphore_Or_Event  := Semaphore;
      SE_Def.Global_Or_Local     := Global;
      SE_Def.Number              := 70;
      SE_Def.Value               := 0;
      SE_Def.Max_Value           := 1;
      SE_Def.Logical_Module_ID   := 255;
      Define_SE (SE_Definition => SE_Def);        -- ses -- define global semaphore S4
      SE_Def.Semaphore_Or_Event  := Semaphore;
      SE_Def.Global_Or_Local     := Global;
      SE_Def.Number              := 64;
      SE_Def.Value               := 1;           -- initially 1 to avoid deadlock
      SE_Def.Max_Value           := 10;
      SE_Def.Logical_Module_ID   := 50;
      Define_SE (SE_Definition => SE_Def);        -- process 1, family 1

-- define semaphore S11
      SE_Def.Semaphore_Or_Event  := Semaphore;
      SE_Def.Global_Or_Local     := Global;
      SE_Def.Number              := 65;
      SE_Def.Value               := 0;
      SE_Def.Max_Value           := 10;
```

WSP USER'S MANUAL

```
    SE_Def.Logical_Module_ID   := 51;          -- process 5, family 2
    Define_SE (SE_Definition => SE_Def);

-- define semaphore S6
    SE_Def.Semaphore_Or_Event  := Semaphore;
    SE_Def.Global_Or_Local     := Global;
    SE_Def.Number              := 66;
    SE_Def.Value               := 0;
    SE_Def.Max_Value           := 10;
    SE_Def.Logical_Module_ID   := 51;          -- process 6, family 2
    Define_SE (SE_Definition => SE_Def);

-- define semaphore S7
    SE_Def.Semaphore_Or_Event  := Semaphore;
    SE_Def.Global_Or_Local     := Global;
    SE_Def.Number              := 67;
    SE_Def.Value               := 0;
    SE_Def.Max_Value           := 10;
    SE_Def.Logical_Module_ID   := 51;          -- process 7, family 2
    Define_SE (SE_Definition => SE_Def);

-- define semaphore S8
    SE_Def.Semaphore_Or_Event  := Semaphore;
    SE_Def.Global_Or_Local     := Global;
    SE_Def.Number              := 68;
    SE_Def.Value               := 0;
    SE_Def.Max_Value           := 10;
    SE_Def.Logical_Module_ID   := 50;          -- process 8, family 1
    Define_SE (SE_Definition => SE_Def);

-- define semaphore S10
    SE_Def.Semaphore_Or_Event  := Semaphore;
    SE_Def.Global_Or_Local     := Global;
    SE_Def.Number              := 69;
    SE_Def.Value               := 0;
    SE_Def.Max_Value           := 10;
    SE_Def.Logical_Module_ID   := 51;          -- process 7, family 2
    Define_SE (SE_Definition => SE_Def);

end Define_Global_Semaphores;
```

WSP USER'S MANUAL

```
-- ----------------------------------------------------------------
--
-- Module         DELETE_GLOBAL_SEMAPHORES
--
-- Overview
--    This procedure deletes global semaphores in the application
-- Modification History
--
--              Author                  Date              Description
--         Karen Overbeke              02/12/87           Created
--
-- ---------------------------------------------------------------- procedure Delete_Global_Semaphores is
begin
        Delete_SE (Number => 64);     -- semaphore S4
        Delete_SE (Number => 65);     -- semaphore S11
        Delete_SE (Number => 66);     -- semaphore S6
        Delete_SE (Number => 67);     -- semaphore S7
        Delete_SE (Number => 68);     -- semaphore S8
        Delete_SE (Number => 69);     -- semaphore S10
        Delete_SE (Number => 70);     -- family shutdown semaphore
        Delete_SE (Number => 71);     -- family initializiation semaphore
end Delete_Global_Semaphores;
```

WSP USER'S MANUAL

```
--
================================================================
=========
--                          SES
--
================================================================
=========
begin Atomic;
      Define_Family_Init_Execs;

Define_Global_Semaphores;

-- set the demo executing flag to true
      SES_Vars.Demo_Executing := true;

Non_Atomic;

-- when the display s/w executing on the MicroVax sets the executing flag
   -- to false to signify that the demo has been exited and is no longer
   -- executing, remove all processes, semaphores, and timers from the
   -- 1750A CPUs while SES_Vars.Demo_Executing = true loop
      null;
   end loop;

-- demo has been stopped so delete applications
   Atomic;
      Define_Family_Shutdown_Execs;
      -- before deleting global semaphores, wait for the non cluster
      -- master cpu to execute its family shutdown executive and
      -- dorm the application processes so processes won't be signalling
      -- a semaphore that has been deleted
      Wait (Number => 70);
      -- delete global semaphores for the application processes
      Delete_Global_Semaphores;
   Non_Atomic;

-- delete self
   Change_BIU_Logical_Id (Logical_Id => 255,
                          To_Enabled => false);

Delete_Process (Process        => 255,
                   Process_Family => 255);
end SES;
```

WSP USER'S MANUAL

```
with User_Interface;    use User_Interface;

--
--
-- Title          F1INIT (FAMILY1 INITIALIZATION EXECUTIVE)
--
--                Copyright (c) 1986, 1987 Westinghouse Electric Corporation
-- Contractor
--
--                Westinghouse Electric Corporation
--                P.O. Box 746
--                Baltimore, Maryland 21203
--
-- Subsystem      N/A
--
-- Abstract
--
--                This program contains and executes the procedures necessary to
--                initialize and start the application process environment for
--                family 1 of the DOS demo.
--
-- Environment
--
--                Oriented towards VAMP hardware architecture.
--
-- Modification History
--
--                Author            Date              Description
--                Karen Overbeke    01/20/87          Created procedure F1Init is
    procedure Family1_Process_Defines;
    procedure Family1_Label_Defines;
    procedure Family1_Semaphore_Defines;
pragma page;
```

WSP USER'S MANUAL

```
--*******************************************************************
--
-- Procedure              FAMILY1_PROCESS_DEFINES
--
-- Overview
--     This procedure defines processes in family 1.
--     For all processes in family 1:
--        Sliced = false,
--        System_Process = false,
--        Processor = GP,
--        Deadline = 1 hour.
--
--     Process    Name    Priority    Atomic    Process Family
--     -------    ----    --------    ------    --------------
--        1         1         8         No           50
--        2         2         8         Yes          50
--        3         3         9         No           50
--        8         8         8         No           50
--        9         9        12         No           50
--
-- Modification History
--
--          Author                   Date              Description
--          Karen Overbeke        12/15/86  Created
--          Karen Overbeke        03/25/87  Removed address state and
--                                          start address from
--                                          process_def parameters
--*******************************************************************
procedure Family1_Process_Defines is Process_Def : User_Interface.Process_Definition_Type;
begin -- define process 1
-- id = 1, process family = 50, priority = 8, not atomic
    Process_Def.Name := 1;
    Process_Def.Process_Family := 50;
    Process_Def.Priority := 8;
    Process_Def.Initial_State := Dormant;
    Process_Def.Atomic := False;
    Define_Process (Process_Definition => Process_Def);
-- define process 2
-- id = 2, process family = 50, priority = 8, atomic
    Process_Def.Name := 2;
    Process_Def.Process_Family := 50;
    Process_Def.Priority := 8;
    Process_Def.Initial_State := Ready;
```

WSP USER'S MANUAL

```
        Process_Def.Atomic := True;
        Define_Process (Process_Definition => Process_Def);
    -- define process 3
    -- id = 3, process family = 50, priority = 9, not atomic
        Process_Def.Name := 3;
        Process_Def.Process_Family := 50;
        Process_Def.Priority := 9;
        Process_Def.Atomic := False;
        Define_Process (Process_Definition => Process_Def);

-- define process 8
    -- id = 8, process family = 50, priority = 8, not atomic
        Process_Def.Name := 8;
        Process_Def.Process_Family:= 50;
        Process_Def.Priority := 8;
        Process_Def.Atomic := False;
        Define_Process (Process_Definition => Process_Def);

-- define process 9
    -- id = 9, process family = 50, priority = 12, not atomic
        Process_Def.Name := 9;
        Process_Def.Process_Family:= 50;
        Process_Def.Priority := 12;
        Process_Def.Atomic := False;
        Define_Process (Process_Definition => Process_Def);

end Family1_Process_Defines;

--
===============================================================================
==========
pragma page;
```

WSP USER'S MANUAL

```
      Process_Def.Atomic := True;
      Define_Process (Process_Definition => Process_Def);

-- define process 3
   -- id = 3, process family = 50, priority = 9, not atomic
      Process_Def.Name := 3;
      Process_Def.Process_Family := 50;
      Process_Def.Priority := 9;
      Process_Def.Atomic := False;
      Define_Process (Process_Definition => Process_Def);

-- define process 8
   -- id = 8, process family = 50, priority = 8, not atomic
      Process_Def.Name := 8;
      Process_Def.Process_Family:= 50;
      Process_Def.Priority := 8;
      Process_Def.Atomic := False;
      Define_Process (Process_Definition => Process_Def);

-- define process 9
   -- id = 9, process family = 50, priority = 12, not atomic
      Process_Def.Name := 9;
      Process_Def.Process_Family:= 50;
      Process_Def.Priority := 12;
      Process_Def.Atomic := False;
      Define_Process (Process_Definition => Process_Def);

end Family1_Process_Defines;

--
===============================================================================
===========
pragma page;
```

WSP USER'S MANUAL

```
--***********************************************************************
--
-- Procedure             FAMILY1_LABEL_DEFINES
--
-- Subsystem
--
-- Overview
--    This procedure sets up the label table for family 1.
--
-- Modification History
--       Author                  Date            Description
--       Karen Overbeke
--
--*********************************************************************** procedure Family1_Label_Defines is
    Label_Array : User_Interface.Label_Array_Type;
begin -- modify the label table, currently, only 4 label table entries may be
-- modified per "Modify_Label_Table" call Label_Array(1) := (Label      => 61,
                       Bit        => ACTIVE_BIT,     -- process 1, data D1
                       To_Enabled => true);
    Label_Array(2) := (Label      => 62,
                       Bit        => ACTIVE_BIT,     -- process 2, data D1
                       To_Enabled => true);
    Label_Array(3) := (Label      => 63,
                       Bit        => ACTIVE_BIT,     -- process 1, data D2
                       To_Enabled => true);
    Label_Array(4) := (Label      => 65,
                       Bit        => ACTIVE_BIT,     -- process 6, data D2
                       To_Enabled => true);
    Modify_Label_Table (Label_Count => 4,
                        Label_Array => Label_Array);

Label_Array(1) := (Label      => 67,
                       Bit        => ACTIVE_BIT,     -- process 2, data D4
                       To_Enabled => true);
    Label_Array(2) := (Label      => 68,
                       Bit        => ACTIVE_BIT,     -- process 3, data D4
                       To_Enabled => true);
    Label_Array(3) := (Label      => 69,
                       Bit        => ACTIVE_BIT,     -- process 2, data D5
                       To_Enabled => true);
```

WSP USER'S MANUAL

```
Label_Array(4) := (Label      => 74,
                   Bit        => ACTIVE_BIT,       -- process 8, data D7
                   To_Enabled => true);
Modify_Label_Table (Label_Count => 4,
                    Label_Array => Label_Array);

Label_Array(1) := (Label      => 76,
                   Bit        => ACTIVE_BIT,       -- process 8, data D8
                   To_Enabled => true);
Label_Array(2) := (Label      => 77,
                   Bit        => ACTIVE_BIT,       -- process 3, data D9
                   To_Enabled => true);
Label_Array(3) := (Label      => 79,
                   Bit        => ACTIVE_BIT,       -- process 9, data D11
                   To_Enabled => true);
Label_Array(4) := (Label      => 81,
                   Bit        => ACTIVE_BIT,       -- process 8, data D12
                   To_Enabled => true);
Modify_Label_Table (Label_Count => 4,
                    Label_Array => Label_Array);

Label_Array(1) := (Label      => 82,
                   Bit        => ACTIVE_BIT,       -- process 9, data D12
                   To_Enabled => true);
Label_Array(2) := (Label      => 83,
                   Bit        => ACTIVE_BIT,       -- process 9, data D13
                   To_Enabled => true);
Label_Array(3) := (Label      => 91,
                   Bit        => ACTIVE_BIT,       -- process 3, data D20
                   To_Enabled => true);
Label_Array(4) := (Label      => 60,
                   Bit        => ACTIVE_BIT,       -- process 2, data D20
                   To_Enabled => true);
Modify_Label_Table (Label_Count => 4,
                    Label_Array => Label_Array);

end Family1_Label_Defines;
--
================================================================================
==========
pragma page;
```

WSP USER'S MANUAL

```
--**************************************************************************
--
-- Procedure               FAMILY1_SEMAPHORE_DEFINES
--
-- Overview
--   This procedure defines semaphores and events for family 1.
--   For all semaphores and events: Global_Or_Local = local.
--   For all semaphores: System_Flag = false;
--
-- Modification History
--            Author              Date           Description
--       Karen Overbeke          12/17/86        Created
--**************************************************************************

Procedure Family1_Semaphore_Defines is

SE_Def : User_Interface.SE_Definition_Type;

begin

-- define semaphore S2
      SE_Def.Semaphore_Or_Event := Semaphore;
      SE_Def.Global_Or_Local := Local;
      SE_Def.Number := 16;
      SE_Def.Value := 0;
      SE_Def.Max_Value := 10;
      SE_Def.Logical_Module_ID := 50;    -- process 2
      Define_SE (SE_Definition => SE_Def);

-- define semaphore S13
      SE_Def.Semaphore_Or_Event := Semaphore;
      SE_Def.Global_Or_Local := Local;
      SE_Def.Number := 18;
      SE_Def.Value := 0;
      SE_Def.Max_Value := 10;
      SE_Def.Logical_Module_ID := 50;    -- process 3
      Define_SE (SE_Definition => SE_Def);

-- define semaphore S9
      SE_Def.Semaphore_Or_Event := Semaphore;
      SE_Def.Global_Or_Local := Local;
      SE_Def.Number := 19;
      SE_Def.Value := 0;
      SE_Def.Max_Value := 10;
      SE_Def.Logical_Module_ID := 50;    -- process 9
      Define_SE (SE_Definition => SE_Def);
```

WSP USER'S MANUAL

```
-- define semaphore S3
   SE_Def.Semaphore_Or_Event := Semaphore;
   SE_Def.Global_Or_Local := Local;
   SE_Def.Number := 21;
   SE_Def.Label := 60;
   SE_Def.Value := 1;
   SE_Def.Max_Value := 10;
   SE_Def.Logical_Module_ID := 50;      -- process 2
   Define_SE (SE_Definition => SE_Def);

end Family1_Semaphore_Defines;

--===============================================================
========
   pragma page;

begin

-- change the BIU logical ID for family 1 initialization executive
   Change_BIU_Logical_Id (Logical_Id => 254,
                          To_Enabled => true);

-- define the processes for family 1
   Family1_Process_Defines;

-- define the labels for family 1
   Family1_Label_Defines;

-- define the semaphores for family 1
   Family1_Semaphore_Defines;

-- change the BIU logical ID for family 1(processes = 1,2,3,8,9;
-- logical module id = 50
   Change_BIU_Logical_Id (Logical_Id => 50,
                          To_Enabled => true);

-- wait until family 2 finishes initializing its processes, labels, semaphores
   Wait (Number => 71);

-- Wake Process 1, since Family 2 must be alive before Process 1 can run.
   Wake_Process (Process        => 1,
                 Process_Family => 50);

-- delete self
   Change_BIU_Logical_Id (Logical_Id => 254,
                          To_Enabled => false);
```

WSP USER'S MANUAL

```
        Delete_Process (Process      => 254,
                        Process_Family => 254);
end F1Init;

with User_Interface;    use User_Interface;

--
-- Title         F2INIT    (FAMILY 2 INITIALIZATION EXECUTIVE)
--
--               Copyright (c) 1986, 1987 Westinghouse Electric Corporation
-- Contractor
--
--               Westinghouse Electric Corporation
--               P.O. Box 746
--               Baltimore, Maryland 21203
--
-- Subsystem     N/A
--
-- Abstract
--
--               This program contains and executes the procedures necessary to
--               initialize and start the application process environment on
--               Family 2 of the DOS demo.
--
-- Environment
--
--               Oriented towards VAMP hardware architecture.
--
-- Modification History
--               Author                    Date        Description
--               Karen Overbeke            01/20/87                Created procedure F2Init is
    procedure Family2_Process_Defines;
    procedure Family2_Label_Defines;
    procedure Family2_Semaphore_Defines;
pragma page;
```

WSP USER'S MANUAL

```
--*********************************************************************
--
-- Procedure                FAMILY2_PROCESS_DEFINES
--
-- Overview
--     This procedure defines processes on family 2.
--     For all processes on family 2:
--         Sliced = false,
--         System_Process = false,
--         Processor = GP,
--         Deadline = 1 hour.
--
--         Process         Name        Priority       Atomic         Process Family
--         -------         ----        --------       ------         --------------
--            4              4             8            No               51
--            5              5             8            No               51
--            6              6             9            No               51
--            7              7             9            No               51
-- Modification History
--         Author              Date              Description
--     Karen Overbeke       12/15/86          Created
--     Karen Overbeke       03/25/87          Removed start address and
--                                            address state from
--                                            process_def parameters
--********************************************************************* procedure Family2_Process_Defines is

Process_Def : User_Interface.Process_Definition_Type;

begin

-- define process 4
   -- id = 4, process family = 51, priority = 8, not atomic
      Process_Def.Name := 4;
      Process_Def.Process_Family := 51;
      Process_Def.Priority := 8;
      Process_Def.Atomic := False;
      Define_Process (Process_Definition => Process_Def);

-- define process 5
   -- id = 5, process family = 51, priority = 8, not atomic
      Process_Def.Name := 5;
      Process_Def.Process_Family := 51;
      Process_Def.Priority := 8;
      Process_Def.Atomic := False;
      Define_Process (Process_Definition => Process_Def);
```

WSP USER'S MANUAL

```
-- define process 6
-- id = 6, process family = 51, priority = 9, not atomic
    Process_Def.Name := 6;
    Process_Def.Process_Family := 51;
    Process_Def.Priority := 9;
    Process_Def.Atomic := False;
    Define_Process (Process_Definition => Process_Def);

-- define process 7
-- id = 7, process family = 51, priority = 9, not atomic
    Process_Def.Name := 7;
    Process_Def.Process_Family := 51;
    Process_Def.Priority := 9;
    Process_Def.Atomic := False;
    Define_Process (Process_Definition => Process_Def);

end Family2_Process_Defines;

--===========================================================
pragma page;
```

WSP USER'S MANUAL

```
--**************************************************************
--
-- Procedure           FAMILY2_LABEL_DEFINES
--
-- Subsystem
--
-- Overview
--    This procedure sets up the label table for family 2.
--
-- Modification History
--            Author              Date           Description
--            Karen Overbeke
--************************************************************** procedure Family2_Label_Defines is
   Label_Array : User_Interface.Label_Array_Type;
begin -- modify the label table, currently, only 4 label table entries may be
-- modified per "Modify_Label_Table" call Label_Array(1) := (Label         => 64,
                      Bit           => ACTIVE_BIT,      -- process 6, data D2
                      To_Enabled    => true);
   Label_Array(2) := (Label         => 66,
                      Bit           => ACTIVE_BIT,      -- process 5, data D3
                      To_Enabled    => true);
   Label_Array(3) := (Label         => 70,
                      Bit           => ACTIVE_BIT,      -- process 6, data D5
                      To_Enabled    => true);
   Label_Array(4) := (Label         => 71,
                      Bit           => ACTIVE_BIT,      -- process 5, data D6
                      To_Enabled    => true);
   Modify_Label_Table (Label_Count  => 4,
                       Label_Array  => Label_Array);

Label_Array(1) := (Label         => 73,
                      Bit           => ACTIVE_BIT,      -- process 5, data D7
                      To_Enabled    => true);
   Label_Array(2) := (Label         => 75,
                      Bit           => ACTIVE_BIT,      -- process 6, data D8
                      To_Enabled    => true);
   Label_Array(3) := (Label         => 78,
                      Bit           => ACTIVE_BIT,      -- process 7, data D9
                      To_Enabled    => true);
```

WSP USER'S MANUAL

```
      Label_Array(4) := (Label       => 80,
                         Bit         => ACTIVE_BIT,    -- process 6, data D11
                         To_Enabled  => true);
      Modify_Label_Table (Label_Count => 4,
                          Label_Array => Label_Array);

Label_Array(1) := (Label       => 86,
                         Bit         => ACTIVE_BIT,    -- process 6, data D17
                         To_Enabled  => true);
      Label_Array(2) := (Label       => 88,
                         Bit         => ACTIVE_BIT,    -- process 7, data D18
                         To_Enabled  => true);
      Label_Array(3) := (Label       => 89,
                         Bit         => ACTIVE_BIT,    -- process 4, data D19
                         To_Enabled  => true);
      Label_Array(4) := (Label       => 90,
                         Bit         => ACTIVE_BIT,    -- process 5, data D19
                         To_Enabled  => true);
      Modify_Label_Table (Label_Count => 4,
                          Label_Array => Label_Array);

end Family2_Label_Defines;
--==========================================================
pragma page;
```

WSP USER'S MANUAL

```
--*************************************************************
--
-- Procedure          FAMILY2_SEMAPHORE_DEFINES
--
-- Overview
--      This procedure defines semaphores and events for family 2.
--      For all semaphores and events: Global_Or_Local = local.
--      There are no semaphores local to Family 2.
--
-- Modification History
--          Author              Date            Description
--          Karen Overbeke      12/17/86        Created
--*************************************************************

Procedure Family2_Semaphore_Defines is

SE_Def : User_Interface.SE_Definition_Type;

begin

-- define semaphore S12
    SE_Def.Semaphore_Or_Event := Semaphore;
    SE_Def.Global_Or_Local := Local;
    SE_Def.Number := 17;
    SE_Def.Value := 0;
    SE_Def.Max_Value := 10;
    SE_Def.Logical_Module_ID := 51;    -- process 6
    Define_SE (SE_Definition => SE_Def);

-- define semaphore S5
    SE_Def.Semaphore_Or_Event := Semaphore;
    SE_Def.Global_Or_Local := Local;
    SE_Def.Number := 20;
    SE_Def.Value := 1;                  -- initially 1 to avoid deadlock
    SE_Def.Max_Value := 10;
    SE_Def.Logical_Module_ID := 51;    -- process 4
    Define_SE (SE_Definition => SE_Def);

end Family2_Semaphore_Defines;

--================================================================
pragma page;
```

WSP USER'S MANUAL

```
begin

-- change the BIU logical ID for family 2 initialization executive
   Change_BIU_Logical_Id (Logical_Id => 253,
                          To_Enabled => true);

-- define the processes for family 2
   Family2_Process_Defines;

-- define the labels for family 2
   Family2_Label_Defines;

-- define the semaphores for family 2
   Family2_Semaphore_Defines;

-- change the BIU logical ID for family 2 (processes = 4,5,6,7;
-- logical module id = 51)
   Change_BIU_Logical_Id (Logical_Id => 51,
                          To_Enabled => true);

-- let family 1 know that everything is initialized for family 2
   Signal (Number => 71);

-- delete self
   Change_BIU_Logical_Id (Logical_Id => 253,
                          To_Enabled => false);
   Delete_Process (Process       => 253,
                   Process_Family => 253);
end F2Init;
```

WSP USER'S MANUAL

```
with User_Interface;    use User_Interface;

--
-- Title      F1SHUTDOWN   (FAMILY1 SHUTDOWN EXECUTIVE)
--
--                Copyright (c) 1986, 1987 Westinghouse Electric Corporation
-- Contractor
--
--              Westinghouse Electric Corporation
--              P.O. Box 746
--              Baltimore, Maryland 21203
--
-- Abstract
--
--              This program contains and executes the procedures necessary to
--              remove the application process environment for family 1.
--
-- Environment
--
--              Oriented towards VAMP hardware architecture.
--
-- Modification History
--
--              Author                  Date              Description
--              Karen Overbeke          01/20/87          Created
procedure F1ShutDown is
    procedure Family1_Process_Dormants;
    procedure Family1_Label_Deletes;
    procedure Family1_Semaphore_Deletes;
    procedure Family1_Process_Deletes;
pragma page;
```

WSP USER'S MANUAL

```
--******************************************************************
--
-- Procedure            FAMILY1_PROCESS_DORMANTS
--
-- Overview
--     This procedure dormants processes for family 1.
--
-- Modification History
--
--          Author                  Date            Description
--          Karen Overbeke          12/17/86        Created
--
--****************************************************************** procedure Family1_Process_Dormants is begin

Dorm_Process (Process      => 1,
                      Process_Family => 50);

Dorm_Process (Process      => 2,
                      Process_Family => 50);

Dorm_Process (Process      => 3,
                      Process_Family => 50);

Dorm_Process (Process      => 8,
                      Process_Family => 50);

Dorm_Process (Process      => 9,
                      Process_Family => 50);

end Family1_Process_Dormants;

--================================================================
    pragma page;
```

WSP USER'S MANUAL

```
--**********************************************************************
--
-- Procedure              FAMILY1_LABEL_DELETES;
--
-- Overview
--    This procedure deletes the labels for family 1 from the label table.
--
-- Modification History
--       Author              Date          Description
--       Karen Overbeke      2/12/87       Created
--
--********************************************************************** procedure Family1_Label_Deletes is
    Label_Array : User_Interface.Label_Array_Type;
begin -- modify the label table, currently, only 4 label table entries may be
-- modified per "Modify_Label_Table" call Label_Array(1) := (Label      => 61,
                       Bit        => ACTIVE_BIT,      -- process 1, data D1
                       To_Enabled => false);
    Label_Array(2) := (Label      => 62,
                       Bit        => ACTIVE_BIT,      -- process 2, data D1
                       To_Enabled => false);
    Label_Array(3) := (Label      => 63,
                       Bit        => ACTIVE_BIT,      -- process 1, data D2
                       To_Enabled => false);
    Label_Array(4) := (Label      => 65,
                       Bit        => ACTIVE_BIT,      -- process 6, data D2
                       To_Enabled => false);
    Modify_Label_Table (Label_Count => 4,
                        Label_Array => Label_Array);

Label_Array(1) := (Label      => 67,
                       Bit        => ACTIVE_BIT,      -- process 2, data D4
                       To_Enabled => false);
    Label_Array(2) := (Label      => 68,
                       Bit        => ACTIVE_BIT,      -- process 3, data D4
                       To_Enabled => false);
    Label_Array(3) := (Label      => 69,
                       Bit        => ACTIVE_BIT,      -- process 2, data D5
                       To_Enabled => false);
    Label_Array(4) := (Label      => 74,
                       Bit        => ACTIVE_BIT,      -- process 8, data D7
                       To_Enabled => false);
    Modify_Label_Table (Label_Count => 4,
                        Label_Array => Label_Array);
```

WSP USER'S MANUAL

```
Label_Array(1) := (Label      => 76,
                   Bit        => ACTIVE_BIT,      -- process 8, data D8
                   To_Enabled => false);
Label_Array(2) := (Label      => 77,
                   Bit        => ACTIVE_BIT,      -- process 3, data D9
                   To_Enabled => false);
Label_Array(3) := (Label      => 79,
                   Bit        => ACTIVE_BIT,      -- process 9, data D11
                   To_Enabled => false);
Label_Array(4) := (Label      => 81,
                   Bit        => ACTIVE_BIT,      -- process 8, data D12
                   To_Enabled => false);
Modify_Label_Table (Label_Count => 4,
                    Label_Array => Label_Array);

Label_Array(1) := (Label      => 82,
                   Bit        => ACTIVE_BIT,      -- process 9, data D12
                   To_Enabled => false);
Label_Array(2) := (Label      => 83,
                   Bit        => ACTIVE_BIT,      -- process 9, data D13
                   To_Enabled => false);
Label_Array(3) := (Label      => 91,
                   Bit        => ACTIVE_BIT,      -- process 3, data D20
                   To_Enabled => false);
Label_Array(4) := (Label      => 60,
                   Bit        => ACTIVE_BIT,      -- process 2, data D20
                   To_Enabled => false);
Modify_Label_Table (Label_Count => 4,
                    Label_Array => Label_Array);

end Family1_Label_Deletes;
--===========================================================
pragma page;
```

WSP USER'S MANUAL

```
..*************************************************************
--
-- Procedure          FAMILY1_PROCESS_DELETES
--
-- Overview
--    This procedure deletes processes for family 1.
--
-- Modification History
--           Author                    Date            Description
--        Karen Overbeke              12/17/86         Created
--
..*************************************************************
   procedure Family1_Process_Deletes is begin Delete_Process (Process        => 1,
                      Process_Family => 50);

Delete_Process (Process        => 2,
                      Process_Family => 50);

Delete_Process (Process        => 3,
                      Process_Family => 50);

Delete_Process (Process        => 8,
                      Process_Family => 50);

Delete_Process (Process        => 9,
                      Process_Family => 50);

end Family1_Process_Deletes ;

--===============================================================
   pragma page;
```

WSP USER'S MANUAL

```
--**************************************************************
--
-- Procedure         FAMILY1_SEMAPHORE_DELETES
--
-- Overview
--    This procedure deletes semaphores and events for family 1.
--
-- Modification History
--      Author                Date              Description
--      Karen Overbeke        12/17/86          Created
--************************************************************** procedure Family1_Semaphore_Deletes is begin

Delete_SE (Number => 16);     -- semaphore S2
      Delete_SE (Number => 18);     -- semaphore S13
      Delete_SE (Number => 19);     -- semaphore S9
      Delete_SE (Number => 21);     -- semaphore S3 end Family1_Semaphore_Deletes;

--================================================================
   pragma page;
```

WSP USER'S MANUAL

```
begin
    Change_BIU_Logical_Id (Logical_Id => 252,
                           To_Enabled => true);

-- change the BIU logical ID for family 1 (processes = 1,2,3,8,9;
    -- logical module id = 50)
    Change_BIU_Logical_Id (Logical_Id => 50,
                           To_Enabled => false);

-- dormant the processes on family 1
    Family1_Process_Dormants;

-- delete the labels for family 1 from the label table
    Family1_Label_Deletes;

-- delete the semaphores for family 1
    Family1_Semaphore_Deletes;

-- delete the processes on family 1
    Family1_Process_Deletes;

-- signal the ses that family 1 has been shutdown
    Signal (Number => 70);

-- delete self
    Change_BIU_Logical_Id (Logical_Id => 252,
                           To_Enabled => false);
    Delete_Process (Process        => 252,
                    Process_Family => 252);
end F1ShutDown;
```

WSP USER'S MANUAL

```
with User_Interface;    use User_Interface;
--
-- Title           F2SHUTDOWN  (FAMILY2 SHUTDOWN INITIALIZATION EXECUTIVE)
--
--                 Copyright (c) 1986, 1987 Westinghouse Electric Corporation
-- Contractor
--
--                 Westinghouse Electric Corporation
--                 P.O. Box 746
--                 Baltimore, Maryland 21203
--
-- Subsystem       N/A
--
-- Abstract
--
--                 This program contains and executes the procedures necessary to
--                 remove the application process environment for family 2.
-- Environment
--
--                 Oriented towards VAMP hardware architecture.
--
-- Modification History
--                 Author              Date            Description
--                 Karen Overbeke      01/20/87        Created
procedure F2ShutDown is
    procedure Family2_Process_Dormants;
    procedure Family2_Label_Deletes;
    procedure Family2_Semaphore_Deletes;
    procedure Family2_Process_Deletes;
pragma page;
```

WSP USER'S MANUAL

```
--**********************************************************************
--
-- Procedure          FAMILY2_PROCESS_DORMANTS
--
-- Overview
--    This procedure dormants processes on family 2.
--
-- Modification History
--      Author              Date              Description
--    Karen Overbeke      12/17/86            Created
--
--********************************************************************** procedure Family2_Process_Dormants is begin

Dorm_Process (Process        => 4,
                  Process_Family => 51);

Dorm_Process (Process        => 5,
                  Process_Family => 51);

Dorm_Process (Process        => 6,
                  Process_Family => 51);

Dorm_Process (Process        => 7,
                  Process_Family => 51);

end Family2_Process_Dormants;

-- ======================================================================
pragma page;
```

WSP USER'S MANUAL

```
--****************************************************
--
-- Procedure            FAMILY2_LABEL_DELETES
--
-- Subsystem
--
-- Overview
--    This procedure deletes the labels for family 2 from the label table.
--
-- Modification History
--           Author              Date              Description
--    Karen Overbeke           2/12/87 Created
--
--**************************************************** procedure Family2_Label_Deletes is
    Label_Array : User_Interface.Label_Array_Type;
begin -- modify the label table, currently, only 4 label table entries may be
-- modified per "Modify_Label_Table" call Label_Array(1) := (Label      => 64,
                       Bit        => ACTIVE_BIT,      -- process 6, data D2
                       To_Enabled => false);
    Label_Array(2) := (Label      => 66,
                       Bit        => ACTIVE_BIT,      -- process 5, data D3
                       To_Enabled => false);
    Label_Array(3) := (Label      => 70,
                       Bit        => ACTIVE_BIT,      -- process 6, data D5
                       To_Enabled => false);
    Label_Array(4) := (Label      => 71,
                       Bit        => ACTIVE_BIT,      -- process 5, data D6
                       To_Enabled => false);
    Modify_Label_Table (Label_Count => 4,
                        Label_Array => Label_Array);

Label_Array(1) := (Label      => 73,
                       Bit        => ACTIVE_BIT,      -- process 5, data D7
                       To_Enabled => false);
    Label_Array(2) := (Label      => 75,
                       Bit        => ACTIVE_BIT,      -- process 6, data D8
                       To_Enabled => false);
    Label_Array(3) := (Label      => 78,
                       Bit        => ACTIVE_BIT,      -- process 7, data D9
                       To_Enabled => false);
    Label_Array(4) := (Label      => 80,
                       Bit        => ACTIVE_BIT,      -- process 6, data D11
                       To_Enabled => false);
```

WSP USER'S MANUAL

```
   Modify_Label_Table (Label_Count => 4,
                       Label_Array => Label_Array);

Label_Array(1) := (Label      => 86,
                   Bit        => ACTIVE_BIT,       -- process 6, data D17
                   To_Enabled => false);
Label_Array(2) := (Label      => 88,
                   Bit        => ACTIVE_BIT,       -- process 7, data D18
                   To_Enabled => false);
Label_Array(3) := (Label      => 89,
                   Bit        => ACTIVE_BIT,       -- process 4, data D19
                   To_Enabled => false);
Label_Array(4) := (Label      => 90,
                   Bit        => ACTIVE_BIT,       -- process 5, data D19
                   To_Enabled => false);
   Modify_Label_Table (Label_Count => 4,
                       Label_Array => Label_Array);

end Family2_Label_Deletes;

--
===============================================================================
pragma page;
```

WSP USER'S MANUAL

```
--****************************************************************
--
-- Procedure          FAMILY2_SEMAPHORE_DELETES
--
-- Overview
--     This procedure deletes semaphores and events for family 2.
--
-- Modification History
--         Author                  Date
--     Karen Overbeke           12/17/86   Created        Description
--
--**************************************************************** procedure Family2_Semaphore_Deletes is begin

-- delete family 2 local semaphores
    Delete_SE (Number => 17);    -- semaphore S12
    Delete_SE (Number => 20);    -- semaphore S5 end Family2_Semaphore_Deletes;

--
==================================================================
pragma page;
```

WSP USER'S MANUAL

```
--*************************************************************
--
-- Title      FAMILY2_PROCESS_DELETES
--
-- Overview
--    This procedure deletes processes for family 2.
--
-- Modification History
--          Author           Date                Description
--     Karen Overbeke      12/17/86    Created
--
--************************************************************* procedure Family2_Process_Deletes is begin

Delete_Process (Process        => 4,
                    Process_Family => 51);

Delete_Process (Process        => 5,
                    Process_Family => 51);

Delete_Process (Process        => 6,
                    Process_Family => 51);

Delete_Process (Process        => 7,
                    Process_Family => 51);

end Family2_Process_Deletes;

--
===============================================================
pragma page;
```

WSP USER'S MANUAL

```
begin

Change_BIU_Logical_Id (Logical_Id => 251,
                               To_Enabled => true);

-- change the BIU logical ID for family 2 (processes = 4,5,6,7;
  -- logical module ids = 48, 49, 50, 51)
        Change_BIU_Logical_Id (Logical_Id => 51,
                               To_Enabled => false);

-- dormant the processes on family 2
     Family2_Process_Dormants;

-- delete the labels for family 2
     Family2_Label_Deletes;

-- delete the semaphores on family 2
     Family2_Semaphore_Deletes;

-- delete the processes on family 2
     Family2_Process_Deletes;

-- delete self
     Change_BIU_Logical_Id (Logical_Id => 251,
                            To_Enabled => false);
     Delete_Process (Process        => 251,
                     Process_Family => 251);
end F2ShutDown;
```

WSP USER'S MANUAL

```
--
-- Title        PROCESS1
--
--              Copyright (c) 1987 Westinghouse Electric Corporation
-- Contractor
--
--              Westinghouse Electric Corporation
--              P.O. Box 746
--              Baltimore, Maryland 21203
--
-- Abstract
--
--              This process shows the following DOS functionality:
--                  code execution on a CPU module
--                  communication between CPUs
--
-- Environment
--
--              Oriented towards VAMP hardware architecture.
--
-- Modification History
--              Author              Date
--              Karen Overbeke      1/19/87            Description
--                                                     Created with User_Interface;           use User_Interface;
with Emulate_Processing_Pkg;   use Emulate_Processing_Pkg;
with Process1_Buffers;

procedure Process1 is
    P1_Loop_Counter : Integer := 0;   -- used for generating data in data flows
begin loop P1_Loop_Counter := P1_Loop_Counter + 1;
        if P1_Loop_Counter > 10000 then
            P1_Loop_Counter := 1;
        end if;

-- Wait for semaphore S4 from process 7
        Wait (Number => 64);

-- Emulate real processing activities
        Emulate_Processing (Loop_Number => 10);
    -- Output data D1 to process 2
        Process1_Buffers.P1_D1_Data := (1..100 => P1_Loop_Counter);
        CPU_Output (Req_CPU_Object_Label => 61,
                    Rem_P1_Bus_ID        => 50,    -- process 2 family
                    Rem_CPU_Object_Label => 62,
                    Word_Count           => 100);
```

WSP USER'S MANUAL

```
-- Output data D2 to process 6, include signal 2 (S2) to process 2
   Process1_Buffers.P1_D2_Data := (1..50 => P1_Loop_Counter);
   CPU_Output (Req_CPU_Object_Label => 63,
               Rem_PI_Bus_ID           => 51,    -- process 6 family
               Rem_CPU_Object_Label => 64,
               Word_Count              => 50,
               Semaphore_ID            => 16);   -- signal event 16 (E2)
-- Emulate real processing activities
   Emulate_Processing (Loop_Number => 20);

Process1_Buffers.P1_D3_Data := (1..100 => P1_Loop_Counter);

-- Signal semaphore 65 (S11) to process 5
   Signal (Number => 65);

end loop;

end Process1;
```

WSP USER'S MANUAL

```
--
-- Title    PROCESS2
--
--                  Copyright (c) 1987 Westinghouse Electric Corporation
-- Contractor
--
--                  Westinghouse Electric Corporation
--                  P.O. Box 746
--                  Baltimore, Maryland 21203
--
-- Subsystem  N/A
--
-- Abstract
--
--                  This process shows the atomic process functionality of the DOS
-- Environment
--                  Oriented towards VAMP hardware architecture.
--
-- Modification History
--
--          Author              Date                  Description
--          Karen Overbeke      12/19/86              Created with User_Interface;              use User_Interface;
with Emulate_Processing_Pkg;     use Emulate_Processing_Pkg;
with Process2_Buffers;

procedure Process2 is
    Label_Array       : User_Interface.Label_Array_Type;
    P2_Loop_Counter   : Integer := 0;        -- used to generate data for data flows
    Wait_Numbers      : User_Interface.Semaphore_List_Type;
begin loop P2_Loop_Counter := P2_Loop_Counter + 1;
        if P2_Loop_Counter > 10000 then
            P2_Loop_Counter := 1;
        end if;

-- Wait for semaphore 16 (S2) from process 1 and
    -- semaphore 21 (S3) from process 3
        Wait_Numbers (1) := 16;      -- semaphore 16  (S2)
        Wait_Numbers (2) := 21;      -- semaphore 21  (S3)
        Waits (Condition => A_N_D,
               Count     => 2,
               Numbers   => Wait_Numbers);
    -- Process 3 did a CPU_Output to Label 60 which is associated with
    -- Semaphore 21. That transfer made Label 60 Busy. To allow the
    -- transfer to occur the next time Process 3 attempts it (and thereby
```

WSP USER'S MANUAL

```
-- allow Semaphore 21 to be signalled). Label 60 must be made non-Busy.
   Label_Array(1) := (Label       => 60,
                      Bit         => BUSY_BIT,
                      To_Enabled  => False);
   Modify_Label_Table (Label_Count => 1,
                       Label_Array => Label_Array);

-- Emulate real processing activities
   Emulate_Processing (Loop_Number => 200);

-- Output data D4 to process 3, include signal to semaphore S13 in process 3
   Process2_Buffers.P2_D4_Data := (1..100 => P2_Loop_Counter);
   CPU_Output (Req_CPU_Object_Label => 67,
               Rem_PI_Bus_ID        => 50,    -- process 3 family
               Rem_CPU_Object_Label => 68,
               Semaphore_ID         => 18,    -- signal semaphore 18 (S13)
               Word_Count           => 100);

-- Emulate real processing activities
   Emulate_Processing (Loop_Number => 70);

Process2_Buffers.P2_D5_Data := (1..100 => P2_Loop_Counter);

-- Signal semaphore S6 to process 6
   Signal (Number => 66);

-- Emulate real processing activities
   Emulate_Processing (Loop_Number => 50);

end loop;

end Process2;
```

WSP USER'S MANUAL

```
--
-- Title    PROCESS3
--
--              Copyright (c) 1986, 1987 Westinghouse Electric Corporation
-- Contractor
--
--              Westinghouse Electric Corporation
--              P.O. Box 746
--              Baltimore, Maryland 21203
--
-- Subsystem   N/A
--
-- Abstract
--
--              This process shows the atomic process functionality of the DOS
-- Environment
--
--              Oriented towards VAMP hardware architecture.
--
-- Modification History
--
--              Author              Date                Description
--              Karen Overbeke      12/19/86            Created with User_Interface;        use User_Interface;
with Emulate_Processing_Pkg;  use Emulate_Processing_Pkg;
with Process3_Buffers;

procedure Process3 is
   P3_Loop_Counter : Integer := 0;    -- used to generate data for data flows
begin
   loop
      P3_Loop_Counter := P3_Loop_Counter + 1;
      if P3_Loop_Counter > 10000 then
         P3_Loop_Counter := 1;
      end if;
   -- Wait on semaphore S13 from process 2
      Wait (Number => 18);

-- NOTE: data D4 (output from process 2) is now available
   -- Emulate real processing activities
      Emulate_Processing (Loop_Number => 240);

Process3_Buffers.P3_D9_Data := (1..20 => P3_Loop_Counter);
   -- Signal semaphore S7 to process 7
      Signal (Number => 67);
```

WSP USER'S MANUAL

```
      Process3_Buffers.P3_D20_Data := (1..10 => P3_Loop_Counter);
   -- output data D20 to process 2 causing semaphore S3 to be signalled
   -- to process 2 because semaphore S3 has label 60 associated with it
      CPU_Output (Req_CPU_Object_Label => 91,
                  Rem_PI_Bus_ID              => 50,   -- process 2 family
                  Rem_CPU_Object_Label => 60,
                  Word_Count                 => 10);
   end loop;
end Process3;
```

WSP USER'S MANUAL

```
--
-- Title    PROCESS4
--
--              Copyright (c) 1986, 1987 Westinghouse Electric Corporation
--
-- Contractor
--
--              Westinghouse Electric Corporation
--              P.O. Box 746
--              Baltimore, Maryland 21203
--
-- Subsystem   N/A
--
-- Abstract
--
--              This process is triggered off of a wrapped back semaphore.
--
-- Environment
--
--              Oriented towards VAMP hardware architecture.
--
-- Modification History
--
--              Author              Date                Description
--              Karen Overbeke      12/19/86            Created with User_Interface;              use User_Interface;
with Emulate_Processing_Pkg;      use Emulate_Processing_Pkg;
with Process4_Buffers;

procedure Process4 is
   P4_Loop_Counter : Integer := 0;  -- used for generating data for data flows
begin loop P4_Loop_Counter := P4_Loop_Counter + 1;
      if P4_Loop_Counter > 10000 then
         P4_Loop_Counter := 1;
      end if;

-- Wait for semaphore S5 from process 7
      Wait (Number => 20);

Process4_Buffers.P4_D19_Data := (1..50 => P4_Loop_Counter);

-- Emulate real processing activities
      Emulate_Processing (Loop_Number => 300);

end loop;

end Process4;
```

WSP USER'S MANUAL

```
-- 
-- Title    PROCESS8
--
--              Copyright (c) 1986, 1987 Westinghouse Electric Corporation
-- Contractor
--
--              Westinghouse Electric Corporation
--              P.O. Box 746
--              Baltimore, Maryland 21203
--
-- Subsystem   N/A
--
-- Abstract
--
--              This process shows the following DOS functionality:
--                  1 event signalling data from 2 processes
--                  atomic code section within a process
--
-- Environment
--
--              Oriented towards VAMP hardware architecture.
--
-- Modification History
--              Author              Date              Description
--              Karen Overbeke      12/19/86          Created with User_Interface;              use User_Interface;
with Emulate_Processing_Pkg;      use Emulate_Processing_Pkg;
with Process8_Buffers;

procedure Process8 is
    P8_Loop_Counter : Integer := 0;   -- for generating data in data flows
begin loop P8_Loop_Counter := P8_Loop_Counter + 1;
        if P8_Loop_Counter > 10000 then
            P8_Loop_Counter := 1;
        end if;

-- Wait on semaphore 68 (S8) from process 6
        Wait (Number => 68);

-- Emulate real processing activities
        Emulate_Processing (Loop_Number => 150);

-- Begin atomic section
        Atomic;
```

WSP USER'S MANUAL

```
        Process8_Buffers.P8_D12_Data := (1..30 => P8_Loop_Counter);
     -- Output data D12 to process 9.
     -- include signal to semaphore 19 (S9) to process 9
        CPU_Output (Req_CPU_Object_Label => 81,
                    Rem_PI_Bus_ID         => 50,  -- process 9 family
                    Rem_CPU_Object_Label  => 82,
                    Word_Count            => 30,
                    Semaphore_ID          => 19);

-- Emulate real processing activities
        Emulate_Processing (Loop_Number => 30);

-- End atomic section
     Non_Atomic;

end loop;

end Process8;

--
-- Title    PROCESS9
--
--
--                  Copyright (c) 1986, 1987 Westinghouse Electric Corporation
--
-- Contractor
--
--               Westinghouse Electric Corporation
--               P.O. Box 746
--               Baltimore, Maryland 21203
--
-- Subsystem    N/A
--
-- Abstract
--
--               This process shows the DOS functionality of an atomic section
--               within a process
--
-- Environment
--
--               Oriented towards VAMP hardware architecture
--
-- Modification History
--               Author              Date                Description
--               Karen Overbeke      12/19/86            Created with User_Interface;          use User_Interface;
with Emulate_Processing_Pkg;  use Emulate_Processing_Pkg;
with Process9_Buffers;
```

WSP USER'S MANUAL

```
--
-- Title    SES_VARS
--
--              Copyright (c) 1986, 1987 Westinghouse Electric Corporation
-- Contractor
--
--              Westinghouse Electric Corporation
--              P.O. Box 746
--              Baltimore, Maryland 21203
--
-- Abstract
--       this package spec contains the global variable that is used by the ses
--       to determine if the demo is still being executed.  The variable is
--       initially false and gets set to true by the ses after it begins the
--       initialization executives.  The display software on the MicroVax sets
--       the variable to false (via the vciu_comm_interface_pkg) when the
--       demo user chooses the "stop" selection from the demo menu.
--
-- Environment
--              Oriented towards VAMP hardware architecture.
--
-- Modification History
--              Author              Date                Description
--              Karen Overbeke      6/17/87             Created package SES_Vars is
    Demo_Executing  : Boolean := False;
end SES_Vars;

package Emulate_Processing_Pkg is

--
-- Title    EMULATE_PROCESSING_PKG
--
--              Copyright (c) 1986, 1987 Westinghouse Electric Corporation
-- Contractor
--
--              Westinghouse Electric Corporation
--              P.O. Box 746
--              Baltimore, Maryland 21203
--
-- Abstract
--       This package contains procedure Emulate_processing, which
--       simulates real processing in processes running on the DOS.
--
-- Environment
--              Oriented towards VAMP hardware architecture.
```

WSP USER'S MANUAL

```
procedure Process9 is
   P9_Loop_Counter : Integer := 0;     -- for generating data in data flows
begin
   loop
      P9_Loop_Counter := P9_Loop_Counter + 1;
      if P9_Loop_Counter > 10000 then
         P9_Loop_Counter := 1;
      end if;

-- Wait for semaphore 19 (S9) from process 8
      Wait (Number => 19);

-- Emulate real processing activities
      Emulate_Processing (Loop_Number => 100);

Process9_Buffers.P9_D13_Data := (1..30 => P9_Loop_Counter);
   -- Signal semaphore S10 to process 7
      CPU_Output (
         Req_CPU_Object_Label => 83,
         Rem_PI_Bus_ID        =>
                  PI_Bus_Slave_ID_Type(Memory_Module_Physical_Id),
         Rem_CPU_Object_Label => 85,
         Word_Count           => 30,
         Semaphore_ID         => 69);   -- signal semaphore 69 (E10)
   end loop;
end Process9;
```

WSP USER'S MANUAL

```
-- Modification History
--              Author         Date
--              Karen Overbeke 12/17/86     Created     Description
--
   procedure Emulate_Processing (Loop_Number : integer);
end;

package body Emulate_Processing_Pkg is

-- Title    EMULATE_PROCESSING_PKG
--
--          Copyright (c) 1986, 1987 Westinghouse Electric Corporation
-- Contractor
--
--          Westinghouse Electric Corporation
--          P.O. Box 746
--          Baltimore, Maryland 21203
-- Abstract
--
--          This procedure performs mathematical computations in a loop
--          from 1 to the input parameter loop value.
--          It simulates computational processing that would be performed
--          in real application processes.
--
-- Environment
--
--          Oriented towards VAMP hardware architecture.
-- Modification History
--              Author         Date
--              Karen Overbeke 12/17/86     Created     Description
   procedure Emulate_Processing (Loop_Number : integer) is
        Value : integer := 0;
   begin for Loop1 in 1..Loop_Number loop
         Value := Value + 1;
         if Value > 20000 then
            Value := 0;
         end if;
      end loop;

end Emulate_Processing;

end Emulate_Processing_Pkg;
```

WSP USER'S MANUAL

```
-- Title        PROCESS1_BUFFERS
--
--              Copyright (c) 1987 Westinghouse Electric Corporation
--
-- Contractor
--              Westinghouse Electric Corporation
--              P.O. Box 746
--              Baltimore, Maryland  21203
--
-- Overview
--              this package contains the data variables used for data flows
--              in process 1.
--
-- Modification History
--              Author              Date              Description
--              Karen Overbeke      05/20/87   Created package Process1_Buffers is subtype Word_Type is Integer;

type Array_50_Type is array (1..50) of Word_Type;
   type Array_100_Type is array (1..100) of Word_Type;

P1_D1_Data : Array_100_Type := (1..100 => 0);
   P1_D2_Data : Array_50_Type  := (1..50  => 0);
   P1_D3_Data : Array_100_Type := (1..100 => 0);

end Process1_Buffers;
```

WSP USER'S MANUAL

```
--
-- Title      PROCESS3_BUFFERS
--
--                  Copyright (c) 1987 Westinghouse Electric Corporation
--
-- Contractor
--
--                  Westinghouse Electric Corporation
--                  P.O. Box 746
--                  Baltimore, Maryland  21203
--
-- Overview
--
--                  this package contains the data variables used for data flows
--                  in process 3.
--
-- Modification History
--                  Author              Date
--                  Karen Overbeke      05/20/87   Created      Description package Process3_Buffers is subtype Word_Type is Integer;

type Array_10_Type  is array (1..10)  of Word_Type;
   type Array_20_Type  is array (1..20)  of Word_Type;
   type Array_100_Type is array (1..100) of Word_Type;

P3_D4_Data   : Array_100_Type := (1..100 => 0);
   P3_D9_Data   : Array_20_Type  := (1..20  => 0);
   P3_D20_Data  : Array_10_Type  := (1..10  => 0);

end Process3_Buffers;
```

WSP USER'S MANUAL

```
-- 
-- Title       PROCESS4_BUFFERS
--
--                 Copyright (c) 1987 Westinghouse Electric Corporation
-- Contractor
--
--              Westinghouse Electric Corporation
--              P.O. Box 746
--              Baltimore, Maryland  21203
-- Overview
--
--              this package contains the data variables used for data flows
--              in process 4.
-- Modification History
--              Author              Date
--              Karen Overbeke      05/20/87   Created    Description package Process4_Buffers is subtype Word_Type is Integer;
   type Array_50_Type is array (1..50) of Word_Type;

P4_D19_Data : Array_50_Type := (1..50 => 0);

end Process4_Buffers;
```

WSP USER'S MANUAL

```
--
-- Title       PROCESS8_BUFFERS
--
--                Copyright (c) 1987 Westinghouse Electric Corporation
-- Contractor
--
--              Westinghouse Electric Corporation
--              P.O. Box 746
--              Baltimore, Maryland  21203
--
-- Overview
--
--              this package contains the data variables used for data flows
--              in process 8.
--
-- Modification History
--
--              Author                  Date                    Description
--              Karen Overbeke          05/20/87    Created package Process8_Buffers is subtype Word_Type is integer;

type Array_30_Type is array (1..30) of Word_Type;
  type Array_50_Type is array (1..50) of Word_Type;

P8_D7_Data  : Array_50_Type := (1..50 => 0);
  P8_D8_Data  : Array_30_Type := (1..30 => 0);
  P8_D12_Data : Array_30_Type := (1..30 => 0);

end Process8_Buffers;
```

WSP USER'S MANUAL

```
-- Title        PROCESS9_BUFFERS
--
--              Copyright (c) 1987 Westinghouse Electric Corporation
-- Contractor
--
--              Westinghouse Electric Corporation
--              P.O. Box 746
--              Baltimore, Maryland   21203
--
-- Overview
--
--              this package contains the data variables used for data flows
--              in process 9.
--
-- Modification History
--              Author              Date                   Description
--              Karen Overbeke      05/20/87    Created package Process9_Buffers is subtype Word_Type is Integer;

type Array_30_Type is array (1..30) of Word_Type;
  type Array_100_Type is array (1..100) of Word_Type;

P9_D11_Data : Array_100_Type := (1..100 => 0);
  P9_D12_Data : Array_30_Type  := (1..30  => 0);
  P9_D13_Data : Array_30_Type  := (1..30  => 0);

end Process9_Buffers;
end app B
```

WSP USER'S MANUAL

APPENDIX F.
TOOLS

10.1 Introduction. The following list describes the tools available to the applications programmer.

a. ACT Ada Environment

- ACT Ada Compiler (Reference 1)
- ACT Ada Run-Time System (Reference 2)
- ACT Ada Linker (Reference 3)

b. VCIU

- Initialization (Reference 9)

c. Build_CPU_Image A problem arose in the usage of ACT's Ada tools, which are not extended memory based, for a system with extended memory. Absolute images (.ABB files) generated by the ACT Linker could only be loaded in the first 64K of memory, but the VAMP contains 256K of memory. Build_CPU_Image, a post-link tool, solves this problem by modifying linker-generated image(s) to load elsewhere in memory. In other words, all images are linked relative to address 0, then are modified by Build_CPU_Image to load where the user desires.

An ACT-generated image is made up of three types of load records: Code, Data and Literal, each record containing a start address. It will almost always be true that these records should all be loaded relative to the same physical address (examples to follow). However, a time may arise when it is desired that the different types of records be loaded relative to different locations, for example, 64K apart. Build_CPU_Image gives the user this load-time flexibility.

Images may be modified separately into individual image files or several images may be combined into a single image file. Build_CPU_Image is instructed of what images to modify (and combine) through an input file of the format:

```
[directory.spec]processX          ## ## ##
disk:[directory.spec]processY     ## ## ##
processZ                          ## ## ##
    :
              (blank line)
label-number process-name Ada-object-name
    :                :                :
```

WSP USER'S MANUAL

The image(s) to be modified/combined are listed above the blank line in the file. (The lines below the blank line are discussed in the next section.) Each image must be in a file with a .ABS file type. Note that the disk and directory specifications are optional, following normal VMS file referencing conventions.

The three pairs of #'s associated with the processes are what give the user his load-time flexibility. The ##s represent the two hex digits that are the 8 most significant bits in a 20-bit address for (256K) the Code records, Data records and Literal records, respectively. Therefore, the user has flexibility to 4K increments within memory. For example, if the input line is:

ProcessA    24    24    24 then ProcessA's image is modified to load the Code, Data and Literal records relative to physical address 24000. If a Code record is originally linked at 1000, Build_CPU_Image will modify the image so it is loaded at 25000 (= 24000 + 1000).

If, instead, the input line were:

ProcessA    34    24    24 then ProcessA's Code records would be loaded relative to 34000, and the Data and Literal records relative to 24000. Therefore, the Code record that was linked to 1000 is loaded at 35000 (= 34000 + 1000)

Generating a Label Table Build_CPU_Image is also the tool used to generate the CPU's PI-Bus Label Table. The label table can be generated only after linking all the processes that contain buffers to be pointed to by PI-Bus labels. After linking a process, run ACT's symbolic information tool on the process by invoking the /Symbolic_Information qualifier on the process's main unit. This ACT qualifier will create a file with the ".ABS_SYMB" file type. This file must remain in the same directory as the process's .ABS file. The format of the .ABS_SYMB file is a four-token line for each global Ada object in the process:

G    Token2    4-char-hex-address    Ada-object-name

Build_CPU_Image is mostly interested in the latter two tokens, but it also verifies the first token is a "G" for Global object. The object must be global in order to get its load address after linking. If the /Symbolic_Information qualifier is not working, the .ABS_SYMB can be generated by hand. To determine the buffer's eventual address by hand, find where the module's (containing the data buffer) data section (.01 extension in the .MAP file) is to be loaded. Then, determine the data buffer's offset from the beginning of the module's data section.

WSP USER'S MANUAL

The 16 least significant bits of the data module's data section address plus the data buffers's offset are what is to be inserted into the .ABS_SYMB file as the "4-char-hex-address".

Once all of the .ABS_SYMB files have been generated, the user is ready to invoke Build_CPU_Image to create the label table. Create the input file for Build_CPU_Image to contain directory specifications of all pertinent processes (including DOS's) and information regarding the PI-Bus labels. The format of the input file was shown in the above section. The information below the blank line in the file is for labels, which consist of three mandatory fields and two optional ones. The format is:

Label-number   Image   Ada-buffer-name   Active?   Interrupt?

The first three fields are mandatory. The fields are:

```
Label-number     : In decimal
Image            : The Image containing the Ada-buffer-name
Ada-buffer-name  : Name of global Ada object
Active?          : Label comes up initially active  (T/F)
Interrupt?       : Label comes up with interrupt bit set (T/F)
```

The two optional fields were created for DOS power-up reasons and it is not suggested that the user make use of these fields for application labels except in exceptional cases.

WSP USER'S MANUAL example, an excerpt from the input file that created the label table for the demonstration follows:

```
ec2users:|dos.act|dos                          00 00 00
ec2users:|dos.act.drivers.appl|process1  2C 2C 2C
ec2users:|dos.act.drivers.appl|process2  30 30 30
ec2users:|dos.act.drivers.appl|process3  34 34 34
ec2users:|dos.act.drivers.appl|process8  38 38 38
ec2users:|dos.act.drivers.appl|process9  3C 3C 3C
ec2users:|dos.act.drivers.appl|process4  2C 2C 2C
ec2users:|dos.act.drivers.appl|process5  30 30 30
ec2users:|dos.act.drivers.appl|process6  34 34 34
ec2users:|dos.act.drivers.appl|process7  38 38 38

61  process1  P1_D1_Data
 63  process1  P1_D2_Data
 65  process1  P1_D3_Data
 62  process2  P2_D1_Data
 67  process2  P2_D4_Data
 69  process2  P2_D5_Data
                :
 82  process9  P9_D12_Data
 83  process9  P9_D13_Data
149  Dos       Add_Process_Buffer
150  Dos       Application_Fault_Buffer
151  Dos       Are_You_Alive_Buffer
152  Dos       BIT_Results_Buffer
153  Dos       CME_Ph2_Buffer              T  T
154  Dos       Deadline_Report_Buffer
155  Dos       Define_Process_Buffer
156  Dos       Define_SE_Buffer
157  Dos       Delete_Process_Buffer
158  Dos       Delete_SE_Buffer
159  Dos       Dorm_Process_Buffer
160  Dos       Health_Buffer
162  Dos       I_Am_Alive_Buffer
163  Dos       I_Am_Here_Buffer
164  Dos       Loading_Buffer
166  Dos       Lost_CME_Buffer             T  T
167  Dos       Message_To_Log_Buffer
168  Dos       PI_Bus_Fault_Buffer
169  Dos       Remove_Process_Buffer
170  Dos       Set_Process_State_Buffer
171  Dos       Signal_Buffer
172  Dos       Switched_PI_Bus_Buffer
173  Dos       Wake_Process_Buffer
```

:: The PI-Bus labels (149-173) associated with the DOS process must be nt whenever a PI-Bus label table is generated for a CPU module.

WSP USER'S MANUAL

As an example, the following is a sample of the file dumped from VCIU:

CPUA
8/ 22/ 1987
1B101
0000005F
00FE0006FFFF000100FE0006FFFF000200FE0006FFFF000300FE0006FFFF000800FE0
006FFFF0009
00FE00020047FFFF000900020013FFFF000300020012FFFF000200030002FFFF00080002
0044FFFF
FFFF00010047FFFF00FE0007FFFF00FE000100020040FFFF00010005FFFFFFFF0001
0005FFFFFFFF
FFFF00010010FFFF000100010041FFFF000100020040FFFF00020005FFFFFFFFFFFF0
0010012FFFF
000200010042FFFF000200030002FFFF000300010043FFFF00030005FFFF

This is the corresponding text:

Dump of CPUA's trace buffer from 8/ 22/ 1987

```
Process 254 defines Process 1
Process 254 defines Process 2
Process 254 defines Process 3
Process 254 defines Process 8
Process 254 defines Process 9
Process 254 waits on Semaphore 71
Process 9 waits on Semaphore 19
Process 3 waits on Semaphore 18
Process 2 waits on 2 semaphores
Process 8 waits on Semaphore 68
Semaphore 71 is signalled by DOS
Process 254 deletes Process 254
Process 1 waits on Semaphore 64
Process 1 calls CPU_Output
Process 1 calls CPU_Output
Semaphore 16 is signalled by DOS
Process 1 signals Semaphore 65
Process 1 waits on Semaphore 64
Process 2 calls CPU_Output
Semaphore 18 is signalled by DOS
Process 2 signals Semaphore 66
Process 2 waits on 2 semaphores
Process 3 signals Semaphore 67
```

CPUB's trace buffer from execution at the same time (truncated for space considerations):

WSP USER'S MANUAL

Dump of CPUB's trace buffer from  8/ 22/ 1987

```
Process    255 defines Process   254
Process    255 defines Process   253
Process    255 waits on Semaphore   22
Process    253 defines Process   4
Process    253 defines Process   5
Process    253 defines Process   6
Process    253 defines Process   7
Process    253 signals Semaphore   71
Process    253 deletes Process   253
Process    6 waits on Semaphore   66
Process    7 waits on   2 semaphores
Process    4 waits on Semaphore   20
Semaphore   65 is signalled by DOS
Process    4 waits on Semaphore   20
Process    5 waits on Semaphore   65
Process    5 calls CPU_Input
Process    5 calls CPU_Input
Semaphore   66 is signalled by DOS
                 :
```

A comparison of the two buffers provides can give some clues on how to use these buffer contents. CPU B contains the SES (Process 255 - see bottom of Section 4.7 Power-Up Description), so it begins execution first. The SES defines Processes 254 and 253, which are two family executives: Process 254 picks up on CPU A immediately because it is doing nothing before the process definition. Process 253 picks up on CPU B after the SES has relinquished control through a Wait on Semaphore 22, because the SES is of higher priority than Process 253.

Notes on semaphores:

A global semaphore may be signalled on one CPU and be waited on by a process in another CPU. In this case, the buffer will make a note of the signal on the first CPU and the arrival of the signal on the second CPU. For example, in the above textual description, Process 1 on CPU A signals semaphore 65 about three-fourths of the way through CPU A's buffer. DOS on CPU B receives the signal message three-fourths of the way through its buffer, as noted by "Semaphore 65 is signalled by DOS". Through this matching of signals, the user can attempt to synchronize the execution of the two CPUs.

WSP USER'S MANUAL

In CPU A's buffer, note the signals of Semaphores 16 and 18 by DOS that are not signalled by CPU B. These signals are actually the result of PI-Bus transfer requests. Note that above the signal of Semaphore 16 is a call by Process 1 to CPU_Output. In the listing of Process 1 in Appendix B you will notice that Process 1 requests Semaphore 16 to be signalled when the transfer completes. The trace buffer makes a note of when the transfer completes. Semaphore 18 is a very similar situation with Process 2's use a CPU_Output.

What we claim is:

1. A digital signal processing system for controlling avionic displays and devices in accordance with processed signals from a plurality of sensors, comprising a plurality of array processor groups, each group including bulk memory means for storing sensor received data, signal processing means for processing the stored data, and controller means for handling the storage and processing of the data;

subbus data network means interconnecting the bulk memory means, the signal processing means, and control means of each respective array processor group, and interconnecting the plurality of groups in parallel relationship for storing sensed data in a bulk memory means of a selected array group and for processing and transferring the stored and processed data to selected array groups in accordance with the control means of a selected one of the array groups;

a plurality of individual general purpose digital computers;

an input/output module means for receiving and generating instructions to operate the avionic displays and devices; and parallel interface bus means interconnecting each of the general purpose computers, the input/output module means, and the control means of each array processor group in parallel relationship to one another for generating the signals to operate the display and avionic devices in accordance with the processed signals.

2. The digital signal processing system of claim 1, wherein the bulk memory means of each group, comprises a central processing unit, a plurality of memory elements, an input/output switch having an input and output port for each of the plurality of memory elements, a control element connecting the plurality of memory elements in parallel to the ports for transferring data from any one of the plurality of memory elements to any one of the plurality of output ports.

3. The digital signal processing system of claim 1 wherein the signal processing means, comprises a plurality of signal processing elements, input/output switch means having a number of input/output ports connected to the processing elements and to the bulk memory means, and a control element for operating the input/output switch for operatively connecting the bulk memory means to a selected one of the signal processing elements.

4. The digital signal processing means of claim 1 wherein the subbus data network means, comprises a bidirectional multibit data bus having an asynchronous input/output switch with a plurality of ports operative at different clock rates for transferring data to a selected array group.

5. The digital signal processing means of claim 1 wherein the subbus data network means comprises a bidirectional multibit data bus having a synchronous input/output switch with a plurality of ports operative at the identical clock rate for transferring data from one array group to another.

6. The digital signal processing means of claim 1 wherein the parallel interface bus means comprises a master/slave protocol permitting the bus master to read data from one slave or to write data to any number of slaves in a single message sequence.

7. The digital signal processing system of claim 1, further comprising a plurality of sensors operatively coupled in parallel relationship to the data network, one of said plurality being a radar antenna and another of said plurality being an electronic warfare sensor.

8. A digital signal processing system for controlling avionic displays and devices in accordance with processed signals from a pluraltiy of sensors, comprising a subbus data network means having a plurality of gate array elements for creating and destroying data paths, one of said elements being an asynchronous element having a plurality of ports operative at different clock rates, said subbus data nework being clocked at a first maximum clock rate;

a plurality of array processor groups, each group including bulk memory means for storing sensor received data, signal processing means for processing the stored data, and controller means for handling the storage and processing of the data, said controller means of each group being operatively coupled in parallel relationship to the parallel interface bus, said bulk memory means of each group being operatively coupled to the data newtork means;

a plurality of sensor means operatively coupled to the data network means for transferring data information to the bulk memory means;

distributed operating system program means residing in the controller means of each array group for controlling the data processed in the signal prpocessing means; and means operatively coupled to the parallel interface bus responsive to the processed signals for operating avionic devices in accordance with the characteristics of the sensed processed signals.

9. The digital signal processor of claim 8 wherein the signal processing mean of at least one array group is operative to process partially the sensed signals, and said system further comprises a plurality of individual general purpose digital computers operatively coupled to the parallel interface bus for completing the processing of the partially processed signals.

10. The digital signal processing system of claim 8, wherein the bulk memory means and controller means of each group each comprise a pair of central processing units, one central processing unit of each respective pair being operatively connected to run application programs for processing the sensed signals in the bulk memory means and signal processing means respectively, and the other central processing unit of each pair being commonly coupled for handling control messages, each of said other units of each pair having a memory operatively shared with one another.

11. The digital signal processing system of claim 8 wherein the plurality of gate array elements for creating and destroying data paths, further comprises a synchronous element having a plurality of ports each operative at the same first maximum clock rate.

12. The digital signal processing system of claim 8 wherein the distributed operating system includes a system executive program, and comprises means responsive to fault indications and status requests of modules coupled to the Parallel interface bus for reconfiguring the system to compensate for the failed module and inform the system executive program of the reconfigured status.

13. The digital signal processing system of claim 8 wherein the distributed operating system, comprises means for detecting the complete failure and the disconnection of a module from the parallel interface bus.

14. The digital signal processing system of claim 8, wherein the bulk memory means of each group, comprises at least one central processing unit, a plurality of memory elements, an input/output switch having an input and output port for each of the plurality of memory elements, a control element connecting the plurality of memory elements in parallel to the ports for transferring data from any one of the plurality of memory elements to any one of the plurality of output ports in accordance with instructions from the central processing unit.

15. The digital signal processing system of claim 8 wherein the signal processing means, comprises a plurality of signal processing elements, input/output switch means having a number of input/output ports connected to the processing elements and to the bulk memory means, and a controller for operating the input/output switch for operatively connecting the bulk memory means to selected ones of the signal processing elements.

16. The digital signal processing means of claim 15, wherein the bulk memory means comprises a plurality of bulk memory elements, input/output switch means with a plurality of ports operative at different clock rates for transferring data between selected ones of the bulk memory elements to selected ones of the signal processing elements.

17. The digital signal processing means of claim 16 wherein the input/output switch means of the signal processing means and the bulk memory means are operable to permit the transfer of data between the plurality of signal processing elements, between the plurality of bulk memory elements and the plurality of signal processing elements, and between the signal processing elements and the controller.

18. The digital signal processing means of claim 17 wherein the parallel interface bus means comprises a master/slave protocol permitting the bus master to read data from one array group or to write data to any number of array groups in a single message sequence.

19. The digital signal processing system of claim 18 wherein the parallel interface bus includes means for operating at a speed of approximately 12.5 MHz.

20. The digital signal processing system of claim 19 wherein the data network includes means for clocking at a rate of 20 MHz.

21. The digital signal processing system of claim 17, wherein the input/output switch means is operable to permit transfers of data from one selected signal processing element to all other signal processing elements, transfers of data between adjacent signal processing elements, and transfers between any signal processor elements in accordance with a stored lookup table.

22. A method of processing signals received from a plurality of different types of avionic sensors in a digital processing system having an input/output module, a generl purpose computer, an array processor group for processing the sensed signals, a plurality of different types of sensor input, a subbus data network connecting the processor group and sensor input in parallel relationship, and a parallel interface bus connecting the array processor group and input/output module and general purpose computer in parallel relationship independent of the sensors and the data network, said method comprising transferring data from the sensors input over the subbus data network to the array processor group for processing the sensed input, transferring data representative of post detection information from the array processor group to the general purpose computer over the parallel interface bus, transferring data representative of avionic system mode commands between the general purpose computer and the input/output module over the parallel interface bus, processing signal processing mode commands in response the post detection information in the general purpose computer, transferring the processed signal processing mode commands from the general purpose digital computer to the array processor group over the parallel interface bus for processing the sensed input in accordance with the mode commands, and transferring control and narrow band data into and out of the input/output module.

23. The method of claim 22 wherein the data is transferred over the subbus data network at a rate substantially faster than the data is transferred over the parallel interface bus.

24. The method of processing signals received from a plurality of different types of avionic sensors in a digital processing system having an input/output module, a plurality of general purpose computers, a plurality of array processor groups for processing the sensed signals, a plurality of different types of sensor input, a subbus data network connecting the array processor groups and sensor input in parallel relationship, and a parallel interface bus connecting the plurality of array processor groups and input/output module and the plurality of general purpose computers in a parallel relationship independent of the sensors and the data network, and an operating system that resides in each central processing unit of the plurality of general purpose computers and the plurality of array processor groups, said method comprising the steps of scheduling and synchronization of application processes, reading and writing data between two modules and between a module and an outside entity via the parallel interface bus, responding to and monitoring fault indications and status requests of each module in the system, and handling of interrupts.

25. The method of claim 24 wherein the step of scheduling and synchronizing, comprises the substeps of defining the processes within a processor module based upon a set of attributes, allocating the module for the execution of the processes, scheduling the processes for changing a process form one state to another, said states being one of the undefined, dormant, waiting, ready, and active states, executing the processes, and synchronizing the processes with semaphores and events.

26. The method of claim 24 wherein the step of reading and writing data comprises the substep of communicating between two parallel interface bus labels, and determining the completion of a transfer with the use of semaphores.

27. The method of claim 24 wherein the step of responding to asnd monitoring fault indications and status requests of each module in the system, comprises the substeps of monitoring the health of the parallel interface bus, interconnecting buses, and loss of a processor module, and determining a suitable reconfiguration to compensate for an unhealthy component.

28. The method of claim 24 wherein the step of responding to and monitoring fault indications and status requests, comprises the substeps of detecting a periodic signal transmitted from each module, and detecting a periodic signal transmitted from each module, and initiating a reconfiguration upon the failure to detect said signal for a predetermined time period.

29. The method of claim 24 wherein the step of handling the interrupts, comprises the substeps of selectively calling a procedure from the step of process scheduling for signalling the proper semaphore or event, and forwarding the message associated with the interrupt for one of the process scheduling and synchronization of application processes, reading and writing data, and responding to and monitoring fault indications.

30. The method of claim 24 wherein the distributed operating system and application programs run on respective one of a pair of central processing units of each array processor group, and the step of process scheduling, comprises the substeps of utilizing an area of memory for sharing between each one of the pair of central processing units to pass parameters, executing both central processing units of the pair concurrently, performing a central processing unit output call on the unit running the application software, and continuing execution of code on the unit running the application software following the output call while the unit running the distributed output system is performing the output.

* * * * *